US009863823B2

(12) United States Patent
McMillen et al.

(10) Patent No.: US 9,863,823 B2
(45) **Date of Patent: *Jan. 9, 2018**

(54) SENSOR SYSTEMS INTEGRATED WITH FOOTWEAR

(71) Applicant: BeBop Sensors, Inc., Berkeley, CA (US)

(72) Inventors: Keith A. McMillen, Berkeley, CA (US); Gregory Wille, Berkeley, CA (US); Daniel Eric McAnulty, Oakland, CA (US)

(73) Assignee: BeBop Sensors, Inc., Berkeley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/052,293

(22) Filed: Feb. 24, 2016

(65) Prior Publication Data

US 2016/0252412 A1 Sep. 1, 2016

Related U.S. Application Data

(60) Provisional application No. 62/126,137, filed on Feb. 27, 2015.

(51) Int. Cl.

| | |
|---|---|
| ***G01B 7/16*** | (2006.01) |
| ***G01L 1/18*** | (2006.01) |
| ***A43B 3/00*** | (2006.01) |

(52) U.S. Cl.
CPC .............. *G01L 1/18* (2013.01); *A43B 3/0005* (2013.01)

(58) Field of Classification Search
CPC ................................ G01L 1/18; A43B 3/0005
USPC ............................ 73/760, 774, 862.041, 777
See application file for complete search history.

(56) References Cited

U.S. PATENT DOCUMENTS

| | | | |
|---|---|---|---|
| 4,294,014 | A | 10/1981 | Baumann et al. |
| 4,438,291 | A | 3/1984 | Eichelberger et al. |
| 4,693,530 | A | 9/1987 | Stillie et al. |
| 4,790,968 | A | 12/1988 | Ohkawa et al. |
| 4,852,443 | A | 8/1989 | Duncan et al. |
| 5,033,291 | A | 7/1991 | Podoloff et al. |
| 5,128,880 | A | 7/1992 | White |
| 5,131,306 | A | 7/1992 | Yamamoto |
| 5,219,292 | A | 6/1993 | Dickirson et al. |
| 5,237,520 | A | 8/1993 | White |
| 5,288,938 | A | 2/1994 | Wheaton |
| 5,316,017 | A | 5/1994 | Edwards et al. |
| 5,429,092 | A | 7/1995 | Kamei |
| 5,571,973 | A | 11/1996 | Taylot |

(Continued)

FOREIGN PATENT DOCUMENTS

| | | | |
|---|---|---|---|
| CN | 200980381 | Y | 11/2007 |
| CN | 201920728 | U | 8/2011 |

(Continued)

OTHER PUBLICATIONS

U.S. Office Action dated Sep. 12, 2012 issued in U.S. Appl. No. 12/904,657.

(Continued)

*Primary Examiner* — Max Noori
(74) *Attorney, Agent, or Firm* — Weaver Austin Villeneuve & Sampson LLP

(57) ABSTRACT

Sensors and sensor systems incorporating piezoresistive materials for integration with footwear are described.

22 Claims, 25 Drawing Sheets

(56) References Cited

U.S. PATENT DOCUMENTS 5,578,766 A 11/1996 Kondo
5,659,395 A 8/1997 Brown et al.
5,695,859 A 12/1997 Burgess
5,729,905 A 3/1998 Mathiasmeier et al.
5,822,223 A 10/1998 Genest
5,866,829 A 2/1999 Pecoraro
5,878,359 A 3/1999 Takeda
5,943,044 A 8/1999 Martinelli et al.
5,989,700 A 11/1999 Krivopal
6,029,358 A 2/2000 Mathiasmeier et al.
6,032,109 A 2/2000 Ritmiller, III
6,049,327 A 4/2000 Walker et al.
6,141,643 A 10/2000 Harmon
6,155,120 A 12/2000 Taylor
6,215,055 B1 4/2001 Saravis
6,216,545 B1 4/2001 Taylor
6,304,840 B1 10/2001 Vance et al.
6,331,893 B1 12/2001 Brown et al.
6,360,615 B1 3/2002 Smela
6,486,776 B1 11/2002 Pollack et al.
6,763,320 B2 7/2004 Kimble
6,815,602 B2 11/2004 De Franco
6,822,635 B2 11/2004 Shahoian et al.
6,829,942 B2 12/2004 Yanai et al.
6,964,205 B2 11/2005 Papakostas et al.
7,066,887 B2* 6/2006 Flesch ...................... A61B 8/12 600/447
7,109,068 B2 9/2006 Akram et al.
7,113,856 B2 9/2006 Theiss et al.
7,157,640 B2 1/2007 Baggs
7,302,866 B1* 12/2007 Malkin ................. B06B 1/0622 73/862.041
7,332,670 B2 2/2008 Fujiwara et al.
7,409,256 B2 8/2008 Lin et al.
7,493,230 B2 2/2009 Schwartz et al.
7,536,794 B2 5/2009 Hay et al.
7,608,776 B2 10/2009 Ludwig
7,719,007 B2 5/2010 Tompkins et al.
7,754,956 B2 7/2010 Gain et al.
7,780,541 B2 8/2010 Bauer
7,855,718 B2 12/2010 Westerman
7,928,312 B2 4/2011 Sharma
7,984,544 B2 7/2011 Rosenberg
8,117,922 B2 2/2012 Xia et al.
8,161,826 B1 4/2012 Taylor
8,274,485 B2 9/2012 Liu et al.
8,346,684 B2 1/2013 Mirbach et al.
8,368,505 B2 2/2013 Deppiesse et al.
8,448,530 B2 5/2013 Leuenberger et al.
8,479,585 B2 7/2013 Shaw-Klein
8,536,880 B2 9/2013 Philipp
8,571,827 B2 10/2013 Jang et al.
8,680,390 B2 3/2014 McMillen et al.
8,884,913 B2 11/2014 Saynac et al.
8,904,876 B2 12/2014 Taylor et al.
8,925,393 B2 1/2015 Cannard et al.
8,945,328 B2 2/2015 Longinotti-Buitoni et al.
8,947,889 B2* 2/2015 Kelley .................. H01L 23/573 174/386
8,964,205 B2 2/2015 Shimizu
8,970,513 B2* 3/2015 Kwon ..................... G06F 3/016 345/173
9,038,482 B2 5/2015 Xia et al.
9,075,404 B2 7/2015 McMillen et al.
9,076,419 B2 7/2015 McMillen et al.
9,112,058 B2* 8/2015 Bao ......................... H01L 29/84
9,164,586 B2* 10/2015 Zellers ................... G06F 3/016
9,271,665 B2 3/2016 Sarrafzadeh et al.
9,417,693 B2 8/2016 Seth
9,442,614 B2 9/2016 McMillen
9,480,582 B2 11/2016 Lundborg
9,529,433 B2 12/2016 Shankar et al.
9,546,921 B2 1/2017 McMillen et al.
9,652,101 B2 5/2017 McMillen et al.
9,696,833 B2 7/2017 McMillen
9,710,060 B2 7/2017 McMillen et al.
9,721,553 B2 8/2017 McMillen et al.
2002/0078757 A1 6/2002 Hines et al.
2004/0031180 A1 2/2004 Ivanov
2004/0093746 A1 5/2004 Varsallona
2004/0183648 A1 9/2004 Weber et al.
2004/0189145 A1 9/2004 Pletner et al.
2005/0109095 A1 5/2005 Sinnett
2007/0129776 A1 6/2007 Robins et al.
2007/0151348 A1 7/2007 Zdeblick et al.
2007/0188179 A1 8/2007 Deangelis et al.
2007/0188180 A1 8/2007 Deangelis et al.
2007/0202765 A1 8/2007 Krans et al.
2007/0234888 A1 10/2007 Rotolo de Moraes
2008/0069412 A1 3/2008 Champagne et al.
2008/0158145 A1 7/2008 Westerman
2008/0189827 A1 8/2008 Bauer
2008/0254824 A1 10/2008 Moraes
2009/0049980 A1 2/2009 Sharma
2009/0237374 A1 9/2009 Li et al.
2009/0272197 A1 11/2009 Ridao Granado et al.
2009/0301190 A1 12/2009 Ross, Jr. et al.
2009/0303400 A1 12/2009 Hou et al.
2010/0134327 A1 6/2010 Dinh et al.
2010/0149108 A1 6/2010 Hotelling et al.
2010/0179724 A1 7/2010 Weston
2010/0242274 A1 9/2010 Rosenfeld et al.
2010/0274447 A1 10/2010 Stumpf
2010/0286951 A1 11/2010 Danenberg et al.
2010/0292945 A1 11/2010 Reynolds et al.
2010/0315337 A1 12/2010 Ferren et al.
2011/0088535 A1 4/2011 Zarimis
2011/0088536 A1 4/2011 Mcmillen et al.
2011/0107771 A1* 5/2011 Crist .................... A43B 3/0005 62/3.3
2011/0141052 A1 6/2011 Bernstein et al.
2011/0153261 A1* 6/2011 Jang ..................... A43B 3/0005 702/141
2011/0241850 A1 10/2011 Bosch et al.
2011/0246028 A1 10/2011 Lisseman et al.
2011/0260994 A1 10/2011 Saynac et al.
2011/0271772 A1 11/2011 Parks et al.
2012/0007831 A1 1/2012 Chang et al.
2012/0024132 A1 2/2012 Wallace et al.
2012/0026124 A1 2/2012 Li et al.
2012/0055257 A1 3/2012 Shaw-Klein
2012/0143092 A1 6/2012 Xia et al.
2012/0191554 A1 7/2012 Xia et al.
2012/0197161 A1 8/2012 Xia et al.
2012/0198949 A1 8/2012 Xia et al.
2012/0234105 A1 9/2012 Taylor
2012/0283979 A1 11/2012 Bruekers et al.
2012/0296528 A1 11/2012 Wellhoefer et al.
2012/0297885 A1 11/2012 Hou et al.
2012/0323501 A1 12/2012 Sarrafzadeh et al.
2013/0009905 A1 1/2013 Castillo et al.
2013/0055482 A1 3/2013 D'Aprile et al.
2013/0082970 A1 4/2013 Frey et al.
2013/0085394 A1 4/2013 Corbett, III et al.
2013/0113057 A1 5/2013 Taylor
2013/0165809 A1 6/2013 Abir
2013/0192071 A1 8/2013 Esposito et al.
2013/0211208 A1 8/2013 Varadan et al.
2013/0239787 A1 9/2013 McMillen et al.
2013/0274985 A1 10/2013 Lee et al.
2013/0275057 A1 10/2013 Perlin et al.
2013/0327560 A1 12/2013 Ichiki
2013/0340598 A1 12/2013 Marquez et al.
2014/0007704 A1 1/2014 Granado et al.
2014/0013865 A1 1/2014 White et al.
2014/0026678 A1 1/2014 Cannard et al.
2014/0033829 A1 2/2014 Xia et al.
2014/0090488 A1 4/2014 Taylor et al.
2014/0104776 A1 4/2014 Clayton et al.
2014/0107966 A1 4/2014 Xia et al.
2014/0107967 A1 4/2014 Xia et al.
2014/0107968 A1 4/2014 Xia et al.
2014/0125124 A1 5/2014 Verner
2014/0130593 A1 5/2014 Ciou et al.

(56) References Cited

U.S. PATENT DOCUMENTS

| | | | | |
|---|---|---|---|---|
| 2014/0150573 | A1 | 6/2014 | Cannard et al. | |
| 2014/0182170 | A1 | 7/2014 | Wawrousek et al. | |
| 2014/0195023 | A1 | 7/2014 | Statham et al. | |
| 2014/0215684 | A1 | 8/2014 | Hardy et al. | |
| 2014/0222243 | A1 | 8/2014 | McMillen et al. | |
| 2014/0318699 | A1 | 10/2014 | Longinotti-Buitoni et al. | |
| 2014/0347076 | A1 | 11/2014 | Barton et al. | |
| 2015/0035743 | A1 | 2/2015 | Rosener | |
| 2015/0084873 | A1 | 3/2015 | Hagenbuch et al. | |
| 2015/0086955 | A1 | 3/2015 | Poniatowski et al. | |
| 2015/0130698 | A1 | 5/2015 | Burgess | |
| 2015/0168238 | A1 | 6/2015 | Raut et al. | |
| 2015/0177080 | A1 | 6/2015 | Esposito et al. | |
| 2015/0261372 | A1 | 9/2015 | McMillen et al. | |
| 2015/0316434 | A1* | 11/2015 | McMillen | G10H 1/348 345/174 |
| 2015/0317964 | A1 | 11/2015 | McMillen et al. | |
| 2015/0330855 | A1* | 11/2015 | Daniecki | A43B 3/0005 73/727 |
| 2015/0331512 | A1 | 11/2015 | McMillen et al. | |
| 2015/0331522 | A1 | 11/2015 | McMillen et al. | |
| 2015/0331523 | A1 | 11/2015 | McMillen et al. | |
| 2015/0331524 | A1 | 11/2015 | McMillen et al. | |
| 2015/0331533 | A1 | 11/2015 | McMillen et al. | |
| 2015/0370396 | A1 | 12/2015 | Hotelling et al. | |
| 2016/0054798 | A1 | 2/2016 | Messinger et al. | |
| 2016/0070347 | A1 | 3/2016 | McMillen et al. | |
| 2016/0169754 | A1 | 6/2016 | Kowalewski et al. | |
| 2016/0175186 | A1 | 6/2016 | Shadduck | |
| 2016/0238547 | A1 | 8/2016 | Park et al. | |
| 2016/0270727 | A1 | 9/2016 | Berg et al. | |
| 2016/0278709 | A1 | 9/2016 | Granado et al. | |
| 2016/0318356 | A1 | 11/2016 | McMillen et al. | |
| 2016/0375910 | A1 | 12/2016 | McMillen et al. | |
| 2017/0038881 | A1 | 2/2017 | McMillen | |
| 2017/0110103 | A1 | 4/2017 | McMillen et al. | |
| 2017/0167931 | A1 | 6/2017 | McMillen et al. | |
| 2017/0212638 | A1 | 7/2017 | McMillen | |

FOREIGN PATENT DOCUMENTS

| | | | |
|---|---|---|---|
| CN | 102551728 | A | 7/2012 |
| CN | 202396601 | U | 8/2012 |
| CN | 203234132 | U | 10/2013 |
| CN | 102406280 | B | 3/2014 |
| DE | 11 2010 004 038 | T5 | 9/2012 |
| EP | 0 014 022 | B1 | 11/1984 |
| EP | 2 682 724 | A1 | 1/2014 |
| JP | H08-194481 | A | 7/1996 |
| JP | 2000-267664 | A | 9/2000 |
| JP | 2008-515008 | A | 5/2008 |
| KR | 10-2007-0008500 | A | 1/2007 |
| KR | 100865148 | B1 | 10/2008 |
| KR | 10-1362742 | B1 | 2/2014 |
| KR | 10-2014-0071693 | A | 6/2014 |
| NL | 8900820 | A | 11/1990 |
| RU | 2 533 539 | C1 | 11/2014 |
| WO | WO 99/20179 | A1 | 4/1999 |
| WO | WO 2007/024875 | A2 | 3/2007 |
| WO | WO 2009/155891 | A1 | 12/2009 |
| WO | WO 2011/047171 | A2 | 4/2011 |
| WO | WO 2015/175317 | A1 | 11/2015 |
| WO | WO 2016/070078 | A1 | 5/2016 |
| WO | WO 2016/138234 | A1 | 9/2016 |
| WO | WO 2016/176307 | A1 | 11/2016 |
| WO | WO 2016/210173 | A1 | 12/2016 |
| WO | WO 2017/066096 | A1 | 4/2017 |

OTHER PUBLICATIONS

U.S. Office Action dated Apr. 15, 2013 issued in U.S. Appl. No. 12/904,657.

U.S. Notice of Allowance dated Nov. 8, 2013 issued in U.S. Appl. No. 12/904,657.

U.S. Office Action dated Mar. 12, 2015 issued in U.S. Appl. No. 14/173,617.

U.S. Notice of Allowance dated May 1, 2015 issued in U.S. Appl. No. 14/173,617.

U.S. Office Action dated Apr. 2, 2015 issued in U.S. Appl. No. 13/799,304.

U.S. Notice of Allowance dated Apr. 24, 2015 issued in U.S. Appl. No. 13/799,304.

U.S. Office Action dated Sep. 1, 2015 issued in U.S. Appl. No. 14/728,872.

U.S. Office Action dated Jan. 13, 2016 issued in U.S. Appl. No. 14/464,551.

PCT International Search Report dated May 27, 2011, issued in PCT/US2010/052701.

PCT International Preliminary Report on Patentability and Written Opinion dated Apr. 26, 2012, issued in PCT/US2010/052701.

Japanese Office Action dated Feb. 25, 2014 issued in JP 2012-534361.

PCT International Search Report and Written Opinion dated Sep. 3, 2015 issued in PCT/US2015/029732.

"Electronic Foot Size Measuring Devices," *Sensatech Research Ltd., Custom Electronic Sensing Solutions*, Registered Office: 4 Heath Square, Boltro Road, Haywards Heath, RH16 1BL Company Registration No. 4524018 Cardiff [retrieved at http:www.electronicsarena.co.uk/companies/sensatech-research/products/electronic-foot-size-measureing-devices on Sep. 17, 2015], 3 pages.

"iStep® Digital Foot Scan," (©2002-2015) [retrieved at http://www.foot.com/site/iStep on Sep. 17, 2015], 1 page.

"Podotech Elftman," and Podotech Elftman Brochure (UK Version) [retrieved at http://www.podotech.com/diagnostics/podotech-elftman-2/ on Sep. 17, 2015] podo+tech®, Foot Care Technology Solutions, 7 pages.

Roh, Jung-Sim et al. (2011) "Robust and reliable fabric and piezoresistive multitouch sensing surfaces for musical controllers," from Alexander Refsum Jensenius, Recorded at: *11th International Conference on New Interfaces for Musical Expression* May 30-Jun. 1, 2011, Oslo, Norway, a vimeo download at http://vimeo.com/26906580.

"The Emed®-Systems," [retrieved at http://www.novel.de/novelcontent/emed on Sep. 17, 2015] novel.de, 4 pages.

U.S. Office Action dated Mar. 10, 2016 issued in U.S. Appl. No. 14/727,619.

U.S. Final Office Action dated Jul. 18, 2016 issued in U.S. Appl. No. 14/727,619.

U.S. Notice of Allowance dated Sep. 15, 2016 issued in U.S. Appl. No. 14/727,619.

U.S. Final Office Action dated Mar. 9, 2016 issued in U.S. Appl. No. 14/728,872.

U.S. Office Action dated Jun. 22, 2016 issued in U.S. Appl. No. 14/728,872.

U.S. Final Office Action dated Oct. 18, 2016 issued in U.S. Appl. No. 14/728,872.

U.S. Advisory Action dated Feb. 10, 2017 issued in U.S. Appl. No. 14/728,872.

U.S. Office Action dated Jul. 25, 2016 issued in U.S. Appl. No. 14/728,873.

U.S. Office Action dated Dec. 30, 2016 issued in U.S. Appl. No. 14/728,873.

U.S. Office Action dated Mar. 9, 2016 issued in U.S. Appl. No. 14/299,976.

U.S. Final Office Action dated Jul. 6, 2016 issued in U.S. Appl. No. 14/299,976.

U.S. Office Action dated Oct. 21, 2016 issued in U.S. Appl. No. 14/299,976.

U.S. Notice of Allowance dated Jun. 23, 2016 issued in U.S. Appl. No. 14/464,551.

U.S. Office Action dated Sep. 23, 2016 issued in U.S. Appl. No. 14/800,538.

U.S. Notice of Allowance dated Jan. 17, 2017 issued in U.S. Appl. No. 14/800,538.

(56) References Cited

OTHER PUBLICATIONS

U.S. Office Action dated Feb. 22, 2017 issued in U.S. Appl. No. 14/671,821.
U.S. Office Action dated Jun. 28, 2016 issued in U.S. Appl. No. 14/671,844.
U.S. Final Office Action dated Nov. 25, 2016 issued in U.S. Appl. No. 14/671,844.
U.S.Notice of Allowance dated Mar. 13, 2017 issued in U.S. Appl. No. 14/671,844.
U.S. Office Action dated May 20, 2016 issued in U.S. Appl. No. 14/928,058.
U.S. Final Office Action dated Jan. 6, 2017 issued in U.S. Appl. No. 14/928,058.
U.S. Notice of Allowance dated Mar. 16, 2017 issued in U.S. Appl. No. 14/928,058.
PCT International Preliminary Report on Patentability and Written Opinion dated Nov. 24, 2016 issued in PCT/US2015/029732.
PCT International Search Report and Written Opinion dated May 26, 2016 issued in PCT/US2016/019513.
PCT International Search Report and Written Opinion dated Apr. 14, 2016 issued in PCT/US2015/058370.
PCT International Search Report and Written Opinion dated Sep. 15, 2016 issued in PCT/US2016/029528.
PCT International Search Report and Written Opinion dated Sep. 29, 2016 issued in PCT/US2016/039089.
PCT International Search Report and Written Opinion dated Jan. 19, 2017 issued in PCT/US2016/055997.
U.S. Office Action dated Dec. 27, 2016 issued in U.S. Appl. No. 15/287,520.
U.S. Notice of Allowance dated Mar. 27, 2017 issued in U.S. Appl. No. 15/287,520.
U.S. Appl. No. 15/287,520, filed Oct. 6, 2016, McMillen et al.
U.S. Appl. No. 15/374,816, filed Dec. 9, 2016, McMillen et al.
U.S. Final Office Action dated Mar. 31, 2017 issued in U.S. Appl. No. 14/728,873.
U.S. Final Office Action dated Apr. 19, 2017 issued in U.S. Appl. No. 14/299,976.
PCT International Preliminary Report on Patentability and Written Opinion dated May 11, 2017 issued in PCT/US2015/058370.
U.S. Appl. No. 15/479,103, filed Apr. 4, 2017, McMillen et al.
U.S. Office Action dated May 19, 2017 issued in U.S. Appl. No. 14/728,872.
U.S. Advisory Action and Examiner initiated interview summary dated May 26, 2017 issued in U.S. Appl. No. 14/728,873.
U.S. Final Office Action dated Jun. 8, 2017 issued in U.S. Appl. No. 14/299,976.
U.S. Notice of Allowance dated Jul. 3, 2017 issued in U.S. Appl. No. 14/671,821.
U.S. Office Action dated Jun. 30, 2017 issued in U.S. Appl. No. 15/251,772.
U.S. Office Action dated Jun. 23, 2017 issued in U.S. Appl. No. 15/190,089.
U.S. Notice of Allowance dated Aug. 10, 2017 issued in U.S. Appl. No. 15/190,089.
U.S. Appl. No. 15/621,935, filed Jun. 13, 2017, McMillen et al.
U.S. Appl. No. 15/630,840, filed Jun. 22, 2017, McMillen et al.

* cited by examiner

SENSOR SYSTEMS INTEGRATED WITH FOOTWEAR

RELATED APPLICATION DATA

The present application is a non-provisional of and claims priority under 35 U.S.C. 119(e) to U.S. Provisional Patent Application No. 62/126,137 entitled Sensor Systems Integrated with Footwear filed on Feb. 27, 2015, the entire disclosure of which is incorporated herein by reference for all purposes.

BACKGROUND

Demand is rapidly rising for technologies that bridge the gap between computing devices and the physical world. These interfaces typically require some form of sensor technology that translates information from the physical domain to the digital domain. The "Internet of Things" contemplates the use of sensors in a virtually limitless range of applications, for many of which conventional sensor technology is not well suited.

SUMMARY

According to various implementations, sensors and applications of sensors are provided. According to a particular class of implementations, a sensor system includes a flexible piezoresistive substrate having a shape of a portion of an article of footwear and an array of sensors. Each sensor includes two conductive traces formed directly on the piezoresistive substrate. Each sensor is positioned on the substrate to align with a region of the exterior of a human foot. Sensor circuitry is configured to energize the sensors to generate sensor signals, and to receive the sensor signals from the array of sensors. Each sensor signal represents a force associated with a corresponding one of the sensors.

According to some implementations, the sensor system includes a flexible dielectric substrate having the shape of the portion of an article of footwear. The flexible dielectric substrate is aligned with the flexible piezoresistive substrate and in contact with the array of sensors. The flexible dielectric substrate is secured to the flexible piezoresistive substrate only at locations on the flexible piezoresistive substrate where there are no sensors. According to a specific implementation, the flexible piezoresistive substrate and the flexible dielectric substrate are included among a plurality of layers. The plurality of layers further includes a stiffener, and top and bottom layers that combine to enclose and provide environmental protection to the flexible piezoresistive substrate, the flexible dielectric substrate, and the stiffener.

According to some implementations, the sensor circuitry is configured to process the sensor signals to determine the corresponding forces. According to a specific implementation, processing of the sensor signals includes determining the corresponding forces by mapping an analog-to-digital converter (ADC) value for each sensor signal to a force value stored in memory associated with the sensor circuitry. According to another specific implementation, processing of the sensor signals includes determining the corresponding forces by, for each sensor signal corresponding to a sensor of interest, generating a first value with the sensor of interest activated, generating a second value with remaining sensors of the array activated, and processing the first and second values to account for parasitic resistances of the sensor array. According to another specific implementation, processing of the sensor signals includes processing the sensor signals corresponding to multiple sensors to determine a speed and a direction of one or more of the corresponding forces.

According to some implementations, the shape of the portion of an article of footwear is a shape of an insole. A first set of the sensors is positioned on the flexible piezoresistive substrate to align with undersides of toes of the human foot. A second set of the sensors is positioned on the flexible piezoresistive substrate to align with a ball of the human foot. A third set of the sensors is positioned on the flexible piezoresistive substrate to align with a heel of the human foot. According to a specific implementation, a fourth set of the sensors is positioned on the flexible piezoresistive substrate to align with an outside edge of the human foot.

According to some implementations, the shape of the portion of an article of footwear is a shape of an upper.

According to another class of implementations, a sensor system, includes a flexible piezoresistive substrate having a shape of a portion of an article of footwear, and a flexible dielectric substrate having the shape of the portion of an article of footwear. The flexible dielectric substrate is aligned with the piezoresistive substrate. An array of sensors includes at least two conductive traces formed directly on the flexible dielectric substrate. The conductive traces are in contact with the flexible piezoresistive substrate. Each sensor is positioned on the flexible dielectric substrate to align with a region of the exterior of a human foot. Sensor circuitry is configured to energize the sensors to generate sensor signals, and to receive the sensor signals from the array of sensors. Each sensor signal represents a force associated with a corresponding one of the sensors.

According to some implementations, the flexible dielectric substrate is secured to the flexible piezoresistive substrate only at locations on the flexible dielectric substrate where there are no sensors. According to a specific implementation, the flexible piezoresistive substrate and the flexible dielectric substrate are included among a plurality of layers. The plurality of layers further includes a stiffener, and top and bottom layers that combine to enclose and provide environmental protection to the flexible piezoresistive substrate, the flexible dielectric substrate, and the stiffener.

According to some implementations, the sensor circuitry is configured to process the sensor signals to determine the corresponding forces. According to a specific implementation, processing of the sensor signals includes determining the corresponding forces by mapping an analog-to-digital converter (ADC) value for each sensor signal to a force value stored in memory associated with the sensor circuitry. According to a specific implementation, processing of the sensor signals includes determining the corresponding forces by, for each sensor signal corresponding to a sensor of interest, generating a first value with the sensor of interest activated, generating a second value with remaining sensors of the array activated, and processing the first and second values to account for parasitic resistances of the sensor array. According to a specific implementation, processing of the sensor signals includes processing the sensor signals corresponding to multiple sensors to determine a speed and a direction of one or more of the corresponding forces.

According to some implementations, the shape of the portion of an article of footwear is a shape of an insole. A first set of the sensors is positioned on the flexible dielectric substrate to align with undersides of toes of the human foot. A second set of the sensors is positioned on the flexible dielectric substrate to align with a ball of the human foot. A third set of the sensors is positioned on the flexible dielectric substrate to align with a heel of the human foot. According to a specific implementation, a fourth set of the sensors is positioned on the flexible dielectric substrate to align with an outside edge of the human foot.

According to some implementations, the shape of the portion of an article of footwear is a shape of an upper.

A further understanding of the nature and advantages of various implementations may be realized by reference to the remaining portions of the specification and the drawings.

DETAILED DESCRIPTION

Figure 1:
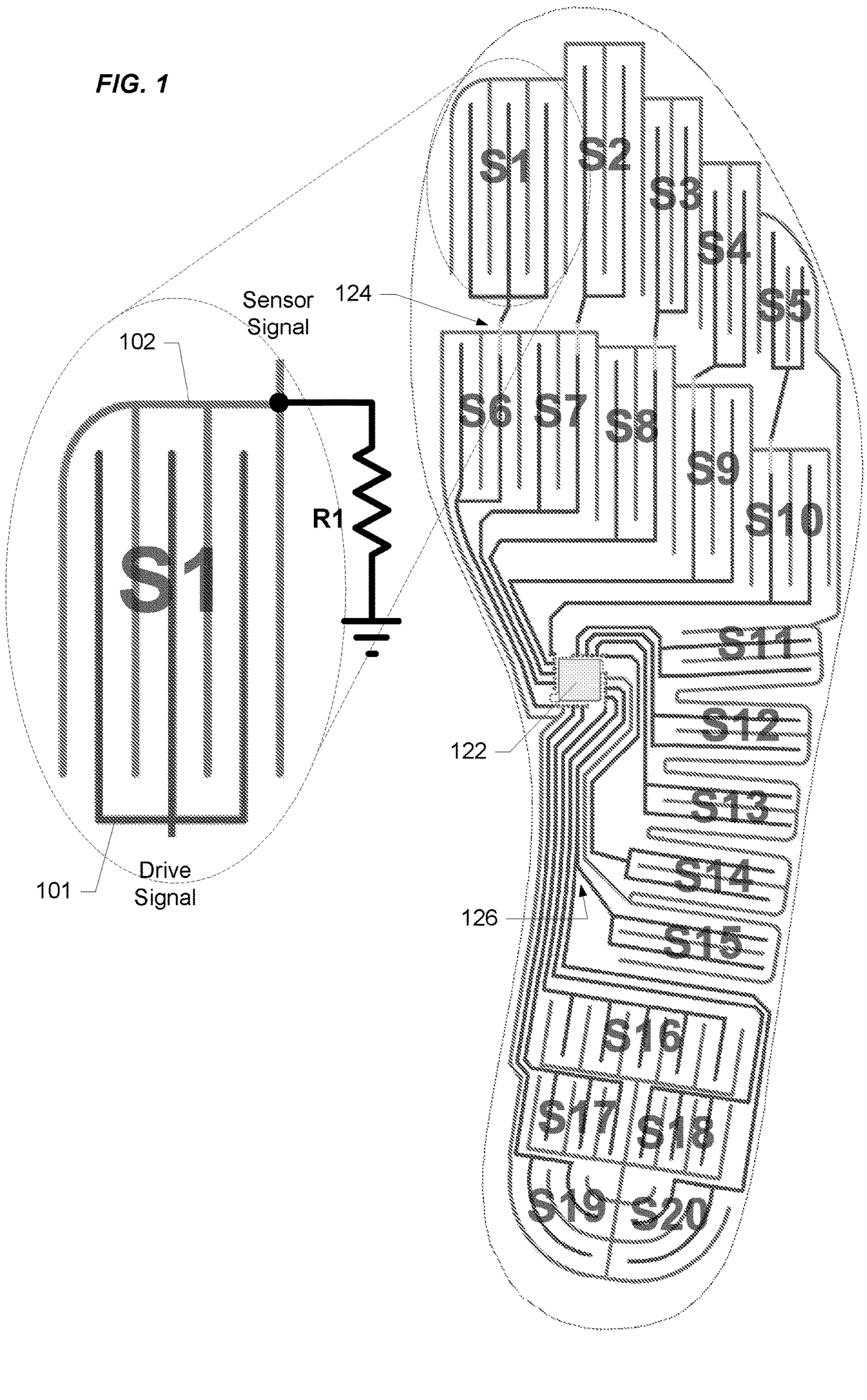
FIG. 1 shows a particular implementation of a footwear insole sensor array.

Sensors and sensor systems incorporating piezoresistive materials are described in this disclosure. In particular, various sensor systems for integration with footwear are described. Specific implementations are described herein including the best modes contemplated. Examples of these implementations are illustrated in the accompanying drawings. However, the scope of this disclosure is not limited to the described implementations. Rather, this disclosure is intended to cover alternatives, modifications, and equivalents of these implementations. In the following description, specific details are set forth in order to provide a thorough understanding of the described implementations. Some implementations may be practiced without some or all of these specific details. In addition, well known features may not have been described in detail to promote clarity.

Piezoresistive materials include any of a class of materials that exhibit a change in electrical resistance in response to mechanical force (e.g., pressure, impact, distortion, etc.) applied to the material. One class of sensors described herein includes conductive traces formed directly on or otherwise integrated with a flexible substrate of piezoresistive material, e.g., a piezoresistive fabric or other flexible material. Another class of sensors described herein includes conductive traces formed directly on or otherwise integrated with a flexible dielectric substrate with flexible piezoresistive material that is adjacent and/or tightly integrated with the dielectric substrate and in contact with portions of the traces. When force is applied to such a sensor, the resistance between traces connected by the piezoresistive material changes in a time-varying manner that is representative of the applied force. A signal representative of the magnitude of the applied force is generated based on the change in resistance. This signal is captured via the conductive traces (e.g., as a voltage or a current), digitized (e.g., via an analog-to-digital converter), processed (e.g., by an associated processor, controller, or suitable circuitry), and potentially mapped (e.g., by the associated processor, controller, or circuitry) to a control function that may be used in conjunction with the control and/or operation of virtually any type of process, device, or system. It should be noted that the output signals from such sensors may also be used to detect a variety of distortions and/or deformations of the substrate(s) on which they are formed or with which they are integrated such as, for example, bends, stretches, torsions, rotations, etc. In addition, arrays of sensors having various configurations are described in this disclosure.

Printing, screening, depositing, thermally transferring, or otherwise forming conductive traces directly on flexible substrates allows for the creation of a sensor or sensor array that fits any arbitrary shape or volume. The piezoresistive material on which the traces are formed or with which the traces are in contact may be any of a variety of woven and non-woven fabrics having piezoresistive properties. Implementations are also contemplated in which the piezoresistive material may be any of a variety of flexible, stretchable, or otherwise deformable materials (e.g., rubber, or a stretchable fabric such as spandex or open mesh fabrics) having piezoresistive properties. The conductive traces may be formed on the piezoresistive material or a flexible dielectric substrate using any of a variety of conductive inks or paints. More generally, implementations are contemplated in which the conductive traces are formed using any flexible conductive material that may be formed on a flexible substrate. It should be understood with reference to the foregoing that, while specific implementations are described with reference to specific materials and techniques, the scope of this disclosure is not so limited.

Both one-sided and two-side implementations are contemplated, e.g., conductive traces can be printed or formed on one or both sides of flexible substrate. As will be understood, two-sided implementations may require some mechanism for connecting conductive traces on one side of the substrate to those on the other side. Some implementations use vias in which conductive ink or paint is flowed through the vias to establish the connections. Alternatively, conductive vias or rivets may make connections through the flexible substrate. Both single and double-sided implementations may also use insulating materials formed over or under conductive traces. This allows for the stacking or layering of conductive traces and signal lines, e.g., to allow the routing of signal line to isolated structures in a manner analogous to the different layers of a printed circuit board.

Routing of signals on and off the flexible substrate may be achieved in a variety of ways. For example, some implementations might use elastomeric connectors (e.g., ZEBRA® connectors) which alternate conductive and non-conductive rubber at a density typically an order of magnitude greater than the width of the conductive traces to which they connect (e.g., at the edge of the substrate). Alternatively, a circuit board (possibly made of a flexible material such as Kapton), or a bundle of conductors may be riveted or otherwise secured to the substrate. The use of rivets may also provide mechanical reinforcement to the connection.

According to some implementations, matching conductive traces or pads on the flexible substrate and a circuit board can be secured to each other using, for example, a layer of conductive adhesive (e.g., a conductive epoxy such as Masterbond EP79 from Masterbond, Inc. of Hackensack, N.J.) applied to one or both of the surfaces which are then mated to each other. The conductive traces or pads can also be held together with additional mechanical elements such as sonic welds or rivets. If conductive rivets are used to make the electrical connections to the conductive traces of the flexible substrate, the conductive adhesive may not be required. Conductive threads may also be used to connect the conductive traces of the flexible substrate to an external assembly. The wide range of variations within the scope of this disclosure will be apparent to those of skill in the art.

According to a particular class of implementations, the piezoresistive material is a pressure sensitive fabric manufactured by Eeonyx, Inc., of Pinole, Calif. The fabric includes conductive particles that are polymerized to keep them suspended in the fabric. The base material is a polyester felt selected for uniformity in density and thickness as this promotes greater uniformity in conductivity of the finished piezoresistive fabric. That is, the mechanical uniformity of the base material results in a more even distribution of conductive particles when the slurry containing the conductive particles is introduced. The fabric may be woven. Alternatively, the fabric may be non-woven such as, for example, a calendared fabric, e.g., fibers bonded together by chemical, mechanical, heat, or solvent treatment. For implementations in which conductive traces are formed on the piezoresistive fabric, calendared material may present a smooth outer surface which promotes more accurate screening of conductive inks.

The conductive particles in the fabric may be any of a wide variety of materials including, for example, silver, copper, gold, aluminum, carbon, etc. Some implementations may employ carbon graphenes that are formed to grip the fabric. Such materials may be fabricated using techniques described in U.S. Pat. No. 7,468,332 for Electroconductive Woven and Non-Woven Fabric issued on Dec. 23, 2008, the entire disclosure of which is incorporated herein by reference for all purposes. However, it should again be noted that any of a wide variety of flexible materials that exhibit a change in resistance or conductivity when force is applied to the material may be suitable for implementation of sensors as described herein.

According to a particular class of implementations, conductive traces having varying levels of conductivity are formed on flexible piezoresistive material or a flexible dielectric substrate using conductive silicone-based inks manufactured by, for example, E.I. du Pont de Nemours and Company (DuPont) of Wilmington, Del., and/or Creative Materials of Ayer, Mass. An example of a conductive ink suitable for implementing highly conductive traces for use with various implementations is product number 125-19 from Creative Materials, a flexible, high temperature, electrically conductive ink. Examples of conductive inks for implementing lower conductivity traces for use with various implementations are product numbers 7102 and 7105 from DuPont, both carbon conductive compositions. Examples of dielectric materials suitable for implementing insulators for use with various implementations are product numbers 5018 and 5036 from DuPont, a UV curable dielectric and an encapsulant, respectively. These inks are flexible and durable and can handle creasing, washing, etc. The degree of conductivity for different traces and applications is controlled by the amount or concentration of conductive particles (e.g., silver, copper, aluminum, carbon, etc.) suspended in the silicone. These inks can be screen printed or printed from an inkjet printer. Another class of implementations uses conductive paints (e.g., carbon particles mixed with paint) such as those that are commonly used for EMI shielding and ESD protection.

Additional examples of sensors and arrays of sensors that may be used with various implementations enabled by the present disclosure are described in U.S. patent application Ser. No. 14/299,976 entitled Piezoresistive Sensors and Applications filed on Jun. 9, 2014, and U.S. patent application Ser. No. 14/464,551 entitled Two-Dimensional Sensor Arrays filed on Aug. 20, 2014, the entire disclosures of both of which are incorporated herein by reference for all purposes. However, it should also be noted that implementations are contemplated that employ a variety of other suitable sensor technologies.

According to a particular class of implementations, insole sensor systems are provided for sensing forces relating to the human foot. FIG. 1 is an illustration of an example of such a sensor system that may be incorporated as part of the insole of a shoe or other type of footwear. The depicted insole sensor system includes twenty sensors that capture data from different areas of the foot. The sensors are implemented with conductive trace patterns that are formed directly on or otherwise integrated with a flexible substrate. The flexible substrate may be a piezoresistive material or a dielectric material. In the latter case, a flexible piezoresistive material is tightly integrated with the dielectric material such that it makes contact with each of the sensor trace patterns. Portions of the conductive traces that are not intended to be part of a sensor (e.g., signal routing traces) may be shielded to reduce any unwanted contributions to the sensor signals. That is, the portions of the conductive traces that bring the drive and sense signals to and from the sensors may be insulated from the piezoresistive material using, for example, a dielectric or non-conducting material (not shown for clarity) that insulates portions of the traces from the piezoresistive material. Portions of the conductive traces may also be formed over such insulating materials.

In the depicted implementation there are 20 sensors, S1-S20. Each of the sensors includes two adjacent traces, the respective patterns of which may include extension that alternate as shown. See, for example, the magnified view of sensor S1. One of the traces 101 receives a drive signal; the other trace 102 transmits the sensor signal to associated sensor circuitry (not shown). The drive signal might be provided, for example, by connecting the trace (permanently or temporarily) to a voltage reference, a signal source that may include additional information in the drive signal, a GPIO (General Purpose Input Output) pin of an associated processor or controller, etc. And as shown in the example in FIG. 1, the sensor signal might be generated using a voltage divider in which one of the resistors of the divider includes the resistance between the two traces through the intervening piezoresistive material. The other resistor (represented by R1) might be included, for example, with the associated sensor circuitry. As the resistance of the piezoresistive material changes with applied force, the sensor signal also varies as a divided portion of the drive signal.

A first set of sensors (S1-S5) aligns with the user's toes; one sensor for each toe. A second set of sensors (S6-S10) aligns with the ball of the foot. A third set of sensors (S11-S15) aligns with the outside of the bottom of the foot opposite the arch. A fourth set of sensors (S16-S20) aligns with the heel. The sensors are energized (via the drive signals) and interrogated (via the sensor signals) to generate an output signal for each that is a representation of the force exerted on that sensor. As will also be appreciated, and depending on the application, implementations are contemplated having more or fewer sensors.

According to various implementations, different sets of sensors may be selectively energized and interrogated thereby reducing the number and overall area of traces on the substrate, as well as the connections to sensor circuitry on an associated PCB (e.g., PCB 122) that may reside, for example, in a cutout of the flexible substrate on which the sensors are configured. In the sensor system depicted in FIG. 1, the 20 sensors are driven via 14 drive signal outputs from the sensor circuitry on the PCB, and the sensor signals are received via 2 sensor signal inputs to the sensor circuitry on the PCB; with 16 connections between the substrate and the PCB. This may be compared to an implementation in which each sensor has its own dedicated pair of signal lines (i.e., 20 sensors; 40 signal lines). The set of sensors providing sensor signals to one of the 2 sensor signal inputs (e.g., sensors S1-S5 and S16-S20) may be energized in any suitable sequence or pattern such that any signal received on the corresponding sensor signal input can be correlated with the corresponding sensor drive signal by the sensor circuitry.

And because the sensor signals in this implementation are received by the sensor circuitry via two different sensor signal inputs, two sensors can be simultaneously energized as long as they are connected to different sensor signal inputs to the sensor circuitry. This allows for the sharing of drive signal lines. For example, in the implementation of FIG. 1, several pairs of sensors share a common drive signal line, i.e., S1 and S6, S2 and S7, S3 and S8, S4 and S9, S5 and S10, and S15 and S20. The sharing of the common drive signal lines is enabled in some cases (e.g., sensors S1 and S6) by insulators which allow the conductive traces to cross (e.g., as illustrated at 124). In other cases (e.g., sensors S15 and S20), the conductive traces might simply diverge (e.g., as illustrated at 126). And although not apparent from the conductive traces of FIG. 1, the remaining pairs of sensors (i.e., S11 and S16, S12 and S17, S13 and S18, and S14 and S19) may share common drive signals that originate and then diverge while on PCB 122. Thus, in the implementation shown, as few as 10 drive signals might need to be generated for energizing 20 sensors. Other suitable variations on this theme will be understood by those of skill in the art to be within the scope of this disclosure.

A printed circuit board (e.g., PCB 122) including circuitry for controlling operation of the sensors and receiving sensor data may be provided, for example, in the area aligned with the arch of the foot (e.g., the cutout in FIG. 1); an area for which sensor data might be either irrelevant or of lesser importance for some applications. According to some implementations, such a PCB may be connected to the conductive traces of the sensor array as described U.S. patent application Ser. No. 14/671,821 entitled Flexible Sensors and Applications filed on Mar. 27, 2015, the entire disclosure of which is incorporated herein by reference for all purposes. According to other implementations and as mentioned above, any of a variety of techniques may be employed to make such a connection including, for example, elastomeric connectors (e.g., ZEBRA® connectors). A variety of other suitable alternatives are available to those of skill in the art.

The substrate on which the sensors are formed may be susceptible to damage or corruption due to environmental conditions (e.g., moisture or temperature) and shear forces. Testing was performed using a variety of multilayer configurations with various materials resulting in an insole design that performs well under a range of conditions. A particular multilayer configuration of such an insole assembly that includes a sensor array like the one described above with reference to FIG. 1 is shown in FIG. 2.

Figure 2:
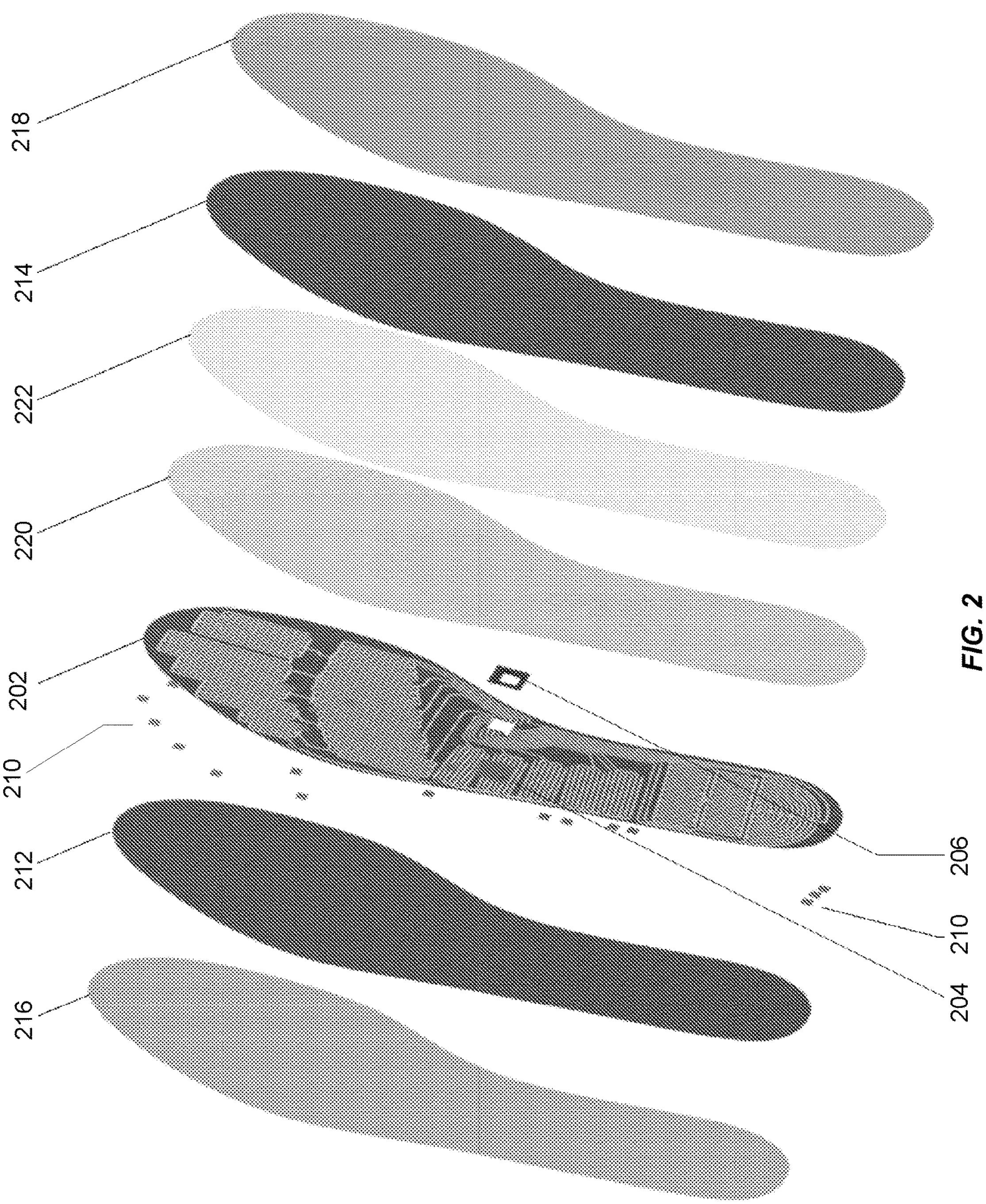
FIG. 2 shows an example of a multilayer configuration of an insole assembly that includes a sensor array.

The multilayer configuration shown in FIG. 2 was shown not only to protect the sensor array from environmental conditions and shear forces, but also to enable a wide dynamic range of operation for each of the sensors (e.g., detection of force or pressure ranging from about 50 grams to about 100 kg; a ratio of about 2000:1). As will be appreciated, this kind of range is important for an insole sensor system intended to work with a wide range of body weights and foot shapes and sizes. That is, under most conditions, only a subset of the sensors in an insole sensor system are likely to be experiencing force at any given time. For example, as a person walks, the heel, ball of the foot, and toes experience the force of coming into contact with the ground in succession. Therefore, at any given moment, most of the force experienced by the foot is concentrated on the sensors aligned with the respective portions of the foot. To be able to usefully measure the forces experienced by those few sensors, each individual sensor must be able to handle a significant amount of weight without running out of range.

On the other hand, it may also be important for some applications to accurately measure very small amounts of force and/or to be able to precisely distinguish between slight variations in force on the same or adjacent sensors. It is therefore desirable not only to have individual sensors that can measure large amounts of force, but also to have those same sensors be sensitive to very small forces and very small changes in force. Implementations of sensor systems as shown in FIGS. 1 and 2 are characterized by such a dynamic range.

Dynamic range testing data for 19 of the 20 sensors of a particular implementation are provided herewith as part of this disclosure (sensor 15 was inoperable during the testing). Raw data is provided in tables below and presented in corresponding graphs in FIGS. 7-25. Also provided in the data below are representations of the logarithmic trendlines for each of the operable sensors. These data demonstrate a wide dynamic range (about 50 grams to about 100 kg) for sensors constructed from conductive traces formed directly on a flexible piezoresistive substrate. The dynamic ranges achieved may be due, at least in part, to the deep integration of the traces with the underlying substrate, i.e., the traces may be able to gather more signal/electrons than conductors of previous sensor designs. Similarly wide dynamic ranges may be achieved for systems in which the conductive traces of the sensors are formed on a flexible dielectric substrate adjacent or otherwise integrated with a piezoresistive substrate.

Referring again to FIG. 2, layer 202 includes a flexible piezoresistive substrate with sensor traces formed directly on the substrate (e.g., conductive ink printed on fabric) and includes a PCB 204 (with associated sensor circuitry) that is secured in an aperture in layer 202 using a backplate 206. It should be noted that implementations are also contemplated in which the sensor traces are formed on a flexible dielectric substrate that is tightly integrated with a flexible piezoresistive material. According to the particular implementation shown in FIG. 2 and in order to better preserve the dynamic ranges of the sensors, the layer of material adjacent the sensor traces on sensor layer 202 (e.g., layer 212) is only adhered to layer 202 at locations that do not include conductive traces. In the depicted implementation, this is achieved using adhesive squares 210 that are aligned with the substrate of layer 202 where there are no traces. It was found during testing that a continuous layer of adhesive in contact with the sensor traces degraded the dynamic range of the sensors.

Layers 212 and 214 are both layers of a closed-cell foam (e.g., Poron or Sorbathane) that is commonly used in shoe insoles. These provide the general look and feel of the insole assembly. In the depicted implementation, each is about 0.5 mm thick. Layers 216 and 218 are both very thin (e.g., about 0.05 mm) plastic layers that are pressed and heated such that they melt into layers 212 and 214. Layers 216 and 218 may be slightly larger than the other layers of the insole assembly so that they contact each other around the edges of the stack, thereby providing an environmental seal for the assembly.

Layer 220 is a stiffener made of a suitable material (e.g., polyethylene terephthalate or PET) and coated with a pressure sensitive adhesive (PSA) (not shown) that adheres to the underside of layer 202. Layer 220 provides enough stiffness to the stack to facilitate, for example, insertion of the assembly into a shoe. Layer 222 is a thin (e.g., about 0.05 mm) layer of PSA that secures layer 220 to layer 214. A wide variety of PSAs are suitable for use on layer 220 and as layer 222 and adhesive squares 210. According to a particular implementation, the PSA for layers 220 and 222 and adhesive squares 210 is 3M-467 W, a double-sided adhesive tape from 3M of Minneapolis, Minn. However, to facilitate mass production, such adhesives may be formed or deposited (e.g., screen printed) on the layer surfaces. As will be appreciated, insole sensor systems implemented as described herein can be configured to operate properly even if set below or above one or more additional insole layers added for comfort or podiatric purposes.

Figure 3:
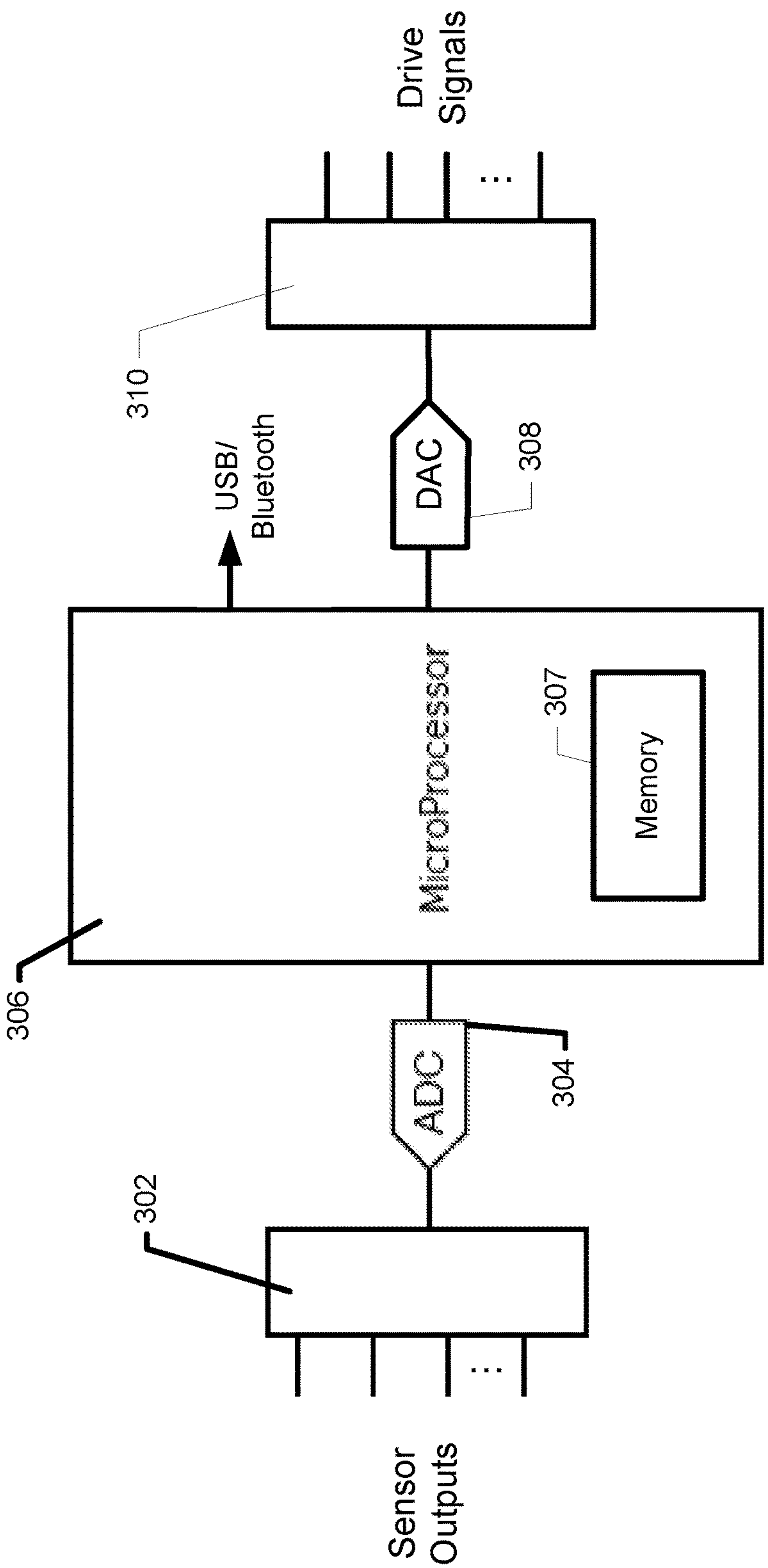
FIG. 3 is a simplified block diagram of sensor circuitry suitable for use with various implementations.
Figure 4:
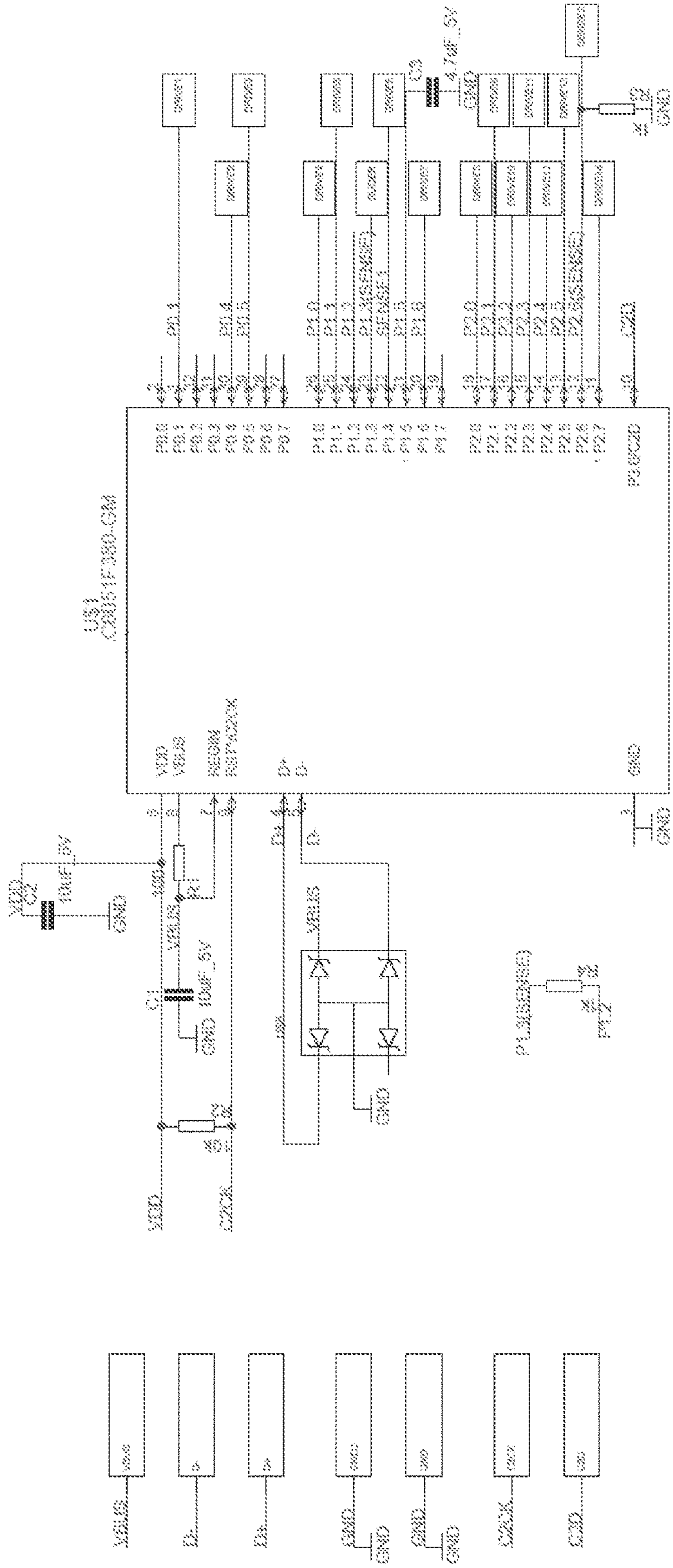
FIG. 4 is a schematic of sensor circuitry suitable for use with various implementations.

FIG. 3 is a simplified diagram of sensor circuitry that may be provided on a PCB for use with implementations described herein. For example, in the implementation described above with reference to FIGS. 1 and 2, such sensor circuitry could be provided on PCB 122 or PCB 204 and connected to the conductive traces associated with sensors S1-S20. When pressure is applied to one of the sensors, a resulting signal (captured via the corresponding traces) is received and digitized (e.g., via multiplexer 302 and A-to-D converter 304) and may be processed locally (e.g., by processor 306) and/or transmitted to a connected device (e.g., via a USB or Bluetooth connection). The sensors may be selectively energized by the sensor circuitry (e.g., under the control of processor 306 via D-to-A converter 308 and multiplexer 310) to effect the generation of the sensor signals. In addition to transmission of data to and from a connected device, power may be provided to the sensor circuitry via a USB connection. Alternatively, systems that transmit data wirelessly (e.g., via Bluetooth) may provide power to the sensor circuitry using any of a variety of mechanisms and techniques including, for example, using one or more batteries, solar cells, and/or mechanisms that harvest mechanical energy. The LTC3588 (provided by Linear Technology Corporation of Milpitas, Calif.) is an example of an energy harvesting power supply that may be used with at least some of these diverse energy sources. Other suitable variations will be appreciated by those of skill in the art. And as will be appreciated, the sensor circuitry shown in FIG. 3 is merely an example. A wide range of sensor circuitry components, configurations, and functionalities are contemplated. FIG. 4 shows a schematic diagram of a specific implementation of sensor circuitry that includes a controller which is the C8051F380-GM controller (provided by Silicon Labs of Austin, Tex.).

As will be understood (and as demonstrated in the sensor test data provided below), the responses of the sensors in arrays enabled by the present disclosure may exhibit variation relative to each other. According to some implementations, calibrated sensor data may be stored (e.g., in memory 307 of processor 306) representing the response of each of the sensors. Such data may be used for ensuring consistency in the way the sensor outputs are processed and/or used to represent applied forces. During calibration, the output of each sensor (e.g., as captured by ADC 304) is measured for a range of known input forces. This may be done, for example, by placing each sensor on a scale, applying force to that sensor, and recording a value in memory for each of a plurality of ADC values that represents a corresponding value reported by the scale. In this way, a set of data points for each sensor is captured (e.g., in a table in memory 307) associating ADC values with corresponding forces (e.g., weights in grams or kilograms). The data set for each sensor may capture a force value for every possible value of the ADC output. Alternatively, fewer data points may be captured and the sensor circuitry may use interpolation to derive force values for ADC outputs not represented in the data set.

Generating the set of data points for each sensor may be done by applying the force individually to each sensor using, for example, a device with a footprint that matches the sensor's active area configuration (e.g., see the shapes of sensors S1-S20 of FIG. 1). It may also be done by applying force simultaneously over the entire array using, for example, a precision inflatable bladder that distributes force evenly over the array. The measurements for a given force can then be captured by activating the sensors sequentially. Other variations will be appreciated by those of skill in the art. Regardless of how the calibration force is applied, what results is data set that the processor may use to map the output received from each sensor to an accurate representation of the force represented. As will be appreciated, this consistency of representation may be important for many applications.

Figure 5:
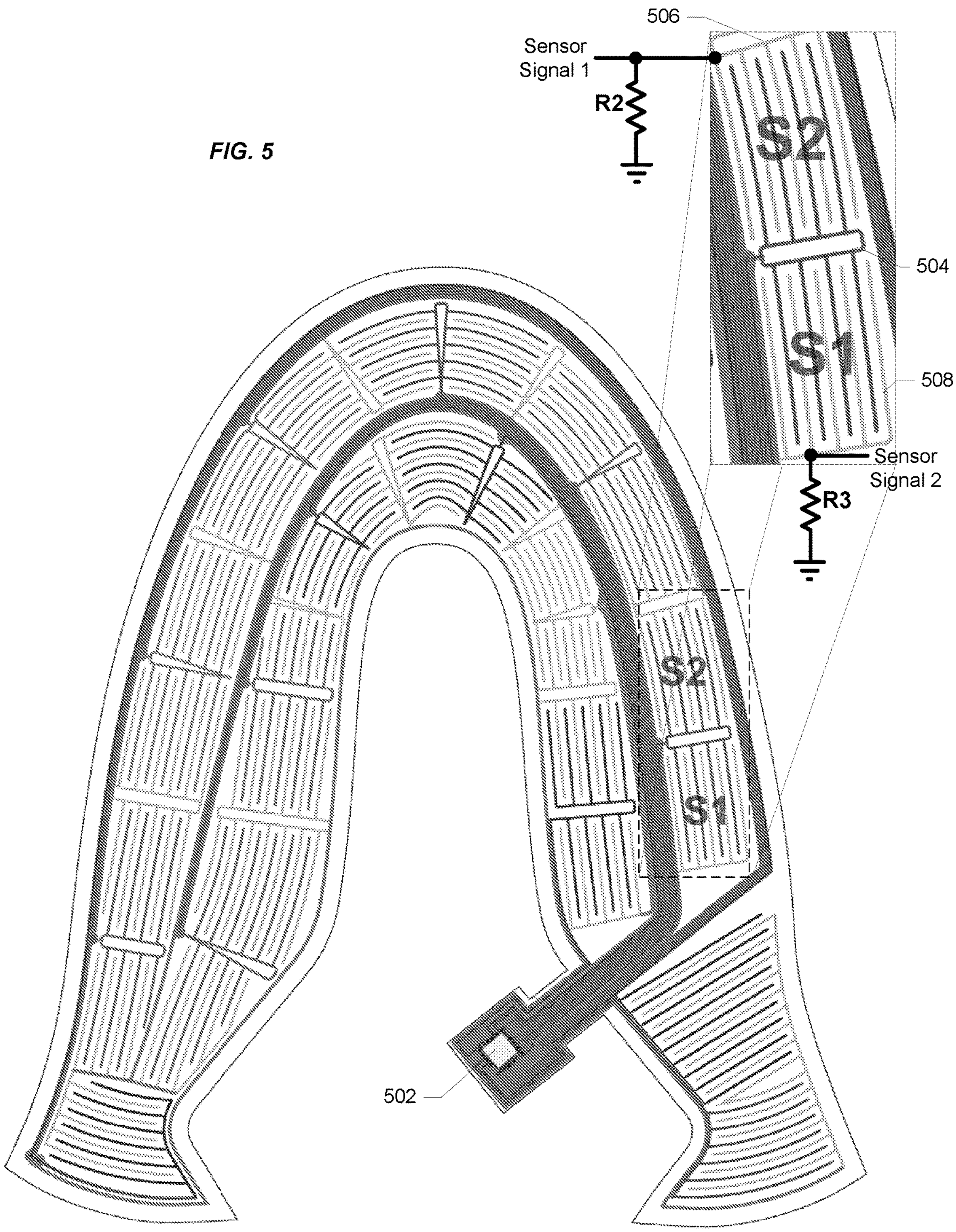
FIG. 5 shows a particular implementation of a footwear upper sensor array.
Figure 6:
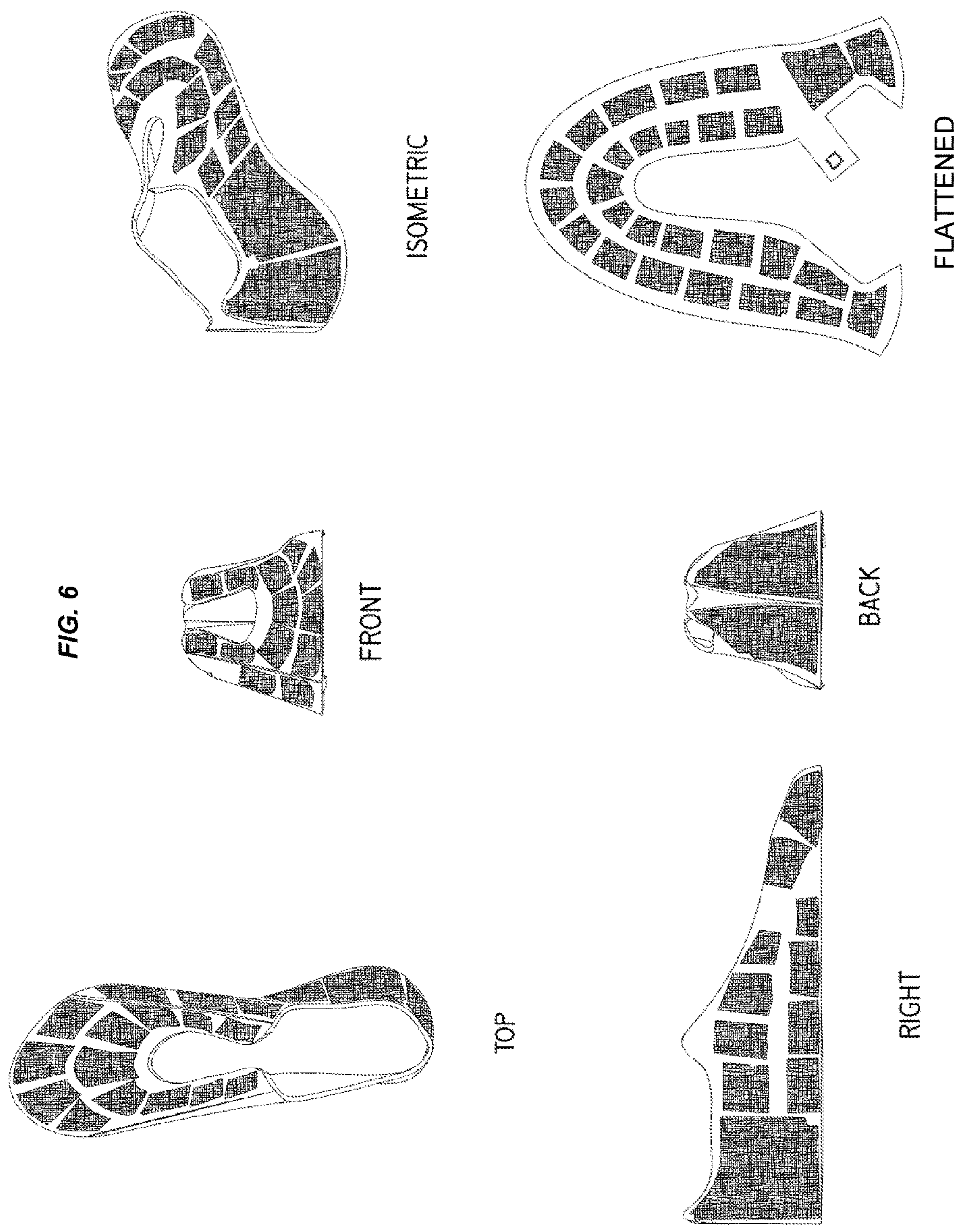
FIG. 6 shows various views and configurations of a footwear upper sensor array similar to the one shown in FIG. 5.
Figure 7:
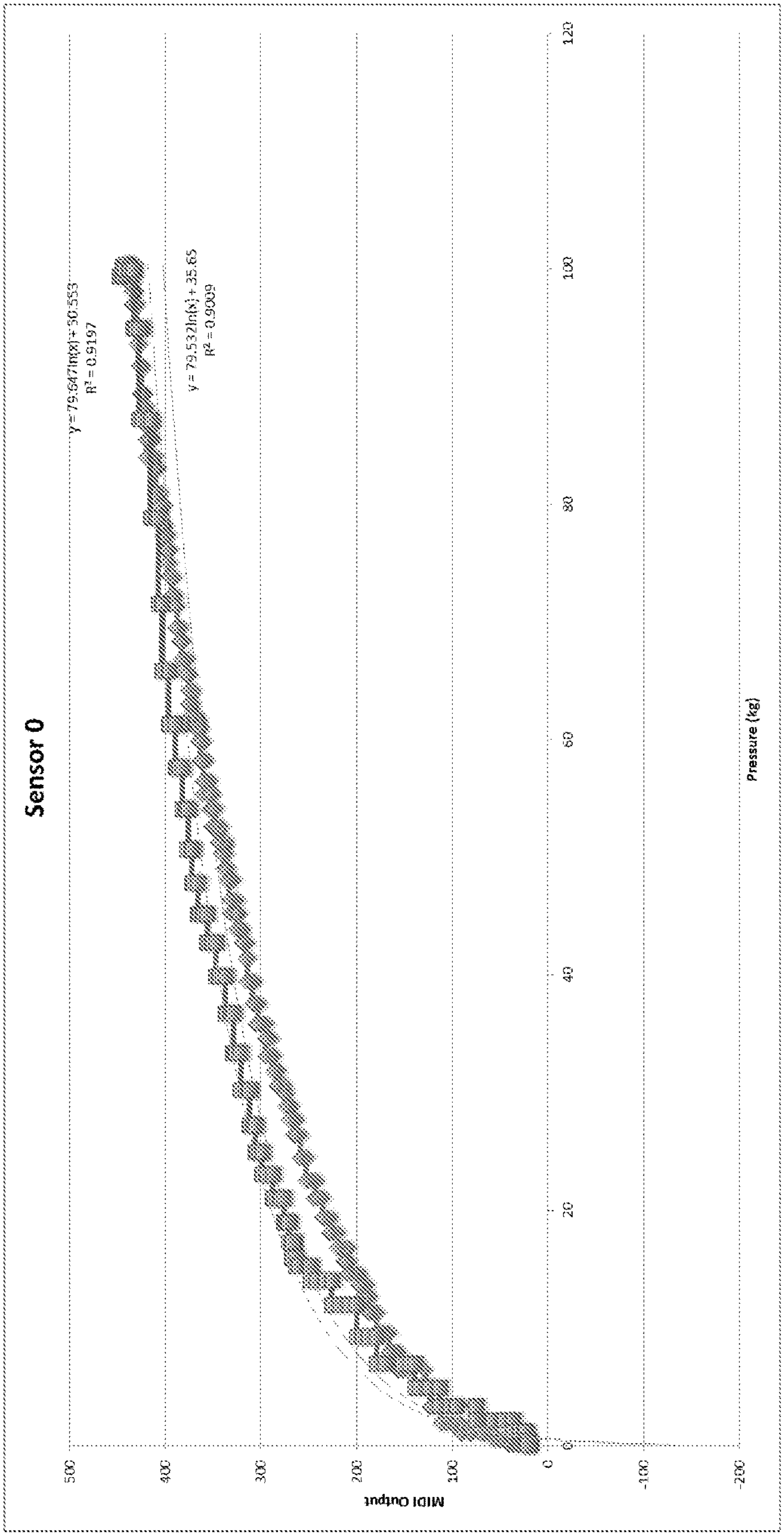
FIGS. 7-25 are graphs of sensor test data.
Figure 8:
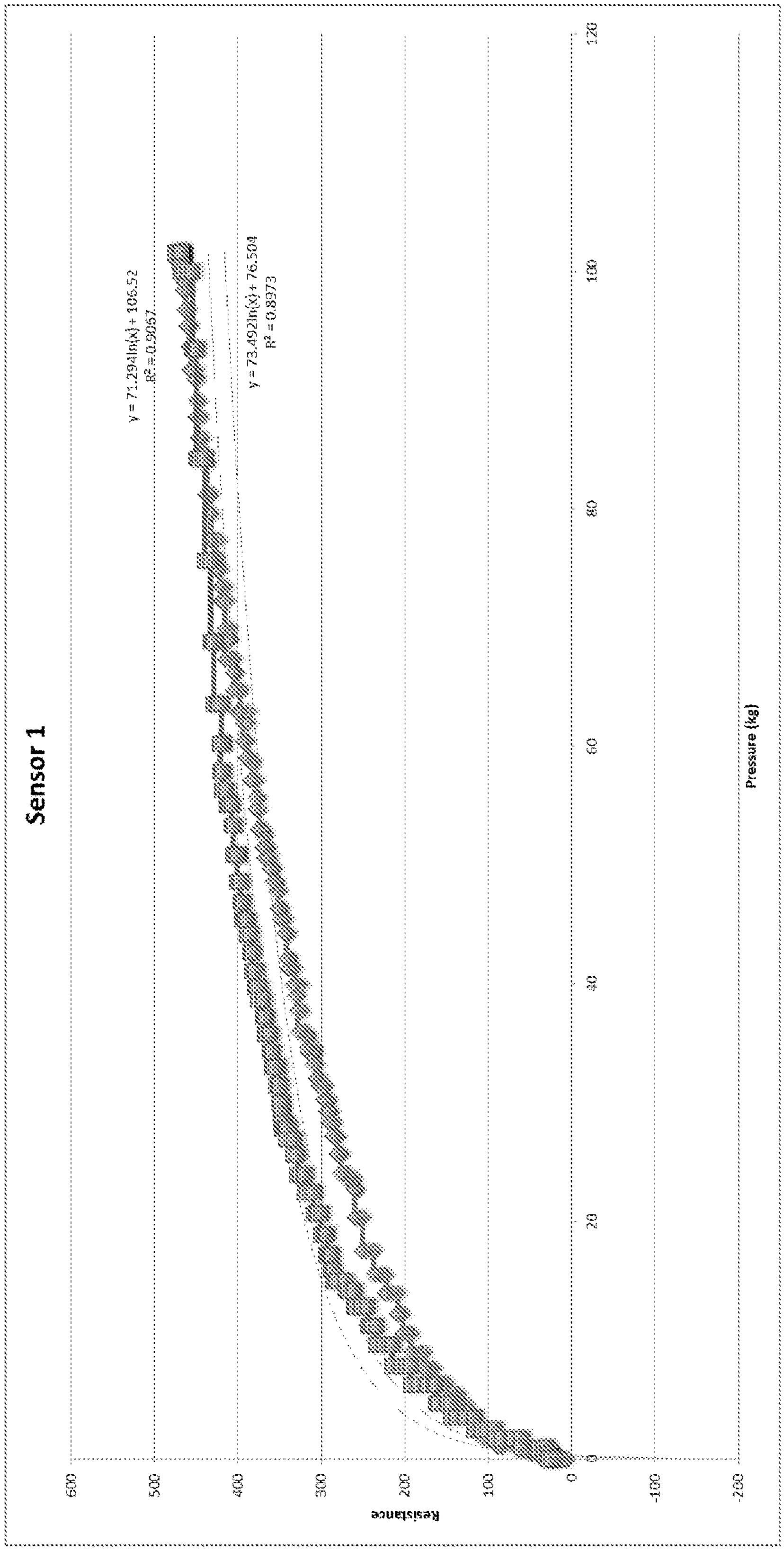
Figure 9:
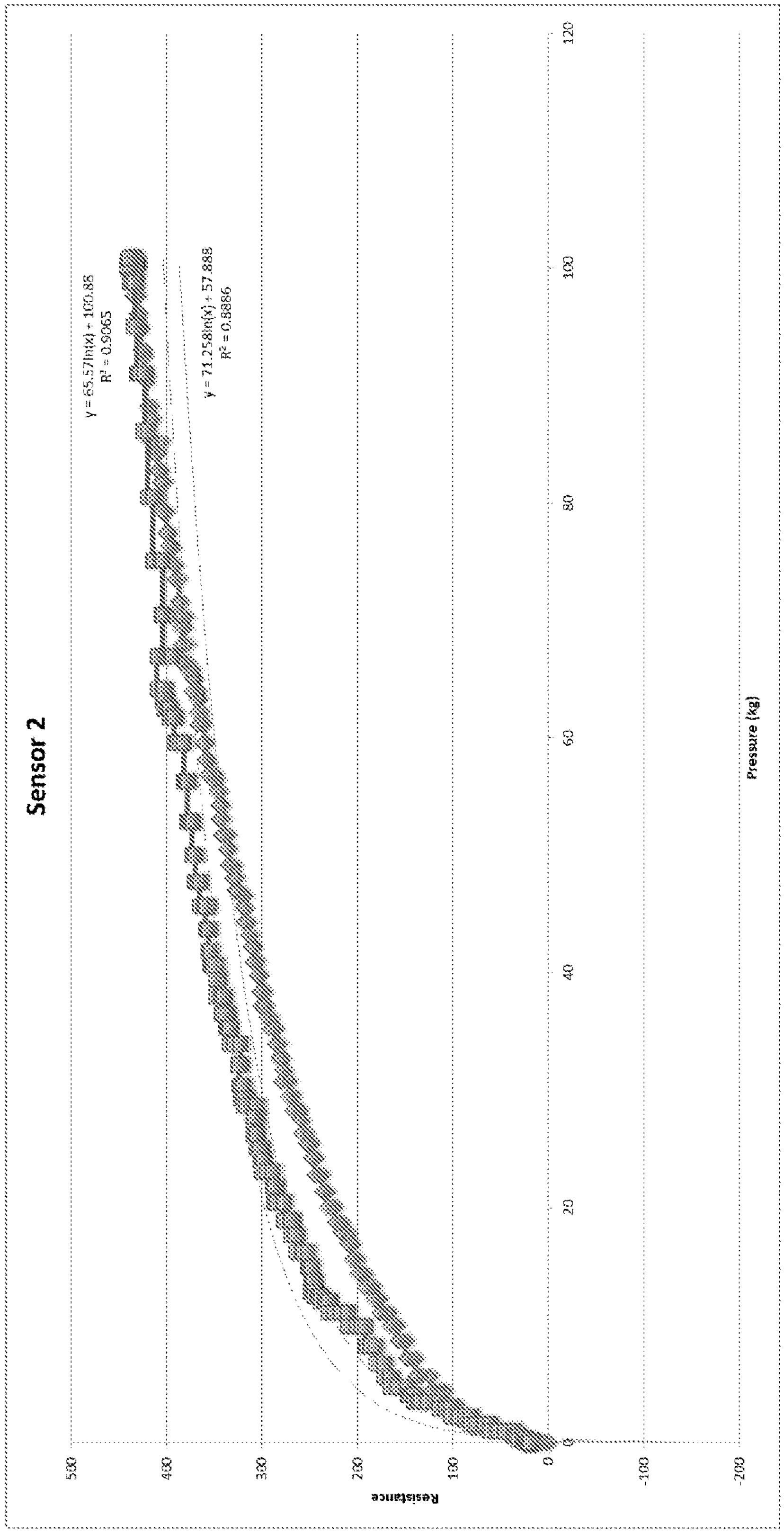
Figure 10:
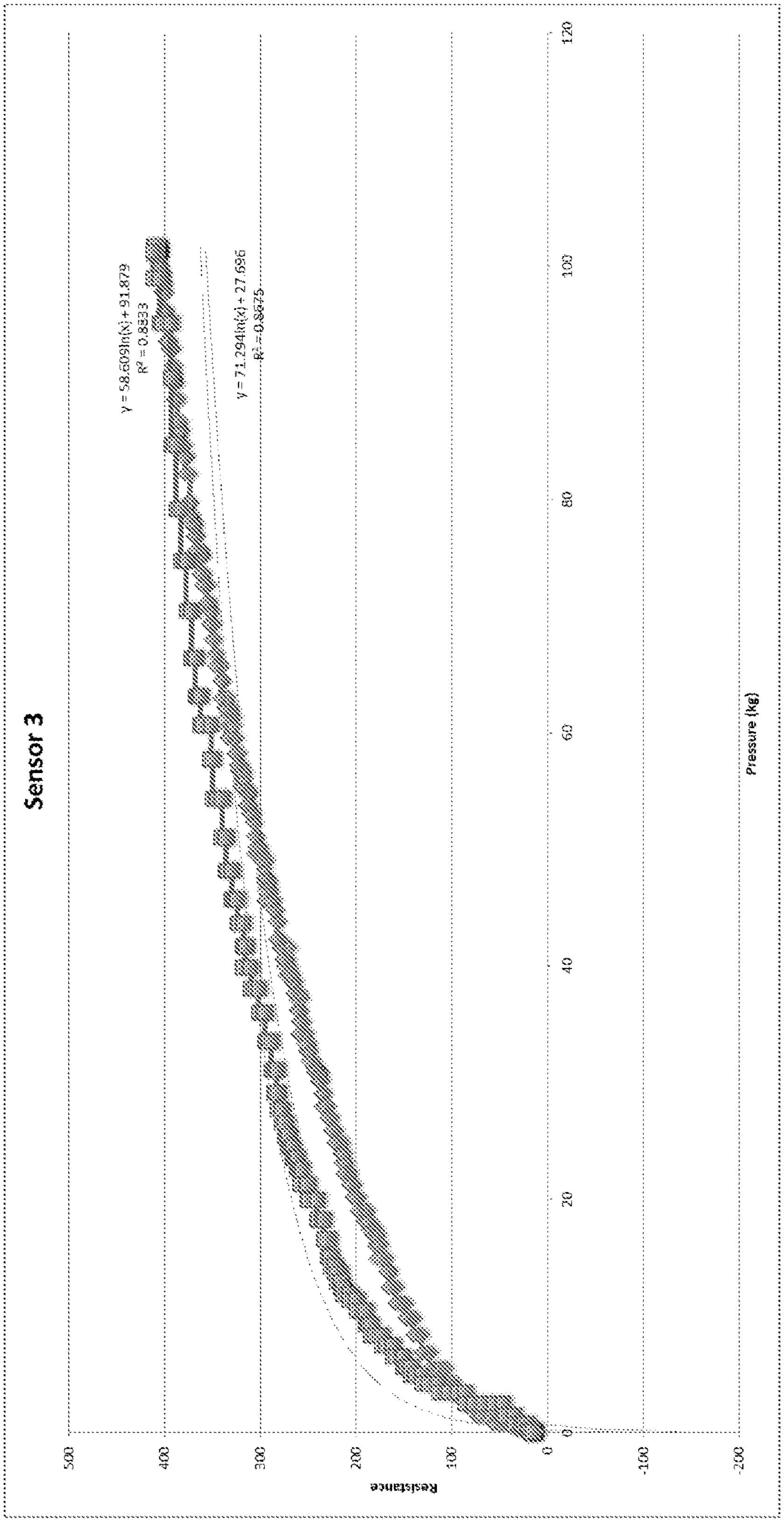
Figure 11:
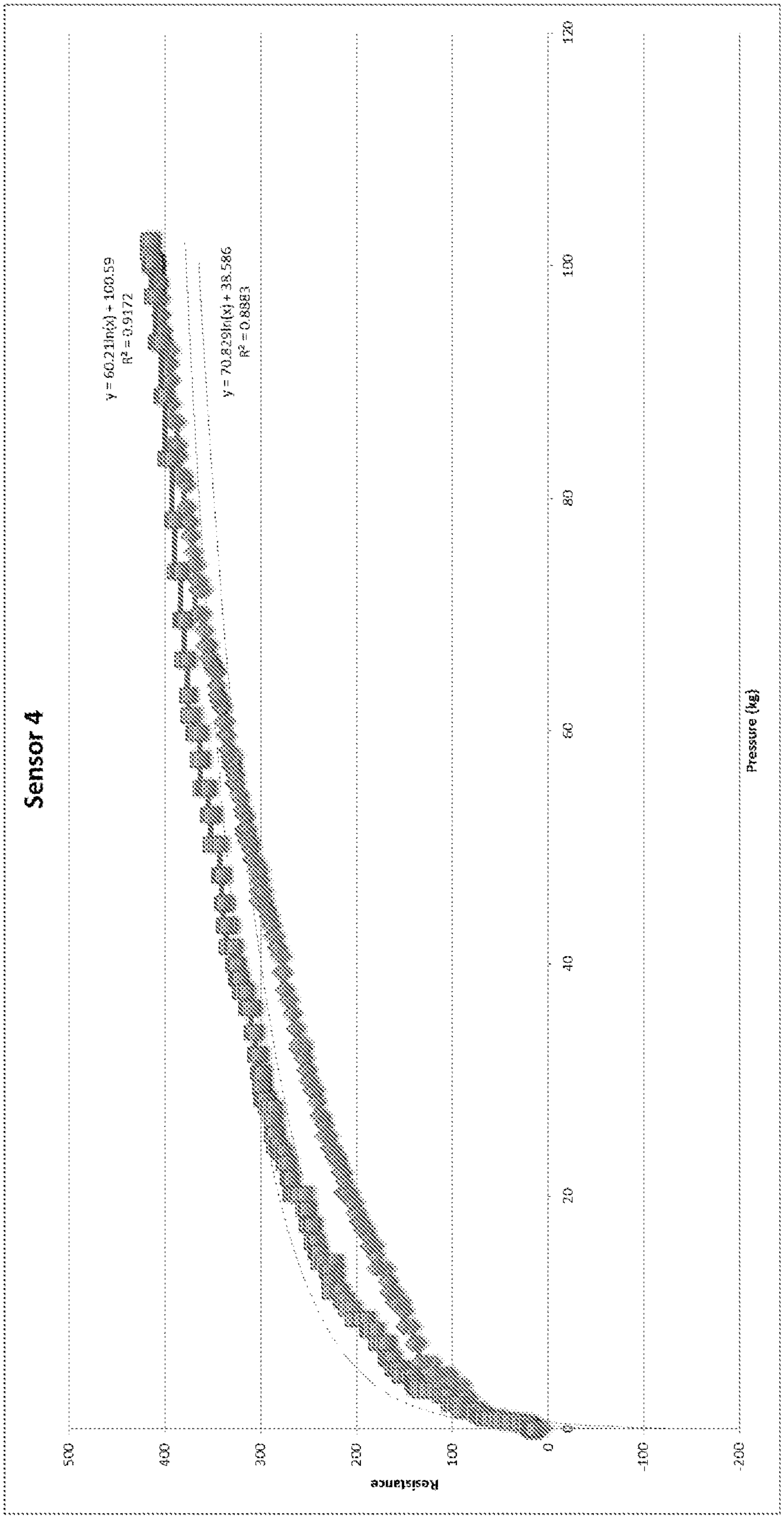
Figure 12:
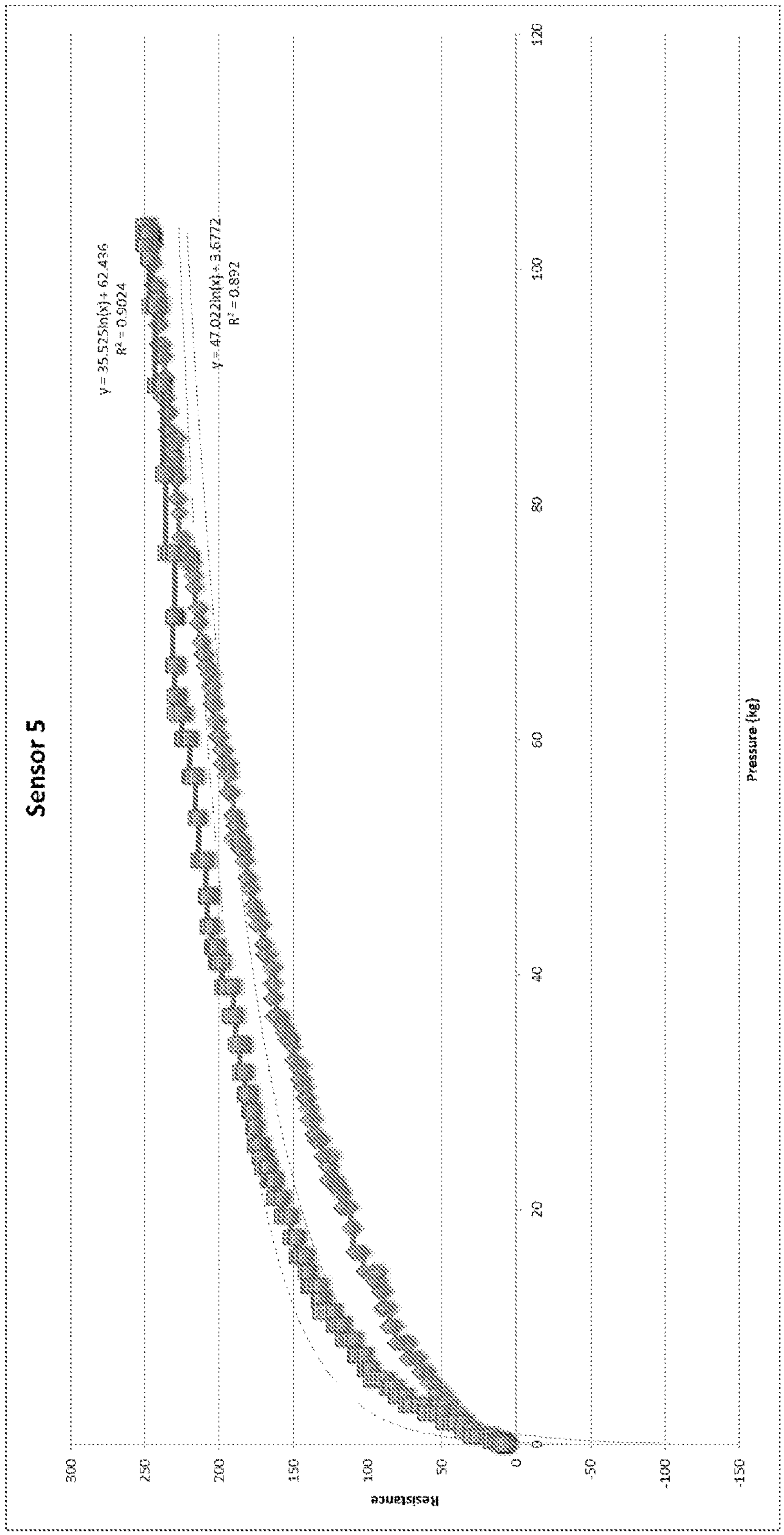
Figure 13:
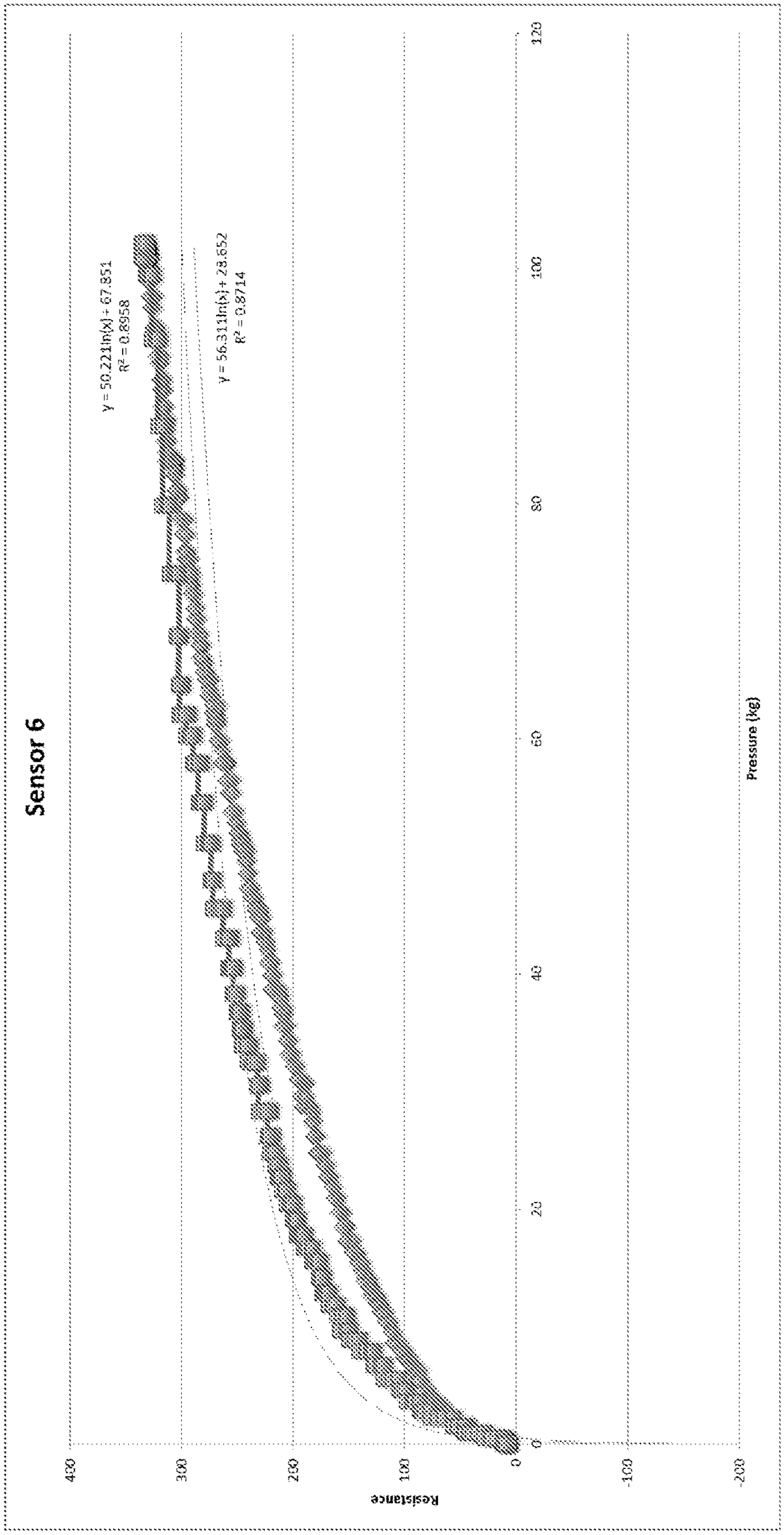
Figure 14:
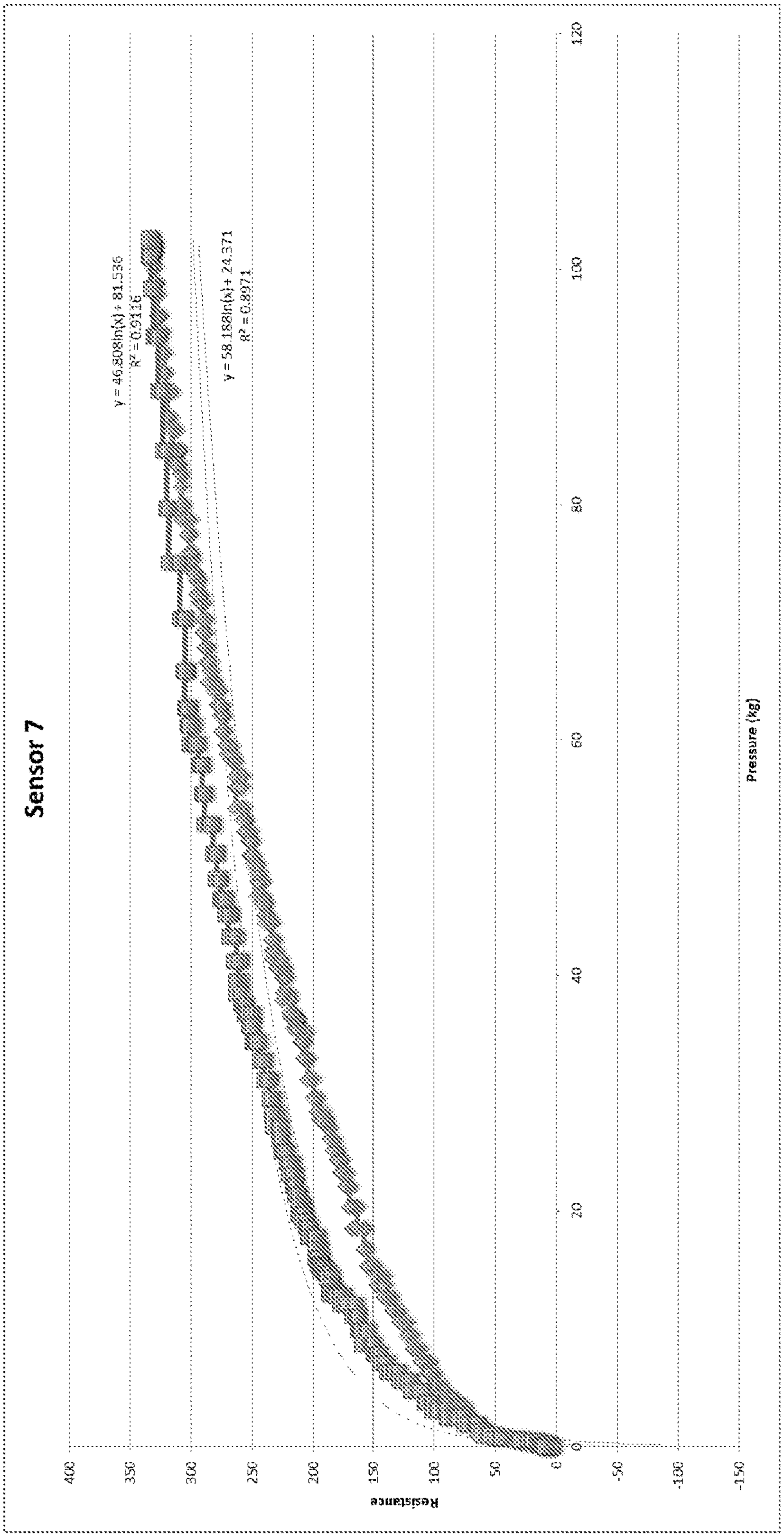
Figure 15:
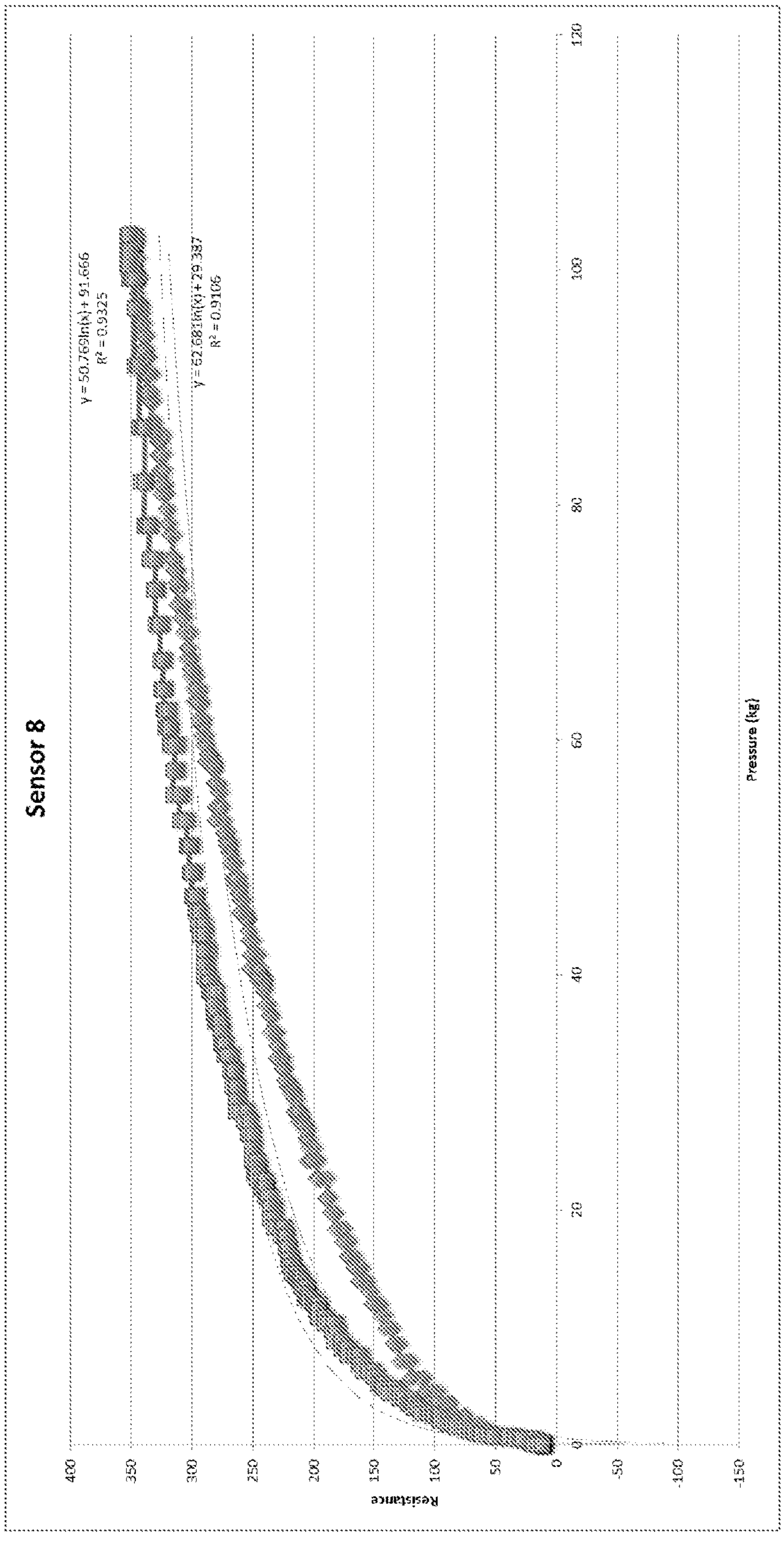
Figure 16:
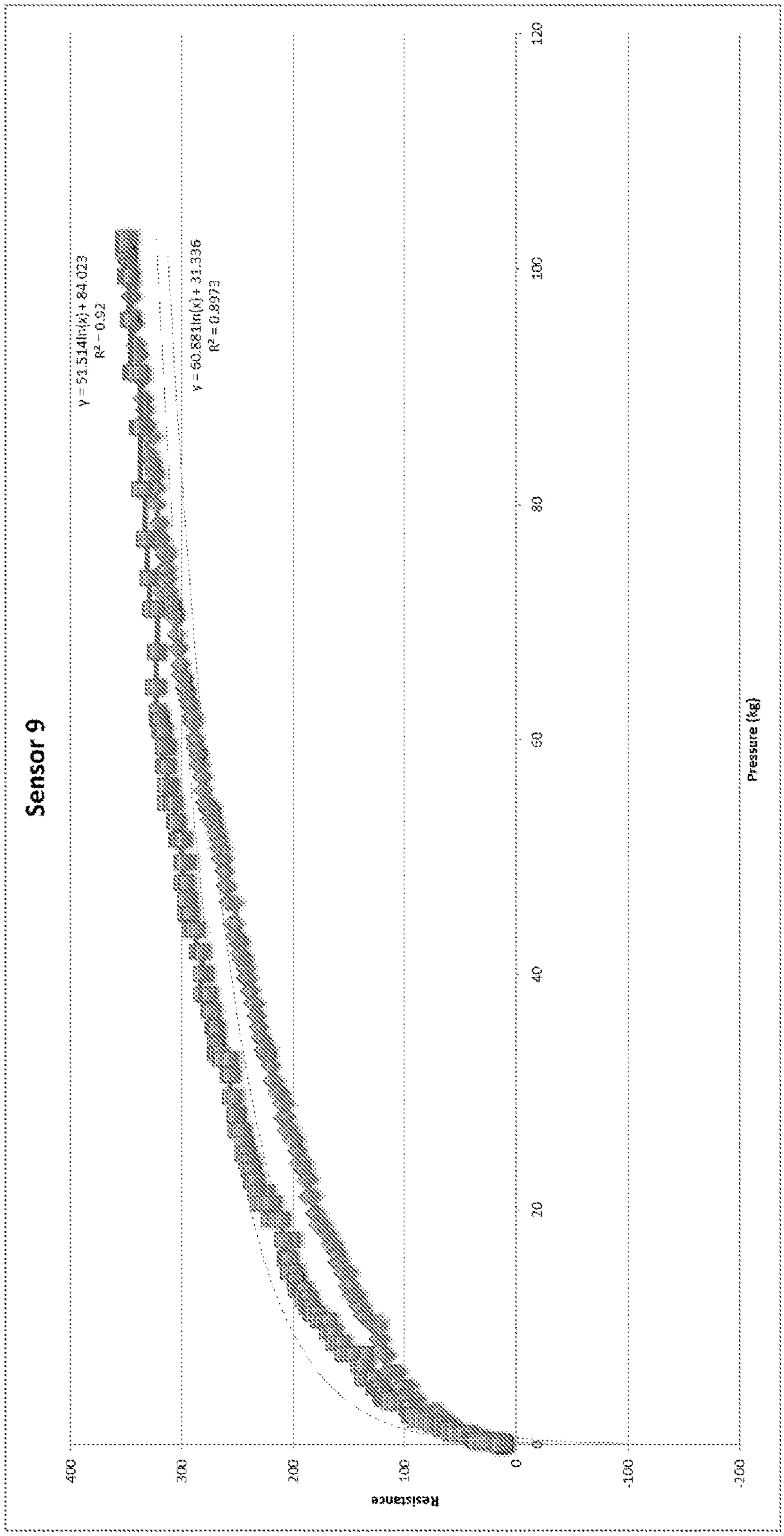
Figure 17:
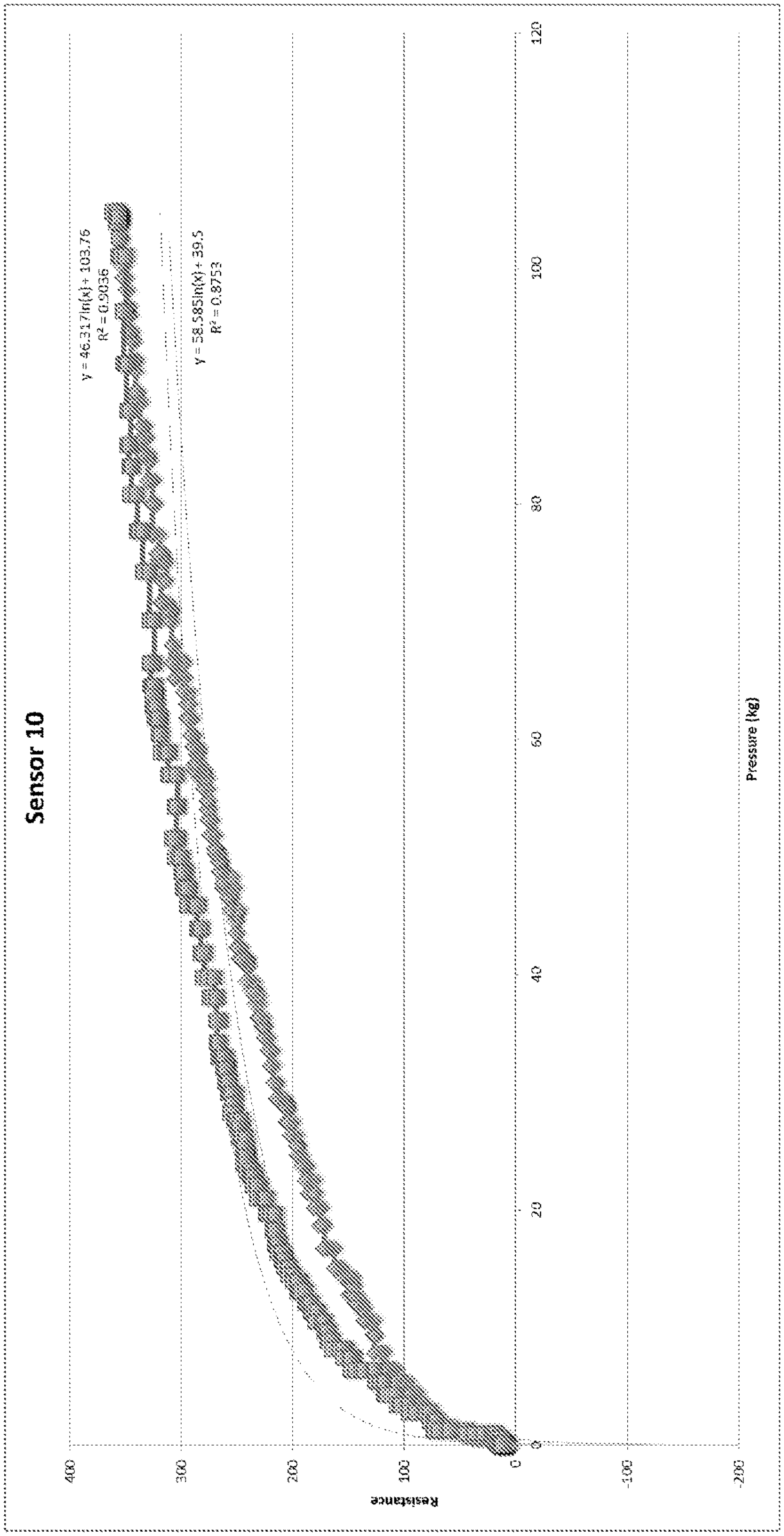
Figure 18:
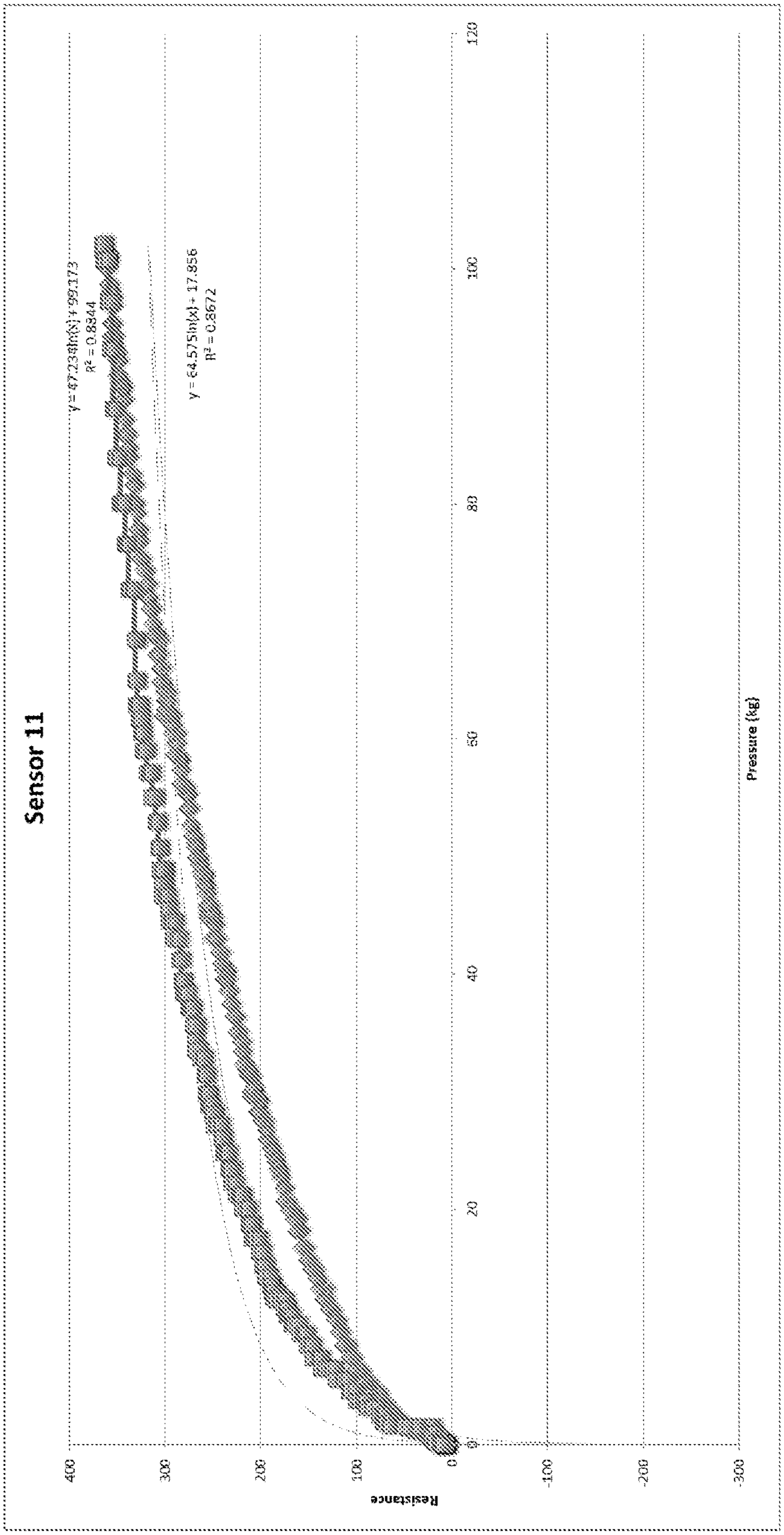
Figure 19:
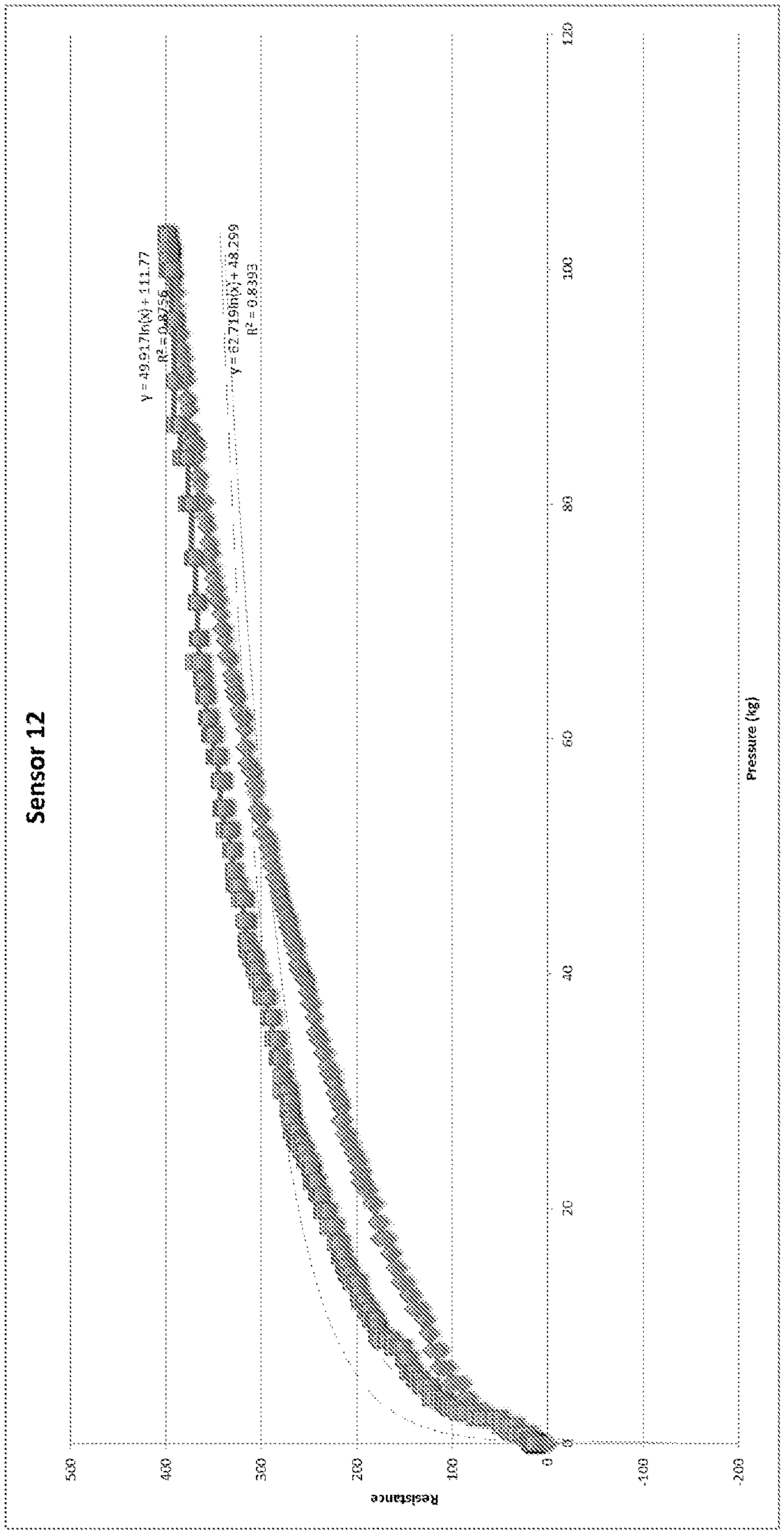
Figure 20:
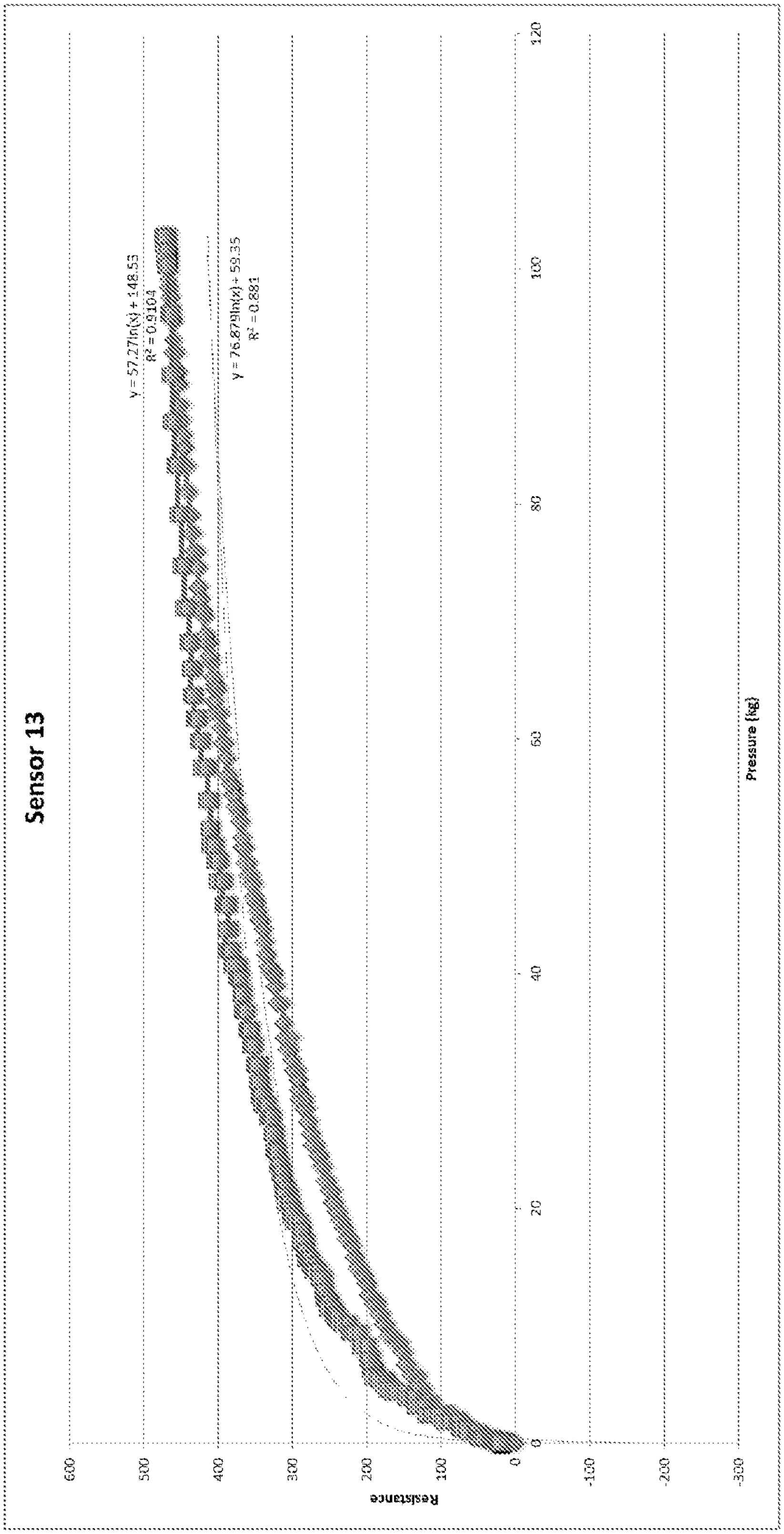
Figure 21:
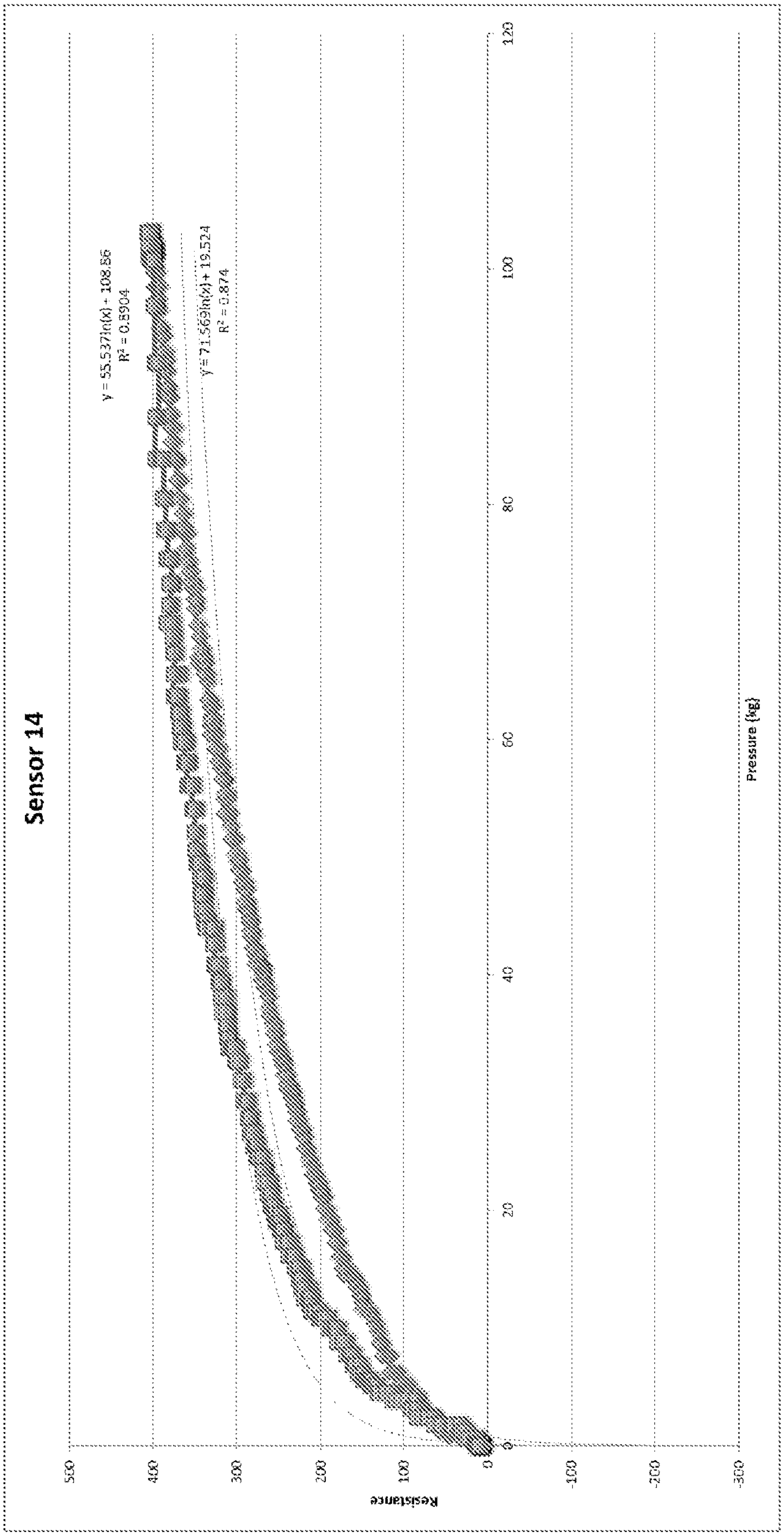
Figure 22:
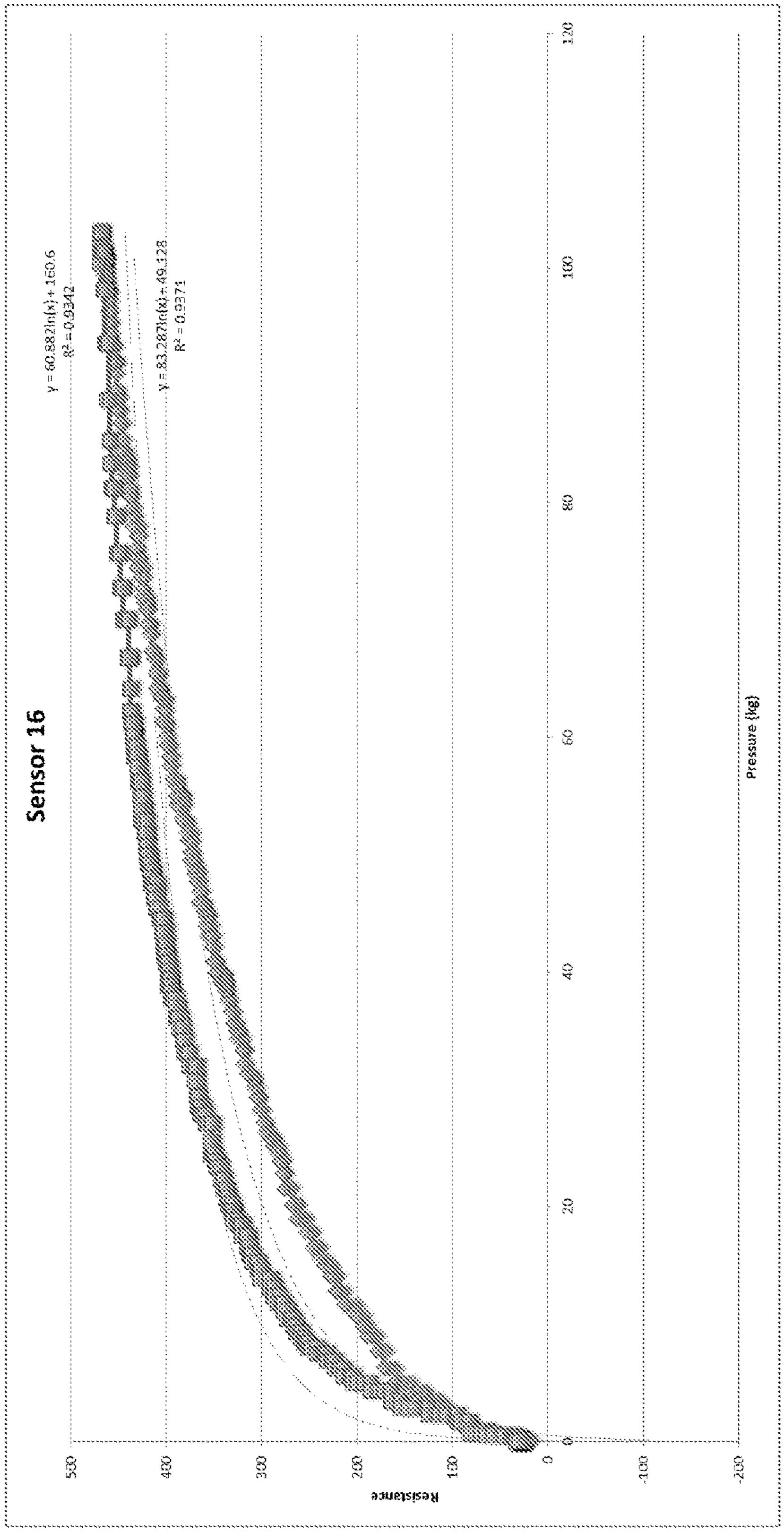
Figure 23:
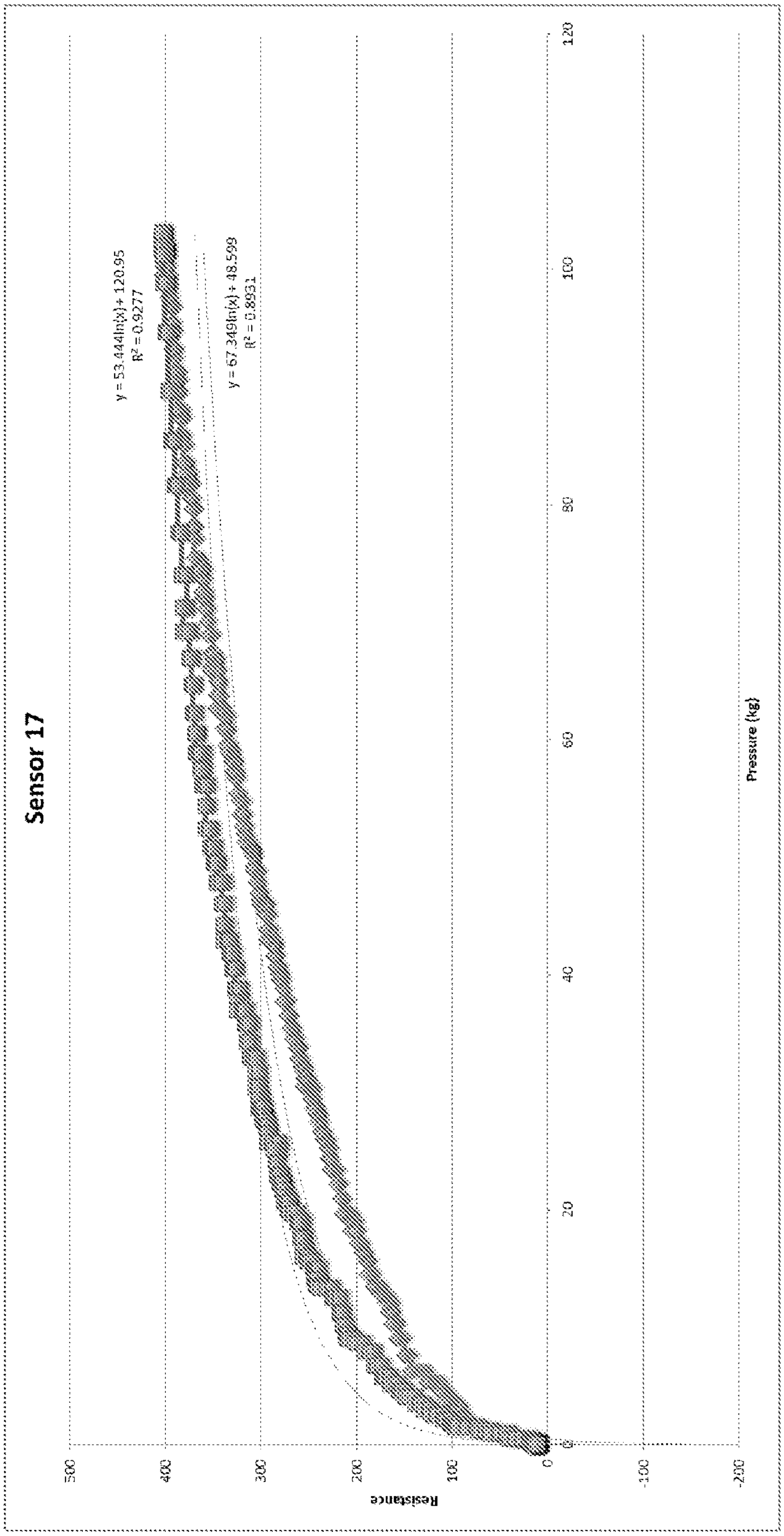
Figure 24:
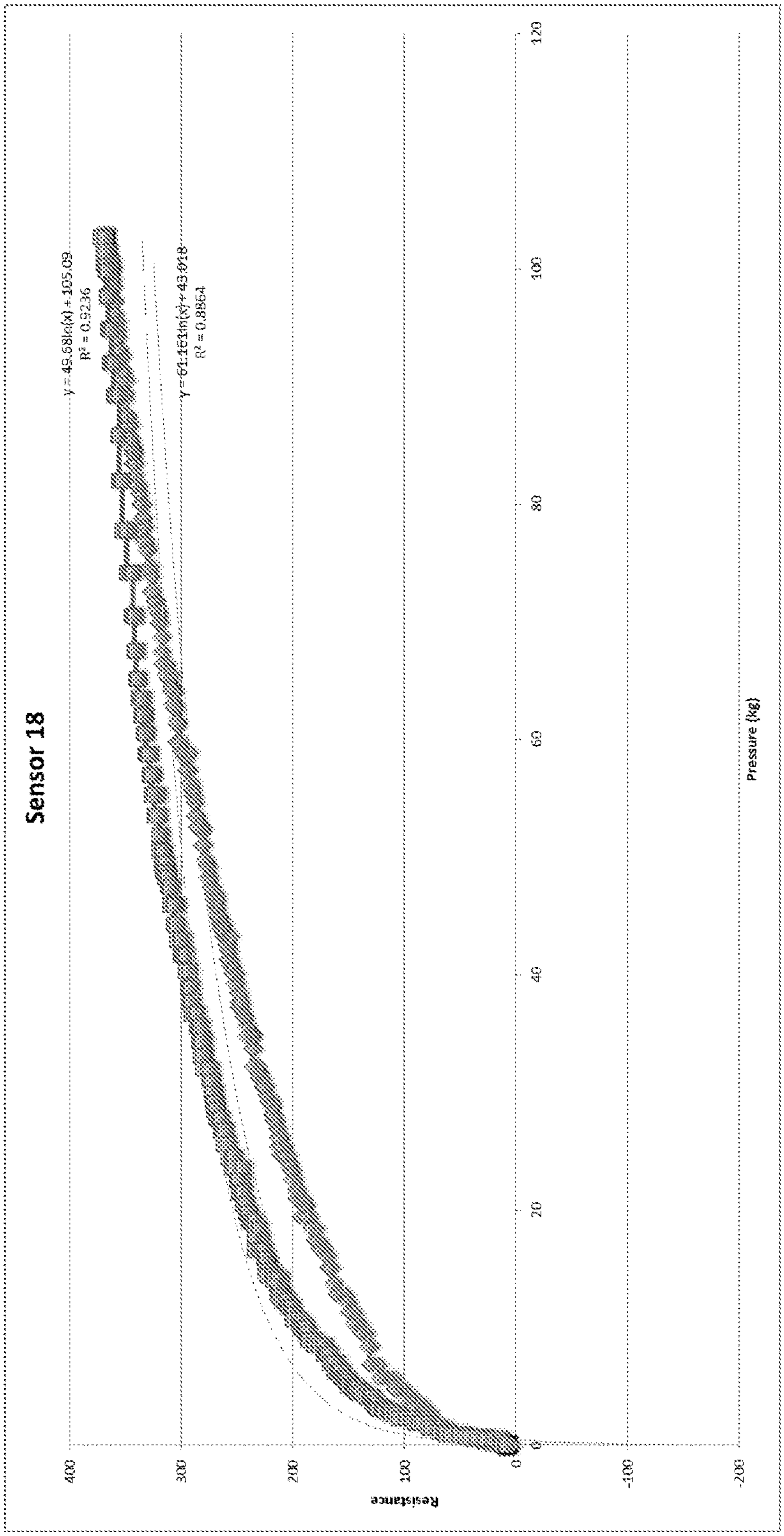
Figure 25:
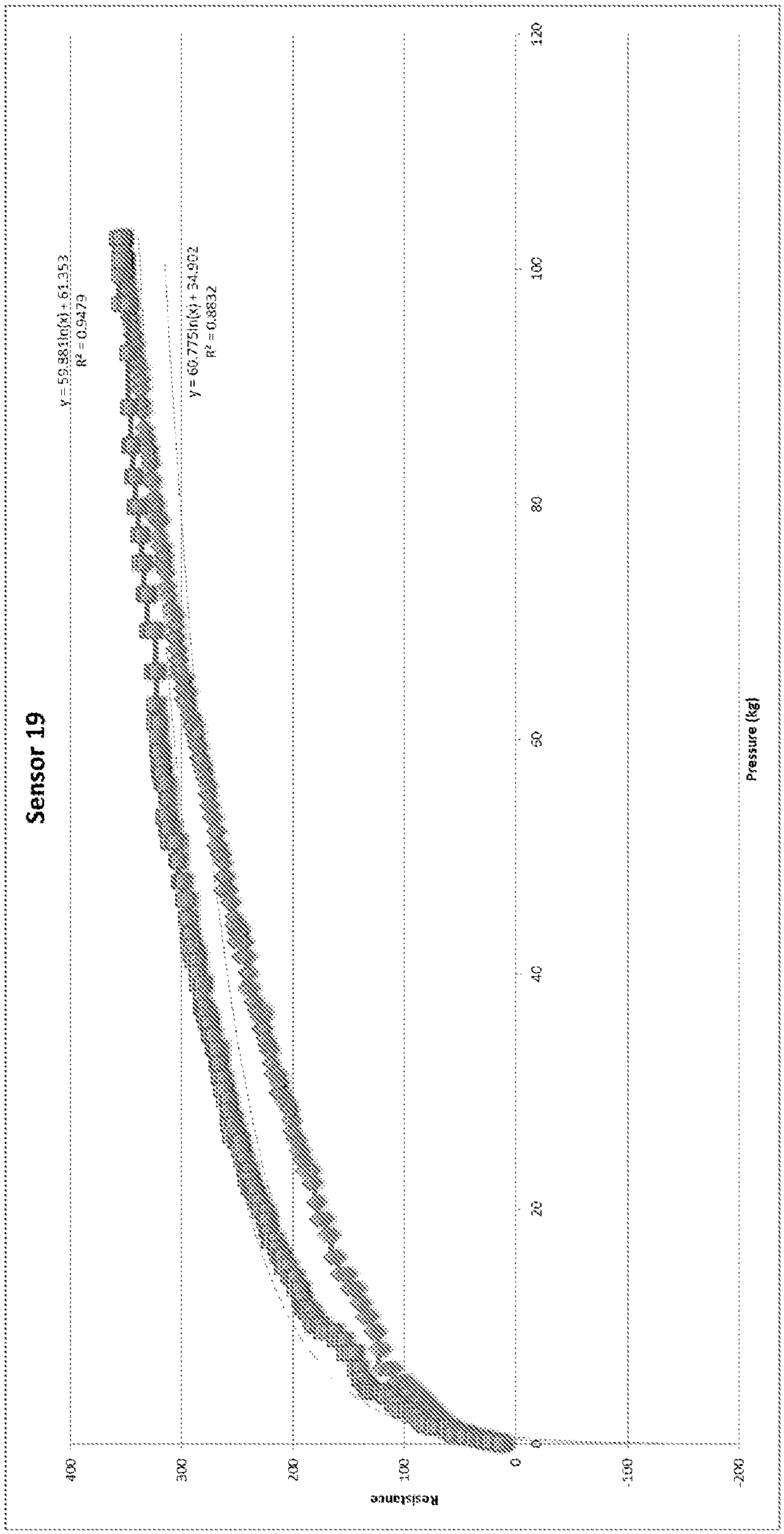

According to another class of implementations, a sensor system for the upper of an article of footwear is provided for sensing a different (and possibly complementary) set of forces relating to the human foot relative to the insole sensor system described above. FIG. 5 is an illustration of an example of such a sensor system that may be incorporated as part of the upper of a shoe or other type of footwear. The sensors are implemented with conductive trace patterns that are formed directly on or otherwise integrated with a flexible substrate. The flexible substrate may be a piezoresistive material or a dielectric material. In the latter case, a flexible piezoresistive material is tightly integrated with the dielectric material such that it makes contact with the sensor trace patterns. Portions of the conductive traces that are not intended to be part of a sensor are insulated from the piezoresistive substrate as indicated by the darker, shaded areas in FIG. 5. The sensor system (shown in a flattened position) may be made to conform to the curved form factor of the upper of the footwear with which it is integrated. This is enabled by the flexibility of the material(s) with which the sensor system is constructed. FIG. 6 shows various views of the sensor system including a "FLATTENED" view similar to FIG. 5 as well as five additional views from various perspectives of the sensor system formed for integration with an article of footwear.

In the depicted implementation, sensor circuitry (not shown) on PCB 502 energizes 27 sensors via 14 drive signal outputs and receives sensor signals from the 27 sensors via 2 sensor signal inputs. Selectively energizing the drive signal outputs allows for detection of forces at 27 different regions of the sensor system and may be accomplished in a manner similar to that described above with reference to the insole sensor system of FIG. 1. Two such regions (S1 and S2) are represented in a magnified view in the upper right hand corner of FIG. 5. One of the traces 504 receives a drive signal while traces 506 and 508 transmit respective sensor signals via insulated routing traces to the sensor circuitry on PCB 502. In this configuration, a single drive signal (e.g., on trace 504) energizes two adjacent sensors (S1 and S2), the sensor signals for which are received by independent sense signal lines (e.g., via traces 506 and 508). The drive signal might be provided, for example, by connecting the trace (permanently or temporarily) to a voltage reference, a signal source that may include additional information in the drive signal, a GPIO pin of a processor on PCB 502, etc. The order in which the sensors are energized may vary. And as shown in the example in FIG. 5, the sensor signals might be generated using voltage dividers in which one of the resistors of the divider includes the resistance between the two traces of each sensor through the intervening piezoresistive material and the other (represented by R2 and R3) might be included with the sensor circuitry. The sensor circuitry may be implemented, for example, as described above with reference to FIGS. 3 and 4.

In some implementations, the multiplicity of sensors in the upper sensor system may enable the determination of a vector representing the force of an impact. That is, because a shoe upper can be made to deform fairly readily, signals representing an impact can be captured for multiple adjacent sensors. By comparing the timing and magnitudes of the captured signals and applying some fairly straightforward mathematics (e.g., with the associated sensor circuitry) a vector representing the impact (e.g., magnitude, speed, direction, etc.) can be derived.

The upper sensor system can be multi-layered in a manner similar to at least some aspects of the insole system described above with reference to FIG. 2, e.g., for comfort, and/or protection of the system components from environmental conditions and/or shear forces. And as should be appreciated, sensors implemented as described herein can be inserted into an existing shoe, on the outside of an existing shoe, or integrated with the shoe structure depending on the application.

For some applications, it may be important to account for crosstalk among the sensors of an array. Crosstalk refers to contributions to a particular sensor's output attributable to other resistive components of the array in parallel with the resistance of the sensor of interest; often referred to as parasitic resistances. As discussed above, the capture of a sensor's output is accomplished through the use of an analog-to-digital converter (ADC) that compares the input to a stable reference and generates an ADC Count given by:

$$\text{Count} = ADC_{max} * \left(\frac{(V_+ - V_-)}{V_{ref}}\right)$$

where $V_+$-$V_-$ represents the ADC input voltage from the sensor ($V_{in}$), and $V_{ref}$ the ADC's reference. According to a particular class of implementations, it is possible to more accurately determine the value of the resistance of interest by taking multiple measurements for the sensor and combining the measurements mathematically in a way that allows for solving for the resistance of interest.

According to one such implementation, one measurement, V1, is taken with the drive signal of the sensor of interest driven high and the drive signals of all of the other sensors driven low. A second measurement, V2, is taken with the drive signal of the sensor of interest driven low and the drive signals of the other sensors driven high. Equations for V1 and V2 may be written as follows:

$$V1 = 3.3\text{V}\left(\frac{R?\|Rp}{R?+R\|Rp}\right)$$

$$V2 = 3.3\text{V}\left(\frac{R\|Rp}{R+R?\|Rp}\right)$$

where R represents the resistance of the sensor of interest, R? represents the resistance of the other resistive components of the array contributing to the measurement, Rp represents the other resistor of the sensor's voltage divider, and 3.3V represents the reference voltage of the ADC. Using substitution, we can find an equation for V1 in terms of V2 (or vice-versa), eliminating the dependence on R? as follows:

$$V1 = Rp\left(\frac{3.3\text{V} - V2}{R + Rp}\right)$$

$$V2 = 3.3\text{V} - \frac{V1(R + Rp)}{Rp}$$

Solving either of these equations for R yields:

$$R = Rp\left(\frac{3.3\text{V} - V2}{V1} - 1\right)$$

And since the measurements of V1 and V2 are in units of ADC Counts, we can choose Vref=Vin=3.3V such that the processor can determine R, the resistance of the sensor of interest, as follows:

$$R = Rp\left(\frac{ADC_{max} - Count_{V2}}{Count_{V1}} - 1\right)$$

A more accurate determination of R allows for a more accurate determination of the force applied to the sensor of interest (e.g., using R as an index into a table of resistance vs. force values).

Modifications to this approach might be useful for some applications in which it is desirable to reduce the amount of time required to complete the measurements and calculations for each sensor. For example, V2 can be measured without driving the signal line for the sensor of interest low, in which case it can be shown that R, the resistance of the sensor of interest, is given by:

$$R = Rp\left(\frac{ADC_{max} - Count_{V2}}{Count_{V1}}\right)$$

This requires fewer instructions/operations by the processor and may be advantageous for applications using higher sample rates. Other variations of these approaches may be apparent to those of skill in the art.

The sensor systems described herein may be used separately and in combination in a wide range of applications. For example, insole sensor systems enabled by the present disclosure can provide information about how the different parts of the foot are contacting a surface (e.g., the ground) through the bottom of a shoe. Such information might be used, for example, for measuring pronation, heel-toe gait analysis, measuring ground reaction (e.g., start/stop speed), measuring hang time (when jumping), measuring torque on turns, etc. Such information might be useful in a wide variety of applications. For example, in the context of athletics, such information could be used to monitor the running technique or balance of an athlete. In the context of medicine, such information could be used to monitor the gait of a rehab patient. In the development of prosthetic devices, such information could be used to provide feedback about the forces on a prosthetic limb for helping to control operation of the prosthesis. In the context of virtual reality, such information (possibly in conjunction with sensor data from an upper sensor system) might be used to translate the movements of a human or interaction with objects in the physical world to an avatar or objects in a virtual space.

An upper sensor system enabled by the present disclosure might be useful for a wide variety of health related applications including, for example, sensing forces associated with the swelling of the feet associated with a diabetic incident. In another example, the depicted sensor system (possibly in conjunction with an insole sensor system) might be used in measuring the style of walking of a patient, with such sensor data being useful, for example, for anticipating a stroke or other health related incident that can be determined by comparing variations in gait and flexing over time. Other examples include measurement of incident forces on soldiers' boots or construction footwear for safety purposes. Applications relating to various sports that involve kicking an object (e.g., a soccer ball, hackeysack, football, etc.) are also contemplated in which impacts are measured in a variety of ways. Other applications (possibly using upper and insole sensor systems together) could relate to sensing the forces associated with footwork (e.g., in sports, dance, etc.) for instructional or coaching purposes. As should be appreciated, any of the foregoing examples may use insole and upper sensor systems in combination to provide additional information that is relevant to the particular application.

As will be appreciated from these diverse examples, the range of applications of sensor systems enabled by the present disclosure is quite broad.

It will be understood by those skilled in the art that changes in the form and details of the implementations described herein may be made without departing from the scope of this disclosure. For example, implementations have been described herein in which conductive traces are formed directly on a flexible piezoresistive substrate to form various types of sensor systems. However, it has also been noted that implementations are contemplated in which some or even all of the conductive traces of a sensor system enabled by the present disclosure may not be formed directly on a flexible piezoresistive substrate, but instead are formed on another flexible substrate that is tightly integrated with a piezoresistive substrate. For example, the conductive traces forming a sensor array may be formed on a non-conductive or low conductivity substrate (e.g., a fabric or rubber with dielectric properties) which is placed in contact with a flexible piezoresistive substrate in a multi-layer structure such that the conductive traces are in contact with the piezoresistive substrate. As will be appreciated by those of skill in the art, such an arrangement may function in a manner similar to sensor systems in which the conductive traces are formed directly on the piezoresistive substrate.

Finally, although various advantages and aspects may have been described with reference to particular implementations, the scope of this disclosure should not be limited by reference to such advantages and aspects.

Sensor Test Data

The data for each of the sensor tables in the following pages are shown graphically in a corresponding figure.

| Sensor 0 | |
|---|---|
| pressure | resistance |
| 0.15 | 26 |
| 0.15 | 32 |
| 0.15 | 35 |
| 0.15 | 41 |
| 0.5 | 41 |
| 0.5 | 44 |
| 0.5 | 49 |
| 0.5 | 57 |
| 1.05 | 57 |
| 1.05 | 64 |
| 1.05 | 69 |
| 1.05 | 81 |
| 1.05 | 91 |
| 1.9 | 91 |
| 1.9 | 99 |
| 1.9 | 106 |
| 1.9 | 112 |
| 3.4 | 112 |
| 3.4 | 114 |
| 3.4 | 117 |
| 3.4 | 123 |
| 5.05 | 123 |
| 5.05 | 129 |
| 5.05 | 133 |
| 5.05 | 129 |
| 6.45 | 129 |
| 6.45 | 145 |
| 6.45 | 150 |
| 6.45 | 156 |
| 7.95 | 156 |
| 7.95 | 159 |
| 7.95 | 162 |
| 7.95 | 166 |
| 9.6 | 166 |
| 9.6 | 171 |
| 9.6 | 177 |
| 9.6 | 179 |
| 11.3 | 179 |
| 11.3 | 182 |
| 11.3 | 187 |
| 12.65 | 187 |
| 12.65 | 190 |
| 12.65 | 195 |
| 12.65 | 190 |
| 13.65 | 190 |
| 13.65 | 194 |
| 13.65 | 195 |
| 13.65 | 198 |
| 14.6 | 198 |
| 14.6 | 200 |
| 14.6 | 202 |
| 14.6 | 206 |
| 14.6 | 209 |
| 15.65 | 209 |
| 15.65 | 214 |
| 15.65 | 211 |
| 15.65 | 212 |
| 16.85 | 212 |
| 16.85 | 210 |
| 16.85 | 219 |
| 16.85 | 220 |
| 18.1 | 220 |
| 18.1 | 225 |
| 18.1 | 226 |
| 18.1 | 228 |
| 19.35 | 228 |
| 19.35 | 230 |
| 19.35 | 233 |
| 19.35 | 236 |
| 21.05 | 236 |
| 21.05 | 239 |
| 21.05 | 244 |
| 21.05 | 243 |
| 22.6 | 243 |
| 22.6 | 247 |
| 22.6 | 251 |
| 22.6 | 253 |

| Sensor 0 | |
|---|---|
| pressure | resistance |
| 24.55 | 253 |
| 24.55 | 257 |
| 24.55 | 259 |
| 26.4 | 259 |
| 26.4 | 263 |
| 26.4 | 267 |
| 26.4 | 264 |
| 27.75 | 264 |
| 27.75 | 267 |
| 27.75 | 268 |
| 27.75 | 270 |
| 28.9 | 270 |
| 28.9 | 271 |
| 28.9 | 273 |
| 28.9 | 274 |
| 30 | 274 |
| 30 | 276 |
| 30.65 | 276 |
| 30.65 | 282 |
| 30.65 | 283 |
| 31.85 | 283 |
| 31.85 | 284 |
| 31.85 | 285 |
| 31.85 | 287 |
| 33.15 | 287 |
| 33.15 | 290 |
| 33.15 | 295 |
| 34.65 | 295 |
| 34.65 | 290 |
| 34.65 | 294 |
| 34.65 | 295 |
| 35.8 | 295 |
| 35.8 | 298 |
| 35.8 | 300 |
| 35.8 | 306 |
| 35.8 | 303 |
| 37.55 | 303 |
| 37.55 | 305 |
| 37.55 | 308 |
| 37.55 | 309 |
| 39.45 | 309 |
| 39.45 | 308 |
| 39.45 | 312 |
| 39.45 | 314 |
| 41.45 | 314 |
| 41.45 | 316 |
| 42.7 | 316 |
| 42.7 | 317 |
| 42.7 | 320 |
| 43.85 | 320 |
| 43.85 | 322 |
| 43.85 | 321 |
| 43.85 | 326 |
| 45.25 | 326 |
| 45.25 | 325 |
| 45.25 | 332 |
| 45.25 | 325 |
| 46.35 | 325 |
| 46.35 | 329 |
| 46.35 | 331 |
| 46.35 | 333 |
| 48.05 | 333 |
| 48.05 | 329 |
| 48.05 | 333 |
| 48.05 | 335 |
| 49.1 | 335 |
| 49.1 | 339 |
| 49.1 | 338 |
| 50.35 | 338 |
| 50.35 | 340 |
| 50.35 | 341 |
| 51.1 | 341 |
| 51.1 | 340 |
| 51.1 | 341 |
| 51.1 | 338 |

| Sensor 0 | |
|---|---|
| pressure | resistance |
| 51.3 | 338 |
| 51.3 | 344 |
| 51.3 | 345 |
| 52.15 | 345 |
| 52.15 | 346 |
| 52.6 | 346 |
| 52.6 | 342 |
| 52.6 | 351 |
| 52.6 | 348 |
| 54.15 | 348 |
| 54.15 | 354 |
| 54.15 | 351 |
| 55.4 | 351 |
| 55.4 | 355 |
| 55.4 | 360 |
| 55.4 | 355 |
| 55.4 | 354 |
| 56.5 | 354 |
| 56.5 | 356 |
| 56.5 | 357 |
| 56.5 | 360 |
| 58.25 | 360 |
| 58.25 | 359 |
| 58.25 | 360 |
| 58.25 | 363 |
| 59.8 | 363 |
| 59.8 | 361 |
| 59.8 | 364 |
| 59.8 | 366 |
| 60.95 | 366 |
| 60.95 | 364 |
| 60.95 | 367 |
| 60.95 | 365 |
| 61.6 | 365 |
| 61.6 | 368 |
| 61.6 | 367 |
| 61.6 | 369 |
| 62.1 | 369 |
| 62.1 | 371 |
| 62.1 | 370 |
| 62.1 | 372 |
| 63.05 | 372 |
| 63.05 | 374 |
| 63.05 | 375 |
| 63.05 | 376 |
| 64.1 | 376 |
| 64.1 | 371 |
| 64.1 | 375 |
| 64.1 | 376 |
| 65.5 | 376 |
| 65.5 | 378 |
| 65.5 | 377 |
| 66.85 | 377 |
| 66.85 | 380 |
| 66.85 | 383 |
| 68.4 | 383 |
| 68.4 | 385 |
| 68.4 | 384 |
| 69.55 | 384 |
| 69.55 | 387 |
| 69.55 | 388 |
| 71.4 | 388 |
| 71.4 | 390 |
| 72.25 | 390 |
| 72.25 | 392 |
| 72.25 | 393 |
| 73.85 | 393 |
| 73.85 | 392 |
| 73.85 | 397 |
| 75.05 | 397 |
| 75.05 | 398 |
| 76.15 | 398 |
| 76.15 | 397 |
| 76.15 | 400 |
| 76.15 | 398 |

-continued

| Sensor 0 | |
|---|---|
| pressure | resistance |
| 77.35 | 398 |
| 77.35 | 399 |
| 77.35 | 402 |
| 77.35 | 403 |
| 78.2 | 403 |
| 78.2 | 402 |
| 78.2 | 404 |
| 78.2 | 403 |
| 79.9 | 403 |
| 79.9 | 405 |
| 79.9 | 403 |
| 79.9 | 406 |
| 80.95 | 406 |
| 80.95 | 410 |
| 80.95 | 408 |
| 80.95 | 410 |
| 83.05 | 410 |
| 83.05 | 411 |
| 83.05 | 410 |
| 83.05 | 411 |
| 84 | 411 |
| 84 | 413 |
| 84 | 414 |
| 84 | 419 |
| 85.5 | 419 |
| 85.5 | 414 |
| 85.5 | 415 |
| 85.5 | 416 |
| 85.5 | 418 |
| 86.55 | 418 |
| 86.55 | 415 |
| 87 | 415 |
| 87 | 419 |
| 87 | 420 |
| 87 | 422 |
| 88.25 | 422 |
| 88.25 | 421 |
| 88.25 | 423 |
| 89.35 | 423 |
| 89.35 | 425 |
| 89.35 | 426 |
| 89.35 | 425 |
| 91.7 | 425 |
| 91.7 | 426 |
| 91.7 | 427 |
| 91.7 | 428 |
| 93.65 | 428 |
| 93.65 | 429 |
| 95.05 | 429 |
| 95.05 | 432 |
| 95.05 | 430 |
| 97.05 | 430 |
| 97.05 | 432 |
| 97.05 | 433 |
| 97.05 | 434 |
| 98 | 434 |
| 98 | 433 |
| 98 | 435 |
| 98 | 434 |
| 98 | 435 |
| 98.8 | 435 |
| 98.8 | 436 |
| 99.4 | 436 |
| 99.4 | 438 |
| 99.4 | 437 |
| 99.9 | 437 |
| 99.9 | 444 |
| 99.9 | 438 |
| 99.9 | 441 |
| 100.15 | 441 |
| 100.15 | 439 |
| 100.15 | 437 |
| 100.15 | 440 |
| 100.35 | 440 |
| 100.35 | 437 |

-continued

| Sensor 0 | |
|---|---|
| pressure | resistance |
| 100.35 | 440 |
| 100.35 | 440 |
| 100.35 | 435 |
| 100.35 | 439 |
| 100.35 | 441 |
| 100.35 | 441 |
| 100.05 | 441 |
| 100.05 | 442 |
| 100.05 | 438 |
| 100.05 | 441 |
| 100.05 | 442 |
| 99.6 | 442 |
| 99.35 | 442 |
| 99.35 | 444 |
| 99.35 | 447 |
| 99.35 | 444 |
| 99.55 | 444 |
| 99.55 | 443 |
| 99.55 | 435 |
| 99.55 | 443 |
| 100.2 | 443 |
| 100.2 | 442 |
| 100.2 | 444 |
| 100.2 | 442 |
| 99.9 | 442 |
| 99.9 | 437 |
| 99.9 | 436 |
| 99.9 | 433 |
| 94.95 | 433 |
| 94.95 | 431 |
| 94.95 | 424 |
| 94.95 | 427 |
| 87.15 | 427 |
| 87.15 | 424 |
| 87.15 | 418 |
| 87.15 | 415 |
| 78.85 | 415 |
| 78.85 | 407 |
| 78.85 | 409 |
| 78.85 | 407 |
| 71.6 | 407 |
| 71.6 | 404 |
| 71.6 | 403 |
| 65.85 | 403 |
| 65.85 | 399 |
| 65.85 | 396 |
| 61.3 | 396 |
| 61.3 | 390 |
| 61.3 | 382 |
| 61.3 | 389 |
| 57.6 | 389 |
| 57.6 | 388 |
| 57.6 | 385 |
| 57.6 | 382 |
| 54.05 | 382 |
| 54.05 | 379 |
| 54.05 | 378 |
| 54.05 | 376 |
| 50.65 | 376 |
| 50.65 | 377 |
| 50.65 | 373 |
| 50.65 | 372 |
| 47.8 | 372 |
| 47.8 | 370 |
| 47.8 | 366 |
| 45.15 | 366 |
| 45.15 | 364 |
| 45.15 | 361 |
| 45.15 | 360 |
| 45.15 | 356 |
| 42.7 | 356 |
| 42.7 | 354 |
| 42.7 | 351 |
| 42.7 | 347 |
| 39.85 | 347 |

-continued

| Sensor 0 | |
|---|---|
| pressure | resistance |
| 39.85 | 344 |
| 39.85 | 340 |
| 39.85 | 337 |
| 36.7 | 337 |
| 36.7 | 332 |
| 36.7 | 329 |
| 33.35 | 329 |
| 33.35 | 327 |
| 33.35 | 326 |
| 33.35 | 321 |
| 30.2 | 321 |
| 30.2 | 316 |
| 30.2 | 313 |
| 30.2 | 312 |
| 27.25 | 312 |
| 27.25 | 311 |
| 27.25 | 308 |
| 27.25 | 306 |
| 24.95 | 306 |
| 24.95 | 304 |
| 24.95 | 302 |
| 24.95 | 299 |
| 23.05 | 299 |
| 23.05 | 294 |
| 23.05 | 293 |
| 23.05 | 288 |
| 21 | 288 |
| 21 | 286 |
| 21 | 283 |
| 21 | 280 |
| 21 | 276 |
| 18.95 | 276 |
| 18.95 | 275 |
| 18.95 | 272 |
| 18.95 | 271 |
| 17.25 | 271 |
| 17.25 | 267 |
| 17.25 | 268 |
| 17.25 | 267 |
| 15.95 | 267 |
| 15.95 | 268 |
| 15.95 | 267 |
| 15.95 | 264 |
| 15.25 | 264 |
| 15.25 | 261 |
| 15.25 | 250 |
| 15.25 | 248 |
| 14.05 | 248 |
| 14.05 | 242 |
| 14.05 | 233 |
| 14.05 | 226 |
| 11.95 | 226 |
| 11.95 | 217 |
| 11.95 | 207 |
| 11.95 | 200 |
| 9.25 | 200 |
| 9.25 | 194 |
| 9.25 | 188 |
| 9.25 | 179 |
| 6.95 | 179 |
| 6.95 | 170 |
| 6.95 | 152 |
| 6.95 | 143 |
| 6.95 | 139 |
| 4.95 | 139 |
| 4.95 | 134 |
| 4.95 | 124 |
| 4.95 | 113 |
| 3.4 | 113 |
| 3.4 | 101 |
| 3.4 | 95 |
| 3.4 | 75 |
| 2.2 | 75 |
| 2.2 | 58 |
| 2.2 | 45 |
| 2.2 | 37 |
| 1.2 | 37 |
| 1.2 | 29 |
| 1.2 | 24 |
| 1.2 | 23 |
| 0.45 | 23 |
| 0.45 | 22 |
| 0.1 | 22 |
| 0.1 | 20 |
| 0.1 | 22 |
| 0.1 | 21 |

| Sensor 1 | |
|---|---|
| pressure | resistance |
| 0.05 | 7 |
| 0.05 | 8 |
| 0.05 | 12 |
| 0.05 | 15 |
| 0.15 | 15 |
| 0.15 | 19 |
| 0.15 | 21 |
| 0.15 | 23 |
| 0.25 | 23 |
| 0.25 | 26 |
| 0.25 | 32 |
| 0.25 | 39 |
| 0.45 | 39 |
| 0.45 | 40 |
| 0.45 | 47 |
| 0.45 | 50 |
| 0.7 | 50 |
| 0.7 | 52 |
| 0.7 | 58 |
| 0.7 | 64 |
| 1.1 | 64 |
| 1.1 | 63 |
| 1.1 | 84 |
| 1.1 | 88 |
| 1.75 | 88 |
| 1.75 | 95 |
| 1.75 | 101 |
| 1.75 | 106 |
| 2.7 | 106 |
| 2.7 | 110 |
| 2.7 | 116 |
| 3.7 | 116 |
| 3.7 | 121 |
| 3.7 | 124 |
| 3.7 | 126 |
| 4.6 | 126 |
| 4.6 | 131 |
| 4.6 | 132 |
| 4.6 | 136 |
| 5.45 | 136 |
| 5.45 | 140 |
| 5.45 | 143 |
| 5.45 | 151 |
| 6.4 | 151 |
| 6.4 | 153 |
| 6.4 | 159 |
| 6.4 | 161 |
| 6.4 | 166 |
| 7.65 | 166 |
| 7.65 | 170 |
| 7.65 | 174 |
| 7.65 | 177 |
| 9 | 177 |
| 9 | 181 |
| 9 | 190 |
| 9 | 193 |

-continued

| Sensor 1 | |
|---|---|
| pressure | resistance |
| 10.55 | 193 |
| 10.55 | 196 |
| 10.55 | 198 |
| 10.55 | 203 |
| 12.3 | 203 |
| 12.3 | 207 |
| 12.3 | 209 |
| 13.95 | 209 |
| 13.95 | 215 |
| 13.95 | 220 |
| 13.95 | 223 |
| 15.55 | 223 |
| 15.55 | 229 |
| 15.55 | 233 |
| 15.55 | 238 |
| 17.6 | 238 |
| 17.6 | 246 |
| 17.6 | 251 |
| 20.35 | 251 |
| 20.35 | 257 |
| 20.35 | 258 |
| 20.35 | 260 |
| 22.7 | 260 |
| 22.7 | 261 |
| 22.7 | 260 |
| 22.7 | 261 |
| 23.6 | 261 |
| 23.6 | 265 |
| 23.6 | 266 |
| 23.6 | 270 |
| 24.1 | 270 |
| 24.1 | 274 |
| 24.1 | 275 |
| 24.1 | 277 |
| 25.7 | 277 |
| 25.7 | 278 |
| 25.7 | 279 |
| 25.7 | 282 |
| 27.2 | 282 |
| 27.2 | 283 |
| 27.2 | 285 |
| 27.2 | 287 |
| 28.35 | 287 |
| 28.35 | 286 |
| 28.35 | 289 |
| 28.35 | 291 |
| 29.3 | 291 |
| 29.3 | 292 |
| 29.3 | 293 |
| 29.3 | 292 |
| 30.25 | 292 |
| 30.25 | 293 |
| 30.25 | 296 |
| 30.25 | 297 |
| 31.4 | 297 |
| 31.4 | 299 |
| 31.4 | 300 |
| 31.4 | 299 |
| 31.4 | 304 |
| 32.1 | 304 |
| 32.1 | 307 |
| 33.25 | 307 |
| 33.25 | 309 |
| 33.25 | 310 |
| 34.2 | 310 |
| 34.2 | 311 |
| 34.2 | 316 |
| 34.2 | 311 |
| 34.65 | 311 |
| 34.65 | 309 |
| 34.65 | 314 |
| 34.65 | 318 |
| 35.55 | 318 |
| 35.55 | 316 |
| 35.55 | 319 |

-continued

| Sensor 1 | |
|---|---|
| pressure | resistance |
| 35.55 | 320 |
| 36.05 | 320 |
| 36.05 | 323 |
| 36.05 | 328 |
| 37.75 | 328 |
| 37.75 | 324 |
| 37.75 | 329 |
| 39 | 329 |
| 39 | 331 |
| 39.95 | 331 |
| 39.95 | 325 |
| 39.95 | 331 |
| 39.95 | 334 |
| 39.95 | 333 |
| 41.35 | 333 |
| 41.35 | 336 |
| 41.35 | 339 |
| 42.15 | 339 |
| 42.15 | 340 |
| 42.15 | 341 |
| 42.15 | 342 |
| 44.2 | 342 |
| 44.2 | 344 |
| 44.2 | 342 |
| 44.2 | 345 |
| 45.5 | 345 |
| 45.5 | 346 |
| 45.5 | 349 |
| 46.4 | 349 |
| 46.4 | 350 |
| 46.4 | 353 |
| 46.4 | 352 |
| 47.9 | 352 |
| 47.9 | 353 |
| 47.9 | 355 |
| 48.6 | 355 |
| 48.6 | 357 |
| 48.6 | 358 |
| 48.6 | 356 |
| 48.6 | 358 |
| 49.7 | 358 |
| 49.7 | 360 |
| 49.7 | 359 |
| 49.7 | 362 |
| 50.65 | 362 |
| 50.65 | 368 |
| 50.65 | 365 |
| 51.5 | 365 |
| 51.5 | 367 |
| 51.5 | 366 |
| 51.5 | 370 |
| 52.5 | 370 |
| 52.5 | 369 |
| 52.5 | 371 |
| 53 | 371 |
| 53 | 372 |
| 53 | 374 |
| 53 | 375 |
| 54.7 | 375 |
| 54.7 | 379 |
| 55.7 | 379 |
| 55.7 | 376 |
| 55.7 | 379 |
| 57.15 | 379 |
| 57.15 | 381 |
| 57.15 | 385 |
| 57.15 | 384 |
| 58.6 | 384 |
| 58.6 | 382 |
| 58.6 | 385 |
| 58.6 | 386 |
| 59.05 | 386 |
| 59.05 | 389 |
| 59.05 | 390 |
| 60.45 | 390 |

-continued

| Sensor 1 | |
|---|---|
| pressure | resistance |
| 60.45 | 392 |
| 60.45 | 394 |
| 61.95 | 394 |
| 61.95 | 388 |
| 62.95 | 388 |
| 62.95 | 398 |
| 62.95 | 400 |
| 62.95 | 398 |
| 64.75 | 398 |
| 64.75 | 399 |
| 64.75 | 405 |
| 66.2 | 405 |
| 66.2 | 404 |
| 66.2 | 405 |
| 66.2 | 406 |
| 67.35 | 406 |
| 67.35 | 407 |
| 67.35 | 409 |
| 67.35 | 415 |
| 69 | 415 |
| 69 | 411 |
| 69 | 412 |
| 69 | 410 |
| 69.95 | 410 |
| 69.95 | 415 |
| 69.95 | 416 |
| 72.25 | 416 |
| 72.25 | 420 |
| 72.25 | 416 |
| 73.4 | 416 |
| 73.4 | 420 |
| 73.4 | 422 |
| 75 | 422 |
| 75 | 423 |
| 75 | 426 |
| 75.9 | 426 |
| 75.9 | 428 |
| 77.4 | 428 |
| 77.4 | 424 |
| 77.4 | 432 |
| 77.4 | 433 |
| 79.6 | 433 |
| 79.6 | 434 |
| 81.25 | 434 |
| 81.25 | 435 |
| 81.25 | 437 |
| 81.25 | 438 |
| 83.85 | 438 |
| 83.85 | 439 |
| 83.85 | 441 |
| 84.7 | 441 |
| 84.7 | 442 |
| 84.7 | 444 |
| 84.7 | 443 |
| 86 | 443 |
| 86 | 448 |
| 86 | 447 |
| 87.8 | 447 |
| 87.8 | 446 |
| 87.8 | 450 |
| 89.1 | 450 |
| 89.1 | 449 |
| 89.1 | 450 |
| 91.05 | 450 |
| 91.05 | 452 |
| 91.05 | 451 |
| 91.8 | 451 |
| 91.8 | 457 |
| 91.8 | 455 |
| 91.8 | 456 |
| 93.7 | 456 |
| 93.7 | 460 |
| 93.7 | 459 |
| 95.45 | 459 |
| 95.45 | 460 |

-continued

| Sensor 1 | |
|---|---|
| pressure | resistance |
| 95.45 | 459 |
| 95.45 | 462 |
| 96.85 | 462 |
| 96.85 | 461 |
| 96.85 | 463 |
| 98.45 | 463 |
| 98.45 | 464 |
| 98.45 | 465 |
| 99.1 | 465 |
| 99.1 | 466 |
| 99.1 | 465 |
| 100.25 | 465 |
| 100.25 | 466 |
| 100.25 | 467 |
| 100.25 | 468 |
| 100.95 | 468 |
| 100.95 | 467 |
| 100.95 | 468 |
| 101.6 | 468 |
| 101.6 | 475 |
| 101.6 | 475 |
| 101.4 | 475 |
| 101.4 | 468 |
| 101.4 | 469 |
| 101.4 | 468 |
| 101.4 | 470 |
| 100.9 | 470 |
| 100.9 | 471 |
| 100.9 | 470 |
| 101.55 | 470 |
| 101.55 | 469 |
| 101.55 | 471 |
| 101.55 | 470 |
| 101.65 | 470 |
| 101.65 | 468 |
| 101.65 | 469 |
| 100 | 469 |
| 100 | 465 |
| 100 | 461 |
| 100 | 455 |
| 93.5 | 455 |
| 93.5 | 454 |
| 93.5 | 453 |
| 93.5 | 450 |
| 84.25 | 450 |
| 84.25 | 447 |
| 84.25 | 443 |
| 84.25 | 440 |
| 75.6 | 440 |
| 75.6 | 436 |
| 75.6 | 433 |
| 68.8 | 433 |
| 68.8 | 431 |
| 68.8 | 429 |
| 68.8 | 426 |
| 68.8 | 429 |
| 63.55 | 429 |
| 63.55 | 425 |
| 63.55 | 423 |
| 63.55 | 420 |
| 60.2 | 420 |
| 60.2 | 422 |
| 60.2 | 419 |
| 60.2 | 421 |
| 57.85 | 421 |
| 57.85 | 420 |
| 57.85 | 419 |
| 56.3 | 419 |
| 56.3 | 418 |
| 56.3 | 414 |
| 55.1 | 414 |
| 55.1 | 413 |
| 55.1 | 411 |
| 55.1 | 408 |
| 53.35 | 408 |

-continued

| Sensor 1 | |
|---|---|
| pressure | resistance |
| 53.35 | 406 |
| 50.85 | 406 |
| 50.85 | 402 |
| 50.85 | 401 |
| 50.85 | 402 |
| 50.85 | 401 |
| 48.6 | 401 |
| 48.6 | 399 |
| 48.6 | 397 |
| 46.85 | 397 |
| 46.85 | 395 |
| 45.45 | 395 |
| 45.45 | 393 |
| 45.45 | 392 |
| 45.45 | 390 |
| 44.15 | 390 |
| 44.15 | 389 |
| 44.15 | 390 |
| 44.15 | 385 |
| 42.65 | 385 |
| 42.65 | 384 |
| 42.65 | 383 |
| 41.1 | 383 |
| 41.1 | 381 |
| 41.1 | 380 |
| 39.75 | 380 |
| 39.75 | 378 |
| 39.75 | 374 |
| 38.7 | 374 |
| 38.7 | 376 |
| 38.7 | 370 |
| 37.25 | 370 |
| 37.25 | 369 |
| 37.25 | 368 |
| 35.75 | 368 |
| 35.75 | 366 |
| 35.75 | 362 |
| 34.3 | 362 |
| 34.3 | 359 |
| 33 | 359 |
| 33 | 357 |
| 33 | 353 |
| 33 | 355 |
| 31.45 | 355 |
| 31.45 | 352 |
| 31.45 | 350 |
| 30.05 | 350 |
| 30.05 | 348 |
| 30.05 | 349 |
| 28.95 | 349 |
| 28.95 | 348 |
| 28.3 | 348 |
| 28.3 | 345 |
| 28.3 | 347 |
| 27.8 | 347 |
| 27.8 | 346 |
| 27.8 | 344 |
| 27.8 | 339 |
| 27.8 | 342 |
| 26.95 | 342 |
| 26.95 | 336 |
| 26.95 | 333 |
| 25.6 | 333 |
| 25.6 | 334 |
| 25.6 | 329 |
| 23.95 | 329 |
| 23.95 | 326 |
| 23.95 | 321 |
| 23.95 | 320 |
| 22.45 | 320 |
| 22.45 | 318 |
| 22.45 | 314 |
| 22.45 | 310 |
| 20.7 | 310 |
| 20.7 | 307 |

-continued

| Sensor 1 | |
|---|---|
| pressure | resistance |
| 20.7 | 305 |
| 20.7 | 301 |
| 18.9 | 301 |
| 18.9 | 298 |
| 18.9 | 297 |
| 18.9 | 294 |
| 17.2 | 294 |
| 17.2 | 292 |
| 17.2 | 291 |
| 17.2 | 289 |
| 15.85 | 289 |
| 15.85 | 286 |
| 15 | 286 |
| 15 | 283 |
| 15 | 279 |
| 15 | 271 |
| 14.2 | 271 |
| 14.2 | 268 |
| 14.2 | 265 |
| 14.2 | 261 |
| 12.85 | 261 |
| 12.85 | 259 |
| 12.85 | 252 |
| 12.85 | 245 |
| 11.2 | 245 |
| 11.2 | 242 |
| 11.2 | 239 |
| 11.2 | 234 |
| 9.6 | 234 |
| 9.6 | 225 |
| 9.6 | 219 |
| 9.6 | 215 |
| 7.85 | 215 |
| 7.85 | 204 |
| 7.85 | 199 |
| 7.85 | 193 |
| 6.25 | 193 |
| 6.25 | 183 |
| 6.25 | 173 |
| 6.25 | 166 |
| 6.25 | 163 |
| 4.7 | 163 |
| 4.7 | 160 |
| 4.7 | 149 |
| 4.7 | 145 |
| 3.5 | 145 |
| 3.5 | 139 |
| 3.5 | 127 |
| 3.5 | 117 |
| 2.5 | 117 |
| 2.5 | 107 |
| 2.5 | 101 |
| 2.5 | 92 |
| 1.7 | 92 |
| 1.7 | 84 |
| 1.7 | 69 |
| 1.7 | 60 |
| 1 | 60 |
| 1 | 41 |
| 1 | 33 |
| 1 | 30 |
| 0.45 | 30 |
| 0.45 | 29 |
| 0.45 | 28 |
| 0.45 | 27 |
| 0.15 | 27 |
| 0.15 | 26 |
| 0.15 | 25 |
| 0.05 | 25 |
| 0.05 | 24 |
| 0.05 | 26 |
| 0.05 | 25 |
| 0.05 | 28 |
| 0.05 | 28 |
| 0.05 | 24 |

-continued

| Sensor 1 | |
|---|---|
| pressure | resistance |

| Sensor 2 | |
|---|---|
| pressure | resistance |
| 0.05 | 0 |
| 0.05 | 3 |
| 0.05 | 6 |
| 0.05 | 8 |
| 0.15 | 8 |
| 0.15 | 10 |
| 0.15 | 13 |
| 0.15 | 14 |
| 0.25 | 14 |
| 0.25 | 20 |
| 0.25 | 21 |
| 0.45 | 21 |
| 0.45 | 32 |
| 0.45 | 35 |
| 0.65 | 35 |
| 0.65 | 39 |
| 0.65 | 37 |
| 0.65 | 42 |
| 0.95 | 42 |
| 0.95 | 51 |
| 0.95 | 48 |
| 0.95 | 49 |
| 0.95 | 59 |
| 1.3 | 59 |
| 1.3 | 67 |
| 1.3 | 74 |
| 1.3 | 79 |
| 2 | 79 |
| 2 | 88 |
| 2 | 94 |
| 2 | 95 |
| 3.2 | 95 |
| 3.2 | 100 |
| 3.2 | 105 |
| 3.2 | 108 |
| 4.45 | 108 |
| 4.45 | 113 |
| 4.45 | 118 |
| 4.45 | 123 |
| 5.7 | 123 |
| 5.7 | 132 |
| 5.7 | 135 |
| 5.7 | 139 |
| 7.15 | 139 |
| 7.15 | 144 |
| 7.15 | 149 |
| 8.7 | 149 |
| 8.7 | 150 |
| 8.7 | 155 |
| 8.7 | 158 |
| 10 | 158 |
| 10 | 161 |
| 10 | 164 |
| 10 | 166 |
| 11.1 | 166 |
| 11.1 | 170 |
| 11.1 | 173 |
| 11.1 | 175 |
| 11.1 | 177 |
| 12.25 | 177 |
| 12.25 | 180 |
| 12.25 | 181 |
| 12.25 | 184 |
| 13.3 | 184 |
| 13.3 | 185 |
| 13.3 | 188 |
| 13.3 | 192 |

-continued

| Sensor 2 | |
|---|---|
| pressure | resistance |
| 14.35 | 192 |
| 14.35 | 194 |
| 14.35 | 198 |
| 14.35 | 200 |
| 15.65 | 200 |
| 15.65 | 203 |
| 15.65 | 206 |
| 16.9 | 206 |
| 16.9 | 207 |
| 16.9 | 211 |
| 17.85 | 211 |
| 17.85 | 210 |
| 17.85 | 216 |
| 17.85 | 218 |
| 18.7 | 218 |
| 18.7 | 217 |
| 18.7 | 220 |
| 18.7 | 224 |
| 20.05 | 224 |
| 20.05 | 226 |
| 20.05 | 227 |
| 20.05 | 231 |
| 20.05 | 232 |
| 21.4 | 232 |
| 21.4 | 234 |
| 21.4 | 236 |
| 21.4 | 237 |
| 22.8 | 237 |
| 22.8 | 240 |
| 22.8 | 243 |
| 22.8 | 245 |
| 24.25 | 245 |
| 24.25 | 244 |
| 24.25 | 248 |
| 25.45 | 248 |
| 25.45 | 250 |
| 25.45 | 253 |
| 25.45 | 254 |
| 26.45 | 254 |
| 26.45 | 258 |
| 26.45 | 257 |
| 26.45 | 258 |
| 27.5 | 258 |
| 27.5 | 261 |
| 28.3 | 261 |
| 28.3 | 262 |
| 28.3 | 264 |
| 28.3 | 265 |
| 28.3 | 268 |
| 29.5 | 268 |
| 29.5 | 269 |
| 29.5 | 272 |
| 30.8 | 272 |
| 30.8 | 273 |
| 30.8 | 279 |
| 31.75 | 279 |
| 31.75 | 276 |
| 31.75 | 279 |
| 32.75 | 279 |
| 32.75 | 282 |
| 32.75 | 283 |
| 32.75 | 282 |
| 33.95 | 282 |
| 33.95 | 285 |
| 33.95 | 287 |
| 35.25 | 287 |
| 35.25 | 286 |
| 35.25 | 290 |
| 35.25 | 291 |
| 36.15 | 291 |
| 36.15 | 293 |
| 36.15 | 296 |
| 37.2 | 296 |
| 37.2 | 301 |
| 37.2 | 298 |

-continued

| Sensor 2 | |
|---|---|
| pressure | resistance |
| 38.4 | 298 |
| 38.4 | 302 |
| 38.4 | 299 |
| 38.4 | 303 |
| 39.8 | 303 |
| 39.8 | 304 |
| 39.8 | 305 |
| 40.95 | 305 |
| 40.95 | 307 |
| 40.95 | 310 |
| 42.2 | 310 |
| 42.2 | 309 |
| 42.2 | 311 |
| 43.15 | 311 |
| 43.15 | 314 |
| 44.3 | 314 |
| 44.3 | 318 |
| 44.3 | 320 |
| 44.3 | 319 |
| 45.55 | 319 |
| 45.55 | 321 |
| 45.55 | 318 |
| 46.6 | 318 |
| 46.6 | 321 |
| 46.6 | 323 |
| 46.6 | 324 |
| 46.6 | 325 |
| 47 | 325 |
| 47 | 329 |
| 47 | 327 |
| 48.15 | 327 |
| 48.15 | 329 |
| 48.15 | 331 |
| 48.15 | 328 |
| 49.15 | 328 |
| 49.15 | 334 |
| 49.15 | 336 |
| 50.55 | 336 |
| 50.55 | 335 |
| 50.55 | 337 |
| 51.75 | 337 |
| 51.75 | 336 |
| 51.75 | 342 |
| 51.75 | 341 |
| 53.15 | 341 |
| 53.15 | 345 |
| 53.15 | 344 |
| 54.25 | 344 |
| 54.25 | 346 |
| 54.25 | 342 |
| 54.25 | 345 |
| 55.45 | 345 |
| 55.45 | 347 |
| 55.45 | 348 |
| 56.45 | 348 |
| 56.45 | 350 |
| 56.45 | 351 |
| 56.45 | 352 |
| 56.95 | 352 |
| 56.95 | 351 |
| 56.95 | 355 |
| 56.95 | 357 |
| 58.1 | 357 |
| 58.1 | 358 |
| 58.1 | 359 |
| 58.1 | 360 |
| 59.6 | 360 |
| 59.6 | 359 |
| 59.6 | 362 |
| 59.6 | 361 |
| 61.15 | 361 |
| 61.15 | 363 |
| 61.15 | 365 |
| 61.15 | 367 |
| 62.15 | 367 |

-continued

| Sensor 2 | |
|---|---|
| pressure | resistance |
| 62.15 | 363 |
| 62.15 | 367 |
| 62.15 | 368 |
| 63.35 | 368 |
| 63.35 | 367 |
| 63.35 | 368 |
| 63.35 | 369 |
| 64 | 369 |
| 64 | 368 |
| 64 | 370 |
| 64 | 373 |
| 65 | 373 |
| 65 | 372 |
| 65 | 373 |
| 65 | 372 |
| 65.75 | 372 |
| 65.75 | 376 |
| 65.75 | 375 |
| 65.75 | 379 |
| 66.45 | 379 |
| 66.45 | 384 |
| 67.95 | 384 |
| 67.95 | 378 |
| 67.95 | 381 |
| 67.95 | 384 |
| 69.4 | 384 |
| 69.4 | 383 |
| 69.4 | 382 |
| 69.4 | 386 |
| 70.4 | 386 |
| 70.4 | 395 |
| 70.4 | 380 |
| 70.4 | 385 |
| 71.55 | 385 |
| 71.55 | 388 |
| 71.55 | 387 |
| 73.55 | 387 |
| 73.55 | 391 |
| 74.75 | 391 |
| 74.75 | 394 |
| 74.75 | 393 |
| 74.75 | 394 |
| 76.15 | 394 |
| 76.15 | 396 |
| 76.4 | 396 |
| 76.4 | 397 |
| 76.4 | 398 |
| 77.5 | 398 |
| 77.5 | 400 |
| 77.5 | 401 |
| 77.5 | 400 |
| 79.3 | 400 |
| 79.3 | 403 |
| 79.3 | 404 |
| 79.3 | 405 |
| 81.8 | 405 |
| 81.8 | 402 |
| 81.8 | 406 |
| 82.75 | 406 |
| 82.75 | 407 |
| 82.75 | 411 |
| 82.75 | 409 |
| 84.25 | 409 |
| 84.25 | 410 |
| 84.25 | 415 |
| 85.2 | 415 |
| 85.2 | 411 |
| 85.2 | 404 |
| 85.2 | 418 |
| 85.2 | 415 |
| 87.15 | 415 |
| 87.15 | 417 |
| 87.15 | 416 |
| 88.2 | 416 |
| 88.2 | 419 |

-continued

| Sensor 2 | |
|---|---|
| pressure | resistance |
| 88.2 | 420 |
| 88.2 | 421 |
| 90.25 | 421 |
| 91 | 421 |
| 91 | 422 |
| 91 | 423 |
| 92.6 | 423 |
| 92.6 | 424 |
| 93.05 | 424 |
| 93.05 | 426 |
| 93.05 | 427 |
| 94.9 | 427 |
| 94.9 | 428 |
| 94.9 | 429 |
| 96.15 | 429 |
| 96.15 | 431 |
| 96.15 | 430 |
| 97.7 | 430 |
| 97.7 | 432 |
| 97.7 | 434 |
| 97.7 | 435 |
| 99.1 | 435 |
| 99.1 | 434 |
| 100.1 | 434 |
| 100.1 | 433 |
| 100.1 | 434 |
| 100.1 | 435 |
| 100.3 | 435 |
| 100.3 | 436 |
| 100.3 | 437 |
| 100.3 | 435 |
| 100.35 | 435 |
| 100.35 | 436 |
| 100.35 | 435 |
| 100.35 | 435 |
| 100.35 | 432 |
| 100.4 | 432 |
| 100.4 | 437 |
| 100.2 | 437 |
| 99.95 | 437 |
| 99.95 | 434 |
| 99.95 | 438 |
| 99.95 | 440 |
| 100.15 | 440 |
| 100.15 | 441 |
| 100.15 | 439 |
| 100.15 | 438 |
| 100.15 | 439 |
| 100.75 | 439 |
| 100.75 | 440 |
| 100.75 | 438 |
| 100.9 | 438 |
| 100.9 | 434 |
| 100.9 | 437 |
| 100.9 | 439 |
| 98.8 | 439 |
| 98.8 | 436 |
| 98.8 | 434 |
| 98.8 | 433 |
| 95.05 | 433 |
| 95.05 | 434 |
| 95.05 | 431 |
| 91 | 431 |
| 91 | 429 |
| 91 | 428 |
| 91 | 423 |
| 86.1 | 423 |
| 86.1 | 424 |
| 86.1 | 419 |
| 80.45 | 419 |
| 80.45 | 410 |
| 80.45 | 415 |
| 80.45 | 414 |
| 75.1 | 414 |
| 75.1 | 412 |

-continued

| Sensor 2 | |
|---|---|
| pressure | resistance |
| 75.1 | 406 |
| 75.1 | 404 |
| 70.5 | 404 |
| 70.5 | 405 |
| 70.5 | 404 |
| 66.9 | 404 |
| 66.9 | 407 |
| 66.9 | 394 |
| 66.9 | 409 |
| 64.1 | 409 |
| 64.1 | 404 |
| 64.1 | 402 |
| 63.2 | 402 |
| 63.2 | 404 |
| 63.2 | 402 |
| 62.5 | 402 |
| 62.5 | 399 |
| 62.5 | 397 |
| 61.75 | 397 |
| 61.75 | 395 |
| 61.75 | 393 |
| 61.75 | 392 |
| 59.55 | 392 |
| 59.55 | 389 |
| 59.55 | 388 |
| 59.55 | 386 |
| 59.55 | 382 |
| 56.3 | 382 |
| 56.3 | 381 |
| 56.3 | 380 |
| 56.3 | 378 |
| 52.9 | 378 |
| 52.9 | 377 |
| 52.9 | 375 |
| 52.9 | 373 |
| 50.05 | 373 |
| 50.05 | 370 |
| 47.75 | 370 |
| 47.75 | 367 |
| 47.75 | 365 |
| 45.7 | 365 |
| 45.7 | 357 |
| 45.7 | 360 |
| 45.7 | 359 |
| 43.65 | 359 |
| 43.65 | 357 |
| 43.65 | 356 |
| 41.85 | 356 |
| 41.85 | 354 |
| 40.6 | 354 |
| 40.6 | 353 |
| 40.6 | 352 |
| 40.6 | 348 |
| 39.4 | 348 |
| 39.4 | 346 |
| 39.4 | 348 |
| 38 | 348 |
| 38 | 343 |
| 38 | 342 |
| 38 | 340 |
| 36.55 | 340 |
| 36.55 | 342 |
| 36.55 | 337 |
| 36.55 | 338 |
| 35.35 | 338 |
| 35.35 | 337 |
| 35.35 | 335 |
| 35.35 | 334 |
| 33.95 | 334 |
| 33.95 | 328 |
| 33.95 | 329 |
| 33.95 | 323 |
| 32.15 | 323 |
| 32.15 | 325 |
| 32.15 | 324 |

-continued

| Sensor 2 | |
|---|---|
| pressure | resistance |
| 30.4 | 324 |
| 30.4 | 323 |
| 30.4 | 320 |
| 29.3 | 320 |
| 29.3 | 322 |
| 29.3 | 320 |
| 29.3 | 316 |
| 29.3 | 319 |
| 28.7 | 319 |
| 28.7 | 317 |
| 28.7 | 305 |
| 27.75 | 305 |
| 27.75 | 309 |
| 27.75 | 308 |
| 26.3 | 308 |
| 26.3 | 309 |
| 26.3 | 308 |
| 26.3 | 306 |
| 25 | 306 |
| 25 | 301 |
| 25 | 303 |
| 25 | 302 |
| 23.95 | 302 |
| 23.95 | 301 |
| 23.95 | 299 |
| 23.05 | 299 |
| 23.05 | 300 |
| 23.05 | 295 |
| 23.05 | 289 |
| 21.8 | 289 |
| 21.8 | 287 |
| 21.8 | 286 |
| 21.8 | 287 |
| 20.4 | 287 |
| 20.4 | 285 |
| 20.4 | 281 |
| 20.4 | 277 |
| 18.9 | 277 |
| 18.9 | 276 |
| 18.9 | 269 |
| 18.9 | 271 |
| 18.9 | 269 |
| 17.65 | 269 |
| 17.65 | 266 |
| 17.65 | 264 |
| 16.2 | 264 |
| 16.2 | 258 |
| 16.2 | 257 |
| 16.2 | 252 |
| 14.95 | 252 |
| 14.95 | 251 |
| 14.95 | 248 |
| 13.7 | 248 |
| 13.7 | 246 |
| 13.7 | 247 |
| 12.85 | 247 |
| 12.85 | 249 |
| 12.85 | 246 |
| 12.85 | 245 |
| 12.45 | 245 |
| 12.45 | 243 |
| 12.45 | 241 |
| 12.45 | 238 |
| 12 | 238 |
| 12 | 233 |
| 12 | 234 |
| 12 | 231 |
| 12 | 230 |
| 11.1 | 230 |
| 11.1 | 224 |
| 11.1 | 218 |
| 11.1 | 210 |
| 9.9 | 210 |
| 9.9 | 201 |
| 9.9 | 196 |
| 9.9 | 192 |
| 8.25 | 192 |
| 8.25 | 191 |
| 8.25 | 187 |
| 8.25 | 181 |
| 6.7 | 181 |
| 6.7 | 175 |
| 6.7 | 171 |
| 5.55 | 171 |
| 5.55 | 166 |
| 5.55 | 165 |
| 4.75 | 165 |
| 4.75 | 157 |
| 4.75 | 147 |
| 4.05 | 147 |
| 4.05 | 146 |
| 4.05 | 143 |
| 4.05 | 140 |
| 3.5 | 140 |
| 3.5 | 136 |
| 3.5 | 133 |
| 3.5 | 126 |
| 3.5 | 114 |
| 2.95 | 114 |
| 2.95 | 107 |
| 2.95 | 104 |
| 2.95 | 101 |
| 2.25 | 101 |
| 2.25 | 93 |
| 2.25 | 87 |
| 2.25 | 81 |
| 1.6 | 81 |
| 1.6 | 75 |
| 1.6 | 66 |
| 1.6 | 61 |
| 1.05 | 61 |
| 1.05 | 52 |
| 1.05 | 45 |
| 1.05 | 36 |
| 0.6 | 36 |
| 0.6 | 34 |
| 0.6 | 31 |
| 0.25 | 31 |
| 0.25 | 27 |
| 0.25 | 25 |
| 0.25 | 24 |
| 0.1 | 24 |
| 0.1 | 22 |
| 0.1 | 23 |
| 0.05 | 23 |
| 0.05 | 22 |
| 0.05 | 22 |
| 0.05 | 21 |
| 0.05 | 21 |
| 0.05 | 20 |
| 0.05 | 20 |
| 0.05 | 21 |
| 0.05 | 19 |

| Sensor 3 | |
|---|---|
| pressure | resistance |
| 0.1 | 11 |
| 0.1 | 14 |
| 0.1 | 16 |
| 0.1 | 19 |
| 0.25 | 19 |
| 0.25 | 22 |
| 0.25 | 25 |
| 0.25 | 31 |
| 0.5 | 31 |

-continued

| Sensor 3 | |
|---|---|
| pressure | resistance |
| 0.5 | 29 |
| 0.5 | 37 |
| 0.5 | 34 |
| 0.8 | 34 |
| 0.8 | 46 |
| 0.8 | 50 |
| 0.8 | 56 |
| 1.4 | 56 |
| 1.4 | 62 |
| 1.4 | 73 |
| 1.4 | 70 |
| 2.3 | 70 |
| 2.3 | 71 |
| 2.3 | 76 |
| 2.3 | 82 |
| 2.3 | 85 |
| 3.25 | 85 |
| 3.25 | 90 |
| 3.25 | 96 |
| 3.25 | 98 |
| 4.35 | 98 |
| 4.35 | 102 |
| 4.35 | 103 |
| 4.35 | 107 |
| 5.55 | 107 |
| 5.55 | 111 |
| 5.55 | 116 |
| 5.55 | 123 |
| 6.9 | 123 |
| 6.9 | 126 |
| 6.9 | 131 |
| 6.9 | 132 |
| 8.4 | 132 |
| 8.4 | 134 |
| 8.4 | 140 |
| 9.85 | 140 |
| 9.85 | 143 |
| 9.85 | 146 |
| 9.85 | 148 |
| 11.1 | 148 |
| 11.1 | 153 |
| 11.1 | 156 |
| 11.1 | 155 |
| 11.1 | 159 |
| 12.45 | 159 |
| 12.45 | 160 |
| 12.45 | 163 |
| 12.45 | 166 |
| 13.8 | 166 |
| 13.8 | 167 |
| 13.8 | 166 |
| 13.8 | 169 |
| 14.95 | 169 |
| 14.95 | 172 |
| 14.95 | 179 |
| 14.95 | 174 |
| 16.1 | 174 |
| 16.1 | 180 |
| 16.1 | 179 |
| 16.1 | 177 |
| 17 | 177 |
| 17 | 180 |
| 17 | 183 |
| 17 | 180 |
| 17.5 | 180 |
| 17.5 | 184 |
| 17.5 | 187 |
| 17.5 | 186 |
| 18.15 | 186 |
| 18.15 | 191 |
| 18.15 | 189 |
| 19.05 | 189 |
| 19.05 | 193 |
| 19.05 | 191 |
| 19.05 | 198 |

-continued

| Sensor 3 | |
|---|---|
| pressure | resistance |
| 20.2 | 198 |
| 20.2 | 200 |
| 20.2 | 204 |
| 20.2 | 203 |
| 21.3 | 203 |
| 21.3 | 204 |
| 21.3 | 205 |
| 21.3 | 207 |
| 22.25 | 207 |
| 22.25 | 209 |
| 22.25 | 211 |
| 22.25 | 213 |
| 23.2 | 213 |
| 23.2 | 211 |
| 23.2 | 215 |
| 23.2 | 213 |
| 23.95 | 213 |
| 23.95 | 216 |
| 23.95 | 215 |
| 24.85 | 215 |
| 24.85 | 217 |
| 24.85 | 221 |
| 24.85 | 222 |
| 25.9 | 222 |
| 25.9 | 223 |
| 25.9 | 226 |
| 27 | 226 |
| 27 | 228 |
| 27 | 230 |
| 28 | 230 |
| 28 | 235 |
| 28 | 233 |
| 28 | 234 |
| 29.05 | 234 |
| 29.05 | 236 |
| 29.05 | 235 |
| 30.2 | 235 |
| 30.2 | 240 |
| 30.2 | 239 |
| 30.85 | 239 |
| 30.85 | 238 |
| 30.85 | 240 |
| 30.85 | 239 |
| 30.95 | 239 |
| 30.95 | 242 |
| 30.95 | 243 |
| 30.95 | 244 |
| 31.35 | 244 |
| 31.35 | 245 |
| 31.9 | 245 |
| 31.9 | 248 |
| 31.9 | 249 |
| 32.8 | 249 |
| 32.8 | 252 |
| 32.8 | 250 |
| 33.4 | 250 |
| 33.4 | 252 |
| 33.4 | 254 |
| 33.4 | 253 |
| 34.2 | 253 |
| 34.2 | 255 |
| 34.2 | 260 |
| 35.2 | 260 |
| 35.2 | 256 |
| 35.2 | 258 |
| 35.2 | 259 |
| 36.15 | 259 |
| 36.15 | 260 |
| 36.15 | 261 |
| 36.15 | 262 |
| 37.25 | 262 |
| 37.25 | 257 |
| 37.25 | 261 |
| 37.25 | 262 |
| 37.65 | 262 |

-continued

| Sensor 3 | |
|---|---|
| pressure | resistance |
| 37.65 | 260 |
| 37.65 | 265 |
| 37.65 | 266 |
| 38.6 | 266 |
| 38.6 | 265 |
| 38.6 | 267 |
| 39.25 | 267 |
| 39.25 | 269 |
| 39.25 | 273 |
| 39.25 | 271 |
| 39.25 | 270 |
| 39.95 | 270 |
| 39.95 | 271 |
| 39.95 | 275 |
| 39.95 | 276 |
| 40.6 | 276 |
| 40.6 | 273 |
| 40.6 | 274 |
| 40.65 | 274 |
| 40.65 | 277 |
| 41.6 | 277 |
| 41.6 | 270 |
| 41.6 | 280 |
| 42.35 | 280 |
| 42.35 | 281 |
| 42.35 | 283 |
| 43.75 | 283 |
| 43.75 | 282 |
| 43.75 | 284 |
| 44.75 | 284 |
| 44.75 | 286 |
| 44.75 | 287 |
| 45.65 | 287 |
| 45.65 | 296 |
| 45.65 | 288 |
| 45.65 | 289 |
| 45.65 | 290 |
| 46.5 | 290 |
| 46.5 | 291 |
| 46.5 | 292 |
| 46.5 | 294 |
| 47.25 | 294 |
| 47.25 | 292 |
| 47.25 | 291 |
| 47.25 | 296 |
| 47.6 | 296 |
| 47.6 | 295 |
| 47.6 | 296 |
| 48.35 | 296 |
| 49.1 | 296 |
| 49.1 | 299 |
| 49.1 | 294 |
| 49.1 | 299 |
| 49.7 | 299 |
| 49.7 | 306 |
| 49.7 | 303 |
| 50.2 | 303 |
| 50.2 | 301 |
| 50.2 | 304 |
| 50.2 | 305 |
| 51.05 | 305 |
| 51.05 | 307 |
| 51.05 | 305 |
| 51.05 | 307 |
| 52.3 | 307 |
| 52.3 | 308 |
| 53.05 | 308 |
| 53.05 | 310 |
| 53.05 | 311 |
| 53.05 | 312 |
| 53.85 | 312 |
| 53.85 | 315 |
| 53.85 | 312 |
| 53.85 | 315 |
| 54.8 | 315 |

-continued

| Sensor 3 | |
|---|---|
| pressure | resistance |
| 54.8 | 313 |
| 54.8 | 314 |
| 54.8 | 313 |
| 55.1 | 313 |
| 55.1 | 315 |
| 55.1 | 318 |
| 55.4 | 318 |
| 55.4 | 320 |
| 56.15 | 320 |
| 56.15 | 319 |
| 56.15 | 317 |
| 56.7 | 317 |
| 56.7 | 321 |
| 56.7 | 323 |
| 56.7 | 321 |
| 57.25 | 321 |
| 57.25 | 323 |
| 57.25 | 324 |
| 57.25 | 325 |
| 58.25 | 325 |
| 58.25 | 326 |
| 58.25 | 323 |
| 58.25 | 327 |
| 59.55 | 327 |
| 59.55 | 328 |
| 59.55 | 329 |
| 59.55 | 335 |
| 60.6 | 335 |
| 60.6 | 331 |
| 60.6 | 329 |
| 61.4 | 329 |
| 61.4 | 331 |
| 61.4 | 332 |
| 61.4 | 334 |
| 61.8 | 334 |
| 61.8 | 335 |
| 61.8 | 332 |
| 62.1 | 332 |
| 62.1 | 337 |
| 62.1 | 332 |
| 62.1 | 338 |
| 62.1 | 336 |
| 63 | 336 |
| 63 | 335 |
| 63 | 341 |
| 64.45 | 341 |
| 64.45 | 342 |
| 64.45 | 341 |
| 64.45 | 342 |
| 65.8 | 342 |
| 65.8 | 343 |
| 65.8 | 344 |
| 65.8 | 346 |
| 66.7 | 346 |
| 66.7 | 348 |
| 68.05 | 348 |
| 68.05 | 350 |
| 69.35 | 350 |
| 69.35 | 351 |
| 69.35 | 352 |
| 69.35 | 353 |
| 70.45 | 353 |
| 70.45 | 354 |
| 70.45 | 352 |
| 70.45 | 353 |
| 71.2 | 353 |
| 71.2 | 354 |
| 71.2 | 356 |
| 72.7 | 356 |
| 72.7 | 358 |
| 72.7 | 357 |
| 72.7 | 359 |
| 72.7 | 360 |
| 73.6 | 360 |
| 73.6 | 362 |

-continued

| Sensor 3 | |
|---|---|
| pressure | resistance |
| 73.6 | 361 |
| 73.6 | 363 |
| 75.2 | 363 |
| 75.2 | 362 |
| 75.2 | 361 |
| 75.2 | 362 |
| 75.65 | 362 |
| 75.65 | 364 |
| 75.65 | 366 |
| 75.65 | 368 |
| 76.9 | 368 |
| 76.9 | 367 |
| 76.9 | 369 |
| 77.65 | 369 |
| 77.65 | 370 |
| 78.05 | 370 |
| 78.05 | 369 |
| 78.05 | 371 |
| 78.05 | 372 |
| 78.65 | 372 |
| 78.65 | 375 |
| 78.65 | 374 |
| 78.65 | 375 |
| 79.75 | 375 |
| 79.75 | 376 |
| 79.75 | 377 |
| 79.75 | 374 |
| 82.15 | 374 |
| 82.15 | 379 |
| 83.7 | 379 |
| 83.7 | 380 |
| 83.7 | 378 |
| 83.7 | 380 |
| 84.7 | 380 |
| 84.7 | 382 |
| 84.7 | 383 |
| 85.85 | 383 |
| 85.85 | 384 |
| 85.85 | 385 |
| 85.85 | 384 |
| 86.7 | 384 |
| 86.7 | 388 |
| 86.7 | 387 |
| 88.6 | 387 |
| 88.6 | 388 |
| 88.6 | 390 |
| 90 | 390 |
| 90 | 389 |
| 90 | 391 |
| 90 | 392 |
| 91.4 | 392 |
| 91.4 | 391 |
| 91.4 | 393 |
| 92.9 | 393 |
| 92.9 | 392 |
| 92.9 | 396 |
| 92.9 | 395 |
| 92.9 | 396 |
| 93.6 | 396 |
| 93.6 | 397 |
| 93.6 | 398 |
| 93.6 | 397 |
| 95.05 | 397 |
| 95.05 | 398 |
| 95.05 | 399 |
| 96.1 | 399 |
| 96.1 | 401 |
| 96.1 | 400 |
| 96.1 | 401 |
| 97.75 | 401 |
| 97.75 | 404 |
| 97.75 | 401 |
| 98.5 | 401 |
| 98.5 | 404 |
| 99.5 | 404 |

-continued

| Sensor 3 | |
|---|---|
| pressure | resistance |
| 99.5 | 405 |
| 99.5 | 406 |
| 100.05 | 406 |
| 100.05 | 405 |
| 100.05 | 406 |
| 100.05 | 407 |
| 100.85 | 407 |
| 100.85 | 408 |
| 101.4 | 408 |
| 101.4 | 408 |
| 101.4 | 407 |
| 101.4 | 408 |
| 101.4 | 409 |
| 101.35 | 409 |
| 101.35 | 408 |
| 101.1 | 408 |
| 101.1 | 410 |
| 101.1 | 407 |
| 101.1 | 411 |
| 101.75 | 411 |
| 101.75 | 410 |
| 101.75 | 407 |
| 101.25 | 407 |
| 101.25 | 409 |
| 101.25 | 408 |
| 101.25 | 412 |
| 98.95 | 412 |
| 98.95 | 406 |
| 98.95 | 404 |
| 98.95 | 405 |
| 95.15 | 405 |
| 95.15 | 403 |
| 95.15 | 397 |
| 95.15 | 394 |
| 90.4 | 394 |
| 90.4 | 392 |
| 90.4 | 393 |
| 84.7 | 393 |
| 84.7 | 391 |
| 84.7 | 387 |
| 84.7 | 388 |
| 79.15 | 388 |
| 79.15 | 385 |
| 79.15 | 383 |
| 74.75 | 383 |
| 74.75 | 380 |
| 74.75 | 375 |
| 74.75 | 377 |
| 70.45 | 377 |
| 70.45 | 373 |
| 70.45 | 372 |
| 66.4 | 372 |
| 66.4 | 369 |
| 66.4 | 368 |
| 63.15 | 368 |
| 63.15 | 366 |
| 63.15 | 365 |
| 63.15 | 363 |
| 60.65 | 363 |
| 60.65 | 362 |
| 60.65 | 361 |
| 60.65 | 352 |
| 57.7 | 352 |
| 57.7 | 353 |
| 57.7 | 350 |
| 54.3 | 350 |
| 54.3 | 346 |
| 54.3 | 345 |
| 54.3 | 341 |
| 54.3 | 340 |
| 51 | 340 |
| 51 | 341 |
| 51 | 337 |
| 51 | 336 |
| 48.2 | 336 |

-continued

| Sensor 3 | |
|---|---|
| pressure | resistance |
| 48.2 | 335 |
| 48.2 | 331 |
| 48.2 | 330 |
| 45.75 | 330 |
| 45.75 | 328 |
| 45.75 | 326 |
| 45.75 | 324 |
| 43.65 | 324 |
| 43.65 | 323 |
| 43.65 | 318 |
| 41.7 | 318 |
| 41.7 | 319 |
| 41.7 | 318 |
| 41.7 | 316 |
| 39.85 | 316 |
| 39.85 | 315 |
| 39.85 | 319 |
| 39.85 | 310 |
| 38.05 | 310 |
| 38.05 | 307 |
| 38.05 | 305 |
| 38.05 | 302 |
| 35.95 | 302 |
| 35.95 | 297 |
| 35.95 | 295 |
| 33.5 | 295 |
| 33.5 | 292 |
| 33.5 | 291 |
| 33.5 | 289 |
| 31.1 | 289 |
| 31.1 | 287 |
| 31.1 | 285 |
| 31.1 | 283 |
| 29.1 | 283 |
| 29.1 | 286 |
| 29.1 | 284 |
| 29.1 | 282 |
| 27.7 | 282 |
| 27.7 | 279 |
| 27.7 | 278 |
| 26.55 | 278 |
| 26.55 | 275 |
| 26.55 | 274 |
| 25.4 | 274 |
| 25.4 | 273 |
| 25.4 | 272 |
| 25.4 | 273 |
| 25.4 | 271 |
| 24.45 | 271 |
| 24.45 | 270 |
| 24.45 | 269 |
| 24.45 | 267 |
| 23.55 | 267 |
| 23.55 | 265 |
| 23.55 | 264 |
| 23.55 | 262 |
| 22.6 | 262 |
| 22.6 | 261 |
| 22.6 | 259 |
| 22.6 | 257 |
| 21.3 | 257 |
| 21.3 | 258 |
| 21.3 | 252 |
| 21.3 | 251 |
| 19.95 | 251 |
| 19.95 | 250 |
| 19.95 | 244 |
| 19.95 | 241 |
| 18.25 | 241 |
| 18.25 | 240 |
| 18.25 | 236 |
| 18.25 | 234 |
| 16.55 | 234 |
| 16.55 | 229 |
| 16.55 | 230 |
| 15.1 | 230 |
| 15.1 | 228 |
| 15.1 | 227 |
| 14.2 | 227 |
| 14.2 | 224 |
| 14.2 | 227 |
| 14.2 | 223 |
| 14.2 | 222 |
| 13.6 | 222 |
| 13.6 | 219 |
| 13.6 | 217 |
| 13.6 | 220 |
| 12.9 | 220 |
| 12.9 | 217 |
| 12.9 | 216 |
| 12.3 | 216 |
| 12.3 | 214 |
| 12.3 | 215 |
| 12.3 | 214 |
| 11.85 | 214 |
| 11.85 | 211 |
| 11.85 | 206 |
| 11.85 | 207 |
| 11.35 | 207 |
| 11.35 | 204 |
| 11.35 | 202 |
| 11.35 | 199 |
| 10.45 | 199 |
| 10.45 | 193 |
| 10.45 | 190 |
| 9.25 | 190 |
| 9.25 | 189 |
| 9.25 | 187 |
| 9.25 | 185 |
| 8.3 | 185 |
| 8.3 | 181 |
| 8.3 | 176 |
| 8.3 | 173 |
| 7.45 | 173 |
| 7.45 | 169 |
| 7.45 | 168 |
| 7.45 | 163 |
| 7.45 | 162 |
| 6.5 | 162 |
| 6.5 | 159 |
| 6.5 | 153 |
| 6.5 | 151 |
| 5.65 | 151 |
| 5.65 | 148 |
| 5.65 | 145 |
| 5.65 | 143 |
| 4.9 | 143 |
| 4.9 | 140 |
| 4.9 | 138 |
| 4.9 | 131 |
| 4.2 | 131 |
| 4.2 | 125 |
| 4.2 | 124 |
| 4.2 | 114 |
| 3.45 | 114 |
| 3.45 | 104 |
| 3.45 | 93 |
| 3.45 | 86 |
| 2.5 | 86 |
| 2.5 | 77 |
| 2.5 | 67 |
| 2.5 | 56 |
| 2.5 | 46 |
| 1.5 | 46 |
| 1.5 | 44 |
| 1.5 | 35 |
| 0.7 | 35 |
| 0.7 | 28 |
| 0.7 | 25 |
| 0.7 | 24 |

-continued

| Sensor 3 | |
|---|---|
| pressure | resistance |
| 0.7 | 22 |
| 0.25 | 22 |
| 0.25 | 21 |
| 0.25 | 19 |
| 0.25 | 20 |
| 0.1 | 20 |
| 0.1 | 17 |
| 0.1 | 19 |
| 0.05 | 19 |
| 0.05 | 18 |
| 0.05 | 17 |
| 0.05 | 17 |
| 0.05 | 16 |
| 0.05 | 19 |
| 0.05 | 19 |
| 0.05 | 16 |
| 0.05 | 15 |
| 0.05 | 15 |
| 0.05 | 16 |

| Sensor 4 | |
|---|---|
| pressure | resistance |
| 0.1 | 5 |
| 0.1 | 9 |
| 0.1 | 12 |
| 0.1 | 14 |
| 0.2 | 14 |
| 0.2 | 15 |
| 0.2 | 16 |
| 0.2 | 19 |
| 0.35 | 19 |
| 0.35 | 23 |
| 0.35 | 25 |
| 0.35 | 26 |
| 0.35 | 29 |
| 0.5 | 29 |
| 0.5 | 32 |
| 0.5 | 36 |
| 0.5 | 37 |
| 0.75 | 37 |
| 0.75 | 39 |
| 0.75 | 42 |
| 0.75 | 49 |
| 1.05 | 49 |
| 1.05 | 55 |
| 1.05 | 63 |
| 1.05 | 70 |
| 1.7 | 70 |
| 1.7 | 75 |
| 1.7 | 79 |
| 1.7 | 82 |
| 2.75 | 82 |
| 2.75 | 85 |
| 2.75 | 88 |
| 2.75 | 89 |
| 3.8 | 89 |
| 3.8 | 93 |
| 3.8 | 99 |
| 3.8 | 102 |
| 4.7 | 102 |
| 4.7 | 106 |
| 4.7 | 111 |
| 4.7 | 115 |
| 4.7 | 120 |
| 5.75 | 120 |
| 5.75 | 127 |
| 5.75 | 130 |
| 5.75 | 135 |
| 7.35 | 135 |
| 7.35 | 138 |

-continued

| Sensor 4 | |
|---|---|
| pressure | resistance |
| 7.35 | 140 |
| 7.35 | 141 |
| 8.85 | 141 |
| 8.85 | 144 |
| 8.85 | 150 |
| 8.85 | 151 |
| 10.15 | 151 |
| 10.15 | 150 |
| 10.15 | 152 |
| 10.9 | 152 |
| 10.9 | 155 |
| 10.9 | 161 |
| 10.9 | 160 |
| 11.85 | 160 |
| 11.85 | 163 |
| 11.85 | 165 |
| 11.85 | 167 |
| 12.75 | 167 |
| 12.75 | 169 |
| 12.75 | 167 |
| 12.75 | 168 |
| 13.85 | 168 |
| 13.85 | 175 |
| 13.85 | 179 |
| 13.85 | 181 |
| 14.9 | 181 |
| 14.9 | 180 |
| 15.75 | 180 |
| 15.75 | 183 |
| 15.75 | 185 |
| 15.75 | 188 |
| 16.55 | 188 |
| 16.55 | 189 |
| 16.55 | 190 |
| 17.2 | 190 |
| 17.2 | 193 |
| 17.2 | 195 |
| 17.85 | 195 |
| 17.85 | 196 |
| 17.85 | 199 |
| 17.85 | 198 |
| 18.6 | 198 |
| 18.6 | 202 |
| 18.6 | 201 |
| 18.6 | 202 |
| 19.5 | 202 |
| 19.5 | 204 |
| 19.5 | 205 |
| 19.5 | 207 |
| 20.4 | 207 |
| 20.4 | 208 |
| 20.4 | 215 |
| 20.4 | 212 |
| 21.25 | 212 |
| 21.25 | 214 |
| 22.1 | 214 |
| 22.1 | 216 |
| 22.1 | 218 |
| 22.1 | 215 |
| 22.1 | 218 |
| 22.9 | 218 |
| 22.9 | 221 |
| 22.9 | 220 |
| 23.4 | 220 |
| 23.4 | 221 |
| 23.4 | 222 |
| 23.4 | 225 |
| 24.2 | 225 |
| 24.2 | 226 |
| 24.2 | 229 |
| 25.2 | 229 |
| 25.2 | 230 |
| 25.2 | 232 |
| 25.2 | 235 |
| 26.2 | 235 |

-continued

| Sensor 4 | |
|---|---|
| pressure | resistance |
| 26.2 | 234 |
| 26.2 | 235 |
| 26.9 | 235 |
| 26.9 | 237 |
| 26.9 | 239 |
| 26.9 | 241 |
| 28.15 | 241 |
| 28.15 | 242 |
| 28.15 | 243 |
| 29.1 | 243 |
| 29.1 | 244 |
| 29.1 | 246 |
| 29.1 | 248 |
| 29.95 | 248 |
| 29.95 | 249 |
| 29.95 | 251 |
| 30.9 | 251 |
| 30.9 | 254 |
| 30.9 | 251 |
| 30.9 | 254 |
| 31.9 | 254 |
| 31.9 | 256 |
| 31.9 | 257 |
| 32.75 | 257 |
| 32.75 | 255 |
| 32.75 | 257 |
| 32.75 | 262 |
| 33.2 | 262 |
| 33.2 | 256 |
| 33.2 | 261 |
| 33.2 | 262 |
| 34.4 | 262 |
| 34.4 | 264 |
| 34.4 | 266 |
| 35.7 | 266 |
| 35.7 | 268 |
| 35.7 | 269 |
| 36.85 | 269 |
| 36.85 | 272 |
| 36.85 | 273 |
| 37.8 | 273 |
| 37.8 | 277 |
| 39.3 | 277 |
| 39.3 | 280 |
| 39.3 | 277 |
| 40.65 | 277 |
| 40.65 | 281 |
| 40.65 | 282 |
| 41.35 | 282 |
| 41.35 | 283 |
| 41.35 | 286 |
| 41.35 | 284 |
| 42.4 | 284 |
| 42.4 | 289 |
| 42.4 | 288 |
| 43.35 | 288 |
| 43.35 | 290 |
| 43.35 | 291 |
| 43.35 | 290 |
| 44.1 | 290 |
| 44.1 | 293 |
| 44.1 | 294 |
| 44.65 | 294 |
| 44.65 | 295 |
| 44.65 | 294 |
| 44.65 | 296 |
| 45.4 | 296 |
| 45.4 | 297 |
| 45.4 | 299 |
| 45.4 | 304 |
| 46.25 | 304 |
| 46.25 | 296 |
| 46.25 | 304 |
| 46.25 | 300 |
| 47.2 | 300 |

-continued

| Sensor 4 | |
|---|---|
| pressure | resistance |
| 47.2 | 301 |
| 47.2 | 302 |
| 47.2 | 303 |
| 47.95 | 303 |
| 47.95 | 301 |
| 47.95 | 306 |
| 48.45 | 306 |
| 48.45 | 302 |
| 48.45 | 307 |
| 49 | 307 |
| 49 | 311 |
| 49 | 309 |
| 49 | 310 |
| 49.9 | 310 |
| 49.9 | 311 |
| 49.9 | 312 |
| 50.5 | 312 |
| 50.5 | 311 |
| 50.5 | 313 |
| 50.5 | 312 |
| 50.5 | 317 |
| 51.2 | 317 |
| 51.2 | 315 |
| 51.2 | 314 |
| 51.2 | 319 |
| 51.65 | 319 |
| 51.65 | 315 |
| 51.65 | 314 |
| 51.65 | 316 |
| 52.65 | 316 |
| 52.65 | 318 |
| 52.65 | 317 |
| 52.65 | 319 |
| 53.2 | 319 |
| 53.2 | 320 |
| 53.2 | 321 |
| 54.1 | 321 |
| 54.1 | 323 |
| 54.65 | 323 |
| 54.65 | 324 |
| 54.65 | 325 |
| 55.5 | 325 |
| 55.5 | 330 |
| 55.5 | 328 |
| 56.2 | 328 |
| 56.2 | 326 |
| 56.2 | 329 |
| 56.2 | 328 |
| 56.9 | 328 |
| 56.9 | 329 |
| 56.9 | 332 |
| 56.9 | 330 |
| 57.4 | 330 |
| 57.4 | 332 |
| 57.4 | 331 |
| 57.4 | 332 |
| 57.85 | 332 |
| 57.85 | 333 |
| 57.85 | 327 |
| 57.85 | 334 |
| 58.4 | 334 |
| 58.4 | 333 |
| 58.4 | 336 |
| 59.6 | 336 |
| 59.6 | 338 |
| 59.6 | 339 |
| 59.6 | 336 |
| 60.85 | 336 |
| 60.85 | 339 |
| 60.85 | 338 |
| 60.85 | 341 |
| 62.05 | 341 |
| 62.05 | 340 |
| 62.05 | 341 |
| 62.05 | 344 |

-continued

| Sensor 4 | |
|---|---|
| pressure | resistance |
| 62.05 | 342 |
| 62.65 | 342 |
| 62.65 | 343 |
| 62.65 | 345 |
| 63.1 | 345 |
| 63.1 | 346 |
| 63.1 | 345 |
| 63.1 | 347 |
| 63.85 | 347 |
| 63.85 | 348 |
| 63.85 | 346 |
| 65.15 | 346 |
| 65.15 | 348 |
| 65.15 | 346 |
| 65.15 | 350 |
| 65.45 | 350 |
| 65.45 | 351 |
| 65.45 | 352 |
| 65.45 | 351 |
| 65.85 | 351 |
| 65.85 | 352 |
| 65.85 | 351 |
| 65.85 | 354 |
| 66.35 | 354 |
| 66.35 | 353 |
| 66.35 | 355 |
| 66.35 | 356 |
| 67.35 | 356 |
| 67.35 | 354 |
| 67.35 | 356 |
| 67.35 | 358 |
| 67.35 | 359 |
| 68.7 | 359 |
| 68.7 | 360 |
| 68.7 | 361 |
| 70.1 | 361 |
| 70.1 | 362 |
| 70.1 | 365 |
| 70.1 | 368 |
| 72.1 | 368 |
| 72.1 | 360 |
| 72.1 | 363 |
| 72.1 | 364 |
| 72.85 | 364 |
| 72.85 | 366 |
| 72.85 | 368 |
| 74.35 | 368 |
| 74.35 | 367 |
| 74.35 | 370 |
| 74.35 | 371 |
| 75.4 | 371 |
| 75.4 | 372 |
| 76.8 | 372 |
| 76.8 | 373 |
| 76.8 | 375 |
| 78 | 375 |
| 78 | 374 |
| 78 | 377 |
| 78 | 376 |
| 79.2 | 376 |
| 79.2 | 378 |
| 79.2 | 380 |
| 81.2 | 380 |
| 81.2 | 378 |
| 81.2 | 379 |
| 81.2 | 381 |
| 81.95 | 381 |
| 81.95 | 382 |
| 81.95 | 384 |
| 81.95 | 386 |
| 83.65 | 386 |
| 83.65 | 387 |
| 83.65 | 386 |
| 84.6 | 386 |
| 84.6 | 394 |

-continued

| Sensor 4 | |
|---|---|
| pressure | resistance |
| 84.6 | 388 |
| 86.6 | 388 |
| 86.6 | 390 |
| 86.6 | 389 |
| 86.6 | 393 |
| 88.1 | 393 |
| 88.1 | 394 |
| 90.2 | 394 |
| 90.2 | 396 |
| 90.2 | 395 |
| 91.6 | 395 |
| 91.6 | 397 |
| 91.6 | 398 |
| 91.6 | 399 |
| 92.7 | 399 |
| 92.7 | 400 |
| 92.7 | 394 |
| 92.7 | 402 |
| 93.5 | 402 |
| 93.5 | 401 |
| 93.5 | 402 |
| 94.45 | 402 |
| 94.45 | 403 |
| 94.45 | 404 |
| 94.45 | 405 |
| 95.8 | 405 |
| 95.8 | 404 |
| 95.8 | 405 |
| 95.8 | 406 |
| 97.15 | 406 |
| 97.15 | 404 |
| 97.15 | 406 |
| 97.15 | 407 |
| 98.25 | 407 |
| 98.25 | 408 |
| 98.25 | 406 |
| 98.6 | 406 |
| 98.6 | 408 |
| 98.6 | 409 |
| 98.6 | 408 |
| 99.05 | 408 |
| 99.05 | 409 |
| 99.05 | 410 |
| 99.6 | 410 |
| 99.6 | 413 |
| 99.6 | 411 |
| 99.85 | 411 |
| 99.85 | 410 |
| 99.85 | 413 |
| 99.85 | 412 |
| 100.05 | 412 |
| 100.05 | 411 |
| 100.05 | 412 |
| 100.2 | 412 |
| 100.2 | 409 |
| 100.2 | 413 |
| 100.2 | 412 |
| 100.2 | 412 |
| 100.35 | 412 |
| 100.35 | 413 |
| 100.3 | 413 |
| 100.2 | 413 |
| 100.2 | 414 |
| 100.2 | 413 |
| 100.1 | 413 |
| 100.1 | 411 |
| 100.1 | 414 |
| 100.1 | 416 |
| 100 | 416 |
| 100 | 415 |
| 100 | 416 |
| 100 | 415 |
| 100.95 | 415 |
| 100.95 | 416 |
| 100.95 | 418 |

-continued

| Sensor 4 | |
|---|---|
| pressure | resistance |
| 101.95 | 418 |
| 101.95 | 417 |
| 101.95 | 416 |
| 102.2 | 416 |
| 102.2 | 417 |
| 102.2 | 415 |
| 100.35 | 415 |
| 100.35 | 414 |
| 100.35 | 413 |
| 100.35 | 414 |
| 97.35 | 414 |
| 97.35 | 413 |
| 97.35 | 412 |
| 97.35 | 410 |
| 93.45 | 410 |
| 93.45 | 409 |
| 93.45 | 407 |
| 93.45 | 404 |
| 88.8 | 404 |
| 88.8 | 403 |
| 88.8 | 402 |
| 88.8 | 400 |
| 83.4 | 400 |
| 83.4 | 397 |
| 83.4 | 396 |
| 83.4 | 393 |
| 78.15 | 393 |
| 78.15 | 392 |
| 78.15 | 390 |
| 73.7 | 390 |
| 73.7 | 387 |
| 73.7 | 386 |
| 73.7 | 384 |
| 69.55 | 384 |
| 69.55 | 382 |
| 69.55 | 381 |
| 69.55 | 380 |
| 66.1 | 380 |
| 66.1 | 381 |
| 66.1 | 382 |
| 66.1 | 377 |
| 63.05 | 377 |
| 63.05 | 376 |
| 61.35 | 376 |
| 61.35 | 375 |
| 61.35 | 371 |
| 59.85 | 371 |
| 59.85 | 369 |
| 59.85 | 366 |
| 59.85 | 364 |
| 57.55 | 364 |
| 57.55 | 366 |
| 57.55 | 364 |
| 57.55 | 363 |
| 55.05 | 363 |
| 55.05 | 360 |
| 55.05 | 358 |
| 55.05 | 355 |
| 52.8 | 355 |
| 52.8 | 352 |
| 52.8 | 351 |
| 52.8 | 352 |
| 50.25 | 352 |
| 50.25 | 347 |
| 50.25 | 343 |
| 47.55 | 343 |
| 47.55 | 344 |
| 47.55 | 342 |
| 47.55 | 341 |
| 45.2 | 341 |
| 45.2 | 340 |
| 45.2 | 337 |
| 45.2 | 339 |
| 43.25 | 339 |
| 43.25 | 336 |

-continued

| Sensor 4 | |
|---|---|
| pressure | resistance |
| 43.25 | 332 |
| 43.25 | 336 |
| 41.45 | 336 |
| 41.45 | 330 |
| 41.45 | 328 |
| 39.9 | 328 |
| 39.9 | 329 |
| 39.9 | 327 |
| 39.9 | 326 |
| 38.7 | 326 |
| 38.7 | 325 |
| 38.7 | 324 |
| 38.7 | 322 |
| 37.6 | 322 |
| 37.6 | 320 |
| 37.6 | 319 |
| 37.6 | 315 |
| 36.15 | 315 |
| 36.15 | 313 |
| 36.15 | 309 |
| 36.15 | 310 |
| 34.1 | 310 |
| 34.1 | 309 |
| 34.1 | 306 |
| 32.2 | 306 |
| 32.2 | 305 |
| 32.2 | 302 |
| 32.2 | 303 |
| 30.6 | 303 |
| 30.6 | 301 |
| 30.6 | 300 |
| 30.6 | 299 |
| 29.3 | 299 |
| 29.3 | 301 |
| 29.3 | 299 |
| 29.3 | 300 |
| 28.35 | 300 |
| 28.35 | 298 |
| 28.35 | 296 |
| 28.35 | 294 |
| 28.35 | 295 |
| 27.6 | 295 |
| 27.6 | 293 |
| 27.6 | 292 |
| 27.6 | 286 |
| 26.6 | 286 |
| 26.6 | 288 |
| 25.35 | 288 |
| 25.35 | 287 |
| 25.35 | 285 |
| 25.35 | 286 |
| 24.35 | 286 |
| 24.35 | 284 |
| 24.35 | 282 |
| 23.8 | 282 |
| 23.8 | 280 |
| 23.8 | 279 |
| 23.8 | 276 |
| 22.85 | 276 |
| 22.85 | 274 |
| 22.85 | 275 |
| 22.85 | 272 |
| 21.5 | 272 |
| 21.5 | 271 |
| 21.5 | 269 |
| 20.2 | 269 |
| 20.2 | 266 |
| 20.2 | 265 |
| 20.2 | 261 |
| 20.2 | 254 |
| 18.95 | 254 |
| 18.95 | 256 |
| 18.95 | 253 |
| 18.95 | 252 |
| 17.5 | 252 |

-continued

| Sensor 4 | |
|---|---|
| pressure | resistance |
| 17.5 | 247 |
| 17.5 | 248 |
| 17.5 | 247 |
| 16.05 | 247 |
| 16.05 | 244 |
| 16.05 | 243 |
| 15.15 | 243 |
| 15.15 | 241 |
| 15.15 | 240 |
| 14.35 | 240 |
| 14.35 | 234 |
| 14.35 | 235 |
| 14.35 | 223 |
| 13.55 | 223 |
| 13.55 | 231 |
| 13.55 | 229 |
| 12.7 | 229 |
| 12.7 | 225 |
| 12.7 | 223 |
| 12.7 | 228 |
| 11.85 | 228 |
| 11.85 | 220 |
| 11.85 | 217 |
| 11.05 | 217 |
| 11.05 | 214 |
| 11.05 | 211 |
| 10.3 | 211 |
| 10.3 | 207 |
| 10.3 | 204 |
| 9.5 | 204 |
| 9.5 | 196 |
| 9.5 | 189 |
| 8.55 | 189 |
| 8.55 | 187 |
| 8.55 | 180 |
| 7.35 | 180 |
| 7.35 | 174 |
| 7.35 | 168 |
| 7.35 | 170 |
| 6.05 | 170 |
| 6.05 | 167 |
| 6.05 | 165 |
| 6.05 | 163 |
| 5.15 | 163 |
| 5.15 | 160 |
| 5.15 | 158 |
| 5.15 | 153 |
| 5.15 | 155 |
| 4.6 | 155 |
| 4.6 | 147 |
| 4.6 | 143 |
| 4.6 | 142 |
| 4.05 | 142 |
| 4.05 | 141 |
| 4.05 | 138 |
| 4.05 | 140 |
| 3.6 | 140 |
| 3.6 | 138 |
| 3.6 | 134 |
| 3.3 | 134 |
| 3.3 | 128 |
| 3.3 | 120 |
| 3.3 | 113 |
| 2.85 | 113 |
| 2.85 | 110 |
| 2.85 | 107 |
| 2.85 | 104 |
| 2.2 | 104 |
| 2.2 | 100 |
| 2.2 | 96 |
| 2.2 | 93 |
| 1.6 | 93 |
| 1.6 | 82 |
| 1.6 | 79 |
| 1.6 | 74 |
| 1.2 | 74 |
| 1.2 | 72 |
| 1.2 | 70 |
| 1.2 | 69 |
| 0.9 | 69 |
| 0.9 | 65 |
| 0.9 | 63 |
| 0.9 | 56 |
| 0.9 | 51 |
| 0.65 | 51 |
| 0.65 | 45 |
| 0.65 | 42 |
| 0.65 | 32 |
| 0.45 | 32 |
| 0.45 | 26 |
| 0.45 | 25 |
| 0.45 | 21 |
| 0.25 | 21 |
| 0.25 | 22 |
| 0.25 | 24 |
| 0.25 | 20 |
| 0.1 | 20 |
| 0.1 | 21 |
| 0.1 | 20 |
| 0.1 | 19 |
| 0.05 | 19 |
| 0.05 | 17 |
| 0.05 | 20 |
| 0.05 | 20 |
| 0.05 | 18 |
| 0.05 | 19 |
| 0.05 | 19 |
| 0.05 | 18 |
| 0.05 | 18 |
| 0.05 | 16 |
| 0.05 | 18 |
| 0.05 | 17 |
| 0.05 | 16 |

| Sensor 5 | |
|---|---|
| pressure | resistance |
| 0.1 | 4 |
| 0.1 | 6 |
| 0.25 | 6 |
| 0.25 | 8 |
| 0.4 | 8 |
| 0.4 | 10 |
| 0.4 | 11 |
| 0.4 | 12 |
| 0.55 | 12 |
| 0.55 | 17 |
| 0.55 | 14 |
| 0.55 | 16 |
| 0.85 | 16 |
| 0.85 | 18 |
| 0.85 | 19 |
| 0.85 | 20 |
| 0.85 | 24 |
| 1.15 | 24 |
| 1.15 | 26 |
| 1.15 | 29 |
| 1.15 | 31 |
| 1.7 | 31 |
| 1.7 | 35 |
| 1.7 | 36 |
| 1.7 | 37 |
| 2.6 | 37 |
| 2.6 | 40 |
| 2.6 | 38 |
| 2.6 | 43 |

-continued

| Sensor 5 | |
|---|---|
| pressure | resistance |
| 3.55 | 43 |
| 3.55 | 46 |
| 3.55 | 48 |
| 4.4 | 48 |
| 4.4 | 52 |
| 4.4 | 53 |
| 4.4 | 54 |
| 5.25 | 54 |
| 5.25 | 59 |
| 5.25 | 58 |
| 5.25 | 59 |
| 6.2 | 59 |
| 6.2 | 62 |
| 6.2 | 64 |
| 6.2 | 65 |
| 7.35 | 65 |
| 7.35 | 67 |
| 7.35 | 71 |
| 7.35 | 73 |
| 8.7 | 73 |
| 8.7 | 72 |
| 8.7 | 75 |
| 8.7 | 78 |
| 8.7 | 81 |
| 10.1 | 81 |
| 10.1 | 83 |
| 10.1 | 86 |
| 10.1 | 85 |
| 11.65 | 85 |
| 11.65 | 87 |
| 11.65 | 91 |
| 11.65 | 89 |
| 13.1 | 89 |
| 13.1 | 90 |
| 13.1 | 91 |
| 13.1 | 92 |
| 13.95 | 92 |
| 13.95 | 94 |
| 13.95 | 95 |
| 13.95 | 96 |
| 14.8 | 96 |
| 14.8 | 92 |
| 14.8 | 103 |
| 16.4 | 103 |
| 16.4 | 106 |
| 16.4 | 110 |
| 18.45 | 110 |
| 18.45 | 111 |
| 18.45 | 112 |
| 20.25 | 112 |
| 20.25 | 116 |
| 20.25 | 117 |
| 20.25 | 118 |
| 21.45 | 118 |
| 21.45 | 117 |
| 21.45 | 119 |
| 21.45 | 120 |
| 22.05 | 120 |
| 22.05 | 123 |
| 22.05 | 121 |
| 22.55 | 121 |
| 22.55 | 124 |
| 22.55 | 127 |
| 23.7 | 127 |
| 23.7 | 126 |
| 23.7 | 128 |
| 23.7 | 126 |
| 24.6 | 126 |
| 24.6 | 124 |
| 24.6 | 129 |
| 24.6 | 131 |
| 25.9 | 131 |
| 25.9 | 132 |
| 25.9 | 135 |
| 25.9 | 133 |

-continued

| Sensor 5 | |
|---|---|
| pressure | resistance |
| 25.9 | 135 |
| 26.4 | 135 |
| 26.4 | 137 |
| 26.4 | 136 |
| 27.7 | 136 |
| 27.7 | 138 |
| 27.7 | 140 |
| 28.6 | 140 |
| 28.6 | 139 |
| 28.6 | 141 |
| 29.5 | 141 |
| 29.5 | 142 |
| 29.5 | 143 |
| 29.5 | 142 |
| 30.4 | 142 |
| 30.4 | 144 |
| 30.4 | 145 |
| 31.1 | 145 |
| 31.1 | 144 |
| 31.1 | 145 |
| 31.1 | 147 |
| 32.15 | 147 |
| 32.15 | 144 |
| 32.15 | 148 |
| 32.65 | 148 |
| 32.65 | 150 |
| 32.65 | 151 |
| 33.95 | 151 |
| 33.95 | 152 |
| 34.55 | 152 |
| 34.55 | 154 |
| 34.55 | 152 |
| 34.55 | 155 |
| 34.55 | 154 |
| 35.2 | 154 |
| 35.2 | 156 |
| 35.2 | 157 |
| 35.7 | 157 |
| 35.7 | 158 |
| 36.55 | 158 |
| 36.55 | 159 |
| 36.55 | 164 |
| 36.55 | 162 |
| 38.05 | 162 |
| 38.05 | 165 |
| 39.3 | 165 |
| 39.3 | 163 |
| 40.65 | 163 |
| 40.65 | 165 |
| 40.65 | 166 |
| 41.75 | 166 |
| 41.75 | 169 |
| 41.75 | 170 |
| 42.65 | 170 |
| 42.65 | 171 |
| 44.2 | 171 |
| 44.2 | 173 |
| 44.2 | 175 |
| 45.25 | 175 |
| 45.25 | 174 |
| 45.25 | 176 |
| 45.95 | 176 |
| 45.95 | 178 |
| 47.35 | 178 |
| 47.35 | 180 |
| 48.2 | 180 |
| 48.2 | 181 |
| 48.2 | 182 |
| 49.7 | 182 |
| 49.7 | 183 |
| 49.7 | 184 |
| 50.75 | 184 |
| 50.75 | 183 |
| 50.75 | 185 |
| 50.75 | 187 |

-continued

| Sensor 5 | |
|---|---|
| pressure | resistance |
| 50.75 | 186 |
| 51.55 | 186 |
| 51.55 | 185 |
| 51.55 | 192 |
| 51.55 | 187 |
| 52.7 | 187 |
| 52.7 | 188 |
| 52.7 | 190 |
| 52.7 | 189 |
| 53.5 | 189 |
| 53.5 | 191 |
| 53.5 | 192 |
| 53.5 | 191 |
| 55.5 | 191 |
| 55.5 | 193 |
| 55.5 | 194 |
| 55.5 | 195 |
| 57.05 | 195 |
| 57.05 | 194 |
| 57.05 | 196 |
| 57.05 | 193 |
| 57.9 | 193 |
| 57.9 | 196 |
| 57.9 | 197 |
| 57.9 | 199 |
| 59.15 | 199 |
| 59.15 | 196 |
| 59.15 | 198 |
| 59.15 | 199 |
| 60.35 | 199 |
| 60.35 | 201 |
| 60.35 | 202 |
| 60.35 | 201 |
| 61.55 | 201 |
| 61.55 | 203 |
| 61.55 | 204 |
| 63.05 | 204 |
| 63.05 | 206 |
| 63.05 | 203 |
| 63.05 | 205 |
| 63.7 | 205 |
| 64.55 | 205 |
| 64.55 | 207 |
| 64.55 | 204 |
| 65.55 | 204 |
| 65.55 | 208 |
| 65.55 | 207 |
| 65.55 | 208 |
| 66.35 | 208 |
| 66.35 | 209 |
| 66.35 | 210 |
| 67.3 | 210 |
| 67.3 | 209 |
| 67.3 | 211 |
| 67.3 | 212 |
| 67.3 | 211 |
| 68.35 | 211 |
| 68.35 | 212 |
| 68.35 | 213 |
| 69.9 | 213 |
| 69.9 | 214 |
| 69.9 | 215 |
| 71.1 | 215 |
| 71.1 | 213 |
| 71.1 | 216 |
| 72.95 | 216 |
| 72.95 | 218 |
| 73.95 | 218 |
| 73.95 | 217 |
| 73.95 | 218 |
| 74.95 | 218 |
| 74.95 | 219 |
| 74.95 | 220 |
| 75.35 | 220 |
| 75.35 | 219 |

-continued

| Sensor 5 | |
|---|---|
| pressure | resistance |
| 75.8 | 219 |
| 75.8 | 221 |
| 75.8 | 223 |
| 75.8 | 221 |
| 75.85 | 221 |
| 75.85 | 220 |
| 75.85 | 222 |
| 75.55 | 222 |
| 75.55 | 220 |
| 75.55 | 221 |
| 75.55 | 222 |
| 75.05 | 222 |
| 75.05 | 223 |
| 75.05 | 221 |
| 75.05 | 223 |
| 75.85 | 223 |
| 75.85 | 225 |
| 75.85 | 224 |
| 77.15 | 224 |
| 77.15 | 225 |
| 77.15 | 227 |
| 79.3 | 227 |
| 80.55 | 227 |
| 80.55 | 229 |
| 82.3 | 229 |
| 82.3 | 228 |
| 82.3 | 230 |
| 82.3 | 229 |
| 83.05 | 229 |
| 83.05 | 230 |
| 83.05 | 233 |
| 83.95 | 233 |
| 83.95 | 230 |
| 83.95 | 229 |
| 83.95 | 231 |
| 84.35 | 231 |
| 84.35 | 232 |
| 84.35 | 231 |
| 84.95 | 231 |
| 84.95 | 232 |
| 84.95 | 231 |
| 85.7 | 231 |
| 85.7 | 227 |
| 85.7 | 233 |
| 85.7 | 234 |
| 86.35 | 234 |
| 86.35 | 236 |
| 86.35 | 235 |
| 87.85 | 235 |
| 87.85 | 234 |
| 87.85 | 235 |
| 87.85 | 236 |
| 89.15 | 236 |
| 89.15 | 237 |
| 89.15 | 240 |
| 89.15 | 237 |
| 90.75 | 237 |
| 90.75 | 238 |
| 90.75 | 237 |
| 92.65 | 237 |
| 92.65 | 239 |
| 92.65 | 240 |
| 92.65 | 239 |
| 93.6 | 239 |
| 93.6 | 241 |
| 93.6 | 238 |
| 93.6 | 242 |
| 95.4 | 242 |
| 95.4 | 240 |
| 95.4 | 242 |
| 95.4 | 241 |
| 96.45 | 241 |
| 96.45 | 243 |
| 96.45 | 242 |
| 97.8 | 242 |

-continued

| Sensor 5 | |
|---|---|
| pressure | resistance |
| 97.8 | 243 |
| 97.8 | 241 |
| 98.65 | 241 |
| 98.65 | 242 |
| 98.65 | 246 |
| 98.65 | 245 |
| 100.5 | 245 |
| 100.5 | 247 |
| 100.5 | 244 |
| 102.15 | 244 |
| 102.15 | 247 |
| 102.15 | 245 |
| 102.15 | 247 |
| 103 | 247 |
| 103 | 245 |
| 103 | 246 |
| 103 | 247 |
| 102.95 | 247 |
| 102.95 | 247 |
| 102.95 | 246 |
| 102.55 | 246 |
| 102.55 | 247 |
| 102.55 | 248 |
| 102.35 | 248 |
| 102.35 | 246 |
| 102.35 | 249 |
| 102.15 | 249 |
| 102.15 | 250 |
| 102.15 | 251 |
| 102.15 | 250 |
| 103.2 | 250 |
| 103.2 | 249 |
| 103.2 | 250 |
| 103.7 | 250 |
| 103.7 | 248 |
| 103.7 | 250 |
| 103.7 | 251 |
| 103.15 | 251 |
| 103.15 | 249 |
| 103.15 | 247 |
| 103.15 | 248 |
| 100.95 | 248 |
| 100.95 | 247 |
| 96.9 | 247 |
| 96.9 | 244 |
| 96.9 | 240 |
| 96.9 | 243 |
| 90.15 | 243 |
| 90.15 | 240 |
| 90.15 | 239 |
| 90.15 | 238 |
| 82.6 | 238 |
| 82.6 | 237 |
| 82.6 | 238 |
| 82.6 | 236 |
| 75.85 | 236 |
| 75.85 | 234 |
| 75.85 | 231 |
| 75.85 | 230 |
| 70.45 | 230 |
| 70.45 | 231 |
| 70.45 | 230 |
| 70.45 | 231 |
| 66.35 | 231 |
| 66.35 | 229 |
| 66.35 | 231 |
| 66.35 | 230 |
| 63.7 | 230 |
| 63.7 | 229 |
| 63.7 | 228 |
| 63.7 | 230 |
| 62.2 | 230 |
| 62.2 | 224 |
| 62.2 | 225 |
| 60.05 | 225 |

-continued

| Sensor 5 | |
|---|---|
| pressure | resistance |
| 60.05 | 224 |
| 60.05 | 221 |
| 60.05 | 220 |
| 56.85 | 220 |
| 56.85 | 219 |
| 56.85 | 218 |
| 56.85 | 216 |
| 53.3 | 216 |
| 53.3 | 214 |
| 49.75 | 214 |
| 49.75 | 212 |
| 49.75 | 211 |
| 49.75 | 209 |
| 46.7 | 209 |
| 46.7 | 207 |
| 46.7 | 206 |
| 46.7 | 208 |
| 44.1 | 208 |
| 44.1 | 207 |
| 44.1 | 205 |
| 42.35 | 205 |
| 42.35 | 204 |
| 42.35 | 203 |
| 42.35 | 202 |
| 41.05 | 202 |
| 41.05 | 201 |
| 41.05 | 200 |
| 41.05 | 198 |
| 39 | 198 |
| 39 | 196 |
| 39 | 195 |
| 39 | 191 |
| 36.55 | 191 |
| 36.55 | 193 |
| 36.55 | 189 |
| 34.05 | 189 |
| 34.05 | 186 |
| 34.05 | 184 |
| 34.05 | 186 |
| 31.65 | 186 |
| 31.65 | 184 |
| 31.65 | 183 |
| 29.85 | 183 |
| 29.85 | 181 |
| 29.85 | 182 |
| 29.85 | 180 |
| 28.4 | 180 |
| 28.4 | 179 |
| 28.4 | 177 |
| 27 | 177 |
| 27 | 176 |
| 25.5 | 176 |
| 25.5 | 175 |
| 25.5 | 172 |
| 25.5 | 173 |
| 24.45 | 173 |
| 24.45 | 169 |
| 24.45 | 171 |
| 23.55 | 171 |
| 23.55 | 168 |
| 23.55 | 167 |
| 22.5 | 167 |
| 22.5 | 165 |
| 22.5 | 164 |
| 22.5 | 163 |
| 21 | 163 |
| 21 | 160 |
| 21 | 158 |
| 19.4 | 158 |
| 19.4 | 155 |
| 19.4 | 152 |
| 17.65 | 152 |
| 17.65 | 149 |
| 17.65 | 148 |
| 16.05 | 148 |

-continued

| Sensor 5 | |
|---|---|
| pressure | resistance |
| 16.05 | 146 |
| 16.05 | 145 |
| 16.05 | 143 |
| 16.05 | 142 |
| 14.7 | 142 |
| 14.7 | 140 |
| 13.55 | 140 |
| 13.55 | 138 |
| 13.55 | 135 |
| 13.55 | 132 |
| 12.35 | 132 |
| 12.35 | 133 |
| 12.35 | 130 |
| 12.35 | 132 |
| 11.35 | 132 |
| 11.35 | 128 |
| 11.35 | 125 |
| 11.35 | 123 |
| 10.25 | 123 |
| 10.25 | 121 |
| 10.25 | 119 |
| 10.25 | 117 |
| 9 | 117 |
| 9 | 114 |
| 9 | 112 |
| 9 | 109 |
| 7.6 | 109 |
| 7.6 | 108 |
| 7.6 | 104 |
| 7.6 | 102 |
| 6.4 | 102 |
| 6.4 | 101 |
| 6.4 | 99 |
| 6.4 | 98 |
| 5.55 | 98 |
| 5.55 | 96 |
| 5.55 | 93 |
| 5.55 | 90 |
| 5.55 | 87 |
| 4.85 | 87 |
| 4.85 | 85 |
| 4.85 | 84 |
| 4.85 | 81 |
| 4.1 | 81 |
| 4.1 | 80 |
| 4.1 | 78 |
| 4.1 | 74 |
| 3.4 | 74 |
| 3.4 | 71 |
| 3.4 | 65 |
| 3.4 | 61 |
| 2.7 | 61 |
| 2.7 | 56 |
| 2.7 | 53 |
| 2.7 | 49 |
| 1.9 | 49 |
| 1.9 | 44 |
| 1.9 | 41 |
| 1.9 | 35 |
| 1.15 | 35 |
| 1.15 | 36 |
| 1.15 | 31 |
| 1.15 | 30 |
| 0.7 | 30 |
| 0.7 | 26 |
| 0.7 | 19 |
| 0.7 | 17 |
| 0.35 | 17 |
| 0.35 | 14 |
| 0.35 | 12 |
| 0.35 | 11 |
| 0.35 | 12 |
| 0.15 | 12 |
| 0.15 | 11 |
| 0.15 | 10 |

-continued

| Sensor 5 | |
|---|---|
| pressure | resistance |
| 0.05 | 10 |
| 0.05 | 9 |
| 0.05 | 10 |
| 0.05 | 10 |
| 0.05 | 9 |
| 0.05 | 10 |
| 0.05 | 10 |
| 0.05 | 9 |
| 0.05 | 10 |
| 0.05 | 10 |
| 0.05 | 9 |
| 0.05 | 9 |
| 0.05 | 11 |
| 0.05 | 9 |
| 0.05 | 7 |

| Sensor 6 | |
|---|---|
| pressure | resistance |
| 0.05 | 8 |
| 0.05 | 9 |
| 0.05 | 12 |
| 0.15 | 12 |
| 0.15 | 11 |
| 0.15 | 16 |
| 0.15 | 14 |
| 0.3 | 14 |
| 0.3 | 16 |
| 0.3 | 17 |
| 0.35 | 17 |
| 0.35 | 15 |
| 0.35 | 18 |
| 0.35 | 20 |
| 0.45 | 20 |
| 0.45 | 21 |
| 0.45 | 26 |
| 0.45 | 25 |
| 0.6 | 25 |
| 0.6 | 26 |
| 0.6 | 29 |
| 0.6 | 33 |
| 0.85 | 33 |
| 0.85 | 32 |
| 0.85 | 34 |
| 0.85 | 35 |
| 0.85 | 37 |
| 1.05 | 37 |
| 1.05 | 41 |
| 1.05 | 46 |
| 1.05 | 51 |
| 1.45 | 51 |
| 1.45 | 53 |
| 1.45 | 57 |
| 2.05 | 57 |
| 2.05 | 58 |
| 2.05 | 60 |
| 2.05 | 61 |
| 2.75 | 61 |
| 2.75 | 63 |
| 2.75 | 67 |
| 3.35 | 67 |
| 3.35 | 68 |
| 3.35 | 70 |
| 3.35 | 72 |
| 3.9 | 72 |
| 3.9 | 77 |
| 3.9 | 79 |
| 4.65 | 79 |
| 4.65 | 82 |
| 4.65 | 87 |
| 4.65 | 85 |

-continued

| Sensor 6 | |
|---|---|
| pressure | resistance |
| 5.45 | 85 |
| 5.45 | 91 |
| 5.45 | 88 |
| 5.45 | 87 |
| 6.25 | 87 |
| 6.25 | 90 |
| 6.25 | 93 |
| 6.25 | 92 |
| 6.85 | 92 |
| 6.85 | 95 |
| 6.85 | 96 |
| 7.4 | 96 |
| 7.4 | 98 |
| 7.4 | 101 |
| 7.95 | 101 |
| 7.95 | 102 |
| 7.95 | 104 |
| 7.95 | 105 |
| 8.7 | 105 |
| 8.7 | 108 |
| 8.7 | 110 |
| 9.5 | 110 |
| 9.5 | 112 |
| 9.5 | 113 |
| 10.4 | 113 |
| 10.4 | 117 |
| 10.4 | 118 |
| 11.25 | 118 |
| 11.25 | 120 |
| 11.25 | 119 |
| 11.25 | 122 |
| 12.05 | 122 |
| 12.05 | 124 |
| 12.05 | 125 |
| 12.05 | 124 |
| 12.05 | 125 |
| 12.65 | 125 |
| 12.65 | 127 |
| 12.65 | 129 |
| 12.65 | 131 |
| 13.35 | 131 |
| 13.35 | 132 |
| 13.35 | 131 |
| 13.35 | 133 |
| 13.95 | 133 |
| 13.95 | 132 |
| 13.95 | 135 |
| 13.95 | 137 |
| 14.75 | 137 |
| 14.75 | 138 |
| 14.75 | 140 |
| 15.45 | 140 |
| 15.45 | 142 |
| 15.45 | 138 |
| 15.45 | 143 |
| 16.3 | 143 |
| 16.3 | 144 |
| 16.3 | 145 |
| 16.3 | 148 |
| 17.35 | 148 |
| 17.35 | 147 |
| 17.35 | 152 |
| 17.35 | 153 |
| 18.55 | 153 |
| 18.55 | 155 |
| 18.55 | 153 |
| 18.55 | 156 |
| 19.7 | 156 |
| 19.7 | 157 |
| 19.7 | 158 |
| 19.7 | 160 |
| 20.9 | 160 |
| 20.9 | 162 |
| 20.9 | 163 |
| 20.9 | 164 |

-continued

| Sensor 6 | |
|---|---|
| pressure | resistance |
| 21.9 | 164 |
| 21.9 | 166 |
| 22.75 | 166 |
| 22.75 | 169 |
| 22.75 | 170 |
| 23.7 | 170 |
| 23.7 | 172 |
| 23.7 | 173 |
| 24.75 | 173 |
| 24.75 | 175 |
| 24.75 | 180 |
| 24.75 | 178 |
| 26.25 | 178 |
| 26.25 | 181 |
| 26.25 | 182 |
| 27.4 | 182 |
| 27.4 | 184 |
| 27.4 | 183 |
| 28.25 | 183 |
| 28.25 | 185 |
| 28.75 | 185 |
| 28.75 | 187 |
| 28.75 | 190 |
| 28.75 | 192 |
| 29.6 | 192 |
| 29.6 | 191 |
| 29.6 | 194 |
| 29.6 | 189 |
| 30.7 | 189 |
| 30.7 | 191 |
| 30.7 | 192 |
| 30.9 | 192 |
| 30.9 | 194 |
| 31.05 | 194 |
| 31.05 | 197 |
| 32.1 | 197 |
| 32.1 | 199 |
| 32.1 | 201 |
| 33.2 | 201 |
| 33.2 | 203 |
| 33.2 | 205 |
| 33.2 | 204 |
| 34.4 | 204 |
| 34.4 | 205 |
| 34.4 | 206 |
| 35.55 | 206 |
| 35.55 | 207 |
| 35.55 | 210 |
| 36.6 | 210 |
| 36.6 | 209 |
| 36.6 | 211 |
| 37.1 | 211 |
| 37.1 | 208 |
| 37.1 | 213 |
| 37.1 | 212 |
| 37.85 | 212 |
| 37.85 | 213 |
| 38.25 | 213 |
| 38.25 | 214 |
| 38.25 | 216 |
| 38.25 | 213 |
| 38.75 | 213 |
| 38.75 | 219 |
| 38.75 | 216 |
| 38.75 | 217 |
| 38.75 | 220 |
| 39.95 | 220 |
| 39.95 | 217 |
| 39.95 | 220 |
| 41 | 220 |
| 41 | 222 |
| 41 | 220 |
| 41 | 223 |
| 42 | 223 |
| 42 | 224 |

-continued

| Sensor 6 | |
|---|---|
| pressure | resistance |
| 42.7 | 224 |
| 42.7 | 226 |
| 42.7 | 227 |
| 43.6 | 227 |
| 43.6 | 226 |
| 43.6 | 231 |
| 44.8 | 231 |
| 44.8 | 229 |
| 44.8 | 233 |
| 44.8 | 229 |
| 45.45 | 229 |
| 45.45 | 231 |
| 45.45 | 234 |
| 45.75 | 234 |
| 45.75 | 235 |
| 45.75 | 234 |
| 45.75 | 235 |
| 46.5 | 235 |
| 46.5 | 236 |
| 46.5 | 238 |
| 47.35 | 238 |
| 47.35 | 241 |
| 47.35 | 239 |
| 47.35 | 240 |
| 48.6 | 240 |
| 48.6 | 241 |
| 48.6 | 242 |
| 49.65 | 242 |
| 49.65 | 244 |
| 49.65 | 242 |
| 50.45 | 242 |
| 50.45 | 243 |
| 50.45 | 246 |
| 50.45 | 244 |
| 51 | 244 |
| 51 | 248 |
| 51 | 246 |
| 51.5 | 246 |
| 51.5 | 247 |
| 51.5 | 248 |
| 52.05 | 248 |
| 52.05 | 249 |
| 52.05 | 251 |
| 52.85 | 251 |
| 52.85 | 252 |
| 53.8 | 252 |
| 53.8 | 254 |
| 53.8 | 255 |
| 53.8 | 256 |
| 55.4 | 256 |
| 55.4 | 258 |
| 55.4 | 255 |
| 56.45 | 255 |
| 56.45 | 259 |
| 56.45 | 258 |
| 56.45 | 260 |
| 57.85 | 260 |
| 57.85 | 262 |
| 57.85 | 261 |
| 57.85 | 260 |
| 58 | 260 |
| 58 | 262 |
| 58 | 263 |
| 58 | 264 |
| 58.95 | 264 |
| 58.95 | 265 |
| 59.8 | 265 |
| 59.8 | 268 |
| 59.8 | 267 |
| 59.8 | 268 |
| 61.25 | 268 |
| 61.25 | 270 |
| 61.25 | 271 |
| 61.25 | 269 |
| 61.7 | 269 |

-continued

| Sensor 6 | |
|---|---|
| pressure | resistance |
| 61.7 | 268 |
| 61.7 | 270 |
| 61.7 | 271 |
| 62.3 | 271 |
| 62.3 | 273 |
| 62.3 | 270 |
| 62.85 | 270 |
| 62.85 | 272 |
| 62.85 | 267 |
| 62.85 | 273 |
| 63.65 | 273 |
| 63.65 | 276 |
| 63.65 | 277 |
| 64.3 | 277 |
| 64.3 | 276 |
| 65.05 | 276 |
| 65.05 | 274 |
| 65.05 | 277 |
| 65.05 | 278 |
| 65.05 | 278 |
| 65.05 | 279 |
| 65.75 | 279 |
| 65.75 | 280 |
| 65.75 | 281 |
| 66.45 | 281 |
| 66.45 | 280 |
| 66.45 | 282 |
| 66.95 | 282 |
| 66.95 | 284 |
| 66.95 | 283 |
| 68 | 283 |
| 68 | 284 |
| 68 | 283 |
| 68 | 284 |
| 68.95 | 284 |
| 68.95 | 286 |
| 68.95 | 285 |
| 68.95 | 288 |
| 70.2 | 288 |
| 70.2 | 286 |
| 70.2 | 289 |
| 71.1 | 289 |
| 71.1 | 288 |
| 71.1 | 289 |
| 72.35 | 289 |
| 72.35 | 290 |
| 72.35 | 292 |
| 73.15 | 292 |
| 73.15 | 293 |
| 73.15 | 292 |
| 73.15 | 293 |
| 73.85 | 293 |
| 73.85 | 291 |
| 73.85 | 293 |
| 74.2 | 293 |
| 74.2 | 295 |
| 74.2 | 293 |
| 75.3 | 293 |
| 75.3 | 296 |
| 75.3 | 297 |
| 75.3 | 296 |
| 75.9 | 296 |
| 75.9 | 297 |
| 75.9 | 298 |
| 75.9 | 297 |
| 77.35 | 297 |
| 77.35 | 300 |
| 77.35 | 296 |
| 78.65 | 296 |
| 78.65 | 300 |
| 78.65 | 302 |
| 80.55 | 302 |
| 80.55 | 303 |
| 80.55 | 305 |
| 80.55 | 303 |

-continued

| Sensor 6 | |
|---|---|
| pressure | resistance |
| 81.2 | 303 |
| 81.2 | 305 |
| 81.2 | 304 |
| 81.2 | 306 |
| 82.45 | 306 |
| 82.45 | 307 |
| 83.05 | 307 |
| 83.05 | 306 |
| 83.05 | 307 |
| 83.05 | 308 |
| 83.7 | 308 |
| 83.7 | 307 |
| 83.7 | 306 |
| 83.7 | 308 |
| 83.75 | 308 |
| 83.75 | 311 |
| 83.75 | 309 |
| 83.75 | 311 |
| 83.8 | 311 |
| 83.8 | 309 |
| 83.65 | 309 |
| 83.65 | 310 |
| 83.65 | 311 |
| 83.65 | 314 |
| 84.4 | 314 |
| 84.4 | 312 |
| 85.35 | 312 |
| 85.35 | 314 |
| 85.35 | 316 |
| 87.2 | 316 |
| 87.2 | 314 |
| 87.2 | 317 |
| 88.25 | 317 |
| 88.25 | 316 |
| 88.25 | 318 |
| 88.25 | 317 |
| 89.7 | 317 |
| 89.7 | 318 |
| 89.7 | 319 |
| 89.7 | 318 |
| 90.55 | 318 |
| 90.55 | 317 |
| 90.55 | 318 |
| 90.55 | 320 |
| 91.95 | 320 |
| 91.95 | 321 |
| 91.95 | 320 |
| 92.55 | 320 |
| 92.55 | 319 |
| 92.55 | 322 |
| 92.55 | 323 |
| 93.8 | 323 |
| 95 | 323 |
| 95 | 325 |
| 95 | 323 |
| 95 | 326 |
| 96.65 | 326 |
| 96.65 | 327 |
| 96.65 | 328 |
| 97.65 | 328 |
| 97.65 | 325 |
| 97.65 | 327 |
| 97.65 | 329 |
| 99 | 329 |
| 99 | 331 |
| 99 | 326 |
| 99 | 330 |
| 99.95 | 330 |
| 100.95 | 330 |
| 100.95 | 329 |
| 100.95 | 328 |
| 100.95 | 332 |
| 101.3 | 332 |
| 101.3 | 331 |
| 101.7 | 331 |

-continued

| Sensor 6 | |
|---|---|
| pressure | resistance |
| 101.7 | 332 |
| 101.7 | 332 |
| 101.7 | 332 |
| 101.7 | 333 |
| 101.3 | 333 |
| 101.3 | 332 |
| 101.3 | 333 |
| 101.3 | 334 |
| 101 | 334 |
| 101 | 333 |
| 101 | 332 |
| 101 | 333 |
| 100.9 | 333 |
| 100.9 | 334 |
| 101 | 334 |
| 101 | 331 |
| 101 | 331 |
| 101 | 336 |
| 101 | 334 |
| 101 | 335 |
| 101.85 | 335 |
| 101.85 | 334 |
| 101.85 | 336 |
| 102.15 | 336 |
| 102.15 | 334 |
| 102.15 | 335 |
| 102.15 | 332 |
| 99.5 | 332 |
| 99.5 | 331 |
| 99.5 | 329 |
| 99.5 | 327 |
| 94 | 327 |
| 94 | 323 |
| 94 | 321 |
| 86.6 | 321 |
| 86.6 | 315 |
| 86.6 | 317 |
| 79.85 | 317 |
| 79.85 | 318 |
| 79.85 | 312 |
| 79.85 | 311 |
| 74.05 | 311 |
| 74.05 | 307 |
| 74.05 | 305 |
| 74.05 | 303 |
| 68.7 | 303 |
| 68.7 | 305 |
| 68.7 | 303 |
| 64.55 | 303 |
| 64.55 | 301 |
| 64.55 | 303 |
| 64.55 | 302 |
| 62.05 | 302 |
| 62.05 | 300 |
| 62.05 | 295 |
| 62.05 | 296 |
| 60.25 | 296 |
| 60.25 | 293 |
| 60.25 | 292 |
| 60.25 | 290 |
| 57.9 | 290 |
| 57.9 | 289 |
| 57.9 | 283 |
| 57.9 | 285 |
| 54.6 | 285 |
| 54.6 | 282 |
| 54.6 | 280 |
| 51.1 | 280 |
| 51.1 | 276 |
| 51.1 | 275 |
| 51.1 | 274 |
| 47.95 | 274 |
| 47.95 | 272 |
| 45.55 | 272 |
| 45.55 | 267 |

-continued

| Sensor 6 | |
| --- | --- |
| pressure | resistance |
| 45.55 | 265 |
| 45.55 | 263 |
| 43.05 | 263 |
| 43.05 | 259 |
| 43.05 | 257 |
| 43.05 | 258 |
| 40.5 | 258 |
| 40.5 | 256 |
| 40.5 | 255 |
| 40.5 | 254 |
| 38.3 | 254 |
| 38.3 | 253 |
| 38.3 | 251 |
| 36.75 | 251 |
| 36.75 | 250 |
| 36.75 | 247 |
| 36.75 | 248 |
| 35.35 | 248 |
| 35.35 | 247 |
| 35.35 | 245 |
| 35.35 | 246 |
| 33.95 | 246 |
| 33.95 | 245 |
| 33.95 | 240 |
| 33.95 | 241 |
| 32.5 | 241 |
| 32.5 | 237 |
| 32.5 | 235 |
| 32.5 | 232 |
| 30.55 | 232 |
| 30.55 | 233 |
| 30.55 | 230 |
| 30.55 | 231 |
| 28.3 | 231 |
| 28.3 | 226 |
| 28.3 | 223 |
| 28.3 | 222 |
| 28.3 | 223 |
| 26.2 | 223 |
| 26.2 | 222 |
| 26.2 | 220 |
| 26.2 | 221 |
| 24.75 | 221 |
| 24.75 | 218 |
| 24.75 | 216 |
| 23.7 | 216 |
| 23.7 | 213 |
| 23.7 | 214 |
| 22.7 | 214 |
| 22.7 | 213 |
| 22.7 | 211 |
| 22.7 | 210 |
| 21.6 | 210 |
| 21.6 | 207 |
| 21.6 | 206 |
| 20.4 | 206 |
| 20.4 | 203 |
| 20.4 | 202 |
| 20.4 | 200 |
| 19.1 | 200 |
| 19.1 | 198 |
| 19.1 | 197 |
| 17.8 | 197 |
| 17.8 | 195 |
| 17.8 | 193 |
| 17.8 | 192 |
| 17.8 | 191 |
| 16.7 | 191 |
| 16.7 | 189 |
| 16.7 | 187 |
| 16.7 | 183 |
| 15.55 | 183 |
| 15.55 | 181 |
| 15.55 | 178 |
| 15.55 | 177 |

-continued

| Sensor 6 | |
| --- | --- |
| pressure | resistance |
| 14.15 | 177 |
| 14.15 | 175 |
| 14.15 | 174 |
| 12.85 | 174 |
| 12.85 | 172 |
| 12.85 | 171 |
| 12.85 | 168 |
| 11.85 | 168 |
| 11.85 | 165 |
| 11.85 | 164 |
| 11.85 | 161 |
| 10.95 | 161 |
| 10.95 | 155 |
| 10.95 | 156 |
| 10.95 | 152 |
| 9.7 | 152 |
| 9.7 | 158 |
| 9.7 | 152 |
| 9.7 | 150 |
| 8.85 | 150 |
| 8.85 | 147 |
| 8.85 | 145 |
| 8.85 | 141 |
| 7.9 | 141 |
| 7.9 | 137 |
| 7.9 | 134 |
| 7.9 | 130 |
| 7.9 | 128 |
| 6.75 | 128 |
| 6.75 | 126 |
| 6.75 | 121 |
| 6.75 | 119 |
| 5.55 | 119 |
| 5.55 | 114 |
| 5.55 | 111 |
| 5.55 | 105 |
| 4.55 | 105 |
| 4.55 | 103 |
| 4.55 | 100 |
| 4.55 | 98 |
| 3.6 | 98 |
| 3.6 | 93 |
| 3.6 | 91 |
| 3.6 | 86 |
| 2.8 | 86 |
| 2.8 | 85 |
| 2.8 | 82 |
| 2.8 | 77 |
| 2.25 | 77 |
| 2.25 | 70 |
| 2.25 | 64 |
| 2.25 | 56 |
| 1.55 | 56 |
| 1.55 | 52 |
| 1.55 | 44 |
| 1.55 | 46 |
| 0.95 | 46 |
| 0.95 | 42 |
| 0.95 | 39 |
| 0.95 | 34 |
| 0.95 | 29 |
| 0.55 | 29 |
| 0.55 | 22 |
| 0.55 | 17 |
| 0.55 | 11 |
| 0.3 | 11 |
| 0.3 | 12 |
| 0.15 | 12 |
| 0.15 | 10 |
| 0.05 | 10 |
| 0.05 | 9 |
| 0.05 | 9 |
| 0.05 | 12 |
| 0.05 | 9 |
| 0.05 | 10 |

-continued

| Sensor 6 | |
|---|---|
| pressure | resistance |
| 0.05 | 11 |
| 0.05 | 8 |
| 0.05 | 7 |
| 0.05 | 9 |

| Sensor 7 | |
|---|---|
| pressure | resistance |
| 0.15 | 17 |
| 0.15 | 20 |
| 0.15 | 21 |
| 0.3 | 21 |
| 0.3 | 24 |
| 0.3 | 29 |
| 0.45 | 29 |
| 0.45 | 31 |
| 0.45 | 33 |
| 0.45 | 34 |
| 0.65 | 34 |
| 0.65 | 37 |
| 0.65 | 39 |
| 0.65 | 41 |
| 0.85 | 41 |
| 0.85 | 39 |
| 0.85 | 40 |
| 0.85 | 48 |
| 1.05 | 48 |
| 1.05 | 53 |
| 1.05 | 55 |
| 1.05 | 62 |
| 1.55 | 62 |
| 1.55 | 63 |
| 1.55 | 64 |
| 1.55 | 68 |
| 2.25 | 68 |
| 2.25 | 69 |
| 2.25 | 73 |
| 3 | 73 |
| 3 | 76 |
| 3.5 | 76 |
| 3.5 | 79 |
| 3.5 | 80 |
| 3.5 | 84 |
| 4 | 84 |
| 4 | 85 |
| 4 | 84 |
| 4 | 85 |
| 4 | 90 |
| 4.6 | 90 |
| 4.6 | 91 |
| 4.6 | 94 |
| 4.6 | 95 |
| 5.35 | 95 |
| 5.35 | 98 |
| 5.35 | 100 |
| 5.35 | 101 |
| 6.3 | 101 |
| 6.3 | 102 |
| 6.3 | 105 |
| 6.3 | 104 |
| 7.25 | 104 |
| 7.25 | 107 |
| 7.25 | 110 |
| 7.25 | 112 |
| 8.3 | 112 |
| 8.3 | 114 |
| 8.3 | 115 |
| 8.3 | 118 |
| 9.45 | 118 |
| 9.45 | 121 |
| 9.45 | 123 |

-continued

| Sensor 7 | |
|---|---|
| pressure | resistance |
| 10.6 | 123 |
| 10.6 | 125 |
| 10.6 | 128 |
| 10.6 | 129 |
| 11.6 | 129 |
| 11.6 | 132 |
| 11.6 | 134 |
| 11.6 | 135 |
| 12.65 | 135 |
| 12.65 | 136 |
| 12.65 | 139 |
| 12.65 | 142 |
| 13.7 | 142 |
| 13.7 | 144 |
| 13.7 | 148 |
| 13.7 | 141 |
| 14.5 | 141 |
| 14.5 | 144 |
| 14.5 | 147 |
| 14.5 | 149 |
| 15.4 | 149 |
| 15.4 | 151 |
| 15.4 | 154 |
| 15.4 | 155 |
| 16.75 | 155 |
| 16.75 | 157 |
| 16.75 | 158 |
| 18.55 | 158 |
| 18.55 | 157 |
| 18.55 | 168 |
| 18.55 | 164 |
| 20.35 | 164 |
| 20.35 | 166 |
| 20.35 | 168 |
| 20.35 | 170 |
| 22.1 | 170 |
| 22.1 | 171 |
| 22.1 | 172 |
| 22.1 | 174 |
| 23.35 | 174 |
| 23.35 | 173 |
| 23.35 | 178 |
| 23.35 | 177 |
| 24.4 | 177 |
| 24.4 | 178 |
| 24.4 | 179 |
| 24.4 | 180 |
| 25.25 | 180 |
| 25.25 | 182 |
| 25.25 | 183 |
| 26.1 | 183 |
| 26.1 | 186 |
| 26.1 | 185 |
| 26.1 | 187 |
| 27.05 | 187 |
| 27.05 | 188 |
| 27.5 | 188 |
| 27.5 | 190 |
| 27.8 | 190 |
| 27.8 | 192 |
| 27.8 | 194 |
| 27.8 | 195 |
| 27.8 | 192 |
| 28.5 | 192 |
| 28.5 | 196 |
| 28.5 | 197 |
| 29.65 | 197 |
| 29.65 | 199 |
| 29.65 | 198 |
| 29.65 | 200 |
| 31.25 | 200 |
| 31.25 | 203 |
| 31.25 | 204 |
| 33 | 204 |
| 33 | 206 |

-continued

| Sensor 7 | |
|---|---|
| pressure | resistance |
| 33 | 207 |
| 33 | 208 |
| 34.35 | 208 |
| 34.35 | 209 |
| 34.35 | 210 |
| 34.35 | 209 |
| 35.2 | 209 |
| 35.2 | 205 |
| 35.2 | 212 |
| 35.2 | 211 |
| 35.55 | 211 |
| 35.55 | 216 |
| 35.55 | 212 |
| 35.55 | 214 |
| 36.2 | 214 |
| 36.2 | 213 |
| 36.35 | 213 |
| 36.35 | 214 |
| 36.35 | 217 |
| 36.35 | 215 |
| 36.55 | 215 |
| 36.55 | 217 |
| 36.55 | 218 |
| 36.85 | 218 |
| 36.85 | 217 |
| 36.85 | 219 |
| 37.95 | 219 |
| 37.95 | 225 |
| 37.95 | 219 |
| 38.5 | 219 |
| 38.5 | 222 |
| 38.5 | 225 |
| 39.9 | 225 |
| 39.9 | 222 |
| 39.9 | 224 |
| 39.9 | 223 |
| 40.6 | 223 |
| 40.6 | 226 |
| 40.6 | 227 |
| 40.6 | 230 |
| 41.4 | 230 |
| 41.4 | 231 |
| 41.4 | 226 |
| 41.4 | 234 |
| 42.05 | 234 |
| 42.05 | 231 |
| 42.05 | 232 |
| 43 | 232 |
| 43 | 233 |
| 43 | 234 |
| 44.5 | 234 |
| 44.5 | 237 |
| 44.5 | 234 |
| 44.5 | 239 |
| 45.2 | 239 |
| 45.2 | 237 |
| 45.2 | 240 |
| 46.2 | 240 |
| 46.2 | 239 |
| 46.2 | 240 |
| 46.2 | 241 |
| 46.8 | 241 |
| 46.8 | 243 |
| 46.8 | 246 |
| 48 | 246 |
| 48 | 243 |
| 48 | 241 |
| 48 | 244 |
| 48.7 | 244 |
| 48.7 | 246 |
| 49.5 | 246 |
| 49.5 | 249 |
| 49.5 | 246 |
| 49.5 | 250 |
| 50.2 | 250 |

-continued

| Sensor 7 | |
|---|---|
| pressure | resistance |
| 50.2 | 252 |
| 50.2 | 251 |
| 50.2 | 250 |
| 51.45 | 250 |
| 51.45 | 252 |
| 51.45 | 253 |
| 51.45 | 251 |
| 52.25 | 251 |
| 52.25 | 253 |
| 52.25 | 256 |
| 53.25 | 256 |
| 53.25 | 257 |
| 53.25 | 256 |
| 53.25 | 257 |
| 54.25 | 257 |
| 54.25 | 258 |
| 54.25 | 263 |
| 55.95 | 263 |
| 55.95 | 262 |
| 55.95 | 258 |
| 57 | 258 |
| 57 | 263 |
| 57 | 264 |
| 58.1 | 264 |
| 58.1 | 266 |
| 58.35 | 266 |
| 58.35 | 268 |
| 58.8 | 268 |
| 58.8 | 269 |
| 58.8 | 270 |
| 58.8 | 267 |
| 59.6 | 267 |
| 59.6 | 272 |
| 60.8 | 272 |
| 60.8 | 275 |
| 60.8 | 274 |
| 62.1 | 274 |
| 62.1 | 275 |
| 62.1 | 276 |
| 62.1 | 274 |
| 62.95 | 274 |
| 62.95 | 277 |
| 62.95 | 279 |
| 62.95 | 277 |
| 64.2 | 277 |
| 64.2 | 280 |
| 64.2 | 279 |
| 64.2 | 281 |
| 64.95 | 281 |
| 64.95 | 282 |
| 64.95 | 283 |
| 64.95 | 285 |
| 65.8 | 285 |
| 65.8 | 283 |
| 65.8 | 285 |
| 66.65 | 285 |
| 66.65 | 287 |
| 66.65 | 284 |
| 66.65 | 286 |
| 67.85 | 286 |
| 67.85 | 287 |
| 67.85 | 289 |
| 69.15 | 289 |
| 69.15 | 291 |
| 69.15 | 290 |
| 70.25 | 290 |
| 70.25 | 288 |
| 70.25 | 291 |
| 70.25 | 290 |
| 71.7 | 290 |
| 71.7 | 293 |
| 71.7 | 292 |
| 71.7 | 293 |
| 72.4 | 293 |
| 72.4 | 294 |

-continued

| Sensor 7 | |
|---|---|
| pressure | resistance |
| 72.4 | 292 |
| 72.4 | 295 |
| 73.5 | 295 |
| 73.5 | 296 |
| 73.5 | 293 |
| 73.5 | 296 |
| 74.1 | 296 |
| 74.1 | 297 |
| 74.1 | 299 |
| 74.1 | 298 |
| 75.3 | 298 |
| 75.3 | 300 |
| 75.95 | 300 |
| 75.95 | 301 |
| 75.95 | 302 |
| 75.95 | 301 |
| 77.5 | 301 |
| 77.5 | 302 |
| 77.5 | 303 |
| 78.75 | 303 |
| 78.75 | 301 |
| 78.75 | 307 |
| 79.95 | 307 |
| 79.95 | 306 |
| 79.95 | 308 |
| 81.55 | 308 |
| 82.55 | 308 |
| 82.55 | 309 |
| 82.55 | 310 |
| 83.45 | 310 |
| 83.45 | 311 |
| 83.45 | 312 |
| 84.5 | 312 |
| 84.5 | 317 |
| 84.5 | 312 |
| 84.5 | 311 |
| 84.65 | 311 |
| 84.65 | 310 |
| 84.65 | 314 |
| 84.65 | 315 |
| 86.35 | 315 |
| 86.35 | 313 |
| 86.35 | 316 |
| 86.35 | 317 |
| 87.4 | 317 |
| 87.4 | 319 |
| 89.55 | 319 |
| 89.55 | 315 |
| 89.55 | 319 |
| 89.55 | 321 |
| 91.2 | 321 |
| 91.2 | 322 |
| 92.9 | 322 |
| 92.9 | 324 |
| 94.7 | 324 |
| 94.7 | 328 |
| 94.7 | 327 |
| 96 | 327 |
| 96 | 326 |
| 96 | 327 |
| 96 | 328 |
| 97.85 | 328 |
| 97.85 | 330 |
| 98.85 | 330 |
| 98.85 | 329 |
| 98.85 | 331 |
| 98.85 | 330 |
| 100.25 | 330 |
| 100.25 | 331 |
| 100.25 | 332 |
| 101.25 | 332 |
| 101.25 | 331 |
| 101.95 | 331 |
| 101.95 | 331 |
| 101.95 | 332 |

-continued

| Sensor 7 | |
|---|---|
| pressure | resistance |
| 101.95 | 333 |
| 101.85 | 333 |
| 101.85 | 334 |
| 101.85 | 332 |
| 101.85 | 335 |
| 101.55 | 335 |
| 101.55 | 334 |
| 101.55 | 333 |
| 101.7 | 333 |
| 101.7 | 335 |
| 101.7 | 333 |
| 102.4 | 333 |
| 102.4 | 335 |
| 102.4 | 334 |
| 102.6 | 334 |
| 102.6 | 335 |
| 101.05 | 335 |
| 101.05 | 334 |
| 101.05 | 333 |
| 98.35 | 333 |
| 98.35 | 331 |
| 94.3 | 331 |
| 94.3 | 329 |
| 94.3 | 328 |
| 94.3 | 327 |
| 89.65 | 327 |
| 89.65 | 326 |
| 89.65 | 324 |
| 89.65 | 323 |
| 84.6 | 323 |
| 84.6 | 320 |
| 84.6 | 323 |
| 84.6 | 320 |
| 79.65 | 320 |
| 79.65 | 318 |
| 75.05 | 318 |
| 75.05 | 310 |
| 75.05 | 309 |
| 70.3 | 309 |
| 70.3 | 306 |
| 70.3 | 305 |
| 65.85 | 305 |
| 65.85 | 306 |
| 65.85 | 304 |
| 65.85 | 305 |
| 62.65 | 305 |
| 62.65 | 302 |
| 62.65 | 304 |
| 62.65 | 303 |
| 61.2 | 303 |
| 61.2 | 302 |
| 61.2 | 298 |
| 61.2 | 301 |
| 59.65 | 301 |
| 59.65 | 299 |
| 59.65 | 297 |
| 59.65 | 294 |
| 57.85 | 294 |
| 57.85 | 293 |
| 57.85 | 291 |
| 55.4 | 291 |
| 55.4 | 289 |
| 52.8 | 289 |
| 52.8 | 285 |
| 52.8 | 284 |
| 52.8 | 282 |
| 50.35 | 282 |
| 50.35 | 280 |
| 50.35 | 279 |
| 48.2 | 279 |
| 48.2 | 280 |
| 48.2 | 276 |
| 46.5 | 276 |
| 46.5 | 275 |
| 46.5 | 274 |

-continued

| Sensor 7 | |
|---|---|
| pressure | resistance |
| 46.5 | 272 |
| 45.15 | 272 |
| 45.15 | 269 |
| 45.15 | 268 |
| 45.15 | 269 |
| 43.25 | 269 |
| 43.25 | 266 |
| 43.25 | 263 |
| 41.2 | 263 |
| 41.2 | 265 |
| 41.2 | 260 |
| 41.2 | 261 |
| 39.5 | 261 |
| 39.5 | 260 |
| 39.5 | 263 |
| 38.4 | 263 |
| 38.4 | 259 |
| 37.5 | 259 |
| 37.5 | 257 |
| 37.5 | 258 |
| 37.5 | 256 |
| 36.7 | 256 |
| 36.7 | 254 |
| 36.7 | 250 |
| 36.7 | 251 |
| 35.7 | 251 |
| 35.7 | 252 |
| 35.7 | 250 |
| 34.4 | 250 |
| 34.4 | 248 |
| 34.4 | 247 |
| 34.4 | 244 |
| 32.8 | 244 |
| 32.8 | 242 |
| 32.8 | 240 |
| 31.15 | 240 |
| 31.15 | 238 |
| 31.15 | 237 |
| 31.15 | 236 |
| 29.55 | 236 |
| 29.55 | 233 |
| 29.55 | 234 |
| 28.25 | 234 |
| 28.25 | 229 |
| 28.25 | 233 |
| 27.15 | 233 |
| 27.15 | 228 |
| 27.15 | 227 |
| 26.1 | 227 |
| 26.1 | 228 |
| 26.1 | 226 |
| 25.1 | 226 |
| 25.1 | 225 |
| 25.1 | 224 |
| 25.1 | 222 |
| 24 | 222 |
| 24 | 220 |
| 24 | 217 |
| 24 | 220 |
| 24 | 219 |
| 23.1 | 219 |
| 23.1 | 215 |
| 23.1 | 220 |
| 23.1 | 217 |
| 22.2 | 217 |
| 22.2 | 216 |
| 22.2 | 215 |
| 21.35 | 215 |
| 21.35 | 213 |
| 21.35 | 214 |
| 21.35 | 212 |
| 20.5 | 212 |
| 20.5 | 210 |
| 20.5 | 209 |
| 20.5 | 212 |

-continued

| Sensor 7 | |
|---|---|
| pressure | resistance |
| 19.7 | 212 |
| 19.7 | 211 |
| 19.7 | 209 |
| 19.7 | 208 |
| 19.15 | 208 |
| 19.15 | 209 |
| 19.15 | 206 |
| 18.6 | 206 |
| 18.6 | 204 |
| 18.6 | 203 |
| 18.6 | 204 |
| 17.8 | 204 |
| 17.8 | 201 |
| 17.8 | 199 |
| 17.8 | 197 |
| 17.8 | 198 |
| 16.85 | 198 |
| 16.85 | 196 |
| 16.85 | 195 |
| 16.85 | 198 |
| 16 | 198 |
| 16 | 194 |
| 16 | 196 |
| 15.5 | 196 |
| 15.5 | 195 |
| 15.5 | 194 |
| 15.5 | 195 |
| 15.3 | 195 |
| 15.3 | 194 |
| 15.15 | 194 |
| 15.15 | 192 |
| 15 | 192 |
| 15 | 194 |
| 15 | 193 |
| 15 | 191 |
| 14.75 | 191 |
| 14.75 | 190 |
| 14.75 | 187 |
| 14.35 | 187 |
| 14.35 | 188 |
| 14.35 | 189 |
| 14.35 | 185 |
| 13.75 | 185 |
| 13.75 | 186 |
| 13.25 | 186 |
| 13.25 | 185 |
| 13.25 | 182 |
| 13.25 | 186 |
| 13.05 | 186 |
| 13.05 | 187 |
| 13.05 | 185 |
| 13.05 | 186 |
| 12.9 | 186 |
| 12.9 | 184 |
| 12.9 | 183 |
| 12.9 | 181 |
| 12.75 | 181 |
| 12.75 | 177 |
| 12.75 | 175 |
| 12.75 | 178 |
| 12.1 | 178 |
| 12.1 | 175 |
| 12.1 | 172 |
| 12.1 | 165 |
| 11.1 | 165 |
| 11.1 | 168 |
| 11.1 | 165 |
| 11.1 | 163 |
| 9.85 | 163 |
| 9.85 | 161 |
| 9.85 | 156 |
| 9.85 | 155 |
| 8.7 | 155 |
| 8.7 | 160 |
| 8.7 | 152 |

-continued

| Sensor 7 | |
|---|---|
| pressure | resistance |
| 8.7 | 150 |
| 7.85 | 150 |
| 7.85 | 148 |
| 7.85 | 147 |
| 7.85 | 145 |
| 7.1 | 145 |
| 7.1 | 141 |
| 7.1 | 139 |
| 6.35 | 139 |
| 6.35 | 137 |
| 6.35 | 133 |
| 6.35 | 129 |
| 5.6 | 129 |
| 5.6 | 126 |
| 5.6 | 122 |
| 5.6 | 119 |
| 4.75 | 119 |
| 4.75 | 110 |
| 4.75 | 112 |
| 4.75 | 108 |
| 3.75 | 108 |
| 3.75 | 107 |
| 3.75 | 102 |
| 3.05 | 102 |
| 3.05 | 98 |
| 3.05 | 97 |
| 3.05 | 90 |
| 2.5 | 90 |
| 2.5 | 87 |
| 2.5 | 89 |
| 2.5 | 80 |
| 2.5 | 76 |
| 1.95 | 76 |
| 1.95 | 73 |
| 1.95 | 66 |
| 1.95 | 65 |
| 1.35 | 65 |
| 1.35 | 61 |
| 1.35 | 60 |
| 1.35 | 62 |
| 1 | 62 |
| 1 | 54 |
| 1 | 55 |
| 1 | 50 |
| 0.75 | 50 |
| 0.75 | 46 |
| 0.75 | 45 |
| 0.75 | 30 |
| 0.55 | 30 |
| 0.55 | 23 |
| 0.55 | 20 |
| 0.55 | 16 |
| 0.3 | 16 |
| 0.3 | 13 |
| 0.3 | 14 |
| 0.3 | 13 |
| 0.3 | 11 |
| 0.15 | 11 |
| 0.15 | 10 |
| 0.15 | 9 |
| 0.05 | 9 |
| 0.05 | 10 |
| 0.05 | 10 |
| 0.05 | 9 |
| 0.05 | 7 |
| 0.05 | 9 |
| 0.05 | 9 |
| 0.05 | 3 |
| 0.05 | 8 |
| 0.05 | 7 |
| 0.05 | 7 |
| 0.05 | 9 |
| 0.05 | 7 |
| 0.05 | 6 |
| 0.05 | 6 |

-continued

| Sensor 7 | |
|---|---|
| pressure | resistance |
| 0.05 | 10 |
| 0.05 | 8 |
| 0.05 | 10 |

| Sensor 8 | |
|---|---|
| pressure | resistance |
| 0.15 | 17 |
| 0.15 | 20 |
| 0.15 | 17 |
| 0.15 | 27 |
| 0.35 | 27 |
| 0.35 | 28 |
| 0.35 | 29 |
| 0.35 | 33 |
| 0.55 | 33 |
| 0.55 | 36 |
| 0.55 | 39 |
| 0.55 | 44 |
| 0.8 | 44 |
| 0.8 | 45 |
| 0.8 | 49 |
| 0.8 | 55 |
| 1.25 | 55 |
| 1.25 | 58 |
| 1.25 | 61 |
| 1.25 | 63 |
| 1.8 | 63 |
| 1.8 | 66 |
| 1.8 | 71 |
| 1.8 | 75 |
| 2.55 | 75 |
| 2.55 | 83 |
| 2.55 | 85 |
| 2.55 | 88 |
| 3.55 | 88 |
| 3.55 | 89 |
| 3.55 | 90 |
| 3.55 | 93 |
| 3.55 | 97 |
| 4.55 | 97 |
| 4.55 | 102 |
| 4.55 | 108 |
| 4.55 | 109 |
| 5.7 | 109 |
| 5.7 | 112 |
| 5.7 | 118 |
| 5.7 | 120 |
| 7.1 | 120 |
| 7.1 | 124 |
| 7.1 | 129 |
| 8.6 | 129 |
| 8.6 | 132 |
| 8.6 | 134 |
| 8.6 | 135 |
| 9.95 | 135 |
| 9.95 | 137 |
| 9.95 | 141 |
| 11.1 | 141 |
| 11.1 | 144 |
| 11.1 | 145 |
| 12.05 | 145 |
| 12.05 | 148 |
| 12.05 | 149 |
| 12.05 | 152 |
| 13.05 | 152 |
| 13.05 | 155 |
| 13.05 | 156 |
| 13.95 | 156 |
| 13.95 | 158 |
| 13.95 | 161 |

-continued

| Sensor 8 | |
|---|---|
| pressure | resistance |
| 13.95 | 163 |
| 15.1 | 163 |
| 15.1 | 161 |
| 15.1 | 162 |
| 15.1 | 167 |
| 16.05 | 167 |
| 16.05 | 169 |
| 16.05 | 170 |
| 16.05 | 172 |
| 17.3 | 172 |
| 17.3 | 171 |
| 17.3 | 174 |
| 17.3 | 176 |
| 18.4 | 176 |
| 18.4 | 179 |
| 18.4 | 176 |
| 18.4 | 182 |
| 19.7 | 182 |
| 19.7 | 184 |
| 19.7 | 187 |
| 21.05 | 187 |
| 21.05 | 190 |
| 21.05 | 189 |
| 22.7 | 189 |
| 22.7 | 195 |
| 22.7 | 198 |
| 22.7 | 196 |
| 22.7 | 197 |
| 24.2 | 197 |
| 24.2 | 198 |
| 24.2 | 205 |
| 24.2 | 202 |
| 25.3 | 202 |
| 25.3 | 200 |
| 25.3 | 204 |
| 26.05 | 204 |
| 26.05 | 207 |
| 26.05 | 205 |
| 26.85 | 205 |
| 26.85 | 206 |
| 26.85 | 208 |
| 27.45 | 208 |
| 27.45 | 207 |
| 27.45 | 213 |
| 27.45 | 210 |
| 28.05 | 210 |
| 28.05 | 211 |
| 28.05 | 214 |
| 28.45 | 214 |
| 28.45 | 212 |
| 28.45 | 214 |
| 28.45 | 216 |
| 28.45 | 214 |
| 29.4 | 214 |
| 29.4 | 217 |
| 30 | 217 |
| 30 | 218 |
| 30 | 217 |
| 30 | 220 |
| 30.55 | 220 |
| 30.55 | 218 |
| 30.55 | 220 |
| 30.55 | 222 |
| 31 | 222 |
| 31 | 223 |
| 31 | 225 |
| 32.05 | 225 |
| 32.05 | 224 |
| 32.05 | 226 |
| 32.95 | 226 |
| 32.95 | 225 |
| 32.95 | 227 |
| 32.95 | 231 |
| 34 | 231 |
| 34 | 229 |

-continued

| Sensor 8 | |
|---|---|
| pressure | resistance |
| 34 | 230 |
| 35.15 | 230 |
| 35.15 | 232 |
| 35.15 | 233 |
| 35.15 | 235 |
| 35.15 | 236 |
| 36.5 | 236 |
| 36.5 | 235 |
| 36.5 | 236 |
| 36.5 | 237 |
| 37.5 | 237 |
| 37.5 | 239 |
| 37.5 | 240 |
| 38.65 | 240 |
| 38.65 | 241 |
| 39.15 | 241 |
| 39.15 | 242 |
| 39.15 | 241 |
| 39.65 | 241 |
| 39.65 | 246 |
| 39.65 | 240 |
| 39.65 | 242 |
| 39.85 | 242 |
| 39.85 | 243 |
| 39.85 | 245 |
| 39.85 | 244 |
| 39.9 | 244 |
| 39.9 | 246 |
| 39.9 | 245 |
| 40.55 | 245 |
| 40.55 | 247 |
| 40.55 | 253 |
| 40.55 | 245 |
| 41.75 | 245 |
| 41.75 | 250 |
| 41.75 | 251 |
| 41.75 | 249 |
| 41.75 | 252 |
| 42.95 | 252 |
| 42.95 | 250 |
| 42.95 | 253 |
| 43.7 | 253 |
| 43.7 | 255 |
| 44.8 | 255 |
| 44.8 | 256 |
| 44.8 | 255 |
| 44.8 | 256 |
| 45.35 | 256 |
| 45.35 | 258 |
| 45.35 | 261 |
| 46.4 | 261 |
| 46.4 | 258 |
| 46.4 | 260 |
| 46.95 | 260 |
| 46.95 | 262 |
| 47.6 | 262 |
| 47.6 | 260 |
| 47.6 | 262 |
| 47.6 | 266 |
| 48.25 | 266 |
| 48.25 | 261 |
| 48.25 | 267 |
| 48.25 | 264 |
| 49.55 | 264 |
| 49.55 | 266 |
| 49.55 | 269 |
| 50.35 | 269 |
| 50.35 | 270 |
| 50.35 | 269 |
| 50.35 | 270 |
| 51.05 | 270 |
| 51.05 | 269 |
| 51.05 | 271 |
| 51.05 | 270 |
| 51.45 | 270 |

-continued

| Sensor 8 | |
|---|---|
| pressure | resistance |
| 51.45 | 271 |
| 51.45 | 272 |
| 52.15 | 272 |
| 52.15 | 271 |
| 52.15 | 273 |
| 52.15 | 274 |
| 53.15 | 274 |
| 53.15 | 275 |
| 53.15 | 281 |
| 54.3 | 281 |
| 54.3 | 276 |
| 54.3 | 278 |
| 54.3 | 279 |
| 54.3 | 276 |
| 55.55 | 276 |
| 55.55 | 279 |
| 56.3 | 279 |
| 56.3 | 278 |
| 56.3 | 283 |
| 56.3 | 281 |
| 57.55 | 281 |
| 57.55 | 282 |
| 57.55 | 283 |
| 57.95 | 283 |
| 57.95 | 282 |
| 57.95 | 284 |
| 58.35 | 284 |
| 58.35 | 286 |
| 58.35 | 283 |
| 58.2 | 283 |
| 58.2 | 289 |
| 58.2 | 286 |
| 58.2 | 285 |
| 58.8 | 285 |
| 58.8 | 286 |
| 58.8 | 288 |
| 59.65 | 288 |
| 59.65 | 290 |
| 59.65 | 289 |
| 60.4 | 289 |
| 60.4 | 290 |
| 60.4 | 293 |
| 61.3 | 293 |
| 61.3 | 292 |
| 61.3 | 291 |
| 61.8 | 291 |
| 61.8 | 292 |
| 61.8 | 293 |
| 61.8 | 295 |
| 63.1 | 295 |
| 63.1 | 294 |
| 63.1 | 292 |
| 63.1 | 294 |
| 63.3 | 294 |
| 63.3 | 299 |
| 63.3 | 297 |
| 63.3 | 296 |
| 64.15 | 296 |
| 64.15 | 294 |
| 64.45 | 294 |
| 64.45 | 298 |
| 64.45 | 299 |
| 64.45 | 297 |
| 65.45 | 297 |
| 65.45 | 298 |
| 65.45 | 301 |
| 66 | 301 |
| 66 | 299 |
| 66 | 301 |
| 66 | 302 |
| 66 | 301 |
| 66.95 | 301 |
| 66.95 | 303 |
| 66.95 | 302 |
| 66.95 | 304 |

-continued

| Sensor 8 | |
|---|---|
| pressure | resistance |
| 67.85 | 304 |
| 67.85 | 303 |
| 69.15 | 303 |
| 69.15 | 302 |
| 69.15 | 307 |
| 70.45 | 307 |
| 70.45 | 306 |
| 70.45 | 309 |
| 71.5 | 309 |
| 71.5 | 307 |
| 71.5 | 308 |
| 71.5 | 312 |
| 72.95 | 312 |
| 72.95 | 310 |
| 72.95 | 311 |
| 73.4 | 311 |
| 73.4 | 312 |
| 73.4 | 313 |
| 74.45 | 313 |
| 74.45 | 314 |
| 74.45 | 313 |
| 74.45 | 315 |
| 75.45 | 315 |
| 75.45 | 316 |
| 75.45 | 319 |
| 75.45 | 316 |
| 77.35 | 316 |
| 77.35 | 317 |
| 77.35 | 319 |
| 78.4 | 319 |
| 78.4 | 320 |
| 79.6 | 320 |
| 79.6 | 321 |
| 79.6 | 322 |
| 81 | 322 |
| 81 | 321 |
| 81 | 325 |
| 81.8 | 325 |
| 81.8 | 323 |
| 81.8 | 324 |
| 81.8 | 325 |
| 83 | 325 |
| 83 | 326 |
| 83 | 327 |
| 83 | 323 |
| 84.35 | 323 |
| 84.35 | 327 |
| 84.35 | 328 |
| 84.35 | 326 |
| 85.45 | 326 |
| 85.45 | 328 |
| 85.45 | 327 |
| 86 | 327 |
| 86 | 323 |
| 86 | 331 |
| 86 | 330 |
| 86.3 | 330 |
| 86.3 | 332 |
| 86.3 | 331 |
| 87.05 | 331 |
| 87.05 | 332 |
| 87.05 | 333 |
| 88.85 | 333 |
| 88.85 | 332 |
| 88.85 | 335 |
| 89.65 | 335 |
| 89.65 | 334 |
| 89.65 | 339 |
| 89.65 | 337 |
| 91.15 | 337 |
| 91.15 | 333 |
| 91.15 | 336 |
| 91.15 | 334 |
| 91.15 | 339 |
| 92.55 | 339 |

-continued

| Sensor 8 | |
|---|---|
| pressure | resistance |
| 92.55 | 337 |
| 92.55 | 336 |
| 92.55 | 338 |
| 93.25 | 338 |
| 93.25 | 339 |
| 93.25 | 341 |
| 93.25 | 340 |
| 94.45 | 340 |
| 94.45 | 339 |
| 94.45 | 338 |
| 94.45 | 341 |
| 95.5 | 341 |
| 95.5 | 342 |
| 95.5 | 340 |
| 95.5 | 344 |
| 96.35 | 344 |
| 96.35 | 343 |
| 96.35 | 341 |
| 96.9 | 341 |
| 96.9 | 343 |
| 97.2 | 343 |
| 97.2 | 345 |
| 97.2 | 344 |
| 97.2 | 345 |
| 98.05 | 345 |
| 99 | 345 |
| 99 | 348 |
| 99 | 347 |
| 99 | 346 |
| 99.3 | 346 |
| 99.3 | 343 |
| 99.3 | 352 |
| 99.3 | 348 |
| 99.45 | 348 |
| 99.45 | 343 |
| 99.45 | 348 |
| 99.45 | 347 |
| 99.55 | 347 |
| 99.55 | 348 |
| 99.55 | 347 |
| 99.75 | 347 |
| 99.75 | 348 |
| 100.1 | 348 |
| 100.1 | 347 |
| 100.1 | 349 |
| 100.4 | 349 |
| 100.4 | 348 |
| 100.4 | 349 |
| 100.4 | 352 |
| 100.65 | 352 |
| 100.65 | 349 |
| 101 | 349 |
| 101 | 350 |
| 101 | 344 |
| 101 | 351 |
| 101.4 | 351 |
| 101.4 | 351 |
| 101.4 | 350 |
| 101.65 | 350 |
| 101.65 | 351 |
| 101.65 | 353 |
| 101.65 | 352 |
| 101.8 | 352 |
| 101.8 | 350 |
| 101.85 | 350 |
| 101.85 | 351 |
| 101.85 | 353 |
| 101.85 | 351 |
| 102.35 | 351 |
| 102.35 | 349 |
| 102.35 | 352 |
| 102.35 | 347 |
| 102.85 | 347 |
| 102.85 | 352 |
| 102.85 | 353 |

-continued

| Sensor 8 | |
|---|---|
| pressure | resistance |
| 102.95 | 353 |
| 102.95 | 351 |
| 102.95 | 352 |
| 101.45 | 352 |
| 101.45 | 350 |
| 101.45 | 351 |
| 100.25 | 351 |
| 100.25 | 352 |
| 100.25 | 353 |
| 100.25 | 352 |
| 99.2 | 352 |
| 99.2 | 350 |
| 99.2 | 349 |
| 99.2 | 347 |
| 96.7 | 347 |
| 96.7 | 346 |
| 96.7 | 347 |
| 91.85 | 347 |
| 91.85 | 345 |
| 91.85 | 344 |
| 91.85 | 343 |
| 86.6 | 343 |
| 86.6 | 341 |
| 86.6 | 339 |
| 82 | 339 |
| 82 | 340 |
| 82 | 342 |
| 82 | 339 |
| 78.2 | 339 |
| 78.2 | 336 |
| 78.2 | 337 |
| 78.2 | 335 |
| 75.35 | 335 |
| 75.35 | 332 |
| 75.35 | 330 |
| 72.75 | 330 |
| 72.75 | 331 |
| 72.75 | 330 |
| 69.8 | 330 |
| 69.8 | 328 |
| 69.8 | 327 |
| 69.8 | 326 |
| 66.75 | 326 |
| 66.75 | 325 |
| 66.75 | 326 |
| 66.75 | 324 |
| 64.3 | 324 |
| 64.3 | 325 |
| 64.3 | 323 |
| 62.55 | 323 |
| 62.55 | 322 |
| 62.55 | 319 |
| 61.1 | 319 |
| 61.1 | 322 |
| 61.1 | 320 |
| 61.1 | 318 |
| 59.55 | 318 |
| 59.55 | 317 |
| 59.55 | 312 |
| 59.55 | 314 |
| 57.45 | 314 |
| 57.45 | 313 |
| 57.45 | 315 |
| 55.25 | 315 |
| 55.25 | 309 |
| 55.25 | 310 |
| 53.15 | 310 |
| 53.15 | 306 |
| 53.15 | 304 |
| 51 | 304 |
| 51 | 302 |
| 51 | 303 |
| 51 | 302 |
| 48.7 | 302 |
| 48.7 | 301 |

-continued

| Sensor 8 | |
|---|---|
| pressure | resistance |
| 48.7 | 299 |
| 48.7 | 300 |
| 46.7 | 300 |
| 46.7 | 298 |
| 46.7 | 299 |
| 46.7 | 297 |
| 45.35 | 297 |
| 45.35 | 296 |
| 45.35 | 294 |
| 44.25 | 294 |
| 44.25 | 293 |
| 44.25 | 295 |
| 44.25 | 290 |
| 43.4 | 290 |
| 43.4 | 293 |
| 43.4 | 294 |
| 43.4 | 290 |
| 42.1 | 290 |
| 42.1 | 288 |
| 42.1 | 287 |
| 42.1 | 290 |
| 40.8 | 290 |
| 40.8 | 288 |
| 40.8 | 290 |
| 39.85 | 290 |
| 39.85 | 289 |
| 39.85 | 290 |
| 39.85 | 287 |
| 39.4 | 287 |
| 39.4 | 285 |
| 39.4 | 286 |
| 38.6 | 286 |
| 38.6 | 284 |
| 38.6 | 283 |
| 38.6 | 280 |
| 37.5 | 280 |
| 37.5 | 282 |
| 37.5 | 283 |
| 37.5 | 282 |
| 36.6 | 282 |
| 36.6 | 281 |
| 36.6 | 279 |
| 36.6 | 281 |
| 36.05 | 281 |
| 36.05 | 279 |
| 36.05 | 278 |
| 36.05 | 277 |
| 35.2 | 277 |
| 35.2 | 276 |
| 34.15 | 276 |
| 34.15 | 274 |
| 34.15 | 275 |
| 34.15 | 273 |
| 33.15 | 273 |
| 33.15 | 271 |
| 33.15 | 268 |
| 33.15 | 269 |
| 31.85 | 269 |
| 31.85 | 266 |
| 31.85 | 267 |
| 31.85 | 266 |
| 30.45 | 266 |
| 30.45 | 267 |
| 30.45 | 263 |
| 30.45 | 264 |
| 29.35 | 264 |
| 29.35 | 262 |
| 29.35 | 264 |
| 28.4 | 264 |
| 28.4 | 261 |
| 28.4 | 258 |
| 28.4 | 261 |
| 28.4 | 255 |
| 27.5 | 255 |
| 27.5 | 257 |

-continued

| Sensor 8 | |
|---|---|
| pressure | resistance |
| 27.5 | 254 |
| 27.5 | 252 |
| 26.35 | 252 |
| 26.35 | 254 |
| 26.35 | 252 |
| 26.35 | 250 |
| 25.2 | 250 |
| 25.2 | 251 |
| 24.15 | 251 |
| 24.15 | 249 |
| 24.15 | 251 |
| 24.15 | 247 |
| 23.5 | 247 |
| 23.5 | 246 |
| 23.5 | 247 |
| 23.5 | 248 |
| 23.05 | 248 |
| 23.05 | 249 |
| 23.05 | 248 |
| 23.05 | 247 |
| 22.5 | 247 |
| 22.5 | 241 |
| 22.5 | 244 |
| 22.5 | 240 |
| 21.9 | 240 |
| 21.9 | 243 |
| 21.9 | 241 |
| 21.9 | 242 |
| 21.9 | 240 |
| 21.1 | 240 |
| 21.1 | 239 |
| 21.1 | 238 |
| 21.1 | 235 |
| 20.25 | 235 |
| 20.25 | 232 |
| 20.25 | 236 |
| 19.3 | 236 |
| 19.3 | 233 |
| 18.55 | 233 |
| 18.55 | 231 |
| 18.55 | 226 |
| 18.55 | 225 |
| 17.8 | 225 |
| 17.8 | 227 |
| 17.8 | 224 |
| 17.8 | 223 |
| 16.8 | 223 |
| 16.8 | 222 |
| 16.8 | 223 |
| 16.8 | 221 |
| 15.8 | 221 |
| 15.8 | 219 |
| 15.8 | 220 |
| 15.3 | 220 |
| 15.3 | 219 |
| 15.3 | 220 |
| 15.3 | 218 |
| 14.9 | 218 |
| 14.9 | 217 |
| 14.9 | 218 |
| 14.6 | 218 |
| 14.6 | 215 |
| 14.6 | 214 |
| 14.6 | 215 |
| 14.25 | 215 |
| 14.25 | 214 |
| 14.25 | 212 |
| 13.9 | 212 |
| 13.9 | 211 |
| 13.9 | 210 |
| 13.5 | 210 |
| 13.5 | 207 |
| 13.5 | 208 |
| 13.5 | 206 |
| 12.95 | 206 |

-continued

| Sensor 8 | |
|---|---|
| pressure | resistance |
| 12.95 | 207 |
| 12.95 | 208 |
| 12.5 | 208 |
| 12.5 | 202 |
| 12.5 | 206 |
| 12.5 | 204 |
| 12.3 | 204 |
| 12.3 | 202 |
| 12.3 | 204 |
| 12.3 | 201 |
| 12.05 | 201 |
| 12.05 | 200 |
| 12.05 | 198 |
| 12.05 | 196 |
| 11.5 | 196 |
| 11.5 | 197 |
| 11.5 | 198 |
| 11.5 | 197 |
| 10.9 | 197 |
| 10.9 | 196 |
| 10.9 | 192 |
| 10.9 | 191 |
| 10.35 | 191 |
| 10.35 | 188 |
| 10.35 | 182 |
| 10.35 | 184 |
| 9.55 | 184 |
| 9.55 | 185 |
| 9.55 | 181 |
| 9.55 | 182 |
| 8.8 | 182 |
| 8.8 | 183 |
| 8.8 | 178 |
| 8.8 | 177 |
| 8.2 | 177 |
| 8.2 | 175 |
| 8.2 | 171 |
| 8.2 | 172 |
| 7.6 | 172 |
| 7.6 | 167 |
| 7.6 | 166 |
| 7.6 | 162 |
| 7.6 | 163 |
| 6.85 | 163 |
| 6.85 | 162 |
| 6.85 | 160 |
| 6.25 | 160 |
| 6.25 | 155 |
| 6.25 | 151 |
| 5.75 | 151 |
| 5.75 | 147 |
| 5.2 | 147 |
| 5.2 | 144 |
| 5.2 | 143 |
| 4.8 | 143 |
| 4.8 | 140 |
| 4.8 | 134 |
| 4.8 | 133 |
| 4.4 | 133 |
| 4.4 | 138 |
| 4.4 | 132 |
| 4.4 | 129 |
| 3.95 | 129 |
| 3.95 | 126 |
| 3.95 | 118 |
| 3.45 | 118 |
| 3.45 | 122 |
| 3.45 | 120 |
| 3.45 | 118 |
| 3.45 | 117 |
| 3.1 | 117 |
| 3.1 | 114 |
| 3.1 | 108 |
| 3.1 | 112 |
| 2.7 | 112 |
| 2.7 | 104 |
| 2.7 | 105 |
| 2.7 | 102 |
| 2.4 | 102 |
| 2.4 | 101 |
| 2.4 | 97 |
| 2.4 | 96 |
| 2.05 | 96 |
| 2.05 | 93 |
| 2.05 | 89 |
| 1.7 | 89 |
| 1.7 | 85 |
| 1.7 | 86 |
| 1.7 | 83 |
| 1.45 | 83 |
| 1.45 | 78 |
| 1.45 | 75 |
| 1.25 | 75 |
| 1.25 | 72 |
| 1.25 | 69 |
| 1.05 | 69 |
| 1.05 | 68 |
| 1.05 | 65 |
| 1.05 | 63 |
| 0.9 | 63 |
| 0.9 | 62 |
| 0.9 | 57 |
| 0.9 | 53 |
| 0.7 | 53 |
| 0.7 | 52 |
| 0.7 | 41 |
| 0.7 | 40 |
| 0.7 | 35 |
| 0.5 | 35 |
| 0.5 | 30 |
| 0.5 | 28 |
| 0.5 | 19 |
| 0.3 | 19 |
| 0.3 | 17 |
| 0.3 | 16 |
| 0.15 | 16 |
| 0.15 | 17 |
| 0.15 | 14 |
| 0.15 | 12 |
| 0.05 | 12 |
| 0.05 | 15 |
| 0.05 | 13 |
| 0.05 | 13 |
| 0.05 | 14 |
| 0.05 | 19 |
| 0.05 | 19 |
| 0.05 | 12 |
| 0.05 | 13 |
| 0.05 | 13 |
| 0.05 | 14 |
| 0.05 | 12 |
| 0.05 | 13 |
| 0.05 | 13 |
| 0.05 | 12 |
| 0.05 | 13 |
| 0.05 | 13 |
| 0.05 | 15 |
| 0.05 | 12 |

| Sensor 9 | |
|---|---|
| pressure | resistance |
| 0.1 | 10 |
| 0.1 | 14 |
| 0.1 | 17 |
| 0.1 | 15 |

-continued

| Sensor 9 | |
|---|---|
| pressure | resistance |
| 0.25 | 15 |
| 0.25 | 20 |
| 0.25 | 21 |
| 0.25 | 26 |
| 0.4 | 26 |
| 0.4 | 24 |
| 0.4 | 26 |
| 0.4 | 27 |
| 0.55 | 27 |
| 0.55 | 28 |
| 0.55 | 31 |
| 0.55 | 30 |
| 0.75 | 30 |
| 0.75 | 39 |
| 0.75 | 40 |
| 0.75 | 47 |
| 1.1 | 47 |
| 1.1 | 51 |
| 1.1 | 54 |
| 1.1 | 56 |
| 1.65 | 56 |
| 1.65 | 57 |
| 1.65 | 58 |
| 1.65 | 62 |
| 2.25 | 62 |
| 2.25 | 66 |
| 2.25 | 70 |
| 2.25 | 74 |
| 2.9 | 74 |
| 2.9 | 71 |
| 2.9 | 80 |
| 2.9 | 84 |
| 2.9 | 88 |
| 3.85 | 88 |
| 3.85 | 90 |
| 3.85 | 93 |
| 3.85 | 95 |
| 5 | 95 |
| 5 | 99 |
| 5 | 103 |
| 5 | 105 |
| 6.2 | 105 |
| 6.2 | 108 |
| 6.2 | 112 |
| 6.2 | 117 |
| 7.65 | 117 |
| 7.65 | 116 |
| 7.65 | 118 |
| 7.65 | 120 |
| 9 | 120 |
| 9 | 123 |
| 9 | 126 |
| 10 | 126 |
| 10 | 128 |
| 10 | 123 |
| 10.5 | 123 |
| 10.5 | 130 |
| 10.5 | 134 |
| 11.1 | 134 |
| 11.1 | 137 |
| 11.1 | 139 |
| 11.1 | 138 |
| 11.9 | 138 |
| 11.9 | 143 |
| 11.9 | 141 |
| 11.9 | 142 |
| 12.7 | 142 |
| 12.7 | 144 |
| 12.7 | 147 |
| 12.7 | 150 |
| 13.6 | 150 |
| 13.6 | 151 |
| 13.6 | 152 |
| 13.6 | 149 |
| 14.7 | 149 |

-continued

| Sensor 9 | |
|---|---|
| pressure | resistance |
| 14.7 | 154 |
| 14.7 | 157 |
| 15.6 | 157 |
| 15.6 | 160 |
| 15.6 | 162 |
| 15.6 | 160 |
| 16.4 | 160 |
| 16.4 | 162 |
| 16.4 | 164 |
| 16.4 | 163 |
| 17.1 | 163 |
| 17.1 | 166 |
| 17.1 | 168 |
| 17.95 | 168 |
| 17.95 | 171 |
| 17.95 | 170 |
| 17.95 | 173 |
| 18.8 | 173 |
| 18.8 | 175 |
| 18.8 | 179 |
| 19.75 | 179 |
| 19.75 | 180 |
| 19.75 | 183 |
| 19.75 | 182 |
| 21.15 | 182 |
| 21.15 | 184 |
| 21.15 | 188 |
| 21.15 | 186 |
| 22.6 | 186 |
| 22.6 | 188 |
| 22.6 | 186 |
| 22.6 | 190 |
| 23.45 | 190 |
| 23.45 | 192 |
| 23.45 | 193 |
| 24.05 | 193 |
| 24.05 | 190 |
| 24.05 | 193 |
| 24.05 | 197 |
| 25 | 197 |
| 25 | 198 |
| 25 | 197 |
| 25 | 198 |
| 26 | 198 |
| 26 | 200 |
| 26 | 201 |
| 26 | 199 |
| 26 | 202 |
| 26.8 | 202 |
| 26.8 | 205 |
| 26.8 | 207 |
| 27.85 | 207 |
| 27.85 | 209 |
| 27.85 | 211 |
| 27.85 | 207 |
| 29.1 | 207 |
| 29.1 | 210 |
| 29.1 | 211 |
| 29.8 | 211 |
| 29.8 | 212 |
| 29.8 | 214 |
| 30.05 | 214 |
| 30.05 | 215 |
| 30.05 | 216 |
| 30.95 | 216 |
| 30.95 | 218 |
| 30.95 | 221 |
| 32.2 | 221 |
| 32.2 | 220 |
| 32.2 | 222 |
| 33.15 | 222 |
| 33.15 | 224 |
| 33.15 | 226 |
| 33.15 | 223 |
| 33.7 | 223 |

-continued

| Sensor 9 | |
|---|---|
| pressure | resistance |
| 33.7 | 225 |
| 33.7 | 227 |
| 33.7 | 228 |
| 34.3 | 228 |
| 34.3 | 227 |
| 34.3 | 229 |
| 34.75 | 229 |
| 34.75 | 230 |
| 34.75 | 231 |
| 35.6 | 231 |
| 35.6 | 232 |
| 35.6 | 233 |
| 36.55 | 233 |
| 36.55 | 234 |
| 36.55 | 235 |
| 37.55 | 235 |
| 37.55 | 238 |
| 37.55 | 234 |
| 37.55 | 238 |
| 38.7 | 238 |
| 38.7 | 241 |
| 38.7 | 239 |
| 38.7 | 240 |
| 39.75 | 240 |
| 39.75 | 244 |
| 39.75 | 242 |
| 39.75 | 243 |
| 40.65 | 243 |
| 40.65 | 242 |
| 40.65 | 244 |
| 41.4 | 244 |
| 41.4 | 245 |
| 41.4 | 246 |
| 41.4 | 248 |
| 41.9 | 248 |
| 41.9 | 249 |
| 42.7 | 249 |
| 42.7 | 250 |
| 42.7 | 247 |
| 42.7 | 250 |
| 42.95 | 250 |
| 42.95 | 249 |
| 42.95 | 251 |
| 43.3 | 251 |
| 43.3 | 252 |
| 43.3 | 253 |
| 43.3 | 254 |
| 44.35 | 254 |
| 44.35 | 255 |
| 44.35 | 256 |
| 44.35 | 252 |
| 46.15 | 252 |
| 46.15 | 257 |
| 46.15 | 256 |
| 46.15 | 258 |
| 46.15 | 260 |
| 47.5 | 260 |
| 47.5 | 263 |
| 47.5 | 259 |
| 47.5 | 262 |
| 48.75 | 262 |
| 48.75 | 264 |
| 48.75 | 263 |
| 48.75 | 262 |
| 49.85 | 262 |
| 49.85 | 265 |
| 49.85 | 264 |
| 49.85 | 267 |
| 50.75 | 267 |
| 50.75 | 263 |
| 50.75 | 269 |
| 51.4 | 269 |
| 51.4 | 266 |
| 51.4 | 268 |
| 51.4 | 267 |

-continued

| Sensor 9 | |
|---|---|
| pressure | resistance |
| 52.05 | 267 |
| 52.05 | 270 |
| 52.05 | 271 |
| 52.7 | 271 |
| 52.7 | 270 |
| 52.7 | 273 |
| 53.25 | 273 |
| 53.25 | 272 |
| 53.25 | 273 |
| 53.25 | 274 |
| 53.25 | 276 |
| 53.8 | 276 |
| 53.8 | 274 |
| 53.8 | 273 |
| 54.15 | 273 |
| 54.15 | 274 |
| 54.15 | 277 |
| 54.05 | 277 |
| 54.05 | 276 |
| 54.05 | 275 |
| 54.05 | 276 |
| 54.05 | 276 |
| 54.05 | 278 |
| 54.05 | 274 |
| 54.05 | 277 |
| 54.65 | 277 |
| 54.65 | 279 |
| 54.65 | 278 |
| 54.65 | 280 |
| 55.7 | 280 |
| 55.7 | 281 |
| 55.7 | 282 |
| 56.95 | 282 |
| 56.95 | 283 |
| 56.95 | 281 |
| 56.95 | 283 |
| 57.95 | 283 |
| 57.95 | 285 |
| 57.95 | 286 |
| 58.75 | 286 |
| 58.75 | 285 |
| 58.8 | 285 |
| 58.8 | 287 |
| 58.8 | 285 |
| 58.8 | 287 |
| 59.3 | 287 |
| 59.3 | 289 |
| 59.3 | 287 |
| 59.3 | 288 |
| 60.1 | 288 |
| 60.1 | 290 |
| 60.1 | 288 |
| 61.45 | 288 |
| 61.45 | 292 |
| 61.45 | 290 |
| 61.45 | 293 |
| 62.05 | 293 |
| 62.05 | 289 |
| 62.05 | 291 |
| 62.05 | 292 |
| 62.9 | 292 |
| 62.9 | 294 |
| 62.9 | 295 |
| 62.9 | 294 |
| 63.3 | 294 |
| 63.3 | 297 |
| 63.3 | 295 |
| 64 | 295 |
| 64 | 297 |
| 64 | 295 |
| 64 | 297 |
| 64.45 | 297 |
| 64.45 | 298 |
| 64.45 | 299 |
| 64.45 | 298 |

-continued

| Sensor 9 | |
|---|---|
| pressure | resistance |
| 65.1 | 298 |
| 65.1 | 299 |
| 65.1 | 298 |
| 65.1 | 299 |
| 65.5 | 299 |
| 65.5 | 300 |
| 65.5 | 303 |
| 66.4 | 303 |
| 66.4 | 301 |
| 66.4 | 302 |
| 67.8 | 302 |
| 67.8 | 304 |
| 67.8 | 305 |
| 67.8 | 304 |
| 67.8 | 305 |
| 68.95 | 305 |
| 68.95 | 306 |
| 70.3 | 306 |
| 70.3 | 307 |
| 70.3 | 306 |
| 70.8 | 306 |
| 70.8 | 307 |
| 70.8 | 306 |
| 70.8 | 309 |
| 71.3 | 309 |
| 71.3 | 308 |
| 71.3 | 309 |
| 71.3 | 311 |
| 71.85 | 311 |
| 71.85 | 310 |
| 71.85 | 309 |
| 71.85 | 311 |
| 72.6 | 311 |
| 72.6 | 319 |
| 72.6 | 312 |
| 73.7 | 312 |
| 73.7 | 314 |
| 73.7 | 313 |
| 74.55 | 313 |
| 74.55 | 314 |
| 74.55 | 316 |
| 74.55 | 315 |
| 75.7 | 315 |
| 75.7 | 316 |
| 75.7 | 315 |
| 75.7 | 313 |
| 76.05 | 313 |
| 76.05 | 317 |
| 76.05 | 318 |
| 77.05 | 318 |
| 77.05 | 320 |
| 77.05 | 319 |
| 77.05 | 322 |
| 78.35 | 322 |
| 78.35 | 319 |
| 78.35 | 321 |
| 78.35 | 322 |
| 80.05 | 322 |
| 80.05 | 324 |
| 81.45 | 324 |
| 81.45 | 325 |
| 81.45 | 326 |
| 81.45 | 323 |
| 82.55 | 323 |
| 82.55 | 325 |
| 82.55 | 324 |
| 82.55 | 327 |
| 83.05 | 327 |
| 83.05 | 326 |
| 83.05 | 327 |
| 83.6 | 327 |
| 83.6 | 326 |
| 83.6 | 329 |
| 83.6 | 328 |
| 84.35 | 328 |

-continued

| Sensor 9 | |
|---|---|
| pressure | resistance |
| 84.35 | 331 |
| 85.75 | 331 |
| 85.75 | 325 |
| 85.75 | 331 |
| 86.7 | 331 |
| 86.7 | 332 |
| 86.7 | 333 |
| 86.7 | 334 |
| 88.05 | 334 |
| 88.05 | 333 |
| 88.05 | 334 |
| 89 | 334 |
| 89 | 336 |
| 89 | 335 |
| 89 | 337 |
| 90.65 | 337 |
| 90.65 | 336 |
| 91.3 | 336 |
| 91.3 | 337 |
| 91.3 | 338 |
| 92.75 | 338 |
| 92.75 | 339 |
| 92.75 | 341 |
| 92.75 | 340 |
| 93.6 | 340 |
| 93.6 | 341 |
| 93.6 | 343 |
| 95.35 | 343 |
| 95.35 | 345 |
| 95.35 | 343 |
| 95.35 | 345 |
| 96.25 | 345 |
| 97.7 | 345 |
| 97.7 | 347 |
| 97.7 | 345 |
| 97.7 | 346 |
| 98.65 | 346 |
| 98.65 | 347 |
| 98.65 | 346 |
| 99.65 | 346 |
| 99.65 | 347 |
| 99.65 | 349 |
| 100.35 | 349 |
| 100.35 | 348 |
| 100.35 | 347 |
| 100.35 | 349 |
| 101.05 | 349 |
| 101.05 | 350 |
| 101.05 | 349 |
| 101.05 | 349 |
| 101.05 | 350 |
| 101.4 | 350 |
| 101.4 | 351 |
| 101.5 | 351 |
| 101.5 | 350 |
| 101.5 | 352 |
| 102 | 352 |
| 102 | 353 |
| 102 | 352 |
| 102.65 | 352 |
| 102.65 | 347 |
| 102.65 | 351 |
| 102.1 | 351 |
| 102.1 | 352 |
| 102.1 | 351 |
| 99.35 | 351 |
| 99.35 | 348 |
| 99.35 | 349 |
| 99.35 | 347 |
| 95.7 | 347 |
| 95.7 | 346 |
| 95.7 | 348 |
| 95.7 | 346 |
| 91.2 | 346 |
| 91.2 | 345 |

-continued

| Sensor 9 | |
|---|---|
| pressure | resistance |
| 91.2 | 344 |
| 91.2 | 342 |
| 91.2 | 337 |
| 86.55 | 337 |
| 86.55 | 340 |
| 86.55 | 338 |
| 86.55 | 337 |
| 81.3 | 337 |
| 81.3 | 336 |
| 81.3 | 338 |
| 81.3 | 333 |
| 77 | 333 |
| 77 | 334 |
| 77 | 333 |
| 77 | 331 |
| 73.75 | 331 |
| 73.75 | 329 |
| 71.05 | 329 |
| 71.05 | 328 |
| 71.05 | 325 |
| 71.05 | 322 |
| 67.45 | 322 |
| 67.45 | 324 |
| 67.45 | 323 |
| 64.45 | 323 |
| 64.45 | 326 |
| 64.45 | 323 |
| 62.35 | 323 |
| 62.35 | 322 |
| 61.65 | 322 |
| 61.65 | 320 |
| 61.65 | 321 |
| 61.65 | 320 |
| 60.75 | 320 |
| 60.75 | 318 |
| 60.75 | 317 |
| 59.4 | 317 |
| 59.4 | 313 |
| 59.4 | 315 |
| 59.4 | 317 |
| 57.75 | 317 |
| 57.75 | 315 |
| 57.75 | 313 |
| 56.1 | 313 |
| 56.1 | 312 |
| 56.1 | 311 |
| 56.1 | 315 |
| 54.6 | 315 |
| 54.6 | 310 |
| 54.6 | 309 |
| 54.6 | 307 |
| 53 | 307 |
| 53 | 306 |
| 53 | 305 |
| 51.5 | 305 |
| 51.5 | 304 |
| 51.5 | 303 |
| 51.5 | 299 |
| 51.5 | 300 |
| 49.55 | 300 |
| 49.55 | 294 |
| 49.55 | 299 |
| 47.8 | 299 |
| 47.8 | 300 |
| 47.8 | 296 |
| 46.4 | 296 |
| 46.4 | 297 |
| 46.4 | 294 |
| 46.4 | 297 |
| 45.15 | 297 |
| 45.15 | 294 |
| 45.15 | 293 |
| 43.85 | 293 |
| 43.85 | 290 |
| 43.85 | 287 |

-continued

| Sensor 9 | |
|---|---|
| pressure | resistance |
| 41.95 | 287 |
| 41.95 | 284 |
| 41.95 | 282 |
| 40.05 | 282 |
| 40.05 | 281 |
| 40.05 | 280 |
| 40.05 | 283 |
| 38.35 | 283 |
| 38.35 | 279 |
| 38.35 | 278 |
| 38.35 | 276 |
| 36.95 | 276 |
| 36.95 | 275 |
| 36.95 | 273 |
| 35.5 | 273 |
| 35.5 | 272 |
| 35.5 | 271 |
| 35.5 | 270 |
| 34.1 | 270 |
| 34.1 | 271 |
| 34.1 | 270 |
| 34.1 | 271 |
| 33.3 | 271 |
| 33.3 | 270 |
| 33.3 | 269 |
| 33.3 | 266 |
| 32.85 | 266 |
| 32.85 | 265 |
| 32.85 | 264 |
| 32.85 | 256 |
| 31.5 | 256 |
| 31.5 | 259 |
| 31.5 | 257 |
| 29.6 | 257 |
| 29.6 | 256 |
| 29.6 | 253 |
| 28.05 | 253 |
| 28.05 | 252 |
| 28.05 | 251 |
| 28.05 | 252 |
| 26.75 | 252 |
| 26.75 | 248 |
| 26.75 | 249 |
| 26.75 | 246 |
| 25.65 | 246 |
| 25.65 | 245 |
| 25.65 | 244 |
| 25.65 | 246 |
| 24.75 | 246 |
| 24.75 | 242 |
| 24.75 | 244 |
| 24.75 | 242 |
| 24.15 | 242 |
| 24.15 | 239 |
| 24.15 | 240 |
| 23.4 | 240 |
| 23.4 | 237 |
| 23.4 | 238 |
| 22.45 | 238 |
| 22.45 | 236 |
| 22.45 | 237 |
| 22.45 | 234 |
| 21.5 | 234 |
| 21.5 | 224 |
| 21.5 | 232 |
| 20.55 | 232 |
| 20.55 | 228 |
| 20.55 | 224 |
| 20.55 | 218 |
| 20.55 | 222 |
| 19.15 | 222 |
| 19.15 | 217 |
| 19.15 | 214 |
| 19.15 | 210 |
| 17.45 | 210 |

-continued

| Sensor 9 | |
|---|---|
| pressure | resistance |
| 17.45 | 201 |
| 17.45 | 210 |
| 17.45 | 208 |
| 15.85 | 208 |
| 15.85 | 204 |
| 15.85 | 207 |
| 15.85 | 205 |
| 14.75 | 205 |
| 14.75 | 204 |
| 14.75 | 200 |
| 14.75 | 198 |
| 13.95 | 198 |
| 13.95 | 199 |
| 13.95 | 198 |
| 13.2 | 198 |
| 13.2 | 195 |
| 13.2 | 193 |
| 13.2 | 191 |
| 12.45 | 191 |
| 12.45 | 192 |
| 12.45 | 188 |
| 12.45 | 189 |
| 12.45 | 187 |
| 11.8 | 187 |
| 11.8 | 188 |
| 11.8 | 186 |
| 11.8 | 185 |
| 11.2 | 185 |
| 11.2 | 183 |
| 11.2 | 178 |
| 10.55 | 178 |
| 10.55 | 174 |
| 10.55 | 171 |
| 10.55 | 168 |
| 9.65 | 168 |
| 9.65 | 170 |
| 9.65 | 166 |
| 9.65 | 164 |
| 8.65 | 164 |
| 8.65 | 161 |
| 8.65 | 160 |
| 8.65 | 156 |
| 7.75 | 156 |
| 7.75 | 150 |
| 7.75 | 147 |
| 7.75 | 135 |
| 6.65 | 135 |
| 6.65 | 142 |
| 6.65 | 139 |
| 5.65 | 139 |
| 5.65 | 134 |
| 5.65 | 130 |
| 5.65 | 128 |
| 4.8 | 128 |
| 4.8 | 127 |
| 4.8 | 124 |
| 4.8 | 121 |
| 4.8 | 123 |
| 4.25 | 123 |
| 4.25 | 120 |
| 4.25 | 122 |
| 4.25 | 120 |
| 3.9 | 120 |
| 3.9 | 119 |
| 3.9 | 116 |
| 3.9 | 114 |
| 3.6 | 114 |
| 3.6 | 109 |
| 3.6 | 101 |
| 3.6 | 99 |
| 3.1 | 99 |
| 3.1 | 96 |
| 3.1 | 98 |
| 3.1 | 96 |
| 2.55 | 96 |

-continued

| Sensor 9 | |
|---|---|
| pressure | resistance |
| 2.55 | 94 |
| 2.55 | 93 |
| 2.55 | 91 |
| 2.1 | 91 |
| 2.1 | 85 |
| 2.1 | 81 |
| 2.1 | 77 |
| 1.75 | 77 |
| 1.75 | 73 |
| 1.75 | 70 |
| 1.75 | 68 |
| 1.35 | 68 |
| 1.35 | 64 |
| 1.35 | 62 |
| 1.35 | 59 |
| 1 | 59 |
| 1 | 56 |
| 1 | 50 |
| 1 | 47 |
| 1 | 43 |
| 0.75 | 43 |
| 0.75 | 39 |
| 0.75 | 42 |
| 0.75 | 40 |
| 0.5 | 40 |
| 0.5 | 39 |
| 0.5 | 38 |
| 0.5 | 37 |
| 0.4 | 37 |
| 0.4 | 36 |
| 0.4 | 35 |
| 0.4 | 34 |
| 0.35 | 34 |
| 0.35 | 36 |
| 0.35 | 30 |
| 0.35 | 26 |
| 0.3 | 26 |
| 0.3 | 20 |
| 0.3 | 17 |
| 0.3 | 13 |
| 0.2 | 13 |
| 0.2 | 15 |
| 0.2 | 16 |
| 0.2 | 17 |
| 0.2 | 15 |
| 0.05 | 15 |
| 0.05 | 11 |
| 0.05 | 17 |
| 0.05 | 17 |
| 0.05 | 14 |
| 0.05 | 15 |
| 0.05 | 15 |
| 0.05 | 15 |
| 0.05 | 14 |
| 0.05 | 13 |
| 0.05 | 17 |
| 0.05 | 17 |
| 0.05 | 15 |
| 0.05 | 13 |
| 0.05 | 16 |

| Sensor 10 | |
|---|---|
| pressure | resistance |
| 0.05 | 4 |
| 0.05 | 10 |
| 0.1 | 10 |
| 0.1 | 13 |
| 0.1 | 15 |
| 0.1 | 20 |
| 0.25 | 20 |

-continued

| Sensor 10 | |
|---|---|
| pressure | resistance |
| 0.25 | 21 |
| 0.25 | 23 |
| 0.4 | 23 |
| 0.4 | 24 |
| 0.4 | 26 |
| 0.55 | 26 |
| 0.55 | 30 |
| 0.55 | 33 |
| 0.55 | 38 |
| 0.75 | 38 |
| 0.75 | 40 |
| 0.75 | 43 |
| 0.75 | 46 |
| 1.1 | 46 |
| 1.1 | 48 |
| 1.1 | 54 |
| 1.1 | 57 |
| 1.75 | 57 |
| 1.75 | 63 |
| 1.75 | 64 |
| 1.75 | 70 |
| 1.75 | 73 |
| 2.55 | 73 |
| 2.55 | 75 |
| 2.55 | 79 |
| 2.55 | 82 |
| 3.55 | 82 |
| 3.55 | 85 |
| 3.55 | 88 |
| 3.55 | 89 |
| 4.5 | 89 |
| 4.5 | 91 |
| 4.5 | 94 |
| 4.5 | 97 |
| 5.45 | 97 |
| 5.45 | 102 |
| 5.45 | 103 |
| 5.45 | 108 |
| 6.5 | 108 |
| 6.5 | 110 |
| 6.5 | 114 |
| 6.5 | 118 |
| 7.9 | 118 |
| 7.9 | 120 |
| 7.9 | 122 |
| 7.9 | 127 |
| 9.35 | 127 |
| 9.35 | 129 |
| 9.35 | 127 |
| 10.65 | 127 |
| 10.65 | 132 |
| 10.65 | 136 |
| 10.65 | 135 |
| 10.65 | 136 |
| 11.55 | 136 |
| 11.55 | 140 |
| 11.55 | 138 |
| 12.1 | 138 |
| 12.1 | 140 |
| 12.1 | 144 |
| 12.1 | 143 |
| 12.85 | 143 |
| 12.85 | 150 |
| 12.85 | 148 |
| 12.85 | 147 |
| 13.65 | 147 |
| 13.65 | 148 |
| 13.65 | 146 |
| 14.3 | 146 |
| 14.3 | 149 |
| 14.3 | 153 |
| 14.3 | 157 |
| 15.1 | 157 |
| 15.1 | 159 |
| 15.1 | 161 |

-continued

| Sensor 10 | |
|---|---|
| pressure | resistance |
| 15.1 | 163 |
| 16.75 | 163 |
| 16.75 | 167 |
| 16.75 | 169 |
| 16.75 | 171 |
| 16.75 | 172 |
| 18.7 | 172 |
| 18.7 | 174 |
| 18.7 | 176 |
| 18.7 | 175 |
| 20.25 | 175 |
| 20.25 | 178 |
| 20.25 | 177 |
| 20.25 | 181 |
| 21.45 | 181 |
| 21.45 | 184 |
| 21.45 | 186 |
| 21.45 | 181 |
| 22.6 | 181 |
| 22.6 | 188 |
| 22.6 | 187 |
| 22.6 | 189 |
| 23.8 | 189 |
| 23.8 | 188 |
| 23.8 | 190 |
| 23.8 | 193 |
| 24.7 | 193 |
| 24.7 | 196 |
| 25.5 | 196 |
| 25.5 | 197 |
| 25.5 | 196 |
| 25.5 | 197 |
| 26.35 | 197 |
| 26.35 | 201 |
| 26.35 | 203 |
| 27.5 | 203 |
| 27.5 | 201 |
| 27.5 | 205 |
| 27.5 | 206 |
| 27.5 | 205 |
| 28.6 | 205 |
| 28.6 | 206 |
| 28.6 | 207 |
| 28.6 | 206 |
| 29.1 | 206 |
| 29.1 | 208 |
| 29.1 | 207 |
| 29.1 | 209 |
| 28.95 | 209 |
| 28.95 | 207 |
| 28.95 | 209 |
| 29.5 | 209 |
| 29.5 | 212 |
| 29.5 | 214 |
| 29.5 | 215 |
| 30.8 | 215 |
| 30.8 | 216 |
| 30.8 | 217 |
| 30.8 | 218 |
| 32.25 | 218 |
| 32.25 | 220 |
| 32.25 | 221 |
| 33.55 | 221 |
| 33.55 | 218 |
| 33.55 | 223 |
| 34.65 | 223 |
| 34.65 | 225 |
| 34.65 | 226 |
| 35.55 | 226 |
| 35.55 | 229 |
| 35.55 | 228 |
| 35.55 | 226 |
| 36.35 | 226 |
| 36.35 | 232 |
| 36.35 | 230 |

-continued

| Sensor 10 | |
|---|---|
| pressure | resistance |
| 37.55 | 230 |
| 37.55 | 234 |
| 38.3 | 234 |
| 38.3 | 231 |
| 38.3 | 235 |
| 38.75 | 235 |
| 38.75 | 238 |
| 38.75 | 235 |
| 39.45 | 235 |
| 39.45 | 241 |
| 39.45 | 240 |
| 39.45 | 242 |
| 40.75 | 242 |
| 40.75 | 241 |
| 40.75 | 242 |
| 41.35 | 242 |
| 41.35 | 243 |
| 41.35 | 249 |
| 41.35 | 243 |
| 41.35 | 242 |
| 41.05 | 242 |
| 41.05 | 244 |
| 41.05 | 245 |
| 41.4 | 245 |
| 41.4 | 246 |
| 41.4 | 247 |
| 42.35 | 247 |
| 42.35 | 249 |
| 42.35 | 250 |
| 43.55 | 250 |
| 43.55 | 252 |
| 44.6 | 252 |
| 44.6 | 251 |
| 44.6 | 252 |
| 45.25 | 252 |
| 45.25 | 253 |
| 45.25 | 251 |
| 45.25 | 255 |
| 45.5 | 255 |
| 45.5 | 254 |
| 45.5 | 257 |
| 45.5 | 249 |
| 45.5 | 257 |
| 46.55 | 257 |
| 46.55 | 256 |
| 46.55 | 257 |
| 46.55 | 258 |
| 47.4 | 258 |
| 47.4 | 252 |
| 47.4 | 257 |
| 47.4 | 263 |
| 47.85 | 263 |
| 47.85 | 261 |
| 47.85 | 262 |
| 47.85 | 263 |
| 48.3 | 263 |
| 48.3 | 254 |
| 48.3 | 263 |
| 48.8 | 263 |
| 48.8 | 264 |
| 48.75 | 264 |
| 48.75 | 263 |
| 48.75 | 265 |
| 48.75 | 266 |
| 49.6 | 266 |
| 49.6 | 265 |
| 49.6 | 266 |
| 49.6 | 267 |
| 50.3 | 267 |
| 50.3 | 266 |
| 50.3 | 270 |
| 50.65 | 270 |
| 50.65 | 271 |
| 50.65 | 270 |
| 51.85 | 270 |

-continued

| Sensor 10 | |
|---|---|
| pressure | resistance |
| 51.85 | 273 |
| 51.85 | 272 |
| 51.85 | 275 |
| 53.15 | 275 |
| 53.15 | 273 |
| 53.15 | 275 |
| 53.15 | 277 |
| 54.05 | 277 |
| 54.05 | 275 |
| 54.05 | 277 |
| 54.8 | 277 |
| 54.8 | 276 |
| 55.8 | 276 |
| 55.8 | 281 |
| 56.75 | 281 |
| 56.75 | 284 |
| 56.75 | 277 |
| 56.75 | 281 |
| 57.3 | 281 |
| 57.3 | 280 |
| 57.3 | 282 |
| 57.3 | 283 |
| 57.35 | 283 |
| 57.35 | 284 |
| 57.35 | 289 |
| 57.9 | 289 |
| 57.9 | 285 |
| 57.9 | 287 |
| 58.7 | 287 |
| 58.7 | 286 |
| 59.15 | 286 |
| 59.15 | 285 |
| 59.15 | 287 |
| 59.4 | 287 |
| 59.4 | 288 |
| 59.4 | 291 |
| 59.4 | 290 |
| 60.35 | 290 |
| 60.35 | 291 |
| 60.35 | 292 |
| 60.35 | 293 |
| 61.8 | 293 |
| 61.8 | 291 |
| 61.8 | 296 |
| 61.8 | 295 |
| 63 | 295 |
| 63 | 296 |
| 63 | 293 |
| 64 | 293 |
| 64 | 298 |
| 64 | 299 |
| 65.2 | 299 |
| 65.2 | 298 |
| 65.2 | 301 |
| 65.2 | 306 |
| 66.55 | 306 |
| 66.55 | 301 |
| 66.8 | 301 |
| 66.8 | 303 |
| 66.8 | 302 |
| 66.55 | 302 |
| 66.55 | 303 |
| 66.55 | 302 |
| 66.55 | 304 |
| 66.55 | 304 |
| 66.55 | 298 |
| 66.55 | 305 |
| 66.55 | 309 |
| 68 | 309 |
| 68 | 308 |
| 68 | 309 |
| 70.05 | 309 |
| 70.05 | 311 |
| 70.95 | 311 |
| 70.95 | 309 |

-continued

| Sensor 10 | |
|---|---|
| pressure | resistance |
| 70.95 | 310 |
| 70.95 | 311 |
| 71 | 311 |
| 71 | 313 |
| 71.65 | 313 |
| 71.65 | 319 |
| 71.65 | 315 |
| 71.65 | 318 |
| 73.45 | 318 |
| 73.45 | 316 |
| 73.45 | 318 |
| 73.45 | 314 |
| 75.05 | 314 |
| 75.05 | 316 |
| 75.05 | 317 |
| 75.3 | 317 |
| 75.3 | 321 |
| 75.3 | 318 |
| 75.8 | 318 |
| 75.8 | 319 |
| 75.8 | 323 |
| 75.8 | 319 |
| 75.8 | 320 |
| 77.4 | 320 |
| 77.4 | 325 |
| 77.4 | 326 |
| 80.05 | 326 |
| 80.05 | 325 |
| 80.05 | 326 |
| 82 | 326 |
| 82 | 327 |
| 82 | 329 |
| 82 | 330 |
| 83.7 | 330 |
| 83.7 | 331 |
| 83.7 | 330 |
| 84.2 | 330 |
| 84.2 | 331 |
| 84.2 | 334 |
| 85.65 | 334 |
| 85.65 | 335 |
| 85.65 | 332 |
| 85.65 | 336 |
| 86.6 | 336 |
| 86.6 | 334 |
| 86.6 | 335 |
| 86.6 | 337 |
| 88.7 | 337 |
| 88.7 | 338 |
| 88.7 | 342 |
| 89.55 | 342 |
| 89.55 | 340 |
| 89.55 | 341 |
| 91.35 | 341 |
| 92.25 | 341 |
| 92.25 | 343 |
| 92.25 | 344 |
| 92.25 | 345 |
| 93.85 | 345 |
| 93.85 | 344 |
| 93.85 | 345 |
| 94.6 | 345 |
| 94.6 | 346 |
| 94.6 | 347 |
| 94.6 | 348 |
| 96 | 348 |
| 96 | 347 |
| 96 | 348 |
| 96.75 | 348 |
| 96.75 | 349 |
| 98.15 | 349 |
| 98.15 | 351 |
| 99.2 | 351 |
| 99.2 | 352 |
| 99.2 | 353 |

-continued

| Sensor 10 | |
|---|---|
| pressure | resistance |
| 100.3 | 353 |
| 100.3 | 352 |
| 100.3 | 354 |
| 101.2 | 354 |
| 101.2 | 356 |
| 101.2 | 355 |
| 101.2 | 356 |
| 102.55 | 356 |
| 102.55 | 357 |
| 102.55 | 355 |
| 102.55 | 356 |
| 102.55 | 356 |
| 104 | 356 |
| 104 | 357 |
| 104 | 356 |
| 104.5 | 356 |
| 104.5 | 357 |
| 104.5 | 356 |
| 104.5 | 358 |
| 104.15 | 358 |
| 104.15 | 356 |
| 104.15 | 358 |
| 104.15 | 359 |
| 103.9 | 359 |
| 103.9 | 358 |
| 103.9 | 359 |
| 104.8 | 359 |
| 104.8 | 360 |
| 104.8 | 362 |
| 104.8 | 359 |
| 104.8 | 358 |
| 104.4 | 358 |
| 104.4 | 357 |
| 101.05 | 357 |
| 101.05 | 355 |
| 101.05 | 350 |
| 96.4 | 350 |
| 96.4 | 353 |
| 96.4 | 352 |
| 91.9 | 352 |
| 91.9 | 350 |
| 91.9 | 347 |
| 91.9 | 349 |
| 87.95 | 349 |
| 87.95 | 346 |
| 85 | 346 |
| 85 | 349 |
| 85 | 347 |
| 83.2 | 347 |
| 83.2 | 346 |
| 83.2 | 345 |
| 80.8 | 345 |
| 80.8 | 346 |
| 80.8 | 340 |
| 77.7 | 340 |
| 77.7 | 339 |
| 77.7 | 338 |
| 77.7 | 335 |
| 74.2 | 335 |
| 74.2 | 334 |
| 74.2 | 329 |
| 70.1 | 329 |
| 70.1 | 328 |
| 70.1 | 325 |
| 66.45 | 325 |
| 66.45 | 329 |
| 66.45 | 328 |
| 64.5 | 328 |
| 64.5 | 327 |
| 64.5 | 326 |
| 64.5 | 325 |
| 63.7 | 325 |
| 63.7 | 326 |
| 63.7 | 324 |
| 63.7 | 326 |

-continued

| Sensor 10 | |
|---|---|
| pressure | resistance |
| 62.75 | 326 |
| 62.75 | 325 |
| 62.75 | 323 |
| 61.8 | 323 |
| 61.8 | 324 |
| 61.8 | 321 |
| 61.8 | 322 |
| 61.8 | 321 |
| 60.4 | 321 |
| 60.4 | 319 |
| 58.85 | 319 |
| 58.85 | 315 |
| 58.85 | 313 |
| 58.85 | 312 |
| 57 | 312 |
| 57 | 310 |
| 57 | 304 |
| 54.25 | 304 |
| 54.25 | 306 |
| 54.25 | 305 |
| 51.55 | 305 |
| 51.55 | 309 |
| 51.55 | 304 |
| 51.55 | 306 |
| 49.95 | 306 |
| 49.95 | 302 |
| 49.95 | 300 |
| 48.7 | 300 |
| 48.7 | 297 |
| 48.7 | 299 |
| 47.3 | 299 |
| 47.3 | 295 |
| 47.3 | 297 |
| 47.3 | 294 |
| 45.85 | 294 |
| 45.85 | 295 |
| 45.85 | 289 |
| 45.85 | 287 |
| 45.85 | 286 |
| 43.9 | 286 |
| 43.9 | 285 |
| 43.9 | 283 |
| 41.8 | 283 |
| 41.8 | 282 |
| 41.8 | 280 |
| 39.75 | 280 |
| 39.75 | 281 |
| 39.75 | 276 |
| 39.75 | 271 |
| 38.05 | 271 |
| 38.05 | 275 |
| 38.05 | 272 |
| 38.05 | 269 |
| 36.1 | 269 |
| 36.1 | 266 |
| 36.1 | 268 |
| 34.25 | 268 |
| 34.25 | 267 |
| 33 | 267 |
| 33 | 265 |
| 33 | 264 |
| 33 | 261 |
| 33 | 263 |
| 32.05 | 263 |
| 32.05 | 261 |
| 32.05 | 260 |
| 32.05 | 261 |
| 30.9 | 261 |
| 30.9 | 259 |
| 30.9 | 258 |
| 29.9 | 258 |
| 29.9 | 257 |
| 29.9 | 252 |
| 29.9 | 255 |
| 29 | 255 |

-continued

| Sensor 10 | |
|---|---|
| pressure | resistance |
| 29 | 254 |
| 28.25 | 254 |
| 28.25 | 256 |
| 28.25 | 253 |
| 27.6 | 253 |
| 27.6 | 252 |
| 27.6 | 251 |
| 27.6 | 247 |
| 27 | 247 |
| 27 | 250 |
| 27 | 249 |
| 26.1 | 249 |
| 26.1 | 246 |
| 26.1 | 247 |
| 26.1 | 246 |
| 26.1 | 243 |
| 25.25 | 243 |
| 25.25 | 245 |
| 25.25 | 244 |
| 24.5 | 244 |
| 24.5 | 243 |
| 24.5 | 242 |
| 24.5 | 243 |
| 23.9 | 243 |
| 23.9 | 245 |
| 23.9 | 241 |
| 23.9 | 242 |
| 23.35 | 242 |
| 23.35 | 237 |
| 23.35 | 239 |
| 23.35 | 238 |
| 22.85 | 238 |
| 22.85 | 237 |
| 22.85 | 235 |
| 22.85 | 236 |
| 22.05 | 236 |
| 22.05 | 232 |
| 22.05 | 231 |
| 22.05 | 232 |
| 21 | 232 |
| 21 | 229 |
| 21 | 226 |
| 21 | 224 |
| 19.65 | 224 |
| 19.65 | 223 |
| 19.65 | 220 |
| 19.65 | 216 |
| 18.3 | 216 |
| 18.3 | 218 |
| 18.3 | 216 |
| 17.1 | 216 |
| 17.1 | 214 |
| 17.1 | 215 |
| 17.1 | 214 |
| 16.35 | 214 |
| 16.35 | 211 |
| 16.35 | 210 |
| 15.75 | 210 |
| 15.75 | 209 |
| 15.75 | 208 |
| 15.1 | 208 |
| 15.1 | 205 |
| 15.1 | 204 |
| 14.5 | 204 |
| 14.5 | 203 |
| 14.5 | 204 |
| 14.5 | 200 |
| 13.9 | 200 |
| 13.9 | 196 |
| 13.9 | 194 |
| 13.9 | 196 |
| 13.1 | 196 |
| 13.1 | 195 |
| 13.1 | 194 |
| 13.1 | 193 |

-continued

| Sensor 10 | |
|---|---|
| pressure | resistance |
| 13.1 | 189 |
| 12.1 | 189 |
| 12.1 | 188 |
| 12.1 | 186 |
| 12.1 | 184 |
| 11.3 | 184 |
| 11.3 | 183 |
| 11.3 | 181 |
| 11.3 | 178 |
| 10.5 | 178 |
| 10.5 | 180 |
| 10.5 | 174 |
| 10.5 | 172 |
| 9.7 | 172 |
| 9.7 | 170 |
| 9.7 | 169 |
| 8.85 | 169 |
| 8.85 | 168 |
| 8.85 | 165 |
| 8.15 | 165 |
| 8.15 | 158 |
| 8.15 | 153 |
| 8.15 | 155 |
| 7.4 | 155 |
| 7.4 | 148 |
| 7.4 | 147 |
| 7.4 | 148 |
| 6.4 | 148 |
| 6.4 | 144 |
| 6.4 | 139 |
| 6.4 | 136 |
| 6.4 | 126 |
| 5.4 | 126 |
| 5.4 | 122 |
| 5.4 | 118 |
| 4.35 | 118 |
| 4.35 | 116 |
| 4.35 | 111 |
| 4.35 | 107 |
| 3.45 | 107 |
| 3.45 | 104 |
| 3.45 | 103 |
| 3.45 | 96 |
| 2.8 | 96 |
| 2.8 | 90 |
| 2.8 | 80 |
| 2.8 | 77 |
| 2.05 | 77 |
| 2.05 | 74 |
| 2.05 | 73 |
| 2.05 | 71 |
| 1.5 | 71 |
| 1.5 | 73 |
| 1.25 | 73 |
| 1.25 | 74 |
| 1.25 | 73 |
| 1.3 | 73 |
| 1.3 | 69 |
| 1.3 | 59 |
| 1.3 | 44 |
| 1.05 | 44 |
| 1.05 | 37 |
| 1.05 | 28 |
| 1.05 | 21 |
| 1.05 | 19 |
| 0.6 | 19 |
| 0.6 | 15 |
| 0.6 | 16 |
| 0.6 | 14 |
| 0.2 | 14 |
| 0.2 | 12 |
| 0.2 | 17 |
| 0.2 | 16 |
| 0.05 | 16 |
| 0.05 | 15 |

-continued

| Sensor 10 | |
|---|---|
| pressure | resistance |
| 0.05 | 14 |
| 0.05 | 15 |
| 0.05 | 15 |
| 0.05 | 14 |
| 0.05 | 17 |
| 0.05 | 14 |
| 0.05 | 14 |
| 0.05 | 13 |
| 0.05 | 13 |
| 0.05 | 12 |
| 0.05 | 13 |
| 0.05 | 13 |
| 0.05 | 15 |
| 0.05 | 13 |
| 0.05 | 13 |
| 0.05 | 11 |
| 0.05 | 13 |
| 0.05 | 12 |
| 0.05 | 12 |
| 0.05 | 11 |
| 0.05 | 10 |
| 0.05 | 14 |
| 0.05 | 14 |
| 0.05 | 13 |
| 0.05 | 11 |
| 0.05 | 11 |
| 0.05 | 12 |
| 0.05 | 11 |
| 0.05 | 11 |
| 0.05 | 10 |
| 0.05 | 11 |
| 0.05 | 11 |
| 0.05 | 12 |
| 0.05 | 12 |
| 0.05 | 11 |
| 0.05 | 12 |

| Sensor 11 | |
|---|---|
| pressure | resistance |
| 0.05 | 3 |
| 0.1 | 3 |
| 0.1 | 6 |
| 0.1 | 11 |
| 0.1 | 12 |
| 0.2 | 12 |
| 0.2 | 14 |
| 0.2 | 16 |
| 0.35 | 16 |
| 0.35 | 19 |
| 0.35 | 20 |
| 0.5 | 20 |
| 0.5 | 22 |
| 0.5 | 26 |
| 0.7 | 26 |
| 0.7 | 28 |
| 0.7 | 30 |
| 0.7 | 31 |
| 0.9 | 31 |
| 0.9 | 33 |
| 1.1 | 33 |
| 1.1 | 39 |
| 1.1 | 44 |
| 1.4 | 44 |
| 1.4 | 47 |
| 1.4 | 49 |
| 1.4 | 51 |
| 1.9 | 51 |
| 1.9 | 53 |
| 1.9 | 54 |
| 1.9 | 60 |

-continued

| Sensor 11 | |
|---|---|
| pressure | resistance |
| 2.45 | 60 |
| 2.45 | 58 |
| 2.45 | 61 |
| 2.45 | 63 |
| 3 | 63 |
| 3 | 64 |
| 3 | 68 |
| 3 | 69 |
| 3.65 | 69 |
| 3.65 | 72 |
| 3.65 | 74 |
| 3.65 | 75 |
| 4.45 | 75 |
| 4.45 | 76 |
| 4.45 | 83 |
| 4.45 | 85 |
| 5.35 | 85 |
| 5.35 | 87 |
| 5.35 | 89 |
| 5.35 | 92 |
| 5.35 | 94 |
| 6.35 | 94 |
| 6.35 | 96 |
| 6.35 | 97 |
| 6.35 | 102 |
| 7.4 | 102 |
| 7.4 | 106 |
| 7.4 | 104 |
| 7.4 | 108 |
| 8.5 | 108 |
| 8.5 | 111 |
| 8.5 | 113 |
| 8.5 | 115 |
| 9.65 | 115 |
| 9.65 | 116 |
| 9.65 | 119 |
| 10.6 | 119 |
| 10.6 | 120 |
| 10.6 | 122 |
| 10.6 | 124 |
| 11.5 | 124 |
| 11.5 | 128 |
| 11.5 | 127 |
| 11.5 | 130 |
| 12.4 | 130 |
| 12.4 | 135 |
| 13.3 | 135 |
| 13.3 | 130 |
| 13.3 | 137 |
| 13.3 | 139 |
| 13.3 | 140 |
| 14.15 | 140 |
| 14.15 | 141 |
| 14.15 | 142 |
| 14.95 | 142 |
| 14.95 | 144 |
| 14.95 | 145 |
| 14.95 | 148 |
| 15.75 | 148 |
| 15.75 | 152 |
| 16.75 | 152 |
| 16.75 | 155 |
| 16.75 | 158 |
| 18.15 | 158 |
| 18.15 | 159 |
| 18.15 | 158 |
| 18.15 | 163 |
| 19.25 | 163 |
| 19.25 | 161 |
| 19.25 | 162 |
| 19.25 | 164 |
| 19.25 | 166 |
| 20 | 166 |
| 20 | 168 |
| 20 | 171 |

-continued

| Sensor 11 | |
|---|---|
| pressure | resistance |
| 20.75 | 171 |
| 20.75 | 176 |
| 21.8 | 176 |
| 21.8 | 174 |
| 21.8 | 177 |
| 21.8 | 178 |
| 22.8 | 178 |
| 22.8 | 179 |
| 22.8 | 181 |
| 23.45 | 181 |
| 23.45 | 180 |
| 23.45 | 183 |
| 23.45 | 184 |
| 24.1 | 184 |
| 24.1 | 185 |
| 24.1 | 184 |
| 24.6 | 184 |
| 24.6 | 186 |
| 24.6 | 188 |
| 25.2 | 188 |
| 25.2 | 190 |
| 25.2 | 189 |
| 25.2 | 191 |
| 25.9 | 191 |
| 25.9 | 193 |
| 25.9 | 195 |
| 26.8 | 195 |
| 26.8 | 194 |
| 27.55 | 194 |
| 27.55 | 198 |
| 27.55 | 201 |
| 27.55 | 200 |
| 28.3 | 200 |
| 28.3 | 201 |
| 28.3 | 205 |
| 28.3 | 203 |
| 29.2 | 203 |
| 29.2 | 200 |
| 29.2 | 201 |
| 29.2 | 203 |
| 29.55 | 203 |
| 29.55 | 205 |
| 29.55 | 211 |
| 30 | 211 |
| 30 | 207 |
| 30 | 208 |
| 30 | 207 |
| 30.4 | 207 |
| 30.4 | 206 |
| 30.4 | 209 |
| 31.3 | 209 |
| 31.3 | 211 |
| 31.3 | 213 |
| 31.55 | 213 |
| 31.55 | 212 |
| 31.55 | 214 |
| 31.9 | 214 |
| 31.9 | 213 |
| 31.9 | 216 |
| 32.35 | 216 |
| 32.35 | 217 |
| 32.35 | 218 |
| 32.35 | 219 |
| 33.45 | 219 |
| 33.45 | 218 |
| 33.45 | 221 |
| 34.25 | 221 |
| 34.25 | 218 |
| 34.25 | 222 |
| 35.15 | 222 |
| 35.15 | 223 |
| 35.15 | 226 |
| 36.4 | 226 |
| 36.4 | 225 |
| 36.4 | 226 |

-continued

| Sensor 11 | |
|---|---|
| pressure | resistance |
| 36.4 | 230 |
| 37.5 | 230 |
| 37.5 | 231 |
| 37.5 | 232 |
| 38.6 | 232 |
| 38.6 | 233 |
| 38.6 | 235 |
| 38.6 | 234 |
| 39.6 | 234 |
| 39.6 | 236 |
| 39.6 | 239 |
| 39.6 | 236 |
| 40.2 | 236 |
| 40.2 | 237 |
| 40.2 | 238 |
| 40.35 | 238 |
| 40.35 | 235 |
| 40.35 | 237 |
| 40.35 | 239 |
| 40.3 | 239 |
| 40.3 | 240 |
| 40.3 | 241 |
| 40.9 | 241 |
| 40.9 | 242 |
| 41.8 | 242 |
| 41.8 | 240 |
| 41.8 | 245 |
| 43.05 | 245 |
| 43.05 | 246 |
| 43.05 | 248 |
| 43.05 | 252 |
| 43.05 | 248 |
| 44.15 | 248 |
| 44.15 | 247 |
| 44.15 | 250 |
| 44.85 | 250 |
| 44.85 | 248 |
| 44.85 | 252 |
| 44.85 | 256 |
| 45.3 | 256 |
| 45.3 | 252 |
| 45.3 | 254 |
| 45.3 | 252 |
| 45.95 | 252 |
| 45.95 | 254 |
| 45.95 | 257 |
| 45.95 | 255 |
| 46.95 | 255 |
| 46.95 | 258 |
| 46.95 | 257 |
| 47.55 | 257 |
| 47.55 | 258 |
| 47.55 | 257 |
| 47.55 | 258 |
| 48.4 | 258 |
| 48.4 | 260 |
| 48.4 | 262 |
| 48.4 | 259 |
| 48.65 | 259 |
| 48.65 | 261 |
| 48.65 | 263 |
| 48.65 | 261 |
| 48.65 | 264 |
| 49.4 | 264 |
| 49.4 | 263 |
| 49.4 | 265 |
| 49.95 | 265 |
| 49.95 | 264 |
| 49.95 | 267 |
| 49.95 | 269 |
| 50.85 | 269 |
| 50.85 | 268 |
| 50.85 | 267 |
| 50.85 | 268 |
| 51.25 | 268 |

-continued

| Sensor 11 | |
|---|---|
| pressure | resistance |
| 51.25 | 269 |
| 51.8 | 269 |
| 51.8 | 271 |
| 51.8 | 273 |
| 52.6 | 273 |
| 52.6 | 274 |
| 52.6 | 273 |
| 52.6 | 275 |
| 54.15 | 275 |
| 54.15 | 273 |
| 54.15 | 277 |
| 54.15 | 276 |
| 55.35 | 276 |
| 55.35 | 277 |
| 55.35 | 276 |
| 55.35 | 279 |
| 55.35 | 277 |
| 55.9 | 277 |
| 55.9 | 278 |
| 55.9 | 281 |
| 55.9 | 283 |
| 56.25 | 283 |
| 56.25 | 284 |
| 56.25 | 283 |
| 56.25 | 284 |
| 57.35 | 284 |
| 57.35 | 282 |
| 57.35 | 284 |
| 58.3 | 284 |
| 58.3 | 286 |
| 58.3 | 284 |
| 58.3 | 285 |
| 58.2 | 285 |
| 58.2 | 286 |
| 58.2 | 287 |
| 58.6 | 287 |
| 58.6 | 289 |
| 58.6 | 291 |
| 59.65 | 291 |
| 59.65 | 289 |
| 59.65 | 290 |
| 59.65 | 287 |
| 60.5 | 287 |
| 60.5 | 288 |
| 60.5 | 292 |
| 60.5 | 293 |
| 61.2 | 293 |
| 61.2 | 291 |
| 61.2 | 293 |
| 61.2 | 294 |
| 61.95 | 294 |
| 61.95 | 291 |
| 61.95 | 302 |
| 61.95 | 294 |
| 62.05 | 294 |
| 62.05 | 296 |
| 62.05 | 297 |
| 62.45 | 297 |
| 62.45 | 301 |
| 63.3 | 301 |
| 63.3 | 299 |
| 63.3 | 300 |
| 63.3 | 296 |
| 64 | 296 |
| 64 | 301 |
| 64 | 302 |
| 64 | 301 |
| 64.35 | 301 |
| 64.35 | 302 |
| 64.9 | 302 |
| 64.9 | 303 |
| 64.9 | 304 |
| 64.9 | 305 |
| 66 | 305 |
| 66 | 306 |

-continued

| Sensor 11 | |
|---|---|
| pressure | resistance |
| 66 | 301 |
| 66 | 305 |
| 67.2 | 305 |
| 67.2 | 310 |
| 67.2 | 307 |
| 68.4 | 307 |
| 68.4 | 304 |
| 68.4 | 309 |
| 68.4 | 308 |
| 68.85 | 308 |
| 68.85 | 309 |
| 68.9 | 309 |
| 68.9 | 310 |
| 68.9 | 312 |
| 69.85 | 312 |
| 69.85 | 313 |
| 69.85 | 314 |
| 71.15 | 314 |
| 71.15 | 313 |
| 71.15 | 314 |
| 71.15 | 316 |
| 72.05 | 316 |
| 72.05 | 318 |
| 72.05 | 319 |
| 72.05 | 317 |
| 73.2 | 317 |
| 73.2 | 318 |
| 73.2 | 319 |
| 74.2 | 319 |
| 74.2 | 321 |
| 74.5 | 321 |
| 74.5 | 322 |
| 74.5 | 323 |
| 75.35 | 323 |
| 75.35 | 324 |
| 75.35 | 327 |
| 76.9 | 327 |
| 76.9 | 326 |
| 76.9 | 327 |
| 77.8 | 327 |
| 77.8 | 326 |
| 77.8 | 327 |
| 77.8 | 330 |
| 79.25 | 330 |
| 79.25 | 329 |
| 79.25 | 330 |
| 80.1 | 330 |
| 80.1 | 331 |
| 80.1 | 332 |
| 80.1 | 333 |
| 81.6 | 333 |
| 81.6 | 332 |
| 81.6 | 331 |
| 81.6 | 333 |
| 82.5 | 333 |
| 82.5 | 334 |
| 82.5 | 336 |
| 83.95 | 336 |
| 83.95 | 337 |
| 83.95 | 339 |
| 84.8 | 339 |
| 84.8 | 338 |
| 84.8 | 339 |
| 85.9 | 339 |
| 85.9 | 338 |
| 85.9 | 343 |
| 85.9 | 341 |
| 87.15 | 341 |
| 87.15 | 342 |
| 87.15 | 343 |
| 88.9 | 343 |
| 88.9 | 342 |
| 88.9 | 345 |
| 88.9 | 344 |
| 89.85 | 344 |

-continued

| Sensor 11 | |
|---|---|
| pressure | resistance |
| 89.85 | 343 |
| 89.85 | 344 |
| 89.85 | 345 |
| 90 | 345 |
| 90 | 347 |
| 90.35 | 347 |
| 90.35 | 345 |
| 90.35 | 346 |
| 90.35 | 349 |
| 90.9 | 349 |
| 90.9 | 350 |
| 90.9 | 351 |
| 90.9 | 350 |
| 92.25 | 350 |
| 92.25 | 349 |
| 92.25 | 350 |
| 92.25 | 349 |
| 92.9 | 349 |
| 92.9 | 351 |
| 92.9 | 352 |
| 94.3 | 352 |
| 94.3 | 353 |
| 94.3 | 357 |
| 94.3 | 354 |
| 95.4 | 354 |
| 95.4 | 355 |
| 95.4 | 357 |
| 95.4 | 355 |
| 96.8 | 355 |
| 96.8 | 356 |
| 96.8 | 358 |
| 97.6 | 358 |
| 97.6 | 355 |
| 97.6 | 356 |
| 97.6 | 359 |
| 98 | 359 |
| 98 | 356 |
| 98 | 359 |
| 98 | 356 |
| 98.65 | 356 |
| 98.65 | 361 |
| 98.65 | 359 |
| 98.65 | 360 |
| 99.85 | 360 |
| 100.8 | 360 |
| 100.8 | 361 |
| 100.8 | 358 |
| 101.1 | 358 |
| 101.1 | 362 |
| 101.1 | 361 |
| 101.1 | 361 |
| 101.1 | 362 |
| 100.9 | 362 |
| 100.9 | 363 |
| 100.9 | 363 |
| 100.9 | 362 |
| 100.7 | 362 |
| 100.7 | 363 |
| 100.7 | 362 |
| 100.65 | 362 |
| 100.65 | 364 |
| 100.65 | 363 |
| 100.65 | 362 |
| 100.6 | 362 |
| 100.6 | 364 |
| 100.6 | 365 |
| 101.7 | 365 |
| 101.7 | 366 |
| 102.1 | 366 |
| 102.1 | 365 |
| 102.1 | 363 |
| 102.1 | 364 |
| 100.75 | 364 |
| 100.75 | 363 |
| 100.75 | 359 |

-continued

| Sensor 11 | |
|---|---|
| pressure | resistance |
| 97.2 | 359 |
| 97.2 | 360 |
| 97.2 | 358 |
| 97.2 | 355 |
| 93.15 | 355 |
| 93.15 | 357 |
| 93.15 | 356 |
| 93.15 | 357 |
| 93.15 | 354 |
| 88.05 | 354 |
| 88.05 | 351 |
| 83.9 | 351 |
| 83.9 | 348 |
| 83.9 | 352 |
| 83.9 | 347 |
| 80.05 | 347 |
| 80.05 | 346 |
| 80.05 | 345 |
| 80.05 | 342 |
| 76.55 | 342 |
| 76.55 | 340 |
| 76.55 | 338 |
| 72.7 | 338 |
| 72.7 | 336 |
| 72.7 | 333 |
| 72.7 | 332 |
| 68.4 | 332 |
| 68.4 | 329 |
| 68.4 | 332 |
| 68.4 | 331 |
| 64.95 | 331 |
| 64.95 | 330 |
| 64.95 | 329 |
| 62.85 | 329 |
| 62.85 | 327 |
| 62.85 | 330 |
| 62.85 | 328 |
| 62.85 | 326 |
| 61.7 | 326 |
| 61.7 | 327 |
| 61.7 | 325 |
| 60.5 | 325 |
| 60.5 | 324 |
| 60.5 | 323 |
| 59 | 323 |
| 59 | 320 |
| 59 | 319 |
| 57.1 | 319 |
| 57.1 | 317 |
| 57.1 | 316 |
| 57.1 | 314 |
| 55.05 | 314 |
| 55.05 | 315 |
| 55.05 | 312 |
| 55.05 | 310 |
| 52.95 | 310 |
| 52.95 | 309 |
| 52.95 | 307 |
| 50.75 | 307 |
| 50.75 | 306 |
| 50.75 | 305 |
| 48.9 | 305 |
| 48.9 | 301 |
| 48.9 | 302 |
| 48.9 | 301 |
| 48.9 | 302 |
| 47.55 | 302 |
| 47.55 | 301 |
| 47.55 | 302 |
| 47.55 | 303 |
| 46.6 | 303 |
| 46.6 | 299 |
| 46.6 | 297 |
| 45.55 | 297 |
| 45.55 | 296 |

-continued

| Sensor 11 | |
|---|---|
| pressure | resistance |
| 44.5 | 296 |
| 44.5 | 293 |
| 44.5 | 292 |
| 44.5 | 289 |
| 42.95 | 289 |
| 42.95 | 291 |
| 42.95 | 287 |
| 42.95 | 284 |
| 41.2 | 284 |
| 41.2 | 285 |
| 41.2 | 283 |
| 39.45 | 283 |
| 39.45 | 281 |
| 39.45 | 282 |
| 39.45 | 281 |
| 38.35 | 281 |
| 38.35 | 279 |
| 38.35 | 276 |
| 37.1 | 276 |
| 37.1 | 274 |
| 37.1 | 272 |
| 37.1 | 271 |
| 35.65 | 271 |
| 35.65 | 267 |
| 35.65 | 268 |
| 34.3 | 268 |
| 34.3 | 269 |
| 33.5 | 269 |
| 33.5 | 268 |
| 33.5 | 263 |
| 32.85 | 263 |
| 32.85 | 260 |
| 32.85 | 259 |
| 31.4 | 259 |
| 31.4 | 258 |
| 31.4 | 256 |
| 29.8 | 256 |
| 29.8 | 257 |
| 29.8 | 255 |
| 29.8 | 254 |
| 28.8 | 254 |
| 28.8 | 255 |
| 28.8 | 253 |
| 28.8 | 251 |
| 28.2 | 251 |
| 28.2 | 250 |
| 28.2 | 248 |
| 28.2 | 249 |
| 27.15 | 249 |
| 27.15 | 247 |
| 27.15 | 246 |
| 27.15 | 241 |
| 26.1 | 241 |
| 26.1 | 240 |
| 26.1 | 239 |
| 24.85 | 239 |
| 24.85 | 238 |
| 24.85 | 235 |
| 24.85 | 234 |
| 23.45 | 234 |
| 23.45 | 230 |
| 23.45 | 233 |
| 23.45 | 231 |
| 22.25 | 231 |
| 22.25 | 229 |
| 22.25 | 230 |
| 22.25 | 226 |
| 21.2 | 226 |
| 21.2 | 223 |
| 21.2 | 221 |
| 21.2 | 219 |
| 21.2 | 220 |
| 20.05 | 220 |
| 20.05 | 216 |
| 20.05 | 213 |

-continued

| Sensor 11 | |
|---|---|
| pressure | resistance |
| 18.7 | 213 |
| 18.7 | 210 |
| 18.7 | 212 |
| 18.7 | 210 |
| 17.5 | 210 |
| 17.5 | 207 |
| 17.5 | 205 |
| 17.5 | 201 |
| 16.35 | 201 |
| 16.35 | 202 |
| 16.35 | 198 |
| 15.2 | 198 |
| 15.2 | 199 |
| 15.2 | 195 |
| 15.2 | 196 |
| 14.25 | 196 |
| 14.25 | 194 |
| 14.25 | 195 |
| 14.25 | 190 |
| 13.55 | 190 |
| 13.55 | 189 |
| 13.55 | 190 |
| 13.55 | 189 |
| 12.95 | 189 |
| 12.95 | 185 |
| 12.95 | 184 |
| 12.95 | 187 |
| 12.5 | 187 |
| 12.5 | 181 |
| 12.5 | 184 |
| 12.25 | 184 |
| 12.25 | 179 |
| 12.25 | 176 |
| 12.25 | 175 |
| 11.6 | 175 |
| 11.6 | 176 |
| 11.6 | 174 |
| 11.6 | 173 |
| 10.95 | 173 |
| 10.95 | 171 |
| 10.95 | 168 |
| 10.2 | 168 |
| 10.2 | 166 |
| 10.2 | 162 |
| 10.2 | 160 |
| 9.4 | 160 |
| 9.4 | 156 |
| 9.4 | 154 |
| 9.4 | 152 |
| 8.4 | 152 |
| 8.4 | 150 |
| 8.4 | 147 |
| 8.4 | 146 |
| 7.35 | 146 |
| 7.35 | 139 |
| 7.35 | 138 |
| 7.35 | 137 |
| 6.45 | 137 |
| 6.45 | 133 |
| 6.45 | 129 |
| 6.45 | 125 |
| 6.45 | 122 |
| 5.55 | 122 |
| 5.55 | 113 |
| 5.55 | 110 |
| 5.55 | 108 |
| 4.55 | 108 |
| 4.55 | 106 |
| 4.55 | 101 |
| 3.75 | 101 |
| 3.75 | 97 |
| 3.75 | 93 |
| 3.75 | 90 |
| 3.1 | 90 |
| 3.1 | 89 |

-continued

| Sensor 11 | |
|---|---|
| pressure | resistance |
| 3.1 | 84 |
| 3.1 | 77 |
| 2.5 | 77 |
| 2.5 | 73 |
| 2.5 | 72 |
| 2.5 | 70 |
| 1.95 | 70 |
| 1.95 | 72 |
| 1.95 | 69 |
| 1.95 | 64 |
| 1.55 | 64 |
| 1.55 | 50 |
| 1.55 | 44 |
| 1.55 | 34 |
| 1.55 | 20 |
| 1.05 | 20 |
| 1.05 | 18 |
| 0.55 | 18 |
| 0.55 | 21 |
| 0.55 | 16 |
| 0.55 | 13 |
| 0.25 | 13 |
| 0.25 | 14 |
| 0.25 | 13 |
| 0.25 | 12 |
| 0.15 | 12 |
| 0.15 | 18 |
| 0.15 | 12 |
| 0.05 | 12 |
| 0.05 | 9 |
| 0.05 | 12 |
| 0.05 | 12 |
| 0.05 | 11 |
| 0.05 | 12 |
| 0.05 | 11 |
| 0.05 | 11 |
| 0.05 | 10 |
| 0.05 | 12 |
| 0.05 | 12 |
| 0.05 | 10 |
| 0.05 | 11 |
| 0.05 | 10 |
| 0.05 | 10 |
| 0.05 | 7 |
| 0.05 | 10 |
| 0.05 | 10 |
| 0.05 | 9 |
| 0.05 | 10 |
| 0.05 | 10 |
| 0.05 | 10 |
| 0.05 | 7 |
| 0.05 | 11 |
| 0.05 | 9 |
| 0.05 | 9 |
| 0.05 | 10 |
| 0.05 | 9 |
| 0.05 | 9 |
| 0.05 | 7 |
| 0.05 | 9 |
| 0.05 | 10 |
| 0.05 | 10 |
| 0.05 | 6 |
| 0.05 | 7 |
| 0.05 | 9 |

| Sensor 12 | |
|---|---|
| pressure | resistance |
| 0.05 | 0 |
| 0.05 | 2 |
| 0.05 | 4 |

-continued

| Sensor 12 | |
|---|---|
| pressure | resistance |
| 0.05 | 4 |
| 0.05 | 6 |
| 0.05 | 5 |
| 0.05 | 8 |
| 0.15 | 8 |
| 0.15 | 10 |
| 0.15 | 12 |
| 0.15 | 13 |
| 0.3 | 13 |
| 0.3 | 14 |
| 0.3 | 16 |
| 0.3 | 18 |
| 0.45 | 18 |
| 0.45 | 20 |
| 0.45 | 22 |
| 0.45 | 24 |
| 0.65 | 24 |
| 0.65 | 28 |
| 0.65 | 31 |
| 0.65 | 33 |
| 0.95 | 33 |
| 0.95 | 39 |
| 0.95 | 42 |
| 0.95 | 45 |
| 1.55 | 45 |
| 1.55 | 47 |
| 1.55 | 51 |
| 1.55 | 55 |
| 2.2 | 55 |
| 2.2 | 60 |
| 2.2 | 67 |
| 2.9 | 67 |
| 2.9 | 74 |
| 2.9 | 80 |
| 2.9 | 82 |
| 3.9 | 82 |
| 3.9 | 83 |
| 3.9 | 89 |
| 5.15 | 89 |
| 5.15 | 94 |
| 5.15 | 98 |
| 5.15 | 103 |
| 6.45 | 103 |
| 6.45 | 108 |
| 6.45 | 114 |
| 6.45 | 115 |
| 7.95 | 115 |
| 7.95 | 113 |
| 7.95 | 114 |
| 7.95 | 122 |
| 9.4 | 122 |
| 9.4 | 126 |
| 9.4 | 127 |
| 10.55 | 127 |
| 10.55 | 129 |
| 10.55 | 131 |
| 10.55 | 132 |
| 11.5 | 132 |
| 11.5 | 135 |
| 11.5 | 138 |
| 11.5 | 141 |
| 12.65 | 141 |
| 12.65 | 143 |
| 12.65 | 145 |
| 12.65 | 147 |
| 13.7 | 147 |
| 13.7 | 150 |
| 13.7 | 153 |
| 13.7 | 156 |
| 14.95 | 156 |
| 14.95 | 160 |
| 14.95 | 161 |
| 14.95 | 162 |
| 16.2 | 162 |
| 16.2 | 164 |

-continued

| Sensor 12 | |
|---|---|
| pressure | resistance |
| 16.2 | 167 |
| 17.45 | 167 |
| 17.45 | 170 |
| 17.45 | 177 |
| 17.45 | 174 |
| 18.85 | 174 |
| 18.85 | 180 |
| 20.45 | 180 |
| 20.45 | 184 |
| 20.45 | 185 |
| 20.45 | 187 |
| 21.55 | 187 |
| 21.55 | 189 |
| 21.55 | 190 |
| 21.55 | 192 |
| 22.3 | 192 |
| 22.3 | 194 |
| 22.3 | 196 |
| 22.3 | 198 |
| 23.2 | 198 |
| 23.2 | 197 |
| 23.2 | 194 |
| 23.2 | 199 |
| 24.1 | 199 |
| 24.1 | 198 |
| 24.1 | 201 |
| 24.1 | 202 |
| 24.8 | 202 |
| 24.8 | 204 |
| 24.8 | 206 |
| 25.6 | 206 |
| 25.6 | 209 |
| 26.4 | 209 |
| 26.4 | 211 |
| 26.4 | 213 |
| 26.4 | 214 |
| 27.55 | 214 |
| 27.55 | 219 |
| 27.55 | 216 |
| 27.55 | 217 |
| 28.6 | 217 |
| 28.6 | 218 |
| 28.6 | 217 |
| 29.15 | 217 |
| 29.15 | 219 |
| 29.15 | 221 |
| 29.15 | 220 |
| 29.8 | 220 |
| 29.8 | 223 |
| 29.8 | 224 |
| 29.8 | 225 |
| 30.8 | 225 |
| 30.8 | 226 |
| 30.8 | 227 |
| 30.8 | 225 |
| 31.6 | 225 |
| 31.6 | 228 |
| 31.6 | 229 |
| 31.6 | 231 |
| 32.2 | 231 |
| 32.2 | 233 |
| 33.3 | 233 |
| 33.3 | 235 |
| 33.3 | 237 |
| 34.4 | 237 |
| 34.4 | 239 |
| 34.4 | 241 |
| 35.1 | 241 |
| 35.1 | 243 |
| 35.1 | 244 |
| 35.1 | 245 |
| 36.25 | 245 |
| 36.25 | 246 |
| 36.25 | 247 |
| 37.5 | 247 |

-continued

| Sensor 12 | |
|---|---|
| pressure | resistance |
| 37.5 | 248 |
| 37.5 | 249 |
| 37.5 | 251 |
| 38.5 | 251 |
| 38.5 | 252 |
| 38.5 | 253 |
| 39.2 | 253 |
| 39.2 | 254 |
| 39.55 | 254 |
| 39.55 | 257 |
| 39.55 | 256 |
| 39.8 | 256 |
| 39.8 | 257 |
| 39.8 | 258 |
| 40.3 | 258 |
| 40.3 | 261 |
| 40.3 | 259 |
| 40.3 | 260 |
| 40.3 | 263 |
| 40.9 | 263 |
| 40.9 | 264 |
| 40.9 | 261 |
| 40.9 | 263 |
| 41.75 | 263 |
| 41.75 | 265 |
| 42.45 | 265 |
| 42.45 | 264 |
| 42.45 | 265 |
| 42.45 | 268 |
| 42.85 | 268 |
| 42.85 | 269 |
| 42.85 | 267 |
| 42.85 | 269 |
| 43.45 | 269 |
| 43.45 | 270 |
| 43.45 | 271 |
| 43.95 | 271 |
| 43.95 | 274 |
| 43.95 | 272 |
| 44.45 | 272 |
| 44.45 | 271 |
| 44.45 | 274 |
| 44.45 | 273 |
| 44.95 | 273 |
| 44.95 | 275 |
| 44.95 | 276 |
| 44.95 | 275 |
| 44.95 | 277 |
| 45.55 | 277 |
| 45.55 | 276 |
| 45.55 | 278 |
| 46.05 | 278 |
| 46.05 | 280 |
| 46.05 | 279 |
| 46.05 | 281 |
| 46.35 | 281 |
| 46.35 | 280 |
| 46.35 | 282 |
| 46.35 | 281 |
| 47 | 281 |
| 47 | 284 |
| 47 | 283 |
| 47 | 282 |
| 47.6 | 282 |
| 47.6 | 284 |
| 47.6 | 283 |
| 48.25 | 283 |
| 48.25 | 287 |
| 48.25 | 286 |
| 48.25 | 288 |
| 49.15 | 288 |
| 49.15 | 289 |
| 49.15 | 291 |
| 49.9 | 291 |
| 49.9 | 292 |

-continued

| Sensor 12 | |
|---|---|
| pressure | resistance |
| 49.9 | 291 |
| 50.65 | 291 |
| 50.65 | 293 |
| 50.65 | 292 |
| 50.65 | 295 |
| 51.4 | 295 |
| 51.4 | 292 |
| 51.4 | 294 |
| 51.4 | 296 |
| 52 | 296 |
| 52 | 298 |
| 52 | 301 |
| 52 | 300 |
| 53.3 | 300 |
| 53.3 | 302 |
| 53.3 | 300 |
| 53.95 | 300 |
| 53.95 | 303 |
| 53.95 | 304 |
| 53.95 | 306 |
| 55.45 | 306 |
| 55.45 | 307 |
| 56.2 | 307 |
| 56.2 | 308 |
| 56.2 | 306 |
| 56.2 | 310 |
| 57.15 | 310 |
| 57.15 | 309 |
| 57.15 | 310 |
| 57.3 | 310 |
| 57.3 | 312 |
| 57.3 | 309 |
| 57.3 | 313 |
| 58 | 313 |
| 58 | 314 |
| 58 | 315 |
| 58 | 316 |
| 59.35 | 316 |
| 59.35 | 315 |
| 59.35 | 318 |
| 60.75 | 318 |
| 60.75 | 319 |
| 60.75 | 318 |
| 61.8 | 318 |
| 61.8 | 320 |
| 61.8 | 319 |
| 61.8 | 321 |
| 61.9 | 321 |
| 61.9 | 322 |
| 61.9 | 323 |
| 62.4 | 323 |
| 62.4 | 324 |
| 62.4 | 325 |
| 62.4 | 326 |
| 63.55 | 326 |
| 63.55 | 325 |
| 63.55 | 326 |
| 63.55 | 328 |
| 64.1 | 328 |
| 64.1 | 329 |
| 64.1 | 330 |
| 64.1 | 329 |
| 64.85 | 329 |
| 64.85 | 331 |
| 64.85 | 330 |
| 65.45 | 330 |
| 65.45 | 333 |
| 66.7 | 333 |
| 66.7 | 334 |
| 66.7 | 335 |
| 67.15 | 335 |
| 67.15 | 337 |
| 67.15 | 338 |
| 68.4 | 338 |
| 68.4 | 339 |

-continued

| Sensor 12 | |
|---|---|
| pressure | resistance |
| 69.35 | 339 |
| 69.35 | 343 |
| 69.35 | 342 |
| 69.35 | 341 |
| 69.35 | 343 |
| 70.6 | 343 |
| 70.6 | 344 |
| 70.6 | 345 |
| 71.85 | 345 |
| 71.85 | 346 |
| 71.85 | 344 |
| 71.85 | 348 |
| 72.85 | 348 |
| 72.85 | 347 |
| 72.85 | 350 |
| 73.7 | 350 |
| 73.7 | 351 |
| 74.6 | 351 |
| 74.6 | 354 |
| 75.8 | 354 |
| 75.8 | 353 |
| 75.8 | 354 |
| 75.8 | 355 |
| 76.7 | 355 |
| 76.7 | 354 |
| 76.7 | 357 |
| 78.05 | 357 |
| 78.05 | 358 |
| 78.05 | 359 |
| 78.9 | 359 |
| 78.9 | 360 |
| 78.9 | 361 |
| 80.2 | 361 |
| 80.2 | 359 |
| 80.2 | 363 |
| 80.2 | 365 |
| 81.55 | 365 |
| 82.4 | 365 |
| 82.4 | 366 |
| 82.4 | 368 |
| 83.9 | 368 |
| 83.9 | 369 |
| 84.85 | 369 |
| 84.85 | 368 |
| 85.2 | 368 |
| 85.2 | 370 |
| 85.2 | 371 |
| 85.2 | 372 |
| 85.35 | 372 |
| 85.35 | 375 |
| 85.35 | 373 |
| 85.35 | 374 |
| 86.35 | 374 |
| 86.35 | 375 |
| 86.35 | 376 |
| 86.35 | 377 |
| 88.05 | 377 |
| 88.05 | 376 |
| 88.05 | 378 |
| 88.05 | 377 |
| 88.95 | 377 |
| 88.95 | 379 |
| 88.95 | 380 |
| 88.95 | 379 |
| 90.5 | 379 |
| 90.5 | 380 |
| 90.5 | 382 |
| 91.25 | 382 |
| 91.25 | 381 |
| 91.25 | 382 |
| 91.25 | 381 |
| 92.5 | 381 |
| 92.5 | 384 |
| 92.5 | 383 |
| 92.5 | 384 |

-continued

| Sensor 12 | |
|---|---|
| pressure | resistance |
| 93.3 | 384 |
| 93.3 | 386 |
| 93.3 | 385 |
| 94.55 | 385 |
| 94.55 | 386 |
| 94.55 | 388 |
| 94.55 | 387 |
| 94.55 | 389 |
| 95.8 | 389 |
| 96.8 | 389 |
| 98.05 | 389 |
| 98.05 | 391 |
| 98.05 | 392 |
| 98.9 | 392 |
| 98.9 | 393 |
| 99.5 | 393 |
| 99.5 | 392 |
| 99.5 | 393 |
| 99.7 | 393 |
| 99.7 | 392 |
| 99.7 | 396 |
| 99.7 | 395 |
| 100.3 | 395 |
| 100.3 | 396 |
| 100.3 | 397 |
| 101.3 | 397 |
| 101.3 | 396 |
| 101.3 | 395 |
| 101.3 | 395 |
| 101.3 | 396 |
| 101.65 | 396 |
| 101.65 | 397 |
| 101.65 | 399 |
| 101.65 | 397 |
| 101.45 | 397 |
| 101.45 | 398 |
| 101.45 | 397 |
| 101.2 | 397 |
| 101.2 | 398 |
| 101.2 | 399 |
| 102 | 399 |
| 102 | 401 |
| 102 | 397 |
| 102 | 401 |
| 103.05 | 401 |
| 103.05 | 400 |
| 102.9 | 400 |
| 102.9 | 398 |
| 102.9 | 399 |
| 99.9 | 399 |
| 99.9 | 397 |
| 99.9 | 396 |
| 99.9 | 394 |
| 95.7 | 394 |
| 95.7 | 392 |
| 95.7 | 391 |
| 90.45 | 391 |
| 90.45 | 390 |
| 90.45 | 391 |
| 86.75 | 391 |
| 86.75 | 387 |
| 86.75 | 386 |
| 86.75 | 385 |
| 83.95 | 385 |
| 83.95 | 382 |
| 83.95 | 379 |
| 83.95 | 377 |
| 80.05 | 377 |
| 80.05 | 379 |
| 80.05 | 376 |
| 80.05 | 373 |
| 75.45 | 373 |
| 75.45 | 370 |
| 75.45 | 369 |
| 71.65 | 369 |

-continued

| Sensor 12 | |
|---|---|
| pressure | resistance |
| 71.65 | 368 |
| 71.65 | 367 |
| 68.55 | 367 |
| 68.55 | 366 |
| 68.55 | 367 |
| 68.55 | 366 |
| 66.55 | 366 |
| 66.55 | 372 |
| 66.55 | 365 |
| 66.55 | 362 |
| 65.05 | 362 |
| 65.05 | 363 |
| 65.05 | 361 |
| 63.6 | 361 |
| 63.6 | 359 |
| 63.6 | 358 |
| 61.8 | 358 |
| 61.8 | 357 |
| 61.8 | 356 |
| 61.8 | 355 |
| 60.3 | 355 |
| 60.3 | 354 |
| 60.3 | 352 |
| 60.3 | 350 |
| 58.5 | 350 |
| 58.5 | 349 |
| 58.5 | 347 |
| 58.5 | 345 |
| 56.4 | 345 |
| 56.4 | 342 |
| 56.4 | 341 |
| 56.4 | 343 |
| 54.05 | 343 |
| 54.05 | 342 |
| 54.05 | 341 |
| 54.05 | 338 |
| 54.05 | 339 |
| 52.25 | 339 |
| 52.25 | 335 |
| 52.25 | 334 |
| 52.25 | 333 |
| 50.55 | 333 |
| 50.55 | 332 |
| 50.55 | 330 |
| 48.8 | 330 |
| 48.8 | 329 |
| 47.6 | 329 |
| 47.6 | 327 |
| 47.6 | 324 |
| 46.35 | 324 |
| 46.35 | 320 |
| 46.35 | 318 |
| 46.35 | 319 |
| 44.5 | 319 |
| 44.5 | 317 |
| 44.5 | 316 |
| 44.5 | 317 |
| 42.85 | 317 |
| 42.85 | 316 |
| 41.95 | 316 |
| 41.95 | 315 |
| 41.95 | 314 |
| 41.95 | 312 |
| 41.25 | 312 |
| 41.25 | 310 |
| 41.25 | 307 |
| 41.25 | 308 |
| 40.35 | 308 |
| 40.35 | 305 |
| 39.35 | 305 |
| 39.35 | 300 |
| 39.35 | 301 |
| 38 | 301 |
| 38 | 297 |
| 38 | 293 |

-continued

| Sensor 12 | |
|---|---|
| pressure | resistance |
| 36.3 | 293 |
| 36.3 | 290 |
| 36.3 | 289 |
| 34.45 | 289 |
| 34.45 | 288 |
| 34.45 | 283 |
| 34.45 | 284 |
| 32.85 | 284 |
| 32.85 | 282 |
| 32.85 | 280 |
| 31.3 | 280 |
| 31.3 | 279 |
| 31.3 | 278 |
| 31.3 | 280 |
| 30.05 | 280 |
| 30.05 | 275 |
| 30.05 | 272 |
| 30.05 | 274 |
| 30.05 | 273 |
| 29.15 | 273 |
| 29.15 | 272 |
| 29.15 | 270 |
| 28.3 | 270 |
| 28.3 | 273 |
| 28.3 | 272 |
| 28.3 | 271 |
| 27.7 | 271 |
| 27.7 | 270 |
| 27.7 | 269 |
| 27.2 | 269 |
| 27.2 | 267 |
| 27.2 | 269 |
| 26.6 | 269 |
| 26.6 | 267 |
| 26.6 | 266 |
| 26.6 | 263 |
| 26.05 | 263 |
| 26.05 | 264 |
| 26.05 | 266 |
| 26.05 | 265 |
| 25.75 | 265 |
| 25.75 | 264 |
| 25.75 | 263 |
| 25.5 | 263 |
| 25.5 | 262 |
| 25.5 | 261 |
| 25.5 | 262 |
| 25.5 | 258 |
| 24.95 | 258 |
| 24.95 | 259 |
| 24.95 | 256 |
| 24.95 | 255 |
| 24.1 | 255 |
| 24.1 | 254 |
| 24.1 | 249 |
| 23.3 | 249 |
| 23.3 | 250 |
| 23.3 | 249 |
| 23.3 | 248 |
| 22.3 | 248 |
| 22.3 | 246 |
| 22.3 | 244 |
| 22.3 | 243 |
| 21.15 | 243 |
| 21.15 | 241 |
| 21.15 | 239 |
| 21.15 | 237 |
| 19.8 | 237 |
| 19.8 | 236 |
| 19.8 | 233 |
| 19.8 | 230 |
| 18.45 | 230 |
| 18.45 | 231 |
| 18.45 | 226 |
| 18.45 | 223 |

-continued

| Sensor 12 | |
|---|---|
| pressure | resistance |
| 17.1 | 223 |
| 17.1 | 218 |
| 17.1 | 221 |
| 17.1 | 219 |
| 15.95 | 219 |
| 15.95 | 217 |
| 15.95 | 215 |
| 15.05 | 215 |
| 15.05 | 211 |
| 15.05 | 213 |
| 15.05 | 212 |
| 14.4 | 212 |
| 14.4 | 211 |
| 14.4 | 210 |
| 14.4 | 207 |
| 13.75 | 207 |
| 13.75 | 203 |
| 13.75 | 200 |
| 13.75 | 199 |
| 12.8 | 199 |
| 12.8 | 198 |
| 12 | 198 |
| 12 | 195 |
| 12 | 193 |
| 12 | 192 |
| 11.3 | 192 |
| 11.3 | 190 |
| 11.3 | 188 |
| 11.3 | 187 |
| 10.6 | 187 |
| 10.6 | 184 |
| 10.6 | 182 |
| 10.6 | 181 |
| 9.85 | 181 |
| 9.85 | 179 |
| 9.85 | 178 |
| 9.85 | 179 |
| 9.2 | 179 |
| 9.2 | 180 |
| 9.2 | 172 |
| 9.2 | 176 |
| 8.8 | 176 |
| 8.8 | 170 |
| 8.8 | 168 |
| 8.8 | 163 |
| 8.2 | 163 |
| 8.2 | 157 |
| 8.2 | 154 |
| 8.2 | 151 |
| 7.15 | 151 |
| 7.15 | 150 |
| 7.15 | 145 |
| 7.15 | 147 |
| 6.1 | 147 |
| 6.1 | 143 |
| 6.1 | 142 |
| 6.1 | 140 |
| 5.45 | 140 |
| 5.45 | 138 |
| 5.45 | 135 |
| 5.45 | 133 |
| 4.9 | 133 |
| 4.9 | 130 |
| 4.9 | 127 |
| 4.9 | 122 |
| 4.3 | 122 |
| 4.3 | 123 |
| 4.3 | 122 |
| 4.3 | 123 |
| 3.9 | 123 |
| 3.9 | 122 |
| 3.9 | 120 |
| 3.9 | 114 |
| 3.65 | 114 |
| 3.65 | 110 |

-continued

| Sensor 12 | |
|---|---|
| pressure | resistance |
| 3.65 | 111 |
| 3.65 | 110 |
| 3.35 | 110 |
| 3.35 | 108 |
| 3.35 | 106 |
| 3.35 | 105 |
| 3.05 | 105 |
| 3.05 | 104 |
| 3.05 | 100 |
| 3.05 | 96 |
| 2.7 | 96 |
| 2.7 | 91 |
| 2.7 | 87 |
| 2.7 | 77 |
| 2.2 | 77 |
| 2.2 | 71 |
| 2.2 | 65 |
| 2.2 | 57 |
| 2.2 | 50 |
| 1.55 | 50 |
| 1.55 | 41 |
| 1.55 | 38 |
| 1.55 | 34 |
| 0.85 | 34 |
| 0.85 | 28 |
| 0.85 | 25 |
| 0.85 | 20 |
| 0.4 | 20 |
| 0.4 | 22 |
| 0.4 | 21 |
| 0.4 | 20 |
| 0.2 | 20 |
| 0.2 | 19 |
| 0.2 | 18 |
| 0.2 | 16 |
| 0.05 | 16 |
| 0.05 | 18 |
| 0.05 | 19 |
| 0.05 | 19 |
| 0.05 | 17 |
| 0.05 | 20 |
| 0.05 | 17 |
| 0.05 | 17 |
| 0.05 | 18 |
| 0.05 | 18 |
| 0.05 | 17 |
| 0.05 | 16 |
| 0.05 | 18 |
| 0.05 | 18 |
| 0.05 | 16 |
| 0.05 | 16 |
| 0.05 | 19 |
| 0.05 | 18 |
| 0.05 | 16 |
| 0.05 | 16 |
| 0.05 | 15 |
| 0.05 | 16 |
| 0.05 | 16 |
| 0.05 | 17 |
| 0.05 | 13 |
| 0.05 | 16 |
| 0.05 | 16 |
| 0.05 | 14 |
| 0.05 | 15 |
| 0.05 | 15 |
| 0.05 | 14 |
| 0.05 | 12 |
| 0.05 | 15 |
| 0.05 | 15 |
| 0.05 | 14 |
| 0.05 | 15 |
| 0.05 | 15 |
| 0.05 | 12 |
| 0.05 | 14 |
| 0.05 | 14 |

-continued

| Sensor 12 | |
|---|---|
| pressure | resistance |
| 0.05 | 15 |
| 0.05 | 13 |
| 0.05 | 15 |
| 0.05 | 12 |
| 0.05 | 12 |
| 0.05 | 14 |

| Sensor 13 | |
|---|---|
| pressure | resistance |
| 0.05 | 0 |
| 0.05 | 1 |
| 0.05 | 3 |
| 0.05 | 4 |
| 0.1 | 4 |
| 0.1 | 8 |
| 0.1 | 9 |
| 0.1 | 8 |
| 0.2 | 8 |
| 0.2 | 11 |
| 0.2 | 12 |
| 0.2 | 13 |
| 0.3 | 13 |
| 0.3 | 14 |
| 0.3 | 16 |
| 0.35 | 16 |
| 0.35 | 17 |
| 0.35 | 22 |
| 0.35 | 24 |
| 0.45 | 24 |
| 0.45 | 26 |
| 0.45 | 33 |
| 0.45 | 37 |
| 0.65 | 37 |
| 0.65 | 45 |
| 0.65 | 52 |
| 1.05 | 52 |
| 1.05 | 58 |
| 1.05 | 60 |
| 1.05 | 63 |
| 1.55 | 63 |
| 1.55 | 67 |
| 1.55 | 73 |
| 2.1 | 73 |
| 2.1 | 76 |
| 2.1 | 79 |
| 2.1 | 86 |
| 2.65 | 86 |
| 2.65 | 92 |
| 2.65 | 99 |
| 2.65 | 105 |
| 2.65 | 110 |
| 3.6 | 110 |
| 3.6 | 113 |
| 3.6 | 117 |
| 3.6 | 122 |
| 4.7 | 122 |
| 4.7 | 126 |
| 4.7 | 131 |
| 5.75 | 131 |
| 5.75 | 132 |
| 5.75 | 141 |
| 5.75 | 143 |
| 6.75 | 143 |
| 6.75 | 150 |
| 6.75 | 148 |
| 6.75 | 149 |
| 7.7 | 149 |
| 7.7 | 152 |
| 7.7 | 154 |
| 7.7 | 155 |

-continued

| Sensor 13 | |
|---|---|
| pressure | resistance |
| 8.6 | 155 |
| 8.6 | 159 |
| 8.6 | 160 |
| 8.6 | 164 |
| 9.2 | 164 |
| 9.2 | 167 |
| 9.2 | 170 |
| 9.2 | 173 |
| 10.15 | 173 |
| 10.15 | 176 |
| 10.15 | 178 |
| 10.15 | 180 |
| 11.1 | 180 |
| 11.1 | 182 |
| 11.1 | 185 |
| 11.95 | 185 |
| 11.95 | 187 |
| 11.95 | 188 |
| 11.95 | 191 |
| 11.95 | 193 |
| 12.65 | 193 |
| 12.65 | 195 |
| 12.65 | 197 |
| 12.65 | 199 |
| 13.6 | 199 |
| 13.6 | 200 |
| 13.6 | 202 |
| 13.6 | 203 |
| 14.3 | 203 |
| 14.3 | 205 |
| 14.3 | 206 |
| 14.3 | 208 |
| 15 | 208 |
| 15 | 212 |
| 15 | 213 |
| 15 | 215 |
| 15.9 | 215 |
| 15.9 | 217 |
| 15.9 | 216 |
| 15.9 | 219 |
| 16.75 | 219 |
| 16.75 | 221 |
| 16.75 | 222 |
| 17.45 | 222 |
| 17.45 | 225 |
| 17.45 | 227 |
| 17.45 | 229 |
| 18.3 | 229 |
| 18.3 | 231 |
| 18.3 | 233 |
| 18.3 | 234 |
| 19 | 234 |
| 19 | 235 |
| 19 | 238 |
| 19 | 239 |
| 19.7 | 239 |
| 19.7 | 238 |
| 19.7 | 243 |
| 20.55 | 243 |
| 20.55 | 245 |
| 20.55 | 248 |
| 20.55 | 246 |
| 21.5 | 246 |
| 21.5 | 250 |
| 21.5 | 248 |
| 21.5 | 253 |
| 22.4 | 253 |
| 22.4 | 256 |
| 22.4 | 254 |
| 22.4 | 257 |
| 23.6 | 257 |
| 23.6 | 260 |
| 23.6 | 263 |
| 24.55 | 263 |
| 24.55 | 264 |

-continued

| Sensor 13 | |
|---|---|
| pressure | resistance |
| 24.55 | 266 |
| 24.55 | 267 |
| 25.4 | 267 |
| 25.4 | 270 |
| 25.4 | 272 |
| 25.4 | 274 |
| 26.35 | 274 |
| 26.35 | 275 |
| 26.35 | 277 |
| 27.35 | 277 |
| 27.35 | 279 |
| 27.35 | 282 |
| 27.35 | 281 |
| 28.5 | 281 |
| 28.5 | 284 |
| 28.5 | 285 |
| 28.5 | 286 |
| 29.35 | 286 |
| 29.35 | 285 |
| 29.35 | 283 |
| 29.35 | 292 |
| 30.1 | 292 |
| 30.1 | 291 |
| 30.1 | 292 |
| 30.1 | 293 |
| 30.95 | 293 |
| 30.95 | 294 |
| 30.95 | 292 |
| 31.8 | 292 |
| 31.8 | 296 |
| 31.8 | 298 |
| 31.8 | 300 |
| 31.8 | 301 |
| 32.6 | 301 |
| 32.6 | 303 |
| 32.6 | 302 |
| 32.6 | 303 |
| 33.55 | 303 |
| 33.55 | 306 |
| 33.55 | 305 |
| 33.55 | 308 |
| 34.5 | 308 |
| 34.5 | 310 |
| 34.5 | 301 |
| 34.5 | 312 |
| 35.75 | 312 |
| 35.75 | 314 |
| 35.75 | 313 |
| 37.5 | 313 |
| 37.5 | 319 |
| 37.5 | 321 |
| 37.5 | 322 |
| 38.95 | 322 |
| 38.95 | 323 |
| 38.95 | 325 |
| 39.8 | 325 |
| 39.8 | 326 |
| 40.2 | 326 |
| 40.2 | 327 |
| 40.2 | 326 |
| 40.2 | 331 |
| 40.65 | 331 |
| 40.65 | 332 |
| 40.65 | 334 |
| 41.65 | 334 |
| 41.65 | 335 |
| 41.65 | 336 |
| 41.65 | 337 |
| 42.8 | 337 |
| 42.8 | 339 |
| 42.8 | 340 |
| 43.8 | 340 |
| 43.8 | 339 |
| 43.8 | 342 |
| 44.6 | 342 |
| 44.6 | 346 |
| 44.6 | 343 |
| 44.6 | 346 |
| 45.35 | 346 |
| 45.35 | 347 |
| 45.35 | 349 |
| 46.05 | 349 |
| 46.05 | 350 |
| 46.05 | 351 |
| 46.5 | 351 |
| 46.5 | 350 |
| 46.5 | 353 |
| 46.5 | 355 |
| 47.7 | 355 |
| 47.7 | 351 |
| 47.7 | 356 |
| 47.7 | 355 |
| 48.45 | 355 |
| 48.45 | 359 |
| 48.45 | 360 |
| 48.45 | 361 |
| 49.5 | 361 |
| 49.5 | 362 |
| 49.5 | 360 |
| 49.5 | 365 |
| 50.75 | 365 |
| 50.75 | 370 |
| 50.75 | 364 |
| 50.75 | 367 |
| 51.6 | 367 |
| 51.6 | 369 |
| 52.95 | 369 |
| 52.95 | 371 |
| 52.95 | 372 |
| 52.95 | 373 |
| 53.8 | 373 |
| 53.8 | 375 |
| 53.8 | 374 |
| 53.8 | 376 |
| 54.35 | 376 |
| 54.35 | 377 |
| 54.35 | 378 |
| 54.35 | 379 |
| 55.3 | 379 |
| 55.3 | 377 |
| 55.3 | 381 |
| 55.3 | 382 |
| 55.35 | 382 |
| 55.35 | 381 |
| 55.35 | 380 |
| 55.95 | 380 |
| 55.95 | 382 |
| 55.95 | 383 |
| 55.95 | 382 |
| 56.1 | 382 |
| 56.1 | 385 |
| 56.1 | 386 |
| 56.9 | 386 |
| 56.9 | 387 |
| 56.9 | 389 |
| 58.35 | 389 |
| 58.35 | 390 |
| 58.35 | 391 |
| 58.35 | 390 |
| 59.65 | 390 |
| 59.65 | 393 |
| 59.65 | 394 |
| 59.65 | 396 |
| 60.9 | 396 |
| 60.9 | 395 |
| 60.9 | 398 |
| 60.9 | 399 |
| 62.15 | 399 |
| 62.15 | 397 |
| 62.15 | 400 |

-continued

| Sensor 13 | |
|---|---|
| pressure | resistance |
| 62.15 | 408 |
| 63.25 | 408 |
| 63.25 | 403 |
| 64.25 | 403 |
| 64.25 | 400 |
| 64.25 | 404 |
| 64.25 | 405 |
| 64.6 | 405 |
| 64.6 | 406 |
| 64.6 | 407 |
| 64.6 | 405 |
| 65.25 | 405 |
| 65.25 | 409 |
| 66.55 | 409 |
| 66.55 | 411 |
| 67.05 | 411 |
| 67.05 | 414 |
| 67.05 | 413 |
| 68.25 | 413 |
| 68.25 | 416 |
| 68.25 | 412 |
| 68.25 | 417 |
| 68.25 | 418 |
| 68.85 | 418 |
| 68.85 | 417 |
| 68.85 | 416 |
| 68.85 | 419 |
| 70.45 | 419 |
| 70.45 | 418 |
| 70.45 | 420 |
| 70.9 | 420 |
| 70.9 | 422 |
| 70.9 | 423 |
| 70.9 | 424 |
| 71.95 | 424 |
| 71.95 | 426 |
| 71.95 | 424 |
| 71.95 | 425 |
| 72.9 | 425 |
| 72.9 | 429 |
| 72.9 | 428 |
| 72.9 | 427 |
| 74.6 | 427 |
| 74.6 | 429 |
| 74.6 | 428 |
| 75.95 | 428 |
| 75.95 | 435 |
| 75.95 | 432 |
| 75.95 | 435 |
| 77.5 | 435 |
| 77.5 | 433 |
| 77.5 | 438 |
| 79 | 438 |
| 79 | 437 |
| 79 | 439 |
| 81.05 | 439 |
| 81.05 | 441 |
| 81.05 | 443 |
| 83.25 | 443 |
| 83.25 | 442 |
| 83.25 | 448 |
| 84.75 | 448 |
| 84.75 | 446 |
| 84.75 | 447 |
| 84.75 | 446 |
| 85.85 | 446 |
| 85.85 | 448 |
| 85.85 | 449 |
| 87.1 | 449 |
| 87.1 | 451 |
| 88.4 | 451 |
| 88.4 | 450 |
| 88.4 | 455 |
| 90.2 | 455 |
| 90.2 | 453 |

-continued

| Sensor 13 | |
|---|---|
| pressure | resistance |
| 90.2 | 454 |
| 90.2 | 455 |
| 90.2 | 456 |
| 91.2 | 456 |
| 91.2 | 457 |
| 91.2 | 456 |
| 91.2 | 455 |
| 92.9 | 455 |
| 92.9 | 458 |
| 92.9 | 462 |
| 94 | 462 |
| 94 | 461 |
| 95.55 | 461 |
| 95.55 | 464 |
| 95.55 | 461 |
| 95.55 | 464 |
| 96.8 | 464 |
| 96.8 | 465 |
| 97.65 | 465 |
| 97.65 | 464 |
| 97.65 | 467 |
| 97.65 | 466 |
| 98.45 | 466 |
| 98.45 | 467 |
| 98.45 | 468 |
| 99.05 | 468 |
| 99.05 | 469 |
| 100.15 | 469 |
| 100.15 | 470 |
| 100.15 | 468 |
| 100.15 | 470 |
| 100.15 | 468 |
| 101 | 468 |
| 101 | 472 |
| 101 | 470 |
| 101 | 471 |
| 101.35 | 471 |
| 101.35 | 471 |
| 101.35 | 470 |
| 101.25 | 470 |
| 101.25 | 472 |
| 101.25 | 471 |
| 100.95 | 471 |
| 100.95 | 472 |
| 100.95 | 470 |
| 100.95 | 473 |
| 101.9 | 473 |
| 101.9 | 474 |
| 101.9 | 469 |
| 102.7 | 469 |
| 102.7 | 474 |
| 102.7 | 473 |
| 102.7 | 474 |
| 102.75 | 474 |
| 102.75 | 475 |
| 102.75 | 474 |
| 102.75 | 471 |
| 100.25 | 471 |
| 100.25 | 470 |
| 100.25 | 467 |
| 96.15 | 467 |
| 96.15 | 466 |
| 96.15 | 463 |
| 90.95 | 463 |
| 90.95 | 466 |
| 90.95 | 462 |
| 86.95 | 462 |
| 86.95 | 464 |
| 86.95 | 458 |
| 86.95 | 459 |
| 83.25 | 459 |
| 83.25 | 458 |
| 83.25 | 456 |
| 83.25 | 455 |
| 79.1 | 455 |

-continued

| Sensor 13 | |
|---|---|
| pressure | resistance |
| 79.1 | 454 |
| 79.1 | 451 |
| 79.1 | 450 |
| 74.7 | 450 |
| 74.7 | 451 |
| 74.7 | 447 |
| 74.7 | 446 |
| 71.15 | 446 |
| 71.15 | 447 |
| 71.15 | 448 |
| 71.15 | 445 |
| 71.15 | 440 |
| 68.2 | 440 |
| 68.2 | 441 |
| 68.2 | 440 |
| 68.2 | 437 |
| 65.95 | 437 |
| 65.95 | 438 |
| 65.95 | 434 |
| 65.95 | 437 |
| 63.7 | 437 |
| 63.7 | 434 |
| 63.7 | 433 |
| 61.7 | 433 |
| 61.7 | 431 |
| 61.7 | 429 |
| 61.7 | 427 |
| 59.85 | 427 |
| 59.85 | 424 |
| 59.85 | 423 |
| 57.55 | 423 |
| 57.55 | 417 |
| 57.55 | 418 |
| 57.55 | 415 |
| 54.75 | 415 |
| 54.75 | 416 |
| 54.75 | 411 |
| 52.35 | 411 |
| 52.35 | 413 |
| 52.35 | 412 |
| 50.9 | 412 |
| 50.9 | 410 |
| 50.9 | 411 |
| 50.9 | 406 |
| 50.9 | 405 |
| 49.6 | 405 |
| 49.6 | 404 |
| 49.6 | 401 |
| 49.6 | 399 |
| 47.9 | 399 |
| 47.9 | 402 |
| 47.9 | 395 |
| 47.9 | 394 |
| 45.85 | 394 |
| 45.85 | 390 |
| 45.85 | 389 |
| 45.85 | 387 |
| 43.8 | 387 |
| 43.8 | 385 |
| 43.8 | 390 |
| 42 | 390 |
| 42 | 386 |
| 42 | 384 |
| 42 | 382 |
| 40.7 | 382 |
| 40.7 | 381 |
| 40.7 | 375 |
| 40.7 | 374 |
| 40.7 | 376 |
| 39.6 | 376 |
| 39.6 | 375 |
| 39.6 | 372 |
| 39.6 | 370 |
| 38.25 | 370 |
| 38.25 | 369 |

-continued

| Sensor 13 | |
|---|---|
| pressure | resistance |
| 38.25 | 368 |
| 36.8 | 368 |
| 36.8 | 365 |
| 36.8 | 362 |
| 35.2 | 362 |
| 35.2 | 361 |
| 35.2 | 359 |
| 35.2 | 357 |
| 33.85 | 357 |
| 33.85 | 355 |
| 33.85 | 352 |
| 32.2 | 352 |
| 32.2 | 349 |
| 32.2 | 343 |
| 32.2 | 347 |
| 30.7 | 347 |
| 30.7 | 348 |
| 30.7 | 344 |
| 30.7 | 345 |
| 29.6 | 345 |
| 29.6 | 344 |
| 29.6 | 340 |
| 29.6 | 342 |
| 28.75 | 342 |
| 28.75 | 337 |
| 28.75 | 338 |
| 28.75 | 337 |
| 28.75 | 334 |
| 27.75 | 334 |
| 27.75 | 331 |
| 27.75 | 330 |
| 27.75 | 328 |
| 26.35 | 328 |
| 26.35 | 326 |
| 26.35 | 325 |
| 26.35 | 326 |
| 24.9 | 326 |
| 24.9 | 324 |
| 24.9 | 323 |
| 24.9 | 321 |
| 23.7 | 321 |
| 23.7 | 319 |
| 23.7 | 318 |
| 23 | 318 |
| 23 | 317 |
| 23 | 316 |
| 23 | 315 |
| 22.25 | 315 |
| 22.25 | 314 |
| 21.65 | 314 |
| 21.65 | 313 |
| 21.65 | 311 |
| 21.65 | 310 |
| 21.65 | 309 |
| 21.1 | 309 |
| 21.1 | 305 |
| 21.1 | 309 |
| 21.1 | 311 |
| 20.45 | 311 |
| 20.45 | 305 |
| 20.45 | 304 |
| 19.85 | 304 |
| 19.85 | 303 |
| 19.85 | 302 |
| 19.85 | 303 |
| 19.4 | 303 |
| 19.4 | 302 |
| 19.4 | 299 |
| 19.4 | 300 |
| 18.85 | 300 |
| 18.85 | 295 |
| 18.85 | 296 |
| 18.85 | 290 |
| 18.1 | 290 |
| 18.1 | 289 |

-continued

| Sensor 13 | |
|---|---|
| pressure | resistance |
| 18.1 | 288 |
| 17.15 | 288 |
| 17.15 | 290 |
| 17.15 | 283 |
| 17.15 | 285 |
| 16.35 | 285 |
| 16.35 | 283 |
| 15.7 | 283 |
| 15.7 | 280 |
| 15.7 | 278 |
| 15.7 | 277 |
| 15.2 | 277 |
| 15.2 | 276 |
| 15.2 | 273 |
| 14.7 | 273 |
| 14.7 | 272 |
| 14.7 | 270 |
| 14.7 | 265 |
| 14.05 | 265 |
| 14.05 | 259 |
| 14.05 | 260 |
| 13 | 260 |
| 13 | 259 |
| 13 | 258 |
| 12.25 | 258 |
| 12.25 | 256 |
| 12.25 | 255 |
| 12.25 | 254 |
| 11.9 | 254 |
| 11.9 | 251 |
| 11.9 | 252 |
| 11.9 | 251 |
| 11.45 | 251 |
| 11.45 | 250 |
| 11.45 | 253 |
| 11.45 | 247 |
| 11.45 | 246 |
| 11 | 246 |
| 11 | 245 |
| 11 | 243 |
| 10.65 | 243 |
| 10.65 | 242 |
| 10.65 | 239 |
| 10.65 | 238 |
| 10.2 | 238 |
| 10.2 | 233 |
| 10.2 | 228 |
| 10.2 | 224 |
| 9.45 | 224 |
| 9.45 | 220 |
| 9.45 | 216 |
| 9.45 | 209 |
| 8.3 | 209 |
| 8.3 | 207 |
| 8.3 | 198 |
| 7.15 | 198 |
| 7.15 | 199 |
| 7.15 | 195 |
| 7.15 | 196 |
| 6.3 | 196 |
| 6.3 | 195 |
| 6.3 | 191 |
| 6.3 | 193 |
| 5.85 | 193 |
| 5.85 | 190 |
| 5.85 | 192 |
| 5.85 | 190 |
| 5.85 | 193 |
| 5.65 | 193 |
| 5.65 | 187 |
| 5.45 | 187 |
| 5.45 | 184 |
| 5.45 | 178 |
| 5.45 | 176 |
| 5.15 | 176 |

-continued

| Sensor 13 | |
|---|---|
| pressure | resistance |
| 5.15 | 174 |
| 5.15 | 177 |
| 5.15 | 178 |
| 4.8 | 178 |
| 4.8 | 170 |
| 4.8 | 173 |
| 4.8 | 174 |
| 4.55 | 174 |
| 4.55 | 171 |
| 4.55 | 165 |
| 4.35 | 165 |
| 4.35 | 160 |
| 4.35 | 152 |
| 4.35 | 148 |
| 3.85 | 148 |
| 3.85 | 143 |
| 3.85 | 138 |
| 3.85 | 135 |
| 3.1 | 135 |
| 3.1 | 130 |
| 3.1 | 124 |
| 3.1 | 121 |
| 2.4 | 121 |
| 2.4 | 114 |
| 2.4 | 109 |
| 2.4 | 104 |
| 2.4 | 99 |
| 1.85 | 99 |
| 1.85 | 87 |
| 1.85 | 79 |
| 1.85 | 76 |
| 1.3 | 76 |
| 1.3 | 75 |
| 1.3 | 72 |
| 1.3 | 65 |
| 0.9 | 65 |
| 0.9 | 54 |
| 0.9 | 52 |
| 0.9 | 51 |
| 0.55 | 51 |
| 0.55 | 49 |
| 0.55 | 51 |
| 0.55 | 47 |
| 0.45 | 47 |
| 0.45 | 43 |
| 0.45 | 39 |
| 0.45 | 35 |
| 0.3 | 35 |
| 0.3 | 33 |
| 0.3 | 32 |
| 0.3 | 31 |
| 0.2 | 31 |
| 0.2 | 29 |
| 0.2 | 27 |
| 0.15 | 27 |
| 0.15 | 28 |
| 0.15 | 26 |
| 0.15 | 24 |
| 0.1 | 24 |
| 0.1 | 25 |
| 0.05 | 25 |
| 0.05 | 24 |
| 0.05 | 24 |
| 0.05 | 24 |
| 0.05 | 26 |
| 0.05 | 23 |
| 0.05 | 24 |
| 0.05 | 24 |
| 0.05 | 22 |
| 0.05 | 24 |
| 0.05 | 24 |
| 0.05 | 23 |
| 0.05 | 25 |
| 0.05 | 22 |
| 0.05 | 22 |

-continued

| Sensor 13 | |
|---|---|
| pressure | resistance |
| 0.05 | 24 |
| 0.05 | 22 |
| 0.05 | 23 |
| 0.05 | 23 |
| 0.05 | 24 |
| 0.05 | 21 |
| 0.05 | 23 |
| 0.05 | 23 |
| 0.05 | 23 |
| 0.05 | 22 |
| 0.05 | 17 |
| 0.05 | 23 |
| 0.05 | 23 |
| 0.05 | 24 |
| 0.05 | 22 |
| 0.05 | 21 |
| 0.05 | 21 |
| 0.05 | 19 |
| 0.05 | 20 |
| 0.05 | 23 |
| 0.05 | 23 |
| 0.05 | 22 |
| 0.05 | 23 |
| 0.05 | 22 |
| 0.05 | 22 |
| 0.05 | 21 |
| 0.05 | 22 |
| 0.05 | 21 |
| 0.05 | 21 |
| 0.05 | 22 |
| 0.05 | 24 |
| 0.05 | 20 |
| 0.05 | 21 |
| 0.05 | 21 |
| 0.05 | 20 |
| 0.05 | 21 |
| 0.05 | 21 |
| 0.05 | 22 |
| 0.05 | 23 |
| 0.05 | 23 |
| 0.05 | 21 |
| 0.05 | 23 |
| 0.05 | 23 |
| 0.05 | 21 |
| 0.05 | 21 |
| 0.05 | 21 |
| 0.05 | 20 |
| 0.05 | 21 |
| 0.05 | 21 |
| 0.05 | 22 |
| 0.05 | 21 |
| 0.05 | 21 |
| 0.05 | 20 |
| 0.05 | 20 |

| Sensor 14 | |
|---|---|
| pressure | resistance |
| 0.05 | 3 |
| 0.05 | 5 |
| 0.15 | 5 |
| 0.15 | 9 |
| 0.15 | 11 |
| 0.25 | 11 |
| 0.25 | 7 |
| 0.25 | 13 |
| 0.25 | 14 |
| 0.4 | 14 |
| 0.4 | 15 |
| 0.4 | 19 |
| 0.4 | 20 |

-continued

| Sensor 14 | |
|---|---|
| pressure | resistance |
| 0.6 | 20 |
| 0.6 | 23 |
| 0.6 | 27 |
| 0.6 | 29 |
| 0.85 | 29 |
| 0.85 | 32 |
| 0.85 | 36 |
| 0.85 | 45 |
| 1.2 | 45 |
| 1.2 | 46 |
| 1.2 | 53 |
| 1.2 | 58 |
| 1.85 | 58 |
| 1.85 | 59 |
| 1.85 | 60 |
| 1.85 | 64 |
| 2.6 | 64 |
| 2.6 | 65 |
| 2.6 | 73 |
| 2.6 | 78 |
| 3.5 | 78 |
| 3.5 | 81 |
| 3.5 | 79 |
| 3.5 | 83 |
| 4.35 | 83 |
| 4.35 | 86 |
| 4.35 | 93 |
| 4.35 | 94 |
| 5.25 | 94 |
| 5.25 | 98 |
| 5.25 | 101 |
| 5.25 | 106 |
| 6.3 | 106 |
| 6.3 | 109 |
| 6.3 | 112 |
| 6.3 | 117 |
| 7.65 | 117 |
| 7.65 | 120 |
| 7.65 | 119 |
| 7.65 | 125 |
| 7.65 | 126 |
| 8.75 | 126 |
| 8.75 | 129 |
| 8.75 | 128 |
| 8.75 | 130 |
| 9.6 | 130 |
| 9.6 | 133 |
| 10.3 | 133 |
| 10.3 | 135 |
| 10.3 | 138 |
| 11 | 138 |
| 11 | 139 |
| 11 | 141 |
| 11.6 | 141 |
| 11.6 | 144 |
| 11.6 | 145 |
| 11.6 | 151 |
| 12.15 | 151 |
| 12.15 | 150 |
| 12.15 | 152 |
| 12.15 | 151 |
| 12.8 | 151 |
| 12.8 | 153 |
| 12.8 | 154 |
| 12.8 | 153 |
| 13.45 | 153 |
| 13.45 | 155 |
| 13.45 | 156 |
| 13.45 | 158 |
| 14 | 158 |
| 14 | 160 |
| 14 | 161 |
| 14.5 | 161 |
| 14.5 | 163 |
| 14.5 | 165 |

-continued

| Sensor 14 | |
|---|---|
| pressure | resistance |
| 14.5 | 171 |
| 15.1 | 171 |
| 15.1 | 169 |
| 15.1 | 171 |
| 15.1 | 174 |
| 16 | 174 |
| 16 | 175 |
| 16 | 176 |
| 16 | 179 |
| 17.25 | 179 |
| 17.25 | 180 |
| 17.25 | 179 |
| 17.25 | 183 |
| 18.35 | 183 |
| 18.35 | 184 |
| 18.35 | 185 |
| 18.35 | 187 |
| 19.2 | 187 |
| 19.2 | 189 |
| 19.2 | 191 |
| 19.2 | 192 |
| 20.1 | 192 |
| 20.1 | 195 |
| 20.1 | 197 |
| 21.2 | 197 |
| 21.2 | 199 |
| 21.2 | 196 |
| 21.2 | 198 |
| 21.2 | 200 |
| 21.75 | 200 |
| 21.75 | 199 |
| 21.75 | 203 |
| 21.75 | 201 |
| 22.35 | 201 |
| 22.35 | 205 |
| 22.35 | 206 |
| 22.35 | 205 |
| 23.05 | 205 |
| 23.05 | 208 |
| 23.05 | 210 |
| 23.85 | 210 |
| 23.85 | 212 |
| 24.45 | 212 |
| 24.45 | 215 |
| 24.45 | 216 |
| 25.3 | 216 |
| 25.3 | 219 |
| 25.3 | 218 |
| 25.3 | 220 |
| 26.2 | 220 |
| 26.2 | 219 |
| 26.2 | 221 |
| 26.9 | 221 |
| 26.9 | 224 |
| 26.9 | 222 |
| 26.9 | 226 |
| 27.7 | 226 |
| 27.7 | 229 |
| 27.7 | 228 |
| 28.4 | 228 |
| 28.4 | 229 |
| 28.4 | 230 |
| 28.4 | 231 |
| 29 | 231 |
| 29 | 232 |
| 29 | 233 |
| 29.6 | 233 |
| 29.6 | 232 |
| 29.6 | 234 |
| 29.6 | 236 |
| 30.15 | 236 |
| 30.15 | 235 |
| 30.15 | 234 |
| 30.15 | 236 |
| 30.35 | 236 |

-continued

| Sensor 14 | |
|---|---|
| pressure | resistance |
| 30.35 | 240 |
| 30.35 | 235 |
| 30.35 | 240 |
| 30.7 | 240 |
| 30.7 | 237 |
| 30.7 | 242 |
| 31.55 | 242 |
| 31.55 | 244 |
| 31.55 | 240 |
| 31.55 | 242 |
| 32.45 | 242 |
| 32.45 | 245 |
| 32.45 | 246 |
| 32.85 | 246 |
| 32.85 | 247 |
| 32.85 | 246 |
| 32.85 | 247 |
| 33.4 | 247 |
| 33.4 | 250 |
| 33.4 | 251 |
| 33.4 | 252 |
| 34.1 | 252 |
| 34.1 | 251 |
| 34.1 | 253 |
| 35.05 | 253 |
| 35.05 | 255 |
| 35.05 | 254 |
| 35.05 | 256 |
| 35.8 | 256 |
| 35.8 | 258 |
| 35.8 | 254 |
| 35.8 | 259 |
| 36.55 | 259 |
| 36.55 | 261 |
| 36.55 | 262 |
| 37.2 | 262 |
| 37.2 | 263 |
| 38.1 | 263 |
| 38.1 | 264 |
| 38.1 | 263 |
| 38.85 | 263 |
| 38.85 | 268 |
| 38.85 | 267 |
| 39.5 | 267 |
| 39.5 | 268 |
| 39.5 | 272 |
| 39.5 | 270 |
| 40.1 | 270 |
| 40.1 | 268 |
| 40.1 | 271 |
| 40.1 | 269 |
| 40.6 | 269 |
| 40.6 | 272 |
| 40.6 | 269 |
| 40.6 | 272 |
| 40.7 | 272 |
| 40.7 | 274 |
| 40.7 | 273 |
| 40.95 | 273 |
| 40.95 | 274 |
| 40.95 | 277 |
| 40.95 | 276 |
| 40.95 | 277 |
| 41.65 | 277 |
| 41.65 | 275 |
| 41.65 | 274 |
| 41.65 | 279 |
| 42.3 | 279 |
| 42.3 | 278 |
| 42.3 | 280 |
| 42.3 | 282 |
| 43.25 | 282 |
| 43.25 | 281 |
| 43.25 | 283 |
| 43.8 | 283 |

-continued

| Sensor 14 | |
|---|---|
| pressure | resistance |
| 43.8 | 282 |
| 43.8 | 284 |
| 43.8 | 283 |
| 44.55 | 283 |
| 44.55 | 285 |
| 44.55 | 284 |
| 44.55 | 285 |
| 44.95 | 285 |
| 44.95 | 284 |
| 44.95 | 286 |
| 45.6 | 286 |
| 45.6 | 290 |
| 45.6 | 289 |
| 45.6 | 288 |
| 46.25 | 288 |
| 46.25 | 289 |
| 46.25 | 288 |
| 46.25 | 291 |
| 47.3 | 291 |
| 47.3 | 292 |
| 47.3 | 291 |
| 47.3 | 289 |
| 47.9 | 289 |
| 47.9 | 294 |
| 47.9 | 295 |
| 48.8 | 295 |
| 48.9 | 295 |
| 48.9 | 297 |
| 48.9 | 299 |
| 48.9 | 298 |
| 49.7 | 298 |
| 49.7 | 299 |
| 49.7 | 300 |
| 49.7 | 297 |
| 50.3 | 297 |
| 50.3 | 302 |
| 50.3 | 303 |
| 51.6 | 303 |
| 51.6 | 304 |
| 51.6 | 303 |
| 51.6 | 306 |
| 51.6 | 307 |
| 52.7 | 307 |
| 52.7 | 308 |
| 52.7 | 309 |
| 53.75 | 309 |
| 53.75 | 308 |
| 53.75 | 312 |
| 53.75 | 315 |
| 55 | 315 |
| 55 | 313 |
| 55 | 312 |
| 55.5 | 312 |
| 55.5 | 314 |
| 55.5 | 315 |
| 56.6 | 315 |
| 56.6 | 316 |
| 56.6 | 315 |
| 56.6 | 315 |
| 56.6 | 317 |
| 56.6 | 316 |
| 56.6 | 319 |
| 57.6 | 319 |
| 57.6 | 317 |
| 57.6 | 319 |
| 58.1 | 319 |
| 58.1 | 321 |
| 58.1 | 323 |
| 59.25 | 323 |
| 59.25 | 324 |
| 59.25 | 325 |
| 59.25 | 321 |
| 59.25 | 326 |
| 60.45 | 326 |
| 60.45 | 325 |

-continued

| Sensor 14 | |
|---|---|
| pressure | resistance |
| 60.45 | 327 |
| 60.45 | 332 |
| 61.3 | 332 |
| 61.3 | 327 |
| 61.3 | 328 |
| 61.8 | 328 |
| 61.8 | 329 |
| 61.8 | 332 |
| 61.8 | 331 |
| 62.85 | 331 |
| 62.85 | 328 |
| 62.85 | 331 |
| 62.85 | 332 |
| 63.4 | 332 |
| 63.4 | 334 |
| 63.4 | 333 |
| 63.4 | 335 |
| 64.95 | 335 |
| 64.95 | 336 |
| 65.55 | 336 |
| 65.55 | 337 |
| 65.55 | 339 |
| 66.5 | 339 |
| 66.5 | 341 |
| 66.5 | 339 |
| 66.5 | 338 |
| 66.5 | 346 |
| 67.05 | 346 |
| 67.05 | 340 |
| 67.05 | 339 |
| 67.05 | 341 |
| 67.75 | 341 |
| 67.75 | 342 |
| 67.75 | 343 |
| 67.75 | 344 |
| 68.8 | 344 |
| 68.8 | 345 |
| 69.75 | 345 |
| 69.75 | 348 |
| 71.2 | 348 |
| 71.2 | 350 |
| 71.2 | 349 |
| 71.9 | 349 |
| 71.9 | 351 |
| 71.9 | 352 |
| 71.9 | 348 |
| 72.9 | 348 |
| 72.9 | 353 |
| 73.4 | 353 |
| 73.4 | 352 |
| 73.4 | 355 |
| 74.3 | 355 |
| 74.3 | 356 |
| 74.3 | 357 |
| 75.15 | 357 |
| 75.15 | 358 |
| 75.15 | 359 |
| 75.15 | 360 |
| 76.3 | 360 |
| 76.3 | 361 |
| 77.6 | 361 |
| 77.6 | 359 |
| 77.6 | 362 |
| 77.6 | 363 |
| 78 | 363 |
| 78 | 364 |
| 78 | 365 |
| 79.15 | 365 |
| 79.15 | 362 |
| 79.15 | 366 |
| 80.45 | 366 |
| 80.45 | 369 |
| 82.05 | 369 |
| 82.05 | 368 |
| 82.05 | 371 |

-continued

| Sensor 14 | |
|---|---|
| pressure | resistance |
| 82.05 | 372 |
| 83.55 | 372 |
| 83.55 | 371 |
| 83.55 | 373 |
| 83.95 | 373 |
| 83.95 | 374 |
| 83.95 | 375 |
| 85.25 | 375 |
| 85.25 | 376 |
| 85.25 | 378 |
| 86.55 | 378 |
| 86.55 | 377 |
| 86.55 | 373 |
| 86.55 | 379 |
| 87.7 | 379 |
| 87.7 | 378 |
| 87.7 | 380 |
| 89.15 | 380 |
| 89.15 | 382 |
| 89.15 | 381 |
| 89.15 | 382 |
| 89.95 | 382 |
| 89.95 | 383 |
| 89.95 | 384 |
| 89.95 | 383 |
| 91.35 | 383 |
| 91.35 | 384 |
| 91.35 | 386 |
| 92.3 | 386 |
| 92.3 | 388 |
| 92.3 | 385 |
| 92.3 | 384 |
| 93 | 384 |
| 93 | 389 |
| 94.3 | 389 |
| 94.3 | 387 |
| 94.3 | 391 |
| 94.3 | 390 |
| 95.05 | 390 |
| 95.05 | 391 |
| 95.05 | 392 |
| 95.05 | 393 |
| 96.5 | 393 |
| 96.5 | 395 |
| 97.5 | 395 |
| 97.5 | 396 |
| 97.5 | 395 |
| 98.55 | 395 |
| 98.55 | 393 |
| 98.55 | 399 |
| 98.55 | 397 |
| 98.55 | 394 |
| 99.65 | 394 |
| 99.65 | 400 |
| 99.65 | 397 |
| 99.65 | 399 |
| 100.15 | 399 |
| 100.15 | 400 |
| 100.15 | 401 |
| 101.2 | 401 |
| 101.2 | 398 |
| 101.2 | 400 |
| 101.2 | 399 |
| 101.7 | 399 |
| 101.7 | 400 |
| 101.7 | 400 |
| 101.7 | 402 |
| 101.9 | 402 |
| 101.9 | 400 |
| 101.9 | 401 |
| 101.9 | 402 |
| 101.55 | 402 |
| 101.55 | 401 |
| 101.55 | 405 |
| 101.55 | 401 |

-continued

| Sensor 14 | |
|---|---|
| pressure | resistance |
| 101.35 | 401 |
| 101.35 | 404 |
| 101.35 | 402 |
| 101.35 | 401 |
| 101.2 | 401 |
| 101.2 | 402 |
| 101.2 | 405 |
| 102.1 | 405 |
| 102.1 | 404 |
| 102.1 | 405 |
| 102.1 | 404 |
| 102.1 | 405 |
| 103.1 | 405 |
| 103.1 | 407 |
| 103.1 | 405 |
| 103.1 | 402 |
| 103.1 | 402 |
| 103.1 | 404 |
| 100.75 | 404 |
| 100.75 | 402 |
| 100.75 | 401 |
| 100.75 | 399 |
| 96.85 | 399 |
| 96.85 | 397 |
| 96.85 | 398 |
| 92.05 | 398 |
| 92.05 | 397 |
| 92.05 | 395 |
| 92.05 | 393 |
| 87.35 | 393 |
| 87.35 | 396 |
| 87.35 | 397 |
| 83.85 | 397 |
| 83.85 | 391 |
| 83.85 | 389 |
| 83.85 | 387 |
| 80.5 | 387 |
| 80.5 | 388 |
| 80.5 | 385 |
| 77.8 | 385 |
| 77.8 | 386 |
| 77.8 | 383 |
| 75.35 | 383 |
| 75.35 | 384 |
| 75.35 | 382 |
| 75.35 | 378 |
| 73.3 | 378 |
| 73.3 | 379 |
| 73.3 | 380 |
| 73.3 | 379 |
| 71.45 | 379 |
| 71.45 | 380 |
| 69.95 | 380 |
| 69.95 | 384 |
| 69.95 | 377 |
| 68.8 | 377 |
| 68.8 | 376 |
| 67.35 | 376 |
| 67.35 | 374 |
| 65.5 | 374 |
| 65.5 | 372 |
| 65.5 | 368 |
| 65.5 | 375 |
| 63.65 | 375 |
| 63.65 | 372 |
| 63.65 | 371 |
| 63.65 | 370 |
| 62.2 | 370 |
| 62.2 | 369 |
| 62.2 | 368 |
| 61.05 | 368 |
| 61.05 | 365 |
| 61.05 | 367 |
| 59.75 | 367 |
| 59.75 | 361 |

-continued

| Sensor 14 | |
|---|---|
| pressure | resistance |
| 59.75 | 363 |
| 59.75 | 362 |
| 58.05 | 362 |
| 58.05 | 361 |
| 58.05 | 360 |
| 58.05 | 359 |
| 56.1 | 359 |
| 56.1 | 355 |
| 56.1 | 353 |
| 54.05 | 353 |
| 54.05 | 351 |
| 54.05 | 350 |
| 52.15 | 350 |
| 52.15 | 349 |
| 50.6 | 349 |
| 50.6 | 348 |
| 49.55 | 348 |
| 49.55 | 347 |
| 49.55 | 345 |
| 49.55 | 344 |
| 48.35 | 344 |
| 48.35 | 342 |
| 48.35 | 343 |
| 48.35 | 339 |
| 46.9 | 339 |
| 46.9 | 343 |
| 46.9 | 340 |
| 46.9 | 341 |
| 45.55 | 341 |
| 45.55 | 342 |
| 45.55 | 338 |
| 44.6 | 338 |
| 44.6 | 339 |
| 44.6 | 336 |
| 44.6 | 337 |
| 44 | 337 |
| 44 | 336 |
| 44 | 327 |
| 44 | 330 |
| 44 | 328 |
| 42.6 | 328 |
| 42.6 | 327 |
| 42.6 | 326 |
| 40.9 | 326 |
| 40.9 | 327 |
| 40.9 | 325 |
| 40.9 | 322 |
| 39.4 | 322 |
| 39.4 | 321 |
| 39.4 | 320 |
| 39.4 | 319 |
| 38.1 | 319 |
| 38.1 | 317 |
| 38.1 | 318 |
| 38.1 | 313 |
| 36.85 | 313 |
| 36.85 | 316 |
| 36.85 | 318 |
| 36.85 | 313 |
| 35.65 | 313 |
| 35.65 | 312 |
| 34.65 | 312 |
| 34.65 | 311 |
| 34.65 | 310 |
| 33.8 | 310 |
| 33.8 | 307 |
| 33.8 | 306 |
| 33.8 | 304 |
| 33.8 | 302 |
| 32.65 | 302 |
| 32.65 | 301 |
| 32.65 | 300 |
| 32.65 | 296 |
| 31.05 | 296 |
| 31.05 | 292 |

-continued

| Sensor 14 | |
|---|---|
| pressure | resistance |
| 29.35 | 292 |
| 29.35 | 289 |
| 29.35 | 287 |
| 27.85 | 287 |
| 27.85 | 285 |
| 27.85 | 287 |
| 27.85 | 284 |
| 26.6 | 284 |
| 26.6 | 281 |
| 26.6 | 280 |
| 25.5 | 280 |
| 25.5 | 281 |
| 25.5 | 278 |
| 25.5 | 276 |
| 24.5 | 276 |
| 24.5 | 275 |
| 24.5 | 274 |
| 24.5 | 269 |
| 23.4 | 269 |
| 23.4 | 268 |
| 23.4 | 269 |
| 23.4 | 268 |
| 22.35 | 268 |
| 22.35 | 262 |
| 22.35 | 261 |
| 22.35 | 263 |
| 21.3 | 263 |
| 21.3 | 260 |
| 21.3 | 259 |
| 20.35 | 259 |
| 20.35 | 257 |
| 20.35 | 256 |
| 19.6 | 256 |
| 19.6 | 254 |
| 19.6 | 253 |
| 19.6 | 249 |
| 19 | 249 |
| 19 | 253 |
| 19 | 251 |
| 19 | 249 |
| 18.3 | 249 |
| 18.3 | 247 |
| 18.3 | 244 |
| 18.3 | 245 |
| 17.25 | 245 |
| 17.25 | 239 |
| 17.25 | 235 |
| 17.25 | 238 |
| 16.1 | 238 |
| 16.1 | 234 |
| 16.1 | 233 |
| 16.1 | 231 |
| 15.05 | 231 |
| 15.05 | 230 |
| 15.05 | 226 |
| 15.05 | 223 |
| 15.05 | 226 |
| 14.15 | 226 |
| 14.15 | 223 |
| 14.15 | 220 |
| 14.15 | 223 |
| 13.3 | 223 |
| 13.3 | 213 |
| 13.3 | 216 |
| 13.3 | 219 |
| 12.55 | 219 |
| 12.55 | 215 |
| 12.55 | 214 |
| 12.55 | 212 |
| 11.9 | 212 |
| 11.9 | 213 |
| 11.9 | 210 |
| 11.9 | 211 |
| 11.4 | 211 |
| 11.4 | 208 |

-continued

| Sensor 14 | |
|---|---|
| pressure | resistance |
| 11.4 | 207 |
| 11.4 | 202 |
| 10.85 | 202 |
| 10.85 | 199 |
| 10.85 | 195 |
| 10.85 | 191 |
| 9.95 | 191 |
| 9.95 | 187 |
| 9.95 | 184 |
| 9.95 | 182 |
| 9.95 | 180 |
| 8.8 | 180 |
| 8.8 | 174 |
| 8.8 | 173 |
| 8.8 | 170 |
| 7.75 | 170 |
| 7.75 | 165 |
| 7.75 | 164 |
| 7.75 | 162 |
| 6.85 | 162 |
| 6.85 | 160 |
| 6.85 | 159 |
| 6.85 | 153 |
| 6.15 | 153 |
| 6.15 | 155 |
| 6.15 | 153 |
| 6.15 | 149 |
| 5.6 | 149 |
| 5.6 | 146 |
| 5.6 | 143 |
| 5.6 | 140 |
| 5.1 | 140 |
| 5.1 | 138 |
| 5.1 | 135 |
| 5.1 | 132 |
| 4.5 | 132 |
| 4.5 | 129 |
| 4.5 | 122 |
| 4.5 | 114 |
| 3.85 | 114 |
| 3.85 | 109 |
| 3.85 | 103 |
| 3.85 | 95 |
| 3.85 | 85 |
| 3.1 | 85 |
| 3.1 | 92 |
| 3.1 | 90 |
| 3.1 | 84 |
| 2.4 | 84 |
| 2.4 | 78 |
| 2.4 | 71 |
| 2.4 | 64 |
| 1.8 | 64 |
| 1.8 | 55 |
| 1.8 | 41 |
| 1.8 | 32 |
| 1.25 | 32 |
| 1.25 | 31 |
| 1.25 | 28 |
| 1.25 | 26 |
| 0.65 | 26 |
| 0.65 | 23 |
| 0.65 | 15 |
| 0.65 | 14 |
| 0.3 | 14 |
| 0.3 | 16 |
| 0.3 | 14 |
| 0.3 | 15 |
| 0.15 | 15 |
| 0.15 | 14 |
| 0.15 | 10 |
| 0.15 | 13 |
| 0.05 | 13 |
| 0.05 | 12 |
| 0.05 | 13 |

-continued

| Sensor 14 | |
|---|---|
| pressure | resistance |
| 0.05 | 12 |
| 0.05 | 13 |
| 0.05 | 13 |
| 0.05 | 12 |
| 0.05 | 9 |
| 0.05 | 9 |
| 0.05 | 12 |
| 0.05 | 11 |
| 0.05 | 12 |
| 0.05 | 12 |
| 0.05 | 13 |
| 0.05 | 12 |
| 0.05 | 12 |
| 0.05 | 11 |
| 0.05 | 11 |
| 0.05 | 12 |
| 0.05 | 12 |
| 0.05 | 11 |
| 0.05 | 12 |
| 0.05 | 12 |
| 0.05 | 11 |
| 0.05 | 10 |
| 0.05 | 10 |
| 0.05 | 12 |
| 0.05 | 10 |
| 0.05 | 11 |
| 0.05 | 11 |
| 0.05 | 10 |

| Sensor 16 | |
|---|---|
| pressure | resistance |
| 0.15 | 18 |
| 0.15 | 19 |
| 0.15 | 21 |
| 0.15 | 24 |
| 0.3 | 24 |
| 0.3 | 27 |
| 0.3 | 28 |
| 0.3 | 30 |
| 0.4 | 30 |
| 0.4 | 33 |
| 0.4 | 36 |
| 0.4 | 39 |
| 0.4 | 44 |
| 0.55 | 44 |
| 0.55 | 49 |
| 0.55 | 52 |
| 0.55 | 53 |
| 0.8 | 53 |
| 0.8 | 55 |
| 0.8 | 58 |
| 0.8 | 59 |
| 1.05 | 59 |
| 1.05 | 62 |
| 1.05 | 68 |
| 1.05 | 78 |
| 1.4 | 78 |
| 1.4 | 86 |
| 1.4 | 91 |
| 1.4 | 93 |
| 2.05 | 93 |
| 2.05 | 98 |
| 2.05 | 102 |
| 2.05 | 105 |
| 2.9 | 105 |
| 2.9 | 106 |
| 2.9 | 110 |
| 2.9 | 114 |
| 3.55 | 114 |
| 3.55 | 116 |

-continued

| Sensor 16 | |
|---|---|
| pressure | resistance |
| 3.55 | 123 |
| 3.55 | 126 |
| 3.55 | 128 |
| 4.25 | 128 |
| 4.25 | 130 |
| 4.25 | 136 |
| 4.25 | 143 |
| 5.05 | 143 |
| 5.05 | 152 |
| 5.05 | 160 |
| 5.05 | 159 |
| 6.25 | 159 |
| 6.25 | 165 |
| 6.25 | 171 |
| 6.25 | 172 |
| 7.75 | 172 |
| 7.75 | 170 |
| 7.75 | 178 |
| 9 | 178 |
| 9 | 183 |
| 9 | 186 |
| 9 | 189 |
| 9.9 | 189 |
| 9.9 | 191 |
| 9.9 | 193 |
| 9.9 | 194 |
| 10.75 | 194 |
| 10.75 | 201 |
| 10.75 | 198 |
| 10.75 | 201 |
| 11.65 | 201 |
| 11.65 | 205 |
| 11.65 | 211 |
| 11.65 | 214 |
| 12.8 | 214 |
| 12.8 | 216 |
| 12.8 | 220 |
| 12.8 | 223 |
| 12.8 | 221 |
| 14.1 | 221 |
| 14.1 | 223 |
| 14.1 | 224 |
| 14.1 | 227 |
| 14.95 | 227 |
| 14.95 | 228 |
| 14.95 | 232 |
| 14.95 | 235 |
| 15.65 | 235 |
| 15.65 | 238 |
| 15.65 | 240 |
| 16.6 | 240 |
| 16.6 | 242 |
| 16.6 | 245 |
| 16.6 | 247 |
| 17.85 | 247 |
| 17.85 | 248 |
| 17.85 | 253 |
| 18.95 | 253 |
| 18.95 | 257 |
| 18.95 | 258 |
| 18.95 | 263 |
| 20.2 | 263 |
| 20.2 | 262 |
| 20.2 | 265 |
| 20.2 | 267 |
| 20.2 | 268 |
| 21.55 | 268 |
| 21.55 | 272 |
| 21.55 | 275 |
| 21.55 | 276 |
| 22.9 | 276 |
| 22.9 | 277 |
| 22.9 | 276 |
| 22.9 | 277 |
| 23.95 | 277 |

-continued

| Sensor 16 | |
|---|---|
| pressure | resistance |
| 23.95 | 279 |
| 23.95 | 280 |
| 23.95 | 281 |
| 24.7 | 281 |
| 24.7 | 284 |
| 24.7 | 283 |
| 25.2 | 283 |
| 25.2 | 284 |
| 25.2 | 288 |
| 25.85 | 288 |
| 25.85 | 289 |
| 25.85 | 290 |
| 25.85 | 292 |
| 26.4 | 292 |
| 26.4 | 293 |
| 26.4 | 296 |
| 27.2 | 296 |
| 27.2 | 297 |
| 27.2 | 299 |
| 28.25 | 299 |
| 28.25 | 301 |
| 28.25 | 303 |
| 29.35 | 303 |
| 29.35 | 304 |
| 29.35 | 303 |
| 29.35 | 305 |
| 30.2 | 305 |
| 30.2 | 308 |
| 30.2 | 307 |
| 30.2 | 308 |
| 30.85 | 308 |
| 30.85 | 309 |
| 30.85 | 310 |
| 31.3 | 310 |
| 31.3 | 312 |
| 31.3 | 314 |
| 31.3 | 316 |
| 32.2 | 316 |
| 32.2 | 319 |
| 33.35 | 319 |
| 33.35 | 318 |
| 33.35 | 319 |
| 33.35 | 320 |
| 34.3 | 320 |
| 34.3 | 322 |
| 34.3 | 325 |
| 34.95 | 325 |
| 34.95 | 324 |
| 34.95 | 327 |
| 34.95 | 326 |
| 35.65 | 326 |
| 35.65 | 328 |
| 35.65 | 330 |
| 36.6 | 330 |
| 36.6 | 331 |
| 36.6 | 332 |
| 36.6 | 333 |
| 37.6 | 333 |
| 37.6 | 336 |
| 37.6 | 334 |
| 37.6 | 336 |
| 38.45 | 336 |
| 38.45 | 337 |
| 38.45 | 338 |
| 38.95 | 338 |
| 38.95 | 340 |
| 38.95 | 338 |
| 38.95 | 339 |
| 39.15 | 339 |
| 39.15 | 338 |
| 39.15 | 340 |
| 39.15 | 342 |
| 39.45 | 342 |
| 39.45 | 341 |
| 39.45 | 340 |

-continued

| Sensor 16 | |
|---|---|
| pressure | resistance |
| 39.45 | 341 |
| 39.8 | 341 |
| 39.8 | 340 |
| 39.8 | 341 |
| 39.75 | 341 |
| 39.75 | 343 |
| 39.75 | 347 |
| 39.75 | 346 |
| 40 | 346 |
| 40 | 345 |
| 40 | 348 |
| 40 | 347 |
| 40.85 | 347 |
| 40.85 | 350 |
| 40.85 | 348 |
| 40.85 | 350 |
| 42.15 | 350 |
| 42.15 | 351 |
| 42.15 | 352 |
| 43.1 | 352 |
| 43.1 | 353 |
| 43.1 | 356 |
| 43.1 | 353 |
| 44 | 353 |
| 44 | 354 |
| 44 | 358 |
| 44.8 | 358 |
| 44.8 | 357 |
| 44.8 | 356 |
| 44.8 | 357 |
| 45.2 | 357 |
| 45.2 | 359 |
| 45.2 | 360 |
| 45.2 | 361 |
| 45.7 | 361 |
| 45.7 | 360 |
| 45.7 | 363 |
| 46 | 363 |
| 46 | 364 |
| 46 | 362 |
| 46 | 365 |
| 46.95 | 365 |
| 46.95 | 363 |
| 46.95 | 364 |
| 47.75 | 364 |
| 47.75 | 368 |
| 48.5 | 368 |
| 48.5 | 366 |
| 48.5 | 370 |
| 48.5 | 368 |
| 49 | 368 |
| 49 | 370 |
| 49 | 371 |
| 49.6 | 371 |
| 49.6 | 374 |
| 49.6 | 372 |
| 50.2 | 372 |
| 50.2 | 373 |
| 50.2 | 375 |
| 51.25 | 375 |
| 51.25 | 374 |
| 51.25 | 377 |
| 51.25 | 373 |
| 51.95 | 373 |
| 51.95 | 376 |
| 51.95 | 378 |
| 52.75 | 378 |
| 52.75 | 379 |
| 52.75 | 382 |
| 53.15 | 382 |
| 53.15 | 381 |
| 53.15 | 383 |
| 54.1 | 383 |
| 54.1 | 384 |
| 54.45 | 384 |

-continued

| Sensor 16 | |
|---|---|
| pressure | resistance |
| 54.45 | 388 |
| 54.45 | 381 |
| 54.9 | 381 |
| 54.9 | 386 |
| 54.9 | 385 |
| 55.15 | 385 |
| 55.15 | 384 |
| 55.15 | 386 |
| 55.15 | 385 |
| 54.55 | 385 |
| 54.55 | 386 |
| 54.55 | 387 |
| 54.3 | 387 |
| 54.3 | 388 |
| 54.3 | 387 |
| 55 | 387 |
| 55 | 388 |
| 55 | 389 |
| 56 | 389 |
| 56 | 390 |
| 56 | 388 |
| 56.5 | 388 |
| 56.5 | 391 |
| 56.5 | 392 |
| 56.5 | 393 |
| 57.6 | 393 |
| 57.6 | 395 |
| 58.35 | 395 |
| 58.35 | 394 |
| 58.35 | 397 |
| 58.35 | 396 |
| 59.35 | 396 |
| 59.35 | 398 |
| 59.35 | 397 |
| 59.35 | 399 |
| 60.1 | 399 |
| 60.1 | 398 |
| 60.1 | 399 |
| 60.1 | 401 |
| 61.05 | 401 |
| 61.05 | 399 |
| 61.05 | 400 |
| 61.05 | 402 |
| 61.4 | 402 |
| 61.4 | 401 |
| 61.4 | 404 |
| 62.35 | 404 |
| 62.35 | 402 |
| 62.35 | 404 |
| 62.35 | 401 |
| 63.15 | 401 |
| 63.15 | 403 |
| 63.15 | 404 |
| 63.15 | 403 |
| 63.35 | 403 |
| 63.35 | 404 |
| 63.35 | 403 |
| 63.35 | 405 |
| 63.75 | 405 |
| 63.75 | 406 |
| 63.75 | 408 |
| 64.2 | 408 |
| 64.2 | 407 |
| 64.2 | 406 |
| 64.2 | 407 |
| 64.2 | 410 |
| 65.25 | 410 |
| 65.25 | 409 |
| 65.25 | 408 |
| 65.6 | 408 |
| 65.6 | 410 |
| 65.6 | 411 |
| 66.65 | 411 |
| 66.65 | 412 |
| 66.65 | 410 |

-continued

| Sensor 16 | |
|---|---|
| pressure | resistance |
| 66.65 | 413 |
| 67.35 | 413 |
| 67.35 | 414 |
| 67.35 | 415 |
| 68.85 | 415 |
| 68.85 | 417 |
| 68.85 | 416 |
| 68.85 | 417 |
| 69.75 | 417 |
| 69.75 | 416 |
| 69.75 | 417 |
| 69.75 | 419 |
| 71 | 419 |
| 71 | 420 |
| 71 | 421 |
| 71 | 419 |
| 71.6 | 419 |
| 71.6 | 420 |
| 71.6 | 421 |
| 71.6 | 422 |
| 72.1 | 422 |
| 72.1 | 421 |
| 72.1 | 422 |
| 72.1 | 424 |
| 72.7 | 424 |
| 72.7 | 425 |
| 73.7 | 425 |
| 73.7 | 424 |
| 73.7 | 426 |
| 74.55 | 426 |
| 74.55 | 423 |
| 74.55 | 428 |
| 74.55 | 430 |
| 75.35 | 430 |
| 75.35 | 428 |
| 75.35 | 427 |
| 75.35 | 431 |
| 76.15 | 431 |
| 76.15 | 430 |
| 76.15 | 431 |
| 77.2 | 431 |
| 77.2 | 429 |
| 77.2 | 428 |
| 78 | 428 |
| 78 | 431 |
| 78 | 434 |
| 78.95 | 434 |
| 78.95 | 433 |
| 78.95 | 434 |
| 79.6 | 434 |
| 79.6 | 435 |
| 79.6 | 436 |
| 80.6 | 436 |
| 80.6 | 439 |
| 80.6 | 436 |
| 81.25 | 436 |
| 81.25 | 439 |
| 81.25 | 438 |
| 82.4 | 438 |
| 82.4 | 439 |
| 82.4 | 443 |
| 82.4 | 440 |
| 83.15 | 440 |
| 83.15 | 439 |
| 83.15 | 441 |
| 83.15 | 440 |
| 83.6 | 440 |
| 83.9 | 440 |
| 83.9 | 442 |
| 83.9 | 443 |
| 84.4 | 443 |
| 84.4 | 444 |
| 84.4 | 446 |
| 85.4 | 446 |
| 85.4 | 445 |

-continued

| Sensor 16 | |
|---|---|
| pressure | resistance |
| 86.8 | 445 |
| 86.8 | 447 |
| 86.8 | 448 |
| 87.9 | 448 |
| 87.9 | 449 |
| 87.9 | 450 |
| 89 | 450 |
| 89 | 449 |
| 89 | 450 |
| 89.6 | 450 |
| 89.6 | 452 |
| 91 | 452 |
| 92 | 452 |
| 92 | 455 |
| 92 | 452 |
| 92 | 453 |
| 92 | 454 |
| 93.45 | 454 |
| 93.45 | 455 |
| 93.45 | 456 |
| 93.45 | 459 |
| 94.5 | 459 |
| 94.5 | 457 |
| 95.45 | 457 |
| 95.45 | 458 |
| 95.45 | 459 |
| 96.4 | 459 |
| 96.4 | 461 |
| 96.4 | 459 |
| 97.25 | 459 |
| 97.25 | 460 |
| 97.95 | 460 |
| 97.95 | 461 |
| 97.95 | 460 |
| 98 | 460 |
| 98 | 462 |
| 98 | 461 |
| 98 | 462 |
| 98.55 | 462 |
| 98.55 | 461 |
| 98.55 | 462 |
| 98.55 | 463 |
| 99.1 | 463 |
| 99.1 | 462 |
| 99.1 | 463 |
| 99.4 | 463 |
| 99.4 | 464 |
| 99.4 | 465 |
| 99.85 | 465 |
| 99.85 | 463 |
| 99.85 | 465 |
| 99.85 | 462 |
| 100.6 | 462 |
| 100.6 | 466 |
| 100.95 | 466 |
| 100.95 | 465 |
| 100.95 | 468 |
| 100.95 | 468 |
| 100.95 | 467 |
| 100.95 | 462 |
| 100.95 | 466 |
| 100.95 | 466 |
| 100.85 | 466 |
| 100.85 | 467 |
| 100.85 | 465 |
| 100.85 | 466 |
| 100.65 | 466 |
| 100.65 | 467 |
| 100.65 | 466 |
| 100.65 | 467 |
| 100.45 | 467 |
| 100.45 | 468 |
| 100.45 | 467 |
| 100.35 | 467 |
| 100.35 | 469 |

-continued

| Sensor 16 | |
|---|---|
| pressure | resistance |
| 100.35 | 470 |
| 101.7 | 470 |
| 101.7 | 467 |
| 101.7 | 470 |
| 103.05 | 470 |
| 103.05 | 469 |
| 103.05 | 469 |
| 103.05 | 470 |
| 103.05 | 469 |
| 103.05 | 468 |
| 101.45 | 468 |
| 101.45 | 467 |
| 101.45 | 466 |
| 98.15 | 466 |
| 98.15 | 464 |
| 93.6 | 464 |
| 93.6 | 462 |
| 93.6 | 463 |
| 93.6 | 461 |
| 93.6 | 460 |
| 88.75 | 460 |
| 88.75 | 459 |
| 88.75 | 462 |
| 88.75 | 459 |
| 85.3 | 459 |
| 85.3 | 458 |
| 85.3 | 459 |
| 85.3 | 458 |
| 83.3 | 458 |
| 83.3 | 457 |
| 81.25 | 457 |
| 81.25 | 455 |
| 81.25 | 456 |
| 81.25 | 454 |
| 78.85 | 454 |
| 78.85 | 453 |
| 78.85 | 452 |
| 75.7 | 452 |
| 75.7 | 451 |
| 75.7 | 449 |
| 75.7 | 448 |
| 72.8 | 448 |
| 72.8 | 447 |
| 72.8 | 446 |
| 72.8 | 445 |
| 70.05 | 445 |
| 70.05 | 444 |
| 70.05 | 442 |
| 70.05 | 439 |
| 66.8 | 439 |
| 66.8 | 440 |
| 66.8 | 439 |
| 66.8 | 438 |
| 64.15 | 438 |
| 64.15 | 437 |
| 62.25 | 437 |
| 62.25 | 438 |
| 62.25 | 436 |
| 61.15 | 436 |
| 61.15 | 435 |
| 61.15 | 434 |
| 61.15 | 435 |
| 60.15 | 435 |
| 60.15 | 434 |
| 60.15 | 435 |
| 60.15 | 434 |
| 59.25 | 434 |
| 59.25 | 431 |
| 58.35 | 431 |
| 58.35 | 432 |
| 58.35 | 433 |
| 58.35 | 432 |
| 58.35 | 430 |
| 57.5 | 430 |
| 57.5 | 428 |

-continued

| Sensor 16 | |
|---|---|
| pressure | resistance |
| 57.5 | 429 |
| 56.25 | 429 |
| 56.25 | 428 |
| 56.25 | 427 |
| 56.25 | 426 |
| 54.95 | 426 |
| 54.95 | 427 |
| 54.95 | 424 |
| 53.8 | 424 |
| 53.8 | 425 |
| 53.8 | 423 |
| 53.8 | 426 |
| 52.85 | 426 |
| 52.85 | 424 |
| 52.85 | 423 |
| 52.85 | 420 |
| 51.8 | 420 |
| 51.8 | 421 |
| 51.8 | 422 |
| 51.8 | 421 |
| 50.8 | 421 |
| 50.8 | 420 |
| 49.95 | 420 |
| 49.95 | 418 |
| 49.95 | 419 |
| 49.2 | 419 |
| 49.2 | 418 |
| 49.2 | 417 |
| 48.6 | 417 |
| 48.6 | 416 |
| 48.6 | 415 |
| 48.1 | 415 |
| 48.1 | 416 |
| 47.55 | 416 |
| 47.55 | 415 |
| 47.55 | 413 |
| 47.55 | 409 |
| 46.9 | 409 |
| 46.9 | 413 |
| 46.9 | 412 |
| 46.25 | 412 |
| 46.25 | 411 |
| 45.45 | 411 |
| 45.45 | 409 |
| 45.45 | 406 |
| 44.55 | 406 |
| 44.55 | 407 |
| 44.55 | 404 |
| 44.55 | 405 |
| 44.55 | 403 |
| 43.4 | 403 |
| 43.4 | 400 |
| 43.4 | 404 |
| 43.4 | 403 |
| 42.3 | 403 |
| 42.3 | 401 |
| 42.3 | 402 |
| 42.3 | 401 |
| 41.4 | 401 |
| 41.4 | 402 |
| 41.4 | 400 |
| 40.8 | 400 |
| 40.8 | 401 |
| 40.8 | 398 |
| 40.15 | 398 |
| 40.15 | 396 |
| 40.15 | 397 |
| 39.4 | 397 |
| 39.4 | 396 |
| 38.8 | 396 |
| 38.8 | 398 |
| 38.8 | 396 |
| 38.8 | 395 |
| 38.3 | 395 |
| 38.3 | 394 |

-continued

| Sensor 16 | |
|---|---|
| pressure | resistance |
| 38.3 | 395 |
| 37.75 | 395 |
| 37.75 | 393 |
| 37.75 | 392 |
| 37.75 | 390 |
| 36.95 | 390 |
| 36.95 | 389 |
| 36.95 | 390 |
| 36.1 | 390 |
| 36.1 | 388 |
| 36.1 | 384 |
| 36.1 | 387 |
| 35.2 | 387 |
| 35.2 | 384 |
| 35.2 | 382 |
| 34.2 | 382 |
| 34.2 | 381 |
| 33.1 | 381 |
| 33.1 | 378 |
| 33.1 | 376 |
| 31.95 | 376 |
| 31.95 | 369 |
| 31.95 | 372 |
| 31.95 | 369 |
| 30.7 | 369 |
| 30.7 | 370 |
| 30.7 | 368 |
| 29.4 | 368 |
| 29.4 | 367 |
| 29.4 | 366 |
| 28.5 | 366 |
| 28.5 | 367 |
| 28.5 | 362 |
| 28.5 | 364 |
| 27.9 | 364 |
| 27.9 | 362 |
| 27.9 | 359 |
| 27.1 | 359 |
| 27.1 | 356 |
| 27.1 | 353 |
| 27.1 | 352 |
| 25.6 | 352 |
| 25.6 | 353 |
| 24.45 | 353 |
| 24.45 | 352 |
| 24.45 | 351 |
| 24.45 | 349 |
| 23.9 | 349 |
| 23.9 | 348 |
| 23.9 | 347 |
| 23.4 | 347 |
| 23.4 | 344 |
| 23.4 | 343 |
| 22.4 | 343 |
| 22.4 | 341 |
| 22.4 | 340 |
| 21.5 | 340 |
| 21.5 | 338 |
| 21.5 | 337 |
| 20.75 | 337 |
| 20.75 | 336 |
| 20.75 | 335 |
| 20.2 | 335 |
| 20.2 | 333 |
| 20.2 | 334 |
| 20.2 | 331 |
| 19.65 | 331 |
| 19.65 | 332 |
| 19.65 | 331 |
| 19.15 | 331 |
| 19.15 | 330 |
| 18.9 | 330 |
| 18.9 | 328 |
| 18.9 | 330 |
| 18.9 | 325 |

-continued

| Sensor 16 | |
|---|---|
| pressure | resistance |
| 18.4 | 325 |
| 18.4 | 323 |
| 18.4 | 322 |
| 18.4 | 320 |
| 18.4 | 321 |
| 17.5 | 321 |
| 17.5 | 315 |
| 17.5 | 317 |
| 17.5 | 315 |
| 16.6 | 315 |
| 16.6 | 313 |
| 15.9 | 313 |
| 15.9 | 311 |
| 15.9 | 310 |
| 15.25 | 310 |
| 15.25 | 307 |
| 15.25 | 305 |
| 15.25 | 304 |
| 14.6 | 304 |
| 14.6 | 302 |
| 14.6 | 301 |
| 13.85 | 301 |
| 13.85 | 290 |
| 13.85 | 296 |
| 13.85 | 292 |
| 13.1 | 292 |
| 13.1 | 291 |
| 13.1 | 286 |
| 13.1 | 287 |
| 12.4 | 287 |
| 12.4 | 288 |
| 12.4 | 286 |
| 12.4 | 281 |
| 11.8 | 281 |
| 11.8 | 283 |
| 11.8 | 279 |
| 11.8 | 277 |
| 11.15 | 277 |
| 11.15 | 276 |
| 11.15 | 273 |
| 11.15 | 274 |
| 10.45 | 274 |
| 10.45 | 270 |
| 10.45 | 269 |
| 10.45 | 267 |
| 9.85 | 267 |
| 9.85 | 266 |
| 9.85 | 264 |
| 9.3 | 264 |
| 9.3 | 263 |
| 9.3 | 260 |
| 9.3 | 259 |
| 8.8 | 259 |
| 8.8 | 256 |
| 8.45 | 256 |
| 8.45 | 254 |
| 8.45 | 251 |
| 8 | 251 |
| 8 | 248 |
| 8 | 244 |
| 8 | 242 |
| 7.5 | 242 |
| 7.5 | 238 |
| 7.5 | 236 |
| 7.5 | 234 |
| 7.5 | 232 |
| 6.85 | 232 |
| 6.85 | 227 |
| 6.85 | 226 |
| 6.85 | 223 |
| 6.2 | 223 |
| 6.2 | 219 |
| 6.2 | 218 |
| 6.2 | 214 |
| 5.6 | 214 |

-continued

| Sensor 16 | |
|---|---|
| pressure | resistance |
| 5.6 | 215 |
| 5.6 | 207 |
| 5.6 | 205 |
| 5 | 205 |
| 5 | 200 |
| 5 | 193 |
| 5 | 186 |
| 4.35 | 186 |
| 4.35 | 177 |
| 4.35 | 171 |
| 4.35 | 164 |
| 3.45 | 164 |
| 3.45 | 163 |
| 3.45 | 158 |
| 3.45 | 154 |
| 2.85 | 154 |
| 2.85 | 146 |
| 2.85 | 139 |
| 2.85 | 125 |
| 2.3 | 125 |
| 2.3 | 114 |
| 2.3 | 106 |
| 2.3 | 94 |
| 1.65 | 94 |
| 1.65 | 91 |
| 1.65 | 85 |
| 1.65 | 82 |
| 1.05 | 82 |
| 1.05 | 83 |
| 1.05 | 80 |
| 0.7 | 80 |
| 0.7 | 76 |
| 0.7 | 70 |
| 0.7 | 65 |
| 0.55 | 65 |
| 0.55 | 57 |
| 0.55 | 45 |
| 0.55 | 38 |
| 0.4 | 38 |
| 0.4 | 36 |
| 0.4 | 35 |
| 0.4 | 34 |
| 0.2 | 34 |
| 0.2 | 33 |
| 0.2 | 30 |
| 0.05 | 30 |
| 0.05 | 32 |
| 0.05 | 33 |
| 0.05 | 33 |
| 0.05 | 32 |
| 0.05 | 32 |
| 0.05 | 31 |
| 0.05 | 33 |
| 0.05 | 33 |
| 0.05 | 31 |
| 0.05 | 30 |
| 0.05 | 31 |
| 0.05 | 31 |
| 0.05 | 32 |
| 0.05 | 31 |
| 0.05 | 30 |
| 0.05 | 30 |
| 0.05 | 31 |
| 0.05 | 30 |
| 0.05 | 30 |
| 0.05 | 30 |
| 0.05 | 30 |
| 0.05 | 29 |
| 0.05 | 28 |
| 0.05 | 28 |
| 0.05 | 30 |
| 0.05 | 29 |
| 0.05 | 29 |
| 0.05 | 28 |
| 0.05 | 29 |

-continued

| Sensor 16 | |
|---|---|
| pressure | resistance |
| 0.05 | 30 |
| 0.05 | 30 |
| 0.05 | 29 |
| 0.05 | 28 |
| 0.05 | 28 |
| 0.05 | 26 |
| 0.05 | 28 |
| 0.05 | 28 |
| 0.05 | 29 |
| 0.05 | 33 |
| 0.05 | 30 |
| 0.05 | 30 |
| 0.05 | 29 |
| 0.05 | 28 |
| 0.05 | 28 |
| 0.05 | 30 |

| Sensor 17 | |
|---|---|
| pressure | resistance |
| 0.05 | 10 |
| 0.05 | 12 |
| 0.05 | 15 |
| 0.05 | 14 |
| 0.2 | 14 |
| 0.2 | 17 |
| 0.2 | 19 |
| 0.3 | 19 |
| 0.3 | 20 |
| 0.3 | 22 |
| 0.3 | 24 |
| 0.4 | 24 |
| 0.4 | 28 |
| 0.4 | 33 |
| 0.5 | 33 |
| 0.5 | 31 |
| 0.5 | 34 |
| 0.5 | 36 |
| 0.6 | 36 |
| 0.6 | 39 |
| 0.6 | 46 |
| 0.85 | 46 |
| 0.85 | 51 |
| 0.85 | 54 |
| 1.15 | 54 |
| 1.15 | 57 |
| 1.15 | 64 |
| 1.15 | 69 |
| 1.15 | 74 |
| 1.65 | 74 |
| 1.65 | 79 |
| 1.65 | 83 |
| 1.65 | 85 |
| 2.45 | 85 |
| 2.45 | 89 |
| 2.45 | 91 |
| 3.3 | 91 |
| 3.3 | 93 |
| 3.3 | 101 |
| 3.3 | 100 |
| 3.95 | 100 |
| 3.95 | 102 |
| 3.95 | 104 |
| 3.95 | 107 |
| 4.6 | 107 |
| 4.6 | 109 |
| 4.6 | 112 |
| 5.3 | 112 |
| 5.3 | 118 |
| 5.3 | 121 |
| 5.3 | 126 |

-continued

| Sensor 17 | |
|---|---|
| pressure | resistance |
| 6.25 | 126 |
| 6.25 | 130 |
| 6.25 | 135 |
| 6.25 | 140 |
| 6.25 | 143 |
| 7.6 | 143 |
| 7.6 | 148 |
| 7.6 | 150 |
| 9.1 | 150 |
| 9.1 | 154 |
| 9.1 | 155 |
| 9.1 | 157 |
| 10.4 | 157 |
| 10.4 | 160 |
| 10.4 | 159 |
| 10.4 | 163 |
| 11.4 | 163 |
| 11.4 | 164 |
| 11.4 | 167 |
| 11.4 | 163 |
| 12.15 | 163 |
| 12.15 | 168 |
| 12.15 | 167 |
| 12.15 | 169 |
| 12.75 | 169 |
| 12.75 | 170 |
| 12.75 | 174 |
| 12.75 | 176 |
| 13.55 | 176 |
| 13.55 | 177 |
| 13.55 | 180 |
| 13.55 | 183 |
| 14.55 | 183 |
| 14.55 | 185 |
| 14.55 | 189 |
| 15.6 | 189 |
| 15.6 | 188 |
| 15.6 | 189 |
| 15.6 | 191 |
| 16.35 | 191 |
| 16.35 | 192 |
| 16.35 | 194 |
| 16.35 | 195 |
| 17.15 | 195 |
| 17.15 | 197 |
| 17.15 | 200 |
| 18.25 | 200 |
| 18.25 | 203 |
| 18.25 | 206 |
| 18.25 | 201 |
| 19.1 | 201 |
| 19.1 | 204 |
| 19.1 | 206 |
| 19.1 | 207 |
| 19.75 | 207 |
| 19.75 | 209 |
| 19.75 | 212 |
| 19.75 | 215 |
| 20.9 | 215 |
| 20.9 | 216 |
| 20.9 | 217 |
| 20.9 | 218 |
| 22.25 | 218 |
| 22.25 | 220 |
| 22.25 | 221 |
| 23.4 | 221 |
| 23.4 | 223 |
| 23.4 | 225 |
| 23.4 | 226 |
| 23.4 | 228 |
| 24.35 | 228 |
| 24.35 | 230 |
| 24.35 | 228 |
| 25.25 | 228 |
| 25.25 | 230 |

-continued

| Sensor 17 | |
|---|---|
| pressure | resistance |
| 25.25 | 231 |
| 25.9 | 231 |
| 25.9 | 233 |
| 25.9 | 236 |
| 25.9 | 235 |
| 26.55 | 235 |
| 26.55 | 236 |
| 26.55 | 239 |
| 26.55 | 238 |
| 27.5 | 238 |
| 27.5 | 240 |
| 27.5 | 241 |
| 28.1 | 241 |
| 28.1 | 240 |
| 28.1 | 241 |
| 28.1 | 243 |
| 28.65 | 243 |
| 28.65 | 244 |
| 28.65 | 243 |
| 28.65 | 246 |
| 28.65 | 245 |
| 29.45 | 245 |
| 29.45 | 248 |
| 30.15 | 248 |
| 30.15 | 250 |
| 30.15 | 249 |
| 30.15 | 246 |
| 30.55 | 246 |
| 30.55 | 252 |
| 30.55 | 251 |
| 30.55 | 256 |
| 31.15 | 256 |
| 31.15 | 253 |
| 31.15 | 252 |
| 31.15 | 254 |
| 31.8 | 254 |
| 31.8 | 256 |
| 32.25 | 256 |
| 32.25 | 257 |
| 32.25 | 258 |
| 32.85 | 258 |
| 32.85 | 260 |
| 32.85 | 262 |
| 33.8 | 262 |
| 33.8 | 261 |
| 33.8 | 263 |
| 33.8 | 262 |
| 33.8 | 263 |
| 34.65 | 263 |
| 34.65 | 265 |
| 34.65 | 266 |
| 34.65 | 267 |
| 35.45 | 267 |
| 35.45 | 268 |
| 35.45 | 269 |
| 35.45 | 271 |
| 36.55 | 271 |
| 36.55 | 272 |
| 36.55 | 271 |
| 36.55 | 274 |
| 37.8 | 274 |
| 37.8 | 273 |
| 37.8 | 275 |
| 37.8 | 277 |
| 38.8 | 277 |
| 38.8 | 278 |
| 39.6 | 278 |
| 39.6 | 279 |
| 39.6 | 281 |
| 40.1 | 281 |
| 40.1 | 280 |
| 40.1 | 281 |
| 40.1 | 282 |
| 40.7 | 282 |
| 40.7 | 285 |

-continued

| Sensor 17 | |
|---|---|
| pressure | resistance |
| 40.7 | 283 |
| 40.7 | 285 |
| 41.65 | 285 |
| 41.65 | 286 |
| 41.65 | 284 |
| 41.65 | 286 |
| 42.5 | 286 |
| 42.5 | 287 |
| 42.5 | 288 |
| 42.5 | 286 |
| 42.95 | 286 |
| 42.95 | 290 |
| 42.95 | 291 |
| 42.95 | 293 |
| 43.85 | 293 |
| 43.85 | 289 |
| 43.85 | 294 |
| 45.2 | 294 |
| 45.2 | 292 |
| 45.2 | 296 |
| 45.2 | 295 |
| 46 | 295 |
| 46 | 297 |
| 46 | 297 |
| 46 | 295 |
| 46 | 301 |
| 46.35 | 301 |
| 46.35 | 300 |
| 46.35 | 301 |
| 46.35 | 303 |
| 46.95 | 303 |
| 46.95 | 302 |
| 46.95 | 301 |
| 46.95 | 303 |
| 47.8 | 303 |
| 47.8 | 304 |
| 47.8 | 305 |
| 48.75 | 305 |
| 48.75 | 306 |
| 48.75 | 303 |
| 48.75 | 307 |
| 49.15 | 307 |
| 49.15 | 309 |
| 49.15 | 308 |
| 50.05 | 308 |
| 50.05 | 309 |
| 50.05 | 310 |
| 50.45 | 310 |
| 50.45 | 309 |
| 50.45 | 311 |
| 50.65 | 311 |
| 50.65 | 312 |
| 50.65 | 310 |
| 50.65 | 313 |
| 50.85 | 313 |
| 50.85 | 312 |
| 51.3 | 312 |
| 51.3 | 317 |
| 51.3 | 316 |
| 51.95 | 316 |
| 51.95 | 318 |
| 52.65 | 318 |
| 52.65 | 317 |
| 52.65 | 319 |
| 53.65 | 319 |
| 53.65 | 320 |
| 53.65 | 322 |
| 53.65 | 319 |
| 54.7 | 319 |
| 54.7 | 321 |
| 54.7 | 324 |
| 55.45 | 324 |
| 55.45 | 325 |
| 56.8 | 325 |
| 56.8 | 327 |

-continued

| Sensor 17 | |
|---|---|
| pressure | resistance |
| 56.8 | 326 |
| 57.3 | 326 |
| 57.3 | 329 |
| 57.3 | 328 |
| 58.1 | 328 |
| 58.1 | 329 |
| 58.1 | 328 |
| 58.1 | 330 |
| 58.4 | 330 |
| 58.4 | 331 |
| 58.8 | 331 |
| 58.8 | 332 |
| 58.8 | 333 |
| 59.1 | 333 |
| 59.1 | 331 |
| 59.1 | 332 |
| 59.1 | 335 |
| 59.6 | 335 |
| 59.6 | 336 |
| 59.6 | 334 |
| 59.6 | 335 |
| 60.7 | 335 |
| 60.7 | 336 |
| 61 | 336 |
| 61 | 337 |
| 61 | 339 |
| 61 | 338 |
| 62.05 | 338 |
| 62.05 | 335 |
| 62.05 | 340 |
| 62.05 | 339 |
| 62.05 | 340 |
| 62.65 | 340 |
| 62.65 | 341 |
| 62.65 | 342 |
| 62.65 | 347 |
| 63.75 | 347 |
| 63.75 | 343 |
| 63.75 | 344 |
| 64.6 | 344 |
| 64.6 | 345 |
| 65 | 345 |
| 65 | 346 |
| 65 | 345 |
| 65.9 | 345 |
| 65.9 | 347 |
| 65.9 | 353 |
| 66.2 | 353 |
| 66.2 | 349 |
| 66.2 | 348 |
| 66.85 | 348 |
| 66.85 | 349 |
| 66.85 | 348 |
| 66.85 | 346 |
| 66.85 | 351 |
| 67.35 | 351 |
| 67.35 | 353 |
| 67.35 | 351 |
| 68.95 | 351 |
| 68.95 | 353 |
| 68.95 | 355 |
| 70.05 | 355 |
| 70.05 | 356 |
| 71.15 | 356 |
| 71.15 | 357 |
| 71.15 | 358 |
| 72.05 | 358 |
| 72.05 | 359 |
| 72.05 | 360 |
| 72.6 | 360 |
| 72.6 | 359 |
| 72.6 | 362 |
| 73.65 | 362 |
| 73.65 | 361 |
| 73.65 | 360 |

-continued

| Sensor 17 | |
|---|---|
| pressure | resistance |
| 74.5 | 360 |
| 74.5 | 361 |
| 74.5 | 364 |
| 75.1 | 364 |
| 75.1 | 365 |
| 74.65 | 365 |
| 74.65 | 362 |
| 74.65 | 365 |
| 74.65 | 366 |
| 74.35 | 366 |
| 74.35 | 367 |
| 74.35 | 366 |
| 75.45 | 366 |
| 75.45 | 367 |
| 75.45 | 370 |
| 77.05 | 370 |
| 77.05 | 369 |
| 77.05 | 371 |
| 78.1 | 371 |
| 78.1 | 373 |
| 78.1 | 371 |
| 78.1 | 370 |
| 79.65 | 370 |
| 79.65 | 371 |
| 79.65 | 372 |
| 79.65 | 373 |
| 80.55 | 373 |
| 80.55 | 374 |
| 80.55 | 373 |
| 81.8 | 373 |
| 81.8 | 375 |
| 81.8 | 374 |
| 81.8 | 376 |
| 82.3 | 376 |
| 82.3 | 378 |
| 82.3 | 376 |
| 82.75 | 376 |
| 82.75 | 377 |
| 82.75 | 376 |
| 82.75 | 379 |
| 83.6 | 379 |
| 83.6 | 378 |
| 83.6 | 379 |
| 83.6 | 381 |
| 85.1 | 381 |
| 85.1 | 379 |
| 85.1 | 382 |
| 85.9 | 382 |
| 85.9 | 383 |
| 85.9 | 384 |
| 87.4 | 384 |
| 87.4 | 382 |
| 87.4 | 383 |
| 87.4 | 385 |
| 88.05 | 385 |
| 88.05 | 383 |
| 88.05 | 385 |
| 88.05 | 386 |
| 88.05 | 387 |
| 89.55 | 387 |
| 89.55 | 386 |
| 89.55 | 387 |
| 90.55 | 387 |
| 90.55 | 388 |
| 90.55 | 387 |
| 90.55 | 389 |
| 91.25 | 389 |
| 91.25 | 387 |
| 91.25 | 388 |
| 91.25 | 390 |
| 92.4 | 390 |
| 93.25 | 390 |
| 93.25 | 391 |
| 93.25 | 392 |
| 93.25 | 391 |

-continued

| Sensor 17 | |
|---|---|
| pressure | resistance |
| 94.75 | 391 |
| 94.75 | 392 |
| 94.75 | 394 |
| 95.45 | 394 |
| 95.45 | 392 |
| 96.8 | 392 |
| 96.8 | 396 |
| 96.8 | 395 |
| 96.8 | 393 |
| 96.8 | 395 |
| 97.6 | 395 |
| 97.6 | 397 |
| 98.15 | 397 |
| 98.15 | 398 |
| 98.7 | 398 |
| 98.7 | 399 |
| 98.7 | 397 |
| 99.5 | 397 |
| 99.5 | 399 |
| 99.5 | 404 |
| 99.5 | 398 |
| 100.25 | 398 |
| 100.25 | 400 |
| 100.25 | 402 |
| 100.25 | 398 |
| 101.3 | 398 |
| 101.3 | 400 |
| 101.3 | 401 |
| 101.3 | 401 |
| 101.3 | 400 |
| 101.75 | 400 |
| 101.75 | 401 |
| 101.55 | 401 |
| 101.55 | 402 |
| 101.55 | 400 |
| 101.55 | 403 |
| 101.7 | 403 |
| 101.7 | 404 |
| 101.7 | 403 |
| 101.7 | 404 |
| 101.7 | 403 |
| 102.85 | 403 |
| 102.85 | 404 |
| 102.85 | 403 |
| 103.15 | 403 |
| 103.15 | 402 |
| 103.15 | 403 |
| 101.2 | 403 |
| 101.2 | 402 |
| 101.2 | 403 |
| 101.2 | 402 |
| 98.8 | 402 |
| 98.8 | 399 |
| 98.8 | 398 |
| 98.8 | 400 |
| 94.6 | 400 |
| 94.6 | 397 |
| 94.6 | 398 |
| 94.6 | 397 |
| 89.65 | 397 |
| 89.65 | 396 |
| 89.65 | 394 |
| 85.45 | 394 |
| 85.45 | 392 |
| 85.45 | 390 |
| 81.6 | 390 |
| 81.6 | 389 |
| 81.6 | 388 |
| 81.6 | 387 |
| 77.55 | 387 |
| 77.55 | 384 |
| 77.55 | 383 |
| 74 | 383 |
| 74 | 382 |
| 74 | 378 |

-continued

| Sensor 17 | |
|---|---|
| pressure | resistance |
| 71.2 | 378 |
| 71.2 | 381 |
| 71.2 | 380 |
| 71.2 | 381 |
| 69.2 | 381 |
| 69.2 | 379 |
| 69.2 | 374 |
| 69.2 | 375 |
| 66.9 | 375 |
| 66.9 | 374 |
| 66.9 | 375 |
| 66.9 | 373 |
| 64.6 | 373 |
| 64.6 | 372 |
| 64.6 | 371 |
| 62.2 | 371 |
| 62.2 | 369 |
| 60.55 | 369 |
| 60.55 | 367 |
| 60.55 | 369 |
| 60.55 | 368 |
| 58.9 | 368 |
| 58.9 | 360 |
| 58.9 | 365 |
| 58.9 | 363 |
| 57.5 | 363 |
| 57.5 | 361 |
| 57.5 | 362 |
| 56.1 | 362 |
| 56.1 | 361 |
| 56.1 | 359 |
| 56.1 | 356 |
| 54.35 | 356 |
| 54.35 | 358 |
| 52.4 | 358 |
| 52.4 | 354 |
| 52.4 | 353 |
| 50.8 | 353 |
| 50.8 | 351 |
| 50.8 | 349 |
| 49.45 | 349 |
| 49.45 | 348 |
| 49.45 | 347 |
| 49.45 | 346 |
| 47.85 | 346 |
| 47.85 | 345 |
| 47.85 | 340 |
| 47.85 | 341 |
| 46 | 341 |
| 46 | 338 |
| 44.2 | 338 |
| 44.2 | 339 |
| 42.9 | 339 |
| 42.9 | 335 |
| 42.9 | 334 |
| 42.9 | 333 |
| 41.85 | 333 |
| 41.85 | 332 |
| 41.85 | 330 |
| 40.5 | 330 |
| 40.5 | 329 |
| 40.5 | 328 |
| 40.5 | 327 |
| 38.8 | 327 |
| 38.8 | 326 |
| 38.8 | 324 |
| 38.8 | 325 |
| 38.8 | 322 |
| 37.7 | 322 |
| 37.7 | 323 |
| 37.7 | 325 |
| 36.95 | 325 |
| 36.95 | 320 |
| 36.95 | 318 |
| 36.95 | 317 |

-continued

| Sensor 17 | |
|---|---|
| pressure | resistance |
| 35.85 | 317 |
| 35.85 | 313 |
| 35.85 | 315 |
| 35.85 | 312 |
| 34.3 | 312 |
| 34.3 | 315 |
| 34.3 | 312 |
| 32.95 | 312 |
| 32.95 | 311 |
| 32.95 | 308 |
| 32.95 | 304 |
| 31.7 | 304 |
| 31.7 | 305 |
| 31.7 | 306 |
| 31.7 | 302 |
| 30.4 | 302 |
| 30.4 | 304 |
| 30.4 | 306 |
| 30.4 | 303 |
| 29.4 | 303 |
| 29.4 | 302 |
| 29.4 | 300 |
| 29.4 | 303 |
| 28.65 | 303 |
| 28.65 | 301 |
| 28.65 | 300 |
| 28.65 | 299 |
| 28.65 | 298 |
| 27.95 | 298 |
| 27.95 | 299 |
| 27.95 | 297 |
| 27.95 | 298 |
| 27.55 | 298 |
| 27.55 | 296 |
| 27.55 | 295 |
| 27.1 | 295 |
| 27.1 | 293 |
| 26.5 | 293 |
| 26.5 | 292 |
| 26.5 | 293 |
| 25.75 | 293 |
| 25.75 | 289 |
| 25.75 | 281 |
| 25.1 | 281 |
| 25.1 | 286 |
| 25.1 | 287 |
| 25.1 | 285 |
| 24.05 | 285 |
| 24.05 | 283 |
| 22.95 | 283 |
| 22.95 | 281 |
| 22.95 | 280 |
| 22.95 | 281 |
| 22.25 | 281 |
| 22.25 | 280 |
| 22.25 | 278 |
| 22.25 | 279 |
| 22.25 | 278 |
| 21.7 | 278 |
| 21.7 | 276 |
| 21.1 | 276 |
| 21.1 | 273 |
| 21.1 | 276 |
| 20.6 | 276 |
| 20.6 | 271 |
| 20.6 | 273 |
| 20.6 | 271 |
| 20.1 | 271 |
| 20.1 | 272 |
| 20.1 | 271 |
| 19.75 | 271 |
| 19.75 | 267 |
| 19.75 | 262 |
| 18.95 | 262 |
| 18.95 | 261 |

-continued

| Sensor 17 | |
|---|---|
| pressure | resistance |
| 18.95 | 256 |
| 18.95 | 259 |
| 17.6 | 259 |
| 17.6 | 257 |
| 17.6 | 255 |
| 17.6 | 257 |
| 16.5 | 257 |
| 16.5 | 255 |
| 16.5 | 254 |
| 16.5 | 257 |
| 16 | 257 |
| 16 | 253 |
| 16 | 251 |
| 15.65 | 251 |
| 15.65 | 248 |
| 15.65 | 249 |
| 15.65 | 246 |
| 15 | 246 |
| 15 | 244 |
| 15 | 242 |
| 15 | 240 |
| 14.1 | 240 |
| 14.1 | 241 |
| 14.1 | 244 |
| 14.1 | 241 |
| 13.6 | 241 |
| 13.6 | 243 |
| 13.6 | 241 |
| 13.6 | 238 |
| 13.35 | 238 |
| 13.35 | 230 |
| 13.35 | 231 |
| 13.35 | 229 |
| 13.35 | 226 |
| 12.5 | 226 |
| 12.5 | 225 |
| 12.5 | 222 |
| 12.5 | 217 |
| 11.2 | 217 |
| 11.2 | 218 |
| 11.2 | 217 |
| 11.2 | 215 |
| 10.2 | 215 |
| 10.2 | 212 |
| 9.45 | 212 |
| 9.45 | 211 |
| 9.45 | 210 |
| 9.05 | 210 |
| 9.05 | 209 |
| 9.05 | 207 |
| 9.05 | 202 |
| 8.65 | 202 |
| 8.65 | 199 |
| 8.65 | 192 |
| 7.9 | 192 |
| 7.9 | 187 |
| 7.9 | 183 |
| 7.9 | 182 |
| 6.75 | 182 |
| 6.75 | 179 |
| 6.75 | 178 |
| 6.75 | 173 |
| 5.8 | 173 |
| 5.8 | 172 |
| 5.8 | 169 |
| 5.8 | 170 |
| 5.8 | 164 |
| 5.15 | 164 |
| 5.15 | 161 |
| 5.15 | 158 |
| 5.15 | 156 |
| 4.6 | 156 |
| 4.6 | 155 |
| 4.6 | 153 |
| 4.6 | 149 |

-continued

| Sensor 17 | |
|---|---|
| pressure | resistance |
| 4.05 | 149 |
| 4.05 | 144 |
| 4.05 | 139 |
| 3.45 | 139 |
| 3.45 | 134 |
| 3.45 | 133 |
| 3.45 | 129 |
| 3 | 129 |
| 3 | 124 |
| 3 | 122 |
| 2.55 | 122 |
| 2.55 | 116 |
| 2.55 | 109 |
| 2.2 | 109 |
| 2.2 | 106 |
| 2.2 | 102 |
| 2.2 | 101 |
| 1.8 | 101 |
| 1.8 | 99 |
| 1.8 | 97 |
| 1.5 | 97 |
| 1.5 | 94 |
| 1.5 | 84 |
| 1.5 | 75 |
| 1.5 | 73 |
| 1.25 | 73 |
| 1.25 | 71 |
| 1.25 | 65 |
| 1.25 | 60 |
| 0.95 | 60 |
| 0.95 | 49 |
| 0.95 | 44 |
| 0.95 | 40 |
| 0.55 | 40 |
| 0.55 | 34 |
| 0.55 | 27 |
| 0.55 | 19 |
| 0.35 | 19 |
| 0.35 | 18 |
| 0.35 | 20 |
| 0.35 | 18 |
| 0.2 | 18 |
| 0.2 | 16 |
| 0.1 | 16 |
| 0.1 | 15 |
| 0.1 | 14 |
| 0.05 | 14 |
| 0.05 | 13 |
| 0.05 | 12 |
| 0.05 | 12 |
| 0.05 | 13 |
| 0.05 | 14 |
| 0.05 | 12 |
| 0.05 | 12 |
| 0.05 | 14 |
| 0.05 | 13 |
| 0.05 | 12 |
| 0.05 | 12 |
| 0.05 | 14 |
| 0.05 | 13 |
| 0.05 | 13 |
| 0.05 | 14 |
| 0.05 | 12 |
| 0.05 | 13 |
| 0.05 | 13 |
| 0.05 | 12 |
| 0.05 | 12 |
| 0.05 | 11 |
| 0.05 | 12 |
| 0.05 | 13 |
| 0.05 | 13 |
| 0.05 | 12 |
| 0.05 | 12 |
| 0.05 | 13 |
| 0.05 | 12 |

-continued

| Sensor 17 | |
|---|---|
| pressure | resistance |
| 0.05 | 12 |
| 0.05 | 13 |
| 0.05 | 12 |
| 0.05 | 12 |
| 0.05 | 10 |
| 0.05 | 12 |
| 0.05 | 12 |
| 0.05 | 13 |
| 0.05 | 10 |

| Sensor 18 | |
|---|---|
| pressure | resistance |
| 0.05 | 3 |
| 0.05 | 7 |
| 0.1 | 7 |
| 0.1 | 11 |
| 0.1 | 15 |
| 0.1 | 17 |
| 0.2 | 17 |
| 0.2 | 20 |
| 0.2 | 26 |
| 0.2 | 24 |
| 0.35 | 24 |
| 0.35 | 26 |
| 0.35 | 30 |
| 0.35 | 33 |
| 0.55 | 33 |
| 0.55 | 34 |
| 0.55 | 38 |
| 0.55 | 41 |
| 0.55 | 45 |
| 0.75 | 45 |
| 0.75 | 44 |
| 0.75 | 46 |
| 1.05 | 46 |
| 1.05 | 50 |
| 1.05 | 55 |
| 1.05 | 59 |
| 1.4 | 59 |
| 1.4 | 64 |
| 1.4 | 68 |
| 1.4 | 70 |
| 2 | 70 |
| 2 | 73 |
| 2 | 76 |
| 2 | 77 |
| 2.8 | 77 |
| 2.8 | 79 |
| 2.8 | 80 |
| 2.8 | 83 |
| 3.45 | 83 |
| 3.45 | 86 |
| 3.45 | 89 |
| 3.45 | 92 |
| 4.1 | 92 |
| 4.1 | 94 |
| 4.1 | 96 |
| 4.1 | 100 |
| 4.85 | 100 |
| 4.85 | 103 |
| 4.85 | 107 |
| 4.85 | 109 |
| 5.75 | 109 |
| 5.75 | 114 |
| 5.75 | 118 |
| 5.75 | 122 |
| 6.9 | 122 |
| 6.9 | 128 |
| 6.9 | 131 |
| 8.4 | 131 |

-continued

| Sensor 18 | |
|---|---|
| pressure | resistance |
| 8.4 | 130 |
| 8.4 | 133 |
| 9.55 | 133 |
| 9.55 | 136 |
| 9.55 | 138 |
| 9.55 | 140 |
| 10.45 | 140 |
| 10.45 | 142 |
| 10.45 | 143 |
| 10.45 | 146 |
| 11.3 | 146 |
| 11.3 | 144 |
| 11.3 | 151 |
| 11.3 | 150 |
| 12.2 | 150 |
| 12.2 | 151 |
| 12.2 | 152 |
| 12.85 | 152 |
| 12.85 | 158 |
| 12.85 | 159 |
| 12.85 | 162 |
| 13.8 | 162 |
| 13.8 | 164 |
| 13.8 | 165 |
| 15.1 | 165 |
| 15.1 | 168 |
| 15.1 | 169 |
| 15.1 | 168 |
| 16.15 | 168 |
| 16.15 | 170 |
| 16.15 | 172 |
| 16.8 | 172 |
| 16.8 | 174 |
| 16.8 | 175 |
| 16.8 | 177 |
| 17.45 | 177 |
| 17.45 | 178 |
| 17.45 | 181 |
| 18.45 | 181 |
| 18.45 | 182 |
| 18.45 | 179 |
| 18.45 | 185 |
| 19.5 | 185 |
| 19.5 | 186 |
| 19.5 | 194 |
| 19.5 | 187 |
| 19.5 | 188 |
| 20.45 | 188 |
| 20.45 | 189 |
| 20.45 | 190 |
| 20.45 | 191 |
| 20.95 | 191 |
| 20.95 | 192 |
| 20.95 | 198 |
| 21.7 | 198 |
| 21.7 | 196 |
| 21.7 | 195 |
| 21.7 | 198 |
| 22.65 | 198 |
| 22.65 | 199 |
| 22.65 | 201 |
| 23.4 | 201 |
| 23.4 | 200 |
| 23.4 | 203 |
| 24 | 203 |
| 24 | 204 |
| 24 | 206 |
| 24 | 204 |
| 24.7 | 204 |
| 24.7 | 207 |
| 24.7 | 212 |
| 24.7 | 208 |
| 25.5 | 208 |
| 25.5 | 209 |
| 25.5 | 210 |

-continued

| Sensor 18 | |
|---|---|
| pressure | resistance |
| 25.5 | 214 |
| 25.5 | 212 |
| 26.25 | 212 |
| 26.25 | 211 |
| 26.25 | 214 |
| 26.25 | 213 |
| 27 | 213 |
| 27 | 215 |
| 27.6 | 215 |
| 27.6 | 216 |
| 27.6 | 218 |
| 28.1 | 218 |
| 28.1 | 220 |
| 28.1 | 218 |
| 28.8 | 218 |
| 28.8 | 220 |
| 28.8 | 218 |
| 29.25 | 218 |
| 29.25 | 221 |
| 29.25 | 223 |
| 29.75 | 223 |
| 29.75 | 224 |
| 30.5 | 224 |
| 30.5 | 225 |
| 30.5 | 228 |
| 30.5 | 227 |
| 31.3 | 227 |
| 31.3 | 231 |
| 31.6 | 231 |
| 31.6 | 230 |
| 31.6 | 231 |
| 31.6 | 232 |
| 32.2 | 232 |
| 32.2 | 234 |
| 32.2 | 233 |
| 32.2 | 236 |
| 33.75 | 236 |
| 33.75 | 235 |
| 33.75 | 237 |
| 34.85 | 237 |
| 34.85 | 238 |
| 34.85 | 237 |
| 34.95 | 237 |
| 34.95 | 238 |
| 34.95 | 237 |
| 34.6 | 237 |
| 34.6 | 240 |
| 34.85 | 240 |
| 34.85 | 242 |
| 35.7 | 242 |
| 35.7 | 243 |
| 35.7 | 241 |
| 35.7 | 243 |
| 36.4 | 243 |
| 36.4 | 244 |
| 36.4 | 245 |
| 36.9 | 245 |
| 36.9 | 246 |
| 37.3 | 246 |
| 37.3 | 249 |
| 37.7 | 249 |
| 37.7 | 246 |
| 37.7 | 248 |
| 37.7 | 247 |
| 38.4 | 247 |
| 38.4 | 251 |
| 38.4 | 250 |
| 39.3 | 250 |
| 39.3 | 251 |
| 39.3 | 253 |
| 40.1 | 253 |
| 40.1 | 254 |
| 40.1 | 250 |
| 40.1 | 254 |
| 40.1 | 255 |

-continued

| Sensor 18 | |
|---|---|
| pressure | resistance |
| 40.8 | 255 |
| 40.8 | 256 |
| 40.8 | 257 |
| 40.8 | 256 |
| 41.35 | 256 |
| 41.35 | 257 |
| 41.35 | 259 |
| 42.05 | 259 |
| 42.05 | 257 |
| 42.05 | 258 |
| 42.6 | 258 |
| 42.6 | 260 |
| 42.6 | 261 |
| 43.25 | 261 |
| 43.25 | 255 |
| 43.25 | 262 |
| 43.25 | 263 |
| 43.65 | 263 |
| 43.65 | 262 |
| 43.65 | 263 |
| 44 | 263 |
| 44 | 264 |
| 44 | 265 |
| 44 | 264 |
| 44.4 | 264 |
| 44.4 | 262 |
| 44.4 | 265 |
| 44.4 | 266 |
| 44.85 | 266 |
| 44.85 | 268 |
| 44.85 | 267 |
| 45.2 | 267 |
| 45.2 | 268 |
| 45.2 | 269 |
| 45.8 | 269 |
| 45.8 | 268 |
| 45.8 | 269 |
| 46.4 | 269 |
| 46.4 | 270 |
| 46.4 | 272 |
| 46.4 | 268 |
| 46.85 | 268 |
| 46.85 | 272 |
| 46.85 | 271 |
| 46.85 | 272 |
| 46.9 | 272 |
| 46.9 | 273 |
| 46.9 | 272 |
| 46.9 | 273 |
| 47.45 | 273 |
| 47.45 | 274 |
| 47.45 | 275 |
| 48.25 | 275 |
| 48.25 | 276 |
| 48.25 | 275 |
| 48.25 | 277 |
| 49.1 | 277 |
| 49.1 | 275 |
| 49.1 | 277 |
| 49.25 | 277 |
| 49.25 | 278 |
| 49.8 | 278 |
| 49.8 | 279 |
| 49.8 | 280 |
| 51.05 | 280 |
| 51.05 | 281 |
| 51.05 | 282 |
| 51.05 | 281 |
| 52.25 | 281 |
| 52.25 | 282 |
| 52.25 | 284 |
| 52.5 | 284 |
| 52.5 | 283 |
| 52.5 | 284 |
| 52.5 | 282 |

-continued

| Sensor 18 | |
|---|---|
| pressure | resistance |
| 52.65 | 282 |
| 52.65 | 286 |
| 52.65 | 284 |
| 52.65 | 286 |
| 53.45 | 286 |
| 53.45 | 288 |
| 53.45 | 286 |
| 53.45 | 289 |
| 54.65 | 289 |
| 54.65 | 288 |
| 54.65 | 289 |
| 55.2 | 289 |
| 55.2 | 290 |
| 55.2 | 291 |
| 55.7 | 291 |
| 55.7 | 292 |
| 55.7 | 290 |
| 56.25 | 290 |
| 56.25 | 293 |
| 56.25 | 294 |
| 57.4 | 294 |
| 57.4 | 295 |
| 57.4 | 294 |
| 57.4 | 296 |
| 58.5 | 296 |
| 58.5 | 298 |
| 58.5 | 297 |
| 58.85 | 297 |
| 58.85 | 292 |
| 58.85 | 298 |
| 58.85 | 299 |
| 59.05 | 299 |
| 59.05 | 300 |
| 59.05 | 301 |
| 59.85 | 301 |
| 59.85 | 305 |
| 59.85 | 304 |
| 59.85 | 303 |
| 61.2 | 303 |
| 61.2 | 304 |
| 61.2 | 305 |
| 61.5 | 305 |
| 61.5 | 304 |
| 61.5 | 305 |
| 61.5 | 304 |
| 62.65 | 304 |
| 62.65 | 306 |
| 62.65 | 307 |
| 63.05 | 307 |
| 63.05 | 309 |
| 63.05 | 308 |
| 64.05 | 308 |
| 64.05 | 306 |
| 64.05 | 307 |
| 64.05 | 311 |
| 64.45 | 311 |
| 64.45 | 310 |
| 64.45 | 309 |
| 64.45 | 310 |
| 65.15 | 310 |
| 65.15 | 313 |
| 65.15 | 312 |
| 65.6 | 312 |
| 65.6 | 309 |
| 65.6 | 314 |
| 65.6 | 315 |
| 66.4 | 315 |
| 66.4 | 313 |
| 66.4 | 314 |
| 66.4 | 318 |
| 67.45 | 318 |
| 67.45 | 317 |
| 67.45 | 318 |
| 68.75 | 318 |
| 68.75 | 317 |

-continued

| Sensor 18 | |
|---|---|
| pressure | resistance |
| 68.75 | 319 |
| 69.95 | 319 |
| 69.95 | 320 |
| 69.95 | 321 |
| 70.65 | 321 |
| 70.65 | 320 |
| 70.65 | 321 |
| 71.15 | 321 |
| 71.15 | 322 |
| 71.15 | 323 |
| 71.15 | 324 |
| 71.85 | 324 |
| 71.85 | 323 |
| 71.85 | 324 |
| 71.85 | 325 |
| 72.65 | 325 |
| 72.65 | 328 |
| 72.65 | 327 |
| 73.9 | 327 |
| 73.9 | 328 |
| 73.9 | 327 |
| 74.65 | 327 |
| 74.65 | 329 |
| 74.65 | 330 |
| 76.2 | 330 |
| 76.2 | 331 |
| 76.2 | 330 |
| 76.2 | 332 |
| 76.9 | 332 |
| 76.9 | 335 |
| 76.9 | 332 |
| 76.9 | 334 |
| 78.05 | 334 |
| 78.05 | 332 |
| 78.05 | 334 |
| 78.9 | 334 |
| 78.9 | 336 |
| 78.9 | 334 |
| 80 | 334 |
| 80 | 336 |
| 80 | 338 |
| 80 | 337 |
| 80.9 | 337 |
| 80.9 | 339 |
| 80.9 | 338 |
| 81.65 | 338 |
| 81.65 | 340 |
| 81.65 | 341 |
| 82.55 | 341 |
| 83.5 | 341 |
| 83.5 | 344 |
| 83.5 | 342 |
| 84.35 | 342 |
| 84.35 | 344 |
| 84.35 | 342 |
| 84.35 | 344 |
| 84.55 | 344 |
| 84.55 | 343 |
| 84.55 | 344 |
| 84.95 | 344 |
| 84.95 | 345 |
| 84.95 | 344 |
| 84.95 | 346 |
| 85.6 | 346 |
| 85.6 | 345 |
| 85.6 | 347 |
| 86.7 | 347 |
| 86.7 | 345 |
| 86.7 | 348 |
| 86.7 | 349 |
| 87.5 | 349 |
| 87.5 | 351 |
| 87.5 | 348 |
| 87.5 | 350 |
| 88.9 | 350 |

-continued

| Sensor 18 | |
|---|---|
| pressure | resistance |
| 89.45 | 350 |
| 89.45 | 352 |
| 89.45 | 351 |
| 90.6 | 351 |
| 90.6 | 353 |
| 90.6 | 349 |
| 90.6 | 353 |
| 91.35 | 353 |
| 91.35 | 355 |
| 91.35 | 354 |
| 91.35 | 353 |
| 92.6 | 353 |
| 92.6 | 354 |
| 92.6 | 355 |
| 92.6 | 356 |
| 93.25 | 356 |
| 93.25 | 358 |
| 93.25 | 357 |
| 94.2 | 357 |
| 94.2 | 358 |
| 94.2 | 359 |
| 94.9 | 359 |
| 94.9 | 361 |
| 94.9 | 356 |
| 94.9 | 359 |
| 95.6 | 359 |
| 95.6 | 357 |
| 95.6 | 360 |
| 96.3 | 360 |
| 96.3 | 361 |
| 97.3 | 361 |
| 97.3 | 360 |
| 97.3 | 361 |
| 98.45 | 361 |
| 98.45 | 363 |
| 98.45 | 362 |
| 99.05 | 362 |
| 99.05 | 363 |
| 99.05 | 365 |
| 99.05 | 363 |
| 99.45 | 363 |
| 99.45 | 365 |
| 99.45 | 364 |
| 99.45 | 365 |
| 99.45 | 364 |
| 99.85 | 364 |
| 99.85 | 363 |
| 100.1 | 363 |
| 100.1 | 365 |
| 100.25 | 365 |
| 100.25 | 363 |
| 100.25 | 366 |
| 100.25 | 365 |
| 100.45 | 365 |
| 100.45 | 366 |
| 100.4 | 366 |
| 100.4 | 366 |
| 100.4 | 363 |
| 100.4 | 366 |
| 100.4 | 367 |
| 100.25 | 367 |
| 100.25 | 366 |
| 100.25 | 367 |
| 100.25 | 367 |
| 100.3 | 367 |
| 100.3 | 368 |
| 100.3 | 367 |
| 100.3 | 370 |
| 100.35 | 370 |
| 100.35 | 368 |
| 100.35 | 365 |
| 100.35 | 369 |
| 100.35 | 368 |
| 101.65 | 368 |
| 101.65 | 369 |
| 101.65 | 368 |
| 101.65 | 369 |
| 102.85 | 369 |
| 102.85 | 368 |
| 102.85 | 369 |
| 102.7 | 369 |
| 102.7 | 373 |
| 102.7 | 369 |
| 101.45 | 369 |
| 101.45 | 370 |
| 101.45 | 366 |
| 101.45 | 368 |
| 99.85 | 368 |
| 99.85 | 367 |
| 97.65 | 367 |
| 97.65 | 366 |
| 97.65 | 367 |
| 97.65 | 366 |
| 94.9 | 366 |
| 94.9 | 364 |
| 94.9 | 365 |
| 94.9 | 363 |
| 92 | 363 |
| 92 | 364 |
| 92 | 362 |
| 92 | 361 |
| 89.25 | 361 |
| 89.25 | 359 |
| 89.25 | 356 |
| 85.85 | 356 |
| 85.85 | 357 |
| 85.85 | 356 |
| 82 | 356 |
| 82 | 354 |
| 82 | 353 |
| 77.75 | 353 |
| 77.75 | 351 |
| 77.75 | 347 |
| 77.75 | 349 |
| 74.15 | 349 |
| 74.15 | 347 |
| 74.15 | 346 |
| 74.15 | 344 |
| 70.5 | 344 |
| 70.5 | 345 |
| 70.5 | 344 |
| 70.5 | 342 |
| 67.5 | 342 |
| 67.5 | 341 |
| 65.1 | 341 |
| 65.1 | 340 |
| 65.1 | 339 |
| 63.5 | 339 |
| 63.5 | 337 |
| 63.5 | 335 |
| 62.05 | 335 |
| 62.05 | 336 |
| 62.05 | 335 |
| 62.05 | 334 |
| 60.5 | 334 |
| 60.5 | 333 |
| 60.5 | 332 |
| 58.75 | 332 |
| 58.75 | 331 |
| 58.75 | 330 |
| 58.75 | 329 |
| 57 | 329 |
| 57 | 328 |
| 57 | 326 |
| 57 | 327 |
| 55.3 | 327 |
| 55.3 | 325 |
| 55.3 | 321 |
| 55.3 | 324 |
| 53.5 | 324 |

-continued

| Sensor 18 | |
|---|---|
| pressure | resistance |
| 53.5 | 322 |
| 53.5 | 323 |
| 53.5 | 320 |
| 51.9 | 320 |
| 51.9 | 319 |
| 51.9 | 320 |
| 50.5 | 320 |
| 50.5 | 317 |
| 50.5 | 318 |
| 50.5 | 317 |
| 49.5 | 317 |
| 49.5 | 318 |
| 49.5 | 317 |
| 49.5 | 314 |
| 48.8 | 314 |
| 48.8 | 317 |
| 48.8 | 316 |
| 48.8 | 315 |
| 48.3 | 315 |
| 48.3 | 314 |
| 48.3 | 312 |
| 47.45 | 312 |
| 47.45 | 311 |
| 47.45 | 310 |
| 45.95 | 310 |
| 45.95 | 306 |
| 45.95 | 305 |
| 45.95 | 307 |
| 44.3 | 307 |
| 44.3 | 304 |
| 42.95 | 304 |
| 42.95 | 299 |
| 42.95 | 300 |
| 42.95 | 301 |
| 41.7 | 301 |
| 41.7 | 300 |
| 41.7 | 299 |
| 41.7 | 296 |
| 40.3 | 296 |
| 40.3 | 293 |
| 38.95 | 293 |
| 38.95 | 294 |
| 38.95 | 292 |
| 37.65 | 292 |
| 37.65 | 291 |
| 36.65 | 291 |
| 36.65 | 289 |
| 36.65 | 286 |
| 35.6 | 286 |
| 35.6 | 284 |
| 35.6 | 283 |
| 34.35 | 283 |
| 34.35 | 284 |
| 34.35 | 280 |
| 34.35 | 282 |
| 33.1 | 282 |
| 33.1 | 283 |
| 33.1 | 281 |
| 33.1 | 280 |
| 33.1 | 281 |
| 32 | 281 |
| 32 | 277 |
| 32 | 276 |
| 32 | 274 |
| 30.95 | 274 |
| 30.95 | 275 |
| 30.95 | 273 |
| 29.95 | 273 |
| 29.95 | 271 |
| 29.95 | 272 |
| 29.15 | 272 |
| 29.15 | 271 |
| 29.15 | 270 |
| 28.5 | 270 |
| 28.5 | 271 |

-continued

| Sensor 18 | |
|---|---|
| pressure | resistance |
| 28.5 | 269 |
| 27.75 | 269 |
| 27.75 | 267 |
| 27.75 | 266 |
| 27.75 | 265 |
| 26.75 | 265 |
| 26.75 | 264 |
| 26.75 | 263 |
| 26.75 | 261 |
| 25.6 | 261 |
| 25.6 | 260 |
| 25.6 | 262 |
| 25.6 | 258 |
| 24.55 | 258 |
| 24.55 | 255 |
| 24.55 | 253 |
| 23.6 | 253 |
| 23.6 | 255 |
| 23.6 | 252 |
| 23.6 | 245 |
| 22.6 | 245 |
| 22.6 | 249 |
| 22.6 | 250 |
| 22.6 | 249 |
| 21.5 | 249 |
| 21.5 | 248 |
| 21.5 | 246 |
| 21.5 | 245 |
| 20.55 | 245 |
| 20.55 | 244 |
| 20.55 | 242 |
| 19.7 | 242 |
| 19.7 | 240 |
| 19.7 | 241 |
| 19.7 | 240 |
| 19.05 | 240 |
| 19.05 | 239 |
| 19.05 | 237 |
| 19.05 | 234 |
| 18.4 | 234 |
| 18.4 | 230 |
| 17.5 | 230 |
| 17.5 | 231 |
| 17.5 | 229 |
| 17.5 | 234 |
| 16.55 | 234 |
| 16.55 | 230 |
| 16.55 | 228 |
| 16.55 | 226 |
| 15.85 | 226 |
| 15.85 | 225 |
| 15.85 | 224 |
| 15.35 | 224 |
| 15.35 | 223 |
| 15.35 | 224 |
| 14.85 | 224 |
| 14.85 | 225 |
| 14.85 | 221 |
| 14.85 | 223 |
| 14.45 | 223 |
| 14.45 | 219 |
| 14.45 | 218 |
| 14.45 | 217 |
| 14.45 | 218 |
| 14.1 | 218 |
| 14.1 | 217 |
| 14.1 | 211 |
| 14.1 | 213 |
| 13.6 | 213 |
| 13.6 | 215 |
| 13.6 | 214 |
| 13 | 214 |
| 13 | 212 |
| 13 | 213 |
| 13 | 212 |

-continued

| Sensor 18 | |
|---|---|
| pressure | resistance |
| 12.65 | 212 |
| 12.65 | 210 |
| 12.65 | 209 |
| 12.65 | 210 |
| 12.3 | 210 |
| 12.3 | 208 |
| 12.3 | 206 |
| 12.3 | 205 |
| 11.8 | 205 |
| 11.8 | 204 |
| 11.8 | 202 |
| 11.8 | 201 |
| 11.15 | 201 |
| 11.15 | 200 |
| 10.7 | 200 |
| 10.7 | 198 |
| 10.7 | 195 |
| 10.4 | 195 |
| 10.4 | 192 |
| 10 | 192 |
| 10 | 193 |
| 10 | 190 |
| 10 | 189 |
| 9.5 | 189 |
| 9.5 | 188 |
| 9.5 | 186 |
| 8.95 | 186 |
| 8.95 | 187 |
| 8.95 | 186 |
| 8.95 | 181 |
| 8.5 | 181 |
| 8.5 | 177 |
| 8.5 | 173 |
| 8.5 | 172 |
| 7.8 | 172 |
| 7.8 | 170 |
| 7.8 | 169 |
| 7.8 | 167 |
| 6.95 | 167 |
| 6.95 | 165 |
| 6.95 | 160 |
| 6.95 | 163 |
| 6.25 | 163 |
| 6.25 | 160 |
| 6.25 | 158 |
| 6.25 | 157 |
| 5.8 | 157 |
| 5.8 | 156 |
| 5.8 | 154 |
| 5.8 | 153 |
| 5.45 | 153 |
| 5.45 | 152 |
| 5.45 | 151 |
| 5.1 | 151 |
| 5.1 | 150 |
| 5.1 | 147 |
| 5.1 | 146 |
| 4.8 | 146 |
| 4.8 | 145 |
| 4.8 | 144 |
| 4.8 | 143 |
| 4.5 | 143 |
| 4.5 | 141 |
| 4.5 | 139 |
| 4.5 | 136 |
| 4.15 | 136 |
| 4.15 | 134 |
| 4.15 | 131 |
| 4.15 | 129 |
| 3.7 | 129 |
| 3.7 | 127 |
| 3.35 | 127 |
| 3.35 | 126 |
| 3.35 | 125 |
| 3.35 | 124 |

-continued

| Sensor 18 | |
|---|---|
| pressure | resistance |
| 3.15 | 124 |
| 3.15 | 119 |
| 3.15 | 120 |
| 3.15 | 119 |
| 3 | 119 |
| 3 | 118 |
| 2.85 | 118 |
| 2.85 | 114 |
| 2.85 | 111 |
| 2.85 | 112 |
| 2.6 | 112 |
| 2.6 | 108 |
| 2.6 | 105 |
| 2.3 | 105 |
| 2.3 | 98 |
| 2.3 | 94 |
| 2.3 | 91 |
| 1.9 | 91 |
| 1.9 | 87 |
| 1.9 | 84 |
| 1.9 | 78 |
| 1.5 | 78 |
| 1.5 | 76 |
| 1.5 | 70 |
| 1.5 | 67 |
| 1.15 | 67 |
| 1.15 | 68 |
| 1.15 | 65 |
| 1.15 | 63 |
| 0.9 | 63 |
| 0.9 | 58 |
| 0.9 | 51 |
| 0.9 | 45 |
| 0.7 | 45 |
| 0.7 | 41 |
| 0.7 | 35 |
| 0.7 | 26 |
| 0.5 | 26 |
| 0.5 | 19 |
| 0.5 | 16 |
| 0.5 | 14 |
| 0.25 | 14 |
| 0.25 | 13 |
| 0.25 | 12 |
| 0.25 | 13 |
| 0.1 | 13 |
| 0.1 | 12 |
| 0.1 | 11 |
| 0.05 | 11 |
| 0.05 | 12 |
| 0.05 | 11 |
| 0.05 | 10 |
| 0.05 | 10 |
| 0.05 | 8 |
| 0.05 | 10 |
| 0.05 | 10 |
| 0.05 | 9 |
| 0.05 | 10 |
| 0.05 | 10 |
| 0.05 | 11 |
| 0.05 | 9 |
| 0.05 | 11 |
| 0.05 | 11 |
| 0.05 | 9 |
| 0.05 | 10 |
| 0.05 | 11 |
| 0.05 | 11 |
| 0.05 | 10 |
| 0.05 | 11 |
| 0.05 | 10 |
| 0.05 | 10 |
| 0.05 | 11 |
| 0.05 | 10 |
| 0.05 | 10 |
| 0.05 | 11 |

-continued

| Sensor 18 | |
|---|---|
| pressure | resistance |
| 0.05 | 11 |
| 0.05 | 10 |
| 0.05 | 10 |
| 0.05 | 9 |
| 0.05 | 11 |
| 0.05 | 8 |
| 0.05 | 8 |
| 0.05 | 13 |
| 0.05 | 10 |
| 0.05 | 9 |
| 0.05 | 9 |
| 0.05 | 8 |

| Sensor 19 | |
|---|---|
| pressure | resistance |
| 0.05 | 11 |
| 0.05 | 15 |
| 0.05 | 16 |
| 0.05 | 18 |
| 0.25 | 18 |
| 0.25 | 22 |
| 0.25 | 25 |
| 0.4 | 25 |
| 0.4 | 27 |
| 0.4 | 29 |
| 0.6 | 29 |
| 0.6 | 35 |
| 0.6 | 36 |
| 0.6 | 37 |
| 0.6 | 39 |
| 0.8 | 39 |
| 0.8 | 41 |
| 1.05 | 41 |
| 1.05 | 43 |
| 1.05 | 45 |
| 1.05 | 49 |
| 1.25 | 49 |
| 1.25 | 53 |
| 1.25 | 56 |
| 1.25 | 59 |
| 1.7 | 59 |
| 1.7 | 63 |
| 1.7 | 66 |
| 1.7 | 67 |
| 2.4 | 67 |
| 2.4 | 69 |
| 2.4 | 70 |
| 2.4 | 73 |
| 3.15 | 73 |
| 3.15 | 76 |
| 3.15 | 83 |
| 3.15 | 80 |
| 3.8 | 80 |
| 3.8 | 81 |
| 3.8 | 84 |
| 3.8 | 86 |
| 3.8 | 88 |
| 4.5 | 88 |
| 4.5 | 89 |
| 4.5 | 93 |
| 4.5 | 96 |
| 5.25 | 96 |
| 5.25 | 101 |
| 5.25 | 103 |
| 5.25 | 109 |
| 6.4 | 109 |
| 6.4 | 112 |
| 6.4 | 115 |
| 6.4 | 122 |
| 8.1 | 122 |

-continued

| Sensor 19 | |
|---|---|
| pressure | resistance |
| 8.1 | 119 |
| 8.1 | 123 |
| 8.1 | 124 |
| 9.65 | 124 |
| 9.65 | 125 |
| 9.65 | 128 |
| 9.65 | 130 |
| 10.9 | 130 |
| 10.9 | 132 |
| 10.9 | 136 |
| 10.9 | 137 |
| 12.05 | 137 |
| 12.05 | 141 |
| 12.05 | 142 |
| 13.25 | 142 |
| 13.25 | 144 |
| 13.25 | 146 |
| 13.25 | 151 |
| 14.5 | 151 |
| 14.5 | 152 |
| 14.5 | 157 |
| 14.5 | 155 |
| 14.5 | 160 |
| 15.95 | 160 |
| 15.95 | 163 |
| 15.95 | 166 |
| 17.85 | 166 |
| 17.85 | 167 |
| 17.85 | 171 |
| 19.15 | 171 |
| 19.15 | 172 |
| 19.15 | 176 |
| 19.15 | 178 |
| 20.6 | 178 |
| 20.6 | 180 |
| 20.6 | 181 |
| 22.25 | 181 |
| 22.25 | 183 |
| 22.25 | 185 |
| 23.35 | 185 |
| 23.35 | 183 |
| 23.35 | 191 |
| 23.35 | 190 |
| 24.2 | 190 |
| 24.2 | 192 |
| 24.2 | 194 |
| 25 | 194 |
| 25 | 193 |
| 25 | 195 |
| 25 | 196 |
| 25.9 | 196 |
| 25.9 | 197 |
| 25.9 | 200 |
| 26.6 | 200 |
| 26.6 | 202 |
| 27.5 | 202 |
| 27.5 | 201 |
| 27.5 | 202 |
| 27.5 | 204 |
| 28.35 | 204 |
| 28.35 | 205 |
| 28.35 | 203 |
| 28.35 | 205 |
| 28.9 | 205 |
| 28.9 | 206 |
| 28.9 | 207 |
| 29.3 | 207 |
| 29.3 | 209 |
| 29.3 | 211 |
| 29.95 | 211 |
| 29.95 | 215 |
| 29.95 | 211 |
| 29.95 | 213 |
| 30.75 | 213 |
| 30.75 | 212 |

-continued

| Sensor 19 | |
|---|---|
| pressure | resistance |
| 30.75 | 214 |
| 30.75 | 213 |
| 31.45 | 213 |
| 31.45 | 215 |
| 31.45 | 216 |
| 31.45 | 220 |
| 32.45 | 220 |
| 32.45 | 221 |
| 32.45 | 220 |
| 33.55 | 220 |
| 33.55 | 221 |
| 33.55 | 223 |
| 34.05 | 223 |
| 34.05 | 224 |
| 34.05 | 225 |
| 34.55 | 225 |
| 34.55 | 227 |
| 35.45 | 227 |
| 35.45 | 228 |
| 35.45 | 230 |
| 35.45 | 227 |
| 36.4 | 227 |
| 36.4 | 230 |
| 36.4 | 231 |
| 36.7 | 231 |
| 36.7 | 233 |
| 36.7 | 232 |
| 36.7 | 226 |
| 36.9 | 226 |
| 36.9 | 232 |
| 36.9 | 235 |
| 36.9 | 234 |
| 37.7 | 234 |
| 37.7 | 236 |
| 37.7 | 237 |
| 38.8 | 237 |
| 38.8 | 239 |
| 38.8 | 243 |
| 40.1 | 243 |
| 40.1 | 240 |
| 40.1 | 241 |
| 41.5 | 241 |
| 41.5 | 248 |
| 41.5 | 243 |
| 41.5 | 245 |
| 42.75 | 245 |
| 42.75 | 244 |
| 42.75 | 245 |
| 42.75 | 252 |
| 43.6 | 252 |
| 43.6 | 249 |
| 43.6 | 248 |
| 43.6 | 249 |
| 43.85 | 249 |
| 43.85 | 247 |
| 43.85 | 251 |
| 44.2 | 251 |
| 44.2 | 250 |
| 44.2 | 252 |
| 44.2 | 254 |
| 44.95 | 254 |
| 44.95 | 255 |
| 46.15 | 255 |
| 46.15 | 257 |
| 46.15 | 258 |
| 47.2 | 258 |
| 47.2 | 259 |
| 47.2 | 261 |
| 47.2 | 264 |
| 48.35 | 264 |
| 48.35 | 260 |
| 48.35 | 261 |
| 48.35 | 263 |
| 49.5 | 263 |
| 49.5 | 264 |

-continued

| Sensor 19 | |
|---|---|
| pressure | resistance |
| 50.2 | 264 |
| 50.2 | 265 |
| 50.2 | 268 |
| 50.2 | 267 |
| 51 | 267 |
| 51 | 269 |
| 51 | 268 |
| 51 | 270 |
| 52.1 | 270 |
| 52.1 | 268 |
| 52.1 | 271 |
| 52.1 | 270 |
| 53.3 | 270 |
| 53.3 | 273 |
| 53.3 | 275 |
| 54.35 | 275 |
| 54.35 | 274 |
| 54.35 | 277 |
| 55.25 | 277 |
| 55.25 | 279 |
| 55.25 | 276 |
| 56.05 | 276 |
| 56.05 | 277 |
| 56.05 | 279 |
| 56.7 | 279 |
| 56.7 | 281 |
| 57.25 | 281 |
| 57.25 | 280 |
| 57.25 | 281 |
| 57.25 | 283 |
| 57.85 | 283 |
| 57.85 | 280 |
| 57.85 | 283 |
| 57.85 | 284 |
| 58.5 | 284 |
| 58.5 | 286 |
| 58.5 | 285 |
| 58.5 | 284 |
| 59.4 | 284 |
| 59.4 | 287 |
| 59.4 | 286 |
| 59.4 | 287 |
| 59.85 | 287 |
| 59.85 | 288 |
| 59.85 | 289 |
| 59.85 | 288 |
| 60.55 | 288 |
| 60.55 | 290 |
| 60.55 | 287 |
| 61.2 | 287 |
| 61.2 | 291 |
| 61.2 | 290 |
| 61.2 | 292 |
| 61.75 | 292 |
| 61.75 | 291 |
| 61.75 | 292 |
| 62.1 | 292 |
| 62.1 | 294 |
| 62.1 | 293 |
| 62.1 | 295 |
| 62.9 | 295 |
| 62.9 | 296 |
| 62.9 | 297 |
| 62.9 | 296 |
| 63.35 | 296 |
| 63.35 | 300 |
| 63.35 | 297 |
| 64.05 | 297 |
| 64.05 | 296 |
| 64.05 | 294 |
| 64.05 | 297 |
| 64.35 | 297 |
| 64.35 | 298 |
| 64.35 | 300 |
| 65.1 | 300 |

-continued

| Sensor 19 | |
|---|---|
| pressure | resistance |
| 65.1 | 298 |
| 65.1 | 299 |
| 65.1 | 298 |
| 65.4 | 298 |
| 65.4 | 299 |
| 65.4 | 305 |
| 66.1 | 305 |
| 66.1 | 302 |
| 66.75 | 302 |
| 66.75 | 304 |
| 66.75 | 303 |
| 67.65 | 303 |
| 67.65 | 304 |
| 67.65 | 305 |
| 67.65 | 306 |
| 68.7 | 306 |
| 68.7 | 305 |
| 68.7 | 308 |
| 68.7 | 307 |
| 69.65 | 307 |
| 69.65 | 308 |
| 69.65 | 305 |
| 70.55 | 305 |
| 70.55 | 308 |
| 70.55 | 309 |
| 71.2 | 309 |
| 71.2 | 310 |
| 71.2 | 311 |
| 72.2 | 311 |
| 72.2 | 313 |
| 73 | 313 |
| 73 | 314 |
| 74.25 | 314 |
| 74.25 | 315 |
| 74.25 | 316 |
| 74.9 | 316 |
| 74.9 | 319 |
| 74.9 | 317 |
| 75.6 | 317 |
| 75.6 | 318 |
| 75.6 | 317 |
| 75.6 | 316 |
| 76.45 | 316 |
| 76.45 | 320 |
| 76.45 | 319 |
| 76.45 | 320 |
| 77.3 | 320 |
| 77.3 | 321 |
| 78.5 | 321 |
| 78.5 | 318 |
| 78.5 | 321 |
| 78.5 | 323 |
| 79.05 | 323 |
| 79.05 | 321 |
| 79.05 | 323 |
| 79.05 | 326 |
| 80.05 | 326 |
| 80.05 | 324 |
| 80.05 | 323 |
| 80.05 | 325 |
| 80.6 | 325 |
| 80.6 | 326 |
| 81.6 | 326 |
| 82.2 | 326 |
| 82.2 | 327 |
| 82.2 | 330 |
| 82.2 | 329 |
| 82.2 | 328 |
| 83.5 | 328 |
| 83.5 | 329 |
| 83.5 | 330 |
| 83.5 | 329 |
| 84 | 329 |
| 84 | 330 |
| 84.75 | 330 |

-continued

| Sensor 19 | |
|---|---|
| pressure | resistance |
| 84.75 | 331 |
| 84.75 | 330 |
| 84.7 | 330 |
| 84.7 | 333 |
| 85.65 | 333 |
| 85.65 | 332 |
| 85.65 | 333 |
| 85.65 | 335 |
| 86.45 | 335 |
| 86.45 | 334 |
| 86.45 | 335 |
| 87.9 | 335 |
| 87.9 | 336 |
| 88.6 | 336 |
| 88.6 | 337 |
| 88.6 | 338 |
| 88.6 | 337 |
| 89.8 | 337 |
| 89.8 | 340 |
| 89.8 | 336 |
| 90.65 | 336 |
| 90.65 | 339 |
| 90.65 | 337 |
| 91.5 | 337 |
| 91.5 | 339 |
| 91.5 | 340 |
| 92.2 | 340 |
| 92.2 | 341 |
| 92.2 | 342 |
| 92.95 | 342 |
| 92.95 | 343 |
| 93.7 | 343 |
| 93.7 | 341 |
| 93.7 | 343 |
| 94.4 | 343 |
| 94.4 | 345 |
| 94.4 | 344 |
| 94.4 | 345 |
| 95.25 | 345 |
| 95.25 | 346 |
| 95.25 | 347 |
| 95.25 | 346 |
| 95.9 | 346 |
| 95.9 | 349 |
| 95.9 | 347 |
| 95.9 | 346 |
| 96.65 | 346 |
| 96.65 | 347 |
| 96.65 | 348 |
| 97.25 | 348 |
| 97.25 | 346 |
| 97.25 | 348 |
| 97.25 | 349 |
| 97.65 | 349 |
| 97.65 | 347 |
| 98.3 | 347 |
| 98.3 | 349 |
| 98.3 | 350 |
| 98.95 | 350 |
| 98.95 | 352 |
| 98.95 | 349 |
| 98.95 | 350 |
| 99.7 | 350 |
| 99.7 | 351 |
| 99.7 | 350 |
| 99.7 | 351 |
| 99.9 | 351 |
| 99.9 | 352 |
| 100.25 | 352 |
| 100.55 | 352 |
| 100.55 | 353 |
| 100.55 | 353 |
| 100.55 | 352 |
| 100.8 | 352 |
| 100.8 | 353 |

-continued

| Sensor 19 | |
|---|---|
| pressure | resistance |
| 100.8 | 354 |
| 100.85 | 354 |
| 100.85 | 356 |
| 100.85 | 354 |
| 101.6 | 354 |
| 101.6 | 355 |
| 101.6 | 354 |
| 102.65 | 354 |
| 102.65 | 356 |
| 102.65 | 354 |
| 102.65 | 358 |
| 102.65 | 354 |
| 102.7 | 354 |
| 102.7 | 353 |
| 102.7 | 355 |
| 100.75 | 355 |
| 100.75 | 353 |
| 100.75 | 356 |
| 100.75 | 354 |
| 99.45 | 354 |
| 99.45 | 353 |
| 99.45 | 356 |
| 97.05 | 356 |
| 97.05 | 351 |
| 97.05 | 348 |
| 92.85 | 348 |
| 92.85 | 347 |
| 92.85 | 349 |
| 92.85 | 348 |
| 88.25 | 348 |
| 88.25 | 346 |
| 85 | 346 |
| 85 | 347 |
| 85 | 344 |
| 85 | 346 |
| 85 | 344 |
| 82.35 | 344 |
| 82.35 | 342 |
| 79.8 | 342 |
| 79.8 | 341 |
| 79.8 | 339 |
| 77.35 | 339 |
| 77.35 | 336 |
| 75 | 336 |
| 75 | 338 |
| 75 | 334 |
| 72.3 | 334 |
| 72.3 | 332 |
| 72.3 | 331 |
| 69.25 | 331 |
| 69.25 | 328 |
| 69.25 | 327 |
| 69.25 | 324 |
| 65.75 | 324 |
| 65.75 | 327 |
| 65.75 | 325 |
| 65.75 | 323 |
| 62.9 | 323 |
| 62.9 | 324 |
| 62.9 | 325 |
| 61.45 | 325 |
| 61.45 | 322 |
| 61.45 | 324 |
| 61.45 | 321 |
| 60.25 | 321 |
| 60.25 | 322 |
| 59 | 322 |
| 59 | 319 |
| 59 | 320 |
| 59 | 321 |
| 57.85 | 321 |
| 57.85 | 319 |
| 57.85 | 321 |
| 57.85 | 319 |
| 57.1 | 319 |

-continued

| Sensor 19 | |
|---|---|
| pressure | resistance |
| 57.1 | 320 |
| 57.1 | 319 |
| 57.1 | 318 |
| 56.25 | 318 |
| 56.25 | 315 |
| 56.25 | 317 |
| 56.25 | 314 |
| 54.9 | 314 |
| 54.9 | 313 |
| 53.4 | 313 |
| 53.4 | 317 |
| 53.4 | 313 |
| 53.4 | 314 |
| 52.4 | 314 |
| 52.4 | 309 |
| 52.4 | 312 |
| 51.25 | 312 |
| 51.25 | 308 |
| 51.25 | 307 |
| 51.25 | 303 |
| 51.25 | 305 |
| 49.65 | 305 |
| 49.65 | 304 |
| 49.65 | 303 |
| 47.9 | 303 |
| 47.9 | 301 |
| 47.9 | 300 |
| 47.9 | 299 |
| 46.3 | 299 |
| 46.3 | 297 |
| 46.3 | 298 |
| 46.3 | 294 |
| 44.75 | 294 |
| 44.75 | 296 |
| 44.75 | 294 |
| 43.25 | 294 |
| 43.25 | 293 |
| 43.25 | 295 |
| 43.25 | 293 |
| 42.4 | 293 |
| 42.4 | 294 |
| 42.4 | 291 |
| 41.8 | 291 |
| 41.8 | 287 |
| 41.8 | 292 |
| 41.8 | 289 |
| 41.2 | 289 |
| 41.2 | 290 |
| 41.2 | 287 |
| 40.2 | 287 |
| 40.2 | 286 |
| 39.15 | 286 |
| 39.15 | 282 |
| 39.15 | 281 |
| 39.15 | 283 |
| 38.1 | 283 |
| 37.25 | 283 |
| 37.25 | 281 |
| 37.25 | 280 |
| 36.5 | 280 |
| 36.5 | 278 |
| 36.5 | 276 |
| 36.5 | 279 |
| 35.8 | 279 |
| 35.8 | 275 |
| 35.8 | 277 |
| 35.8 | 276 |
| 34.8 | 276 |
| 34.8 | 275 |
| 34.8 | 272 |
| 33.7 | 272 |
| 33.7 | 270 |
| 33.7 | 266 |
| 33.7 | 269 |
| 32.4 | 269 |

-continued

| Sensor 19 | |
|---|---|
| pressure | resistance |
| 32.4 | 267 |
| 32.4 | 268 |
| 32.4 | 267 |
| 31.1 | 267 |
| 31.1 | 265 |
| 31.1 | 266 |
| 31.1 | 263 |
| 30.15 | 263 |
| 30.15 | 262 |
| 30.15 | 265 |
| 30.15 | 262 |
| 29.3 | 262 |
| 29.3 | 260 |
| 29.3 | 262 |
| 29.3 | 259 |
| 28.45 | 259 |
| 28.45 | 258 |
| 28.45 | 259 |
| 27.7 | 259 |
| 27.7 | 254 |
| 27.7 | 256 |
| 27.7 | 257 |
| 27.15 | 257 |
| 27.15 | 258 |
| 27.15 | 255 |
| 26.65 | 255 |
| 26.65 | 251 |
| 26.65 | 254 |
| 26.25 | 254 |
| 26.25 | 257 |
| 26.25 | 252 |
| 25.8 | 252 |
| 25.8 | 250 |
| 25.8 | 249 |
| 25.8 | 248 |
| 25.05 | 248 |
| 25.05 | 249 |
| 25.05 | 247 |
| 24.2 | 247 |
| 24.2 | 246 |
| 24.2 | 247 |
| 24.2 | 244 |
| 23.3 | 244 |
| 23.3 | 242 |
| 23.3 | 240 |
| 22.55 | 240 |
| 22.55 | 243 |
| 22.55 | 240 |
| 22.55 | 241 |
| 22.55 | 239 |
| 21.9 | 239 |
| 21.9 | 240 |
| 21.9 | 238 |
| 21.9 | 237 |
| 21.35 | 237 |
| 21.35 | 236 |
| 21.35 | 235 |
| 21.35 | 234 |
| 20.65 | 234 |
| 20.65 | 232 |
| 20.65 | 230 |
| 19.85 | 230 |
| 19.85 | 231 |
| 19.85 | 230 |
| 19.85 | 224 |
| 19.05 | 224 |
| 19.05 | 226 |
| 19.05 | 223 |
| 19.05 | 224 |
| 18.1 | 224 |
| 18.1 | 223 |
| 18.1 | 222 |
| 17.3 | 222 |
| 17.3 | 221 |
| 17.3 | 216 |

-continued

| Sensor 19 | |
|---|---|
| pressure | resistance |
| 16.7 | 216 |
| 16.7 | 214 |
| 16.7 | 215 |
| 16 | 215 |
| 16 | 213 |
| 16 | 212 |
| 16 | 211 |
| 16 | 210 |
| 15.1 | 210 |
| 15.1 | 208 |
| 15.1 | 204 |
| 14.25 | 204 |
| 14.25 | 202 |
| 14.25 | 200 |
| 14.25 | 199 |
| 13.25 | 199 |
| 13.25 | 195 |
| 13.25 | 194 |
| 13.25 | 195 |
| 12.25 | 195 |
| 12.25 | 193 |
| 12.25 | 192 |
| 11.65 | 192 |
| 11.65 | 191 |
| 11.65 | 189 |
| 11.25 | 189 |
| 11.25 | 187 |
| 11.25 | 185 |
| 11.25 | 184 |
| 10.65 | 184 |
| 10.65 | 185 |
| 10.65 | 181 |
| 10.65 | 182 |
| 10.15 | 182 |
| 10.15 | 181 |
| 10.15 | 183 |
| 10.15 | 178 |
| 10.15 | 175 |
| 9.65 | 175 |
| 9.65 | 174 |
| 9.65 | 168 |
| 9.65 | 163 |
| 8.85 | 163 |
| 8.85 | 162 |
| 8.85 | 158 |
| 8.85 | 154 |
| 7.7 | 154 |
| 7.7 | 150 |
| 7.7 | 147 |
| 7.7 | 145 |
| 6.4 | 145 |
| 6.4 | 144 |
| 6.4 | 145 |
| 6.4 | 141 |
| 5.55 | 141 |
| 5.55 | 140 |
| 5.55 | 137 |
| 5 | 137 |
| 5 | 135 |
| 5 | 137 |
| 5 | 135 |
| 4.7 | 135 |
| 4.7 | 134 |
| 4.7 | 132 |
| 4.45 | 132 |
| 4.45 | 129 |
| 4.45 | 125 |
| 4.45 | 122 |
| 4.45 | 118 |
| 4.05 | 118 |
| 4.05 | 114 |
| 4.05 | 111 |
| 3.4 | 111 |
| 3.4 | 110 |
| 3.4 | 111 |

-continued

| Sensor 19 | |
|---|---|
| pressure | resistance |
| 3.4 | 108 |
| 3.4 | 104 |
| 2.85 | 104 |
| 2.85 | 99 |
| 2.85 | 95 |
| 2.85 | 93 |
| 2.4 | 93 |
| 2.4 | 91 |
| 2.4 | 89 |
| 2.4 | 87 |
| 1.95 | 87 |
| 1.95 | 85 |
| 1.95 | 82 |
| 1.6 | 82 |
| 1.6 | 80 |
| 1.6 | 75 |
| 1.4 | 75 |
| 1.4 | 70 |
| 1.4 | 64 |
| 1.4 | 59 |
| 1.1 | 59 |
| 1.1 | 60 |
| 1.1 | 62 |
| 1.1 | 58 |
| 1.1 | 57 |
| 0.8 | 57 |
| 0.8 | 51 |
| 0.8 | 49 |
| 0.8 | 47 |
| 0.6 | 47 |
| 0.6 | 38 |
| 0.45 | 38 |
| 0.45 | 34 |
| 0.45 | 32 |
| 0.45 | 30 |
| 0.3 | 30 |
| 0.3 | 26 |
| 0.3 | 24 |
| 0.15 | 24 |
| 0.15 | 20 |
| 0.15 | 16 |
| 0.15 | 15 |
| 0.05 | 15 |
| 0.05 | 11 |
| 0.05 | 14 |

Summary of Sensor Responses for Increasing Force

| sensorNum | increasing pressure logarithmic trendline | slope | $R^2$ value |
|---|---|---|---|
| 0 | y = 79.532ln(x) + 35.65 | 79.532 | 0.90091 |
| 1 | y = 73.492ln(x) + 76.504 | 73.492 | 0.89734 |
| 2 | y = 71.258ln(x) + 57.888 | 71.258 | 0.88863 |
| 3 | y = 71.294ln(x) + 27.696 | 71.294 | 0.86748 |
| 4 | y = 70.829ln(x) + 38.586 | 70.829 | 0.88832 |
| 5 | y = 47.022ln(x) + 3.6772 | 47.022 | 0.89202 |
| 6 | y = 56.311ln(x) + 28.652 | 56.311 | 0.87141 |
| 7 | y = 58.188ln(x) + 24.371 | 58.188 | 0.89709 |
| 8 | y = 62.681ln(x) + 29.387 | 62.681 | 0.91059 |
| 9 | y = 60.881ln(x) + 31.336 | 60.881 | 0.89726 |
| 10 | y = 58.585ln(x) + 39.5 | 58.585 | 0.87527 |
| 11 | y = 64.575ln(x) + 17.856 | 64.575 | 0.86721 |
| 12 | y = 62.719ln(x) + 48.299 | 62.719 | 0.83935 |
| 13 | y = 76.879ln(x) + 59.35 | 76.879 | 0.88099 |
| 14 | y = 71.569ln(x) + 19.524 | 71.569 | 0.87404 |
| 15 | dead | dead | dead |
| 16 | y = 83.287ln(x) + 49.128 | 83.287 | 0.93708 |
| 17 | y = 67.349ln(x) + 48.599 | 67.349 | 0.89315 |
| 18 | y = 61.161ln(x) + 43.018 | 61.161 | 0.88636 |
| 19 | y = 60.775ln(x) + 34.902 | 60.775 | 0.88318 |
| | max | 83.287 | 0.93708 |
| | min | 47.022 | 0.83935 |
| | Standard Deviation | 8.93816348 | |

Summary of Sensor Responses for Decreasing Force

| sensorNum | decreasing pressure logarithmic trendline | slope | $R^2$ value |
|---|---|---|---|
| 0 | y = 79.647ln(x) + 50.553 | 79.647 | 0.91966 |
| 1 | y = 71.294ln(x) + 106.52 | 71.294 | 0.90667 |
| 2 | y = 65.57ln(x) + 100.88 | 65.57 | 0.90652 |
| 3 | y = 58.609ln(x) + 91.879 | 58.609 | 0.88328 |
| 4 | y = 60.21ln(x) + 100.59 | 60.21 | 0.91721 |
| 5 | y = 35.525ln(x) + 62.436 | 35.525 | 0.90237 |
| 6 | y = 50.221ln(x) + 67.851 | 50.221 | 0.89585 |
| 7 | y = 46.808ln(x) + 81.536 | 46.808 | 0.91163 |
| 8 | y = 50.769ln(x) + 91.666 | 50.769 | 0.9325 |
| 9 | y = 51.514ln(x) + 84.023 | 51.514 | 0.91998 |
| 10 | y = 46.317ln(x) + 103.76 | 46.317 | 0.90362 |
| 11 | y = 47.234ln(x) + 99.173 | 47.234 | 0.88442 |
| 12 | y = 49.917ln(x) + 111.77 | 49.917 | 0.87557 |
| 13 | y = 57.27ln(x) + 148.53 | 57.27 | 0.91038 |
| 14 | y = 55.537ln(x) + 108.86 | 55.537 | 0.89042 |
| 15 | dead | dead | dead |
| 16 | y = 60.882ln(x) + 160.6 | 60.882 | 0.93421 |
| 17 | y = 53.444ln(x) + 120.95 | 53.444 | 0.92771 |
| 18 | y = 49.68ln(x) + 105.09 | 49.68 | 0.92358 |
| 19 | y = 59.881ln(x) + 61.353 | 59.881 | 0.94787 |
| | max | 79.647 | 0.94787 |
| | min | 35.525 | 0.87557 |
| | Standard Deviation | 9.94086457 | |

What is claimed is:

1. A sensor system, comprising:

a flexible piezoresistive fabric substrate having a shape of a portion of an article of footwear, the piezoresistive substrate having top and bottom surfaces;

an array of sensors, each sensor including two conductive traces, both of the two conductive traces for each sensor being printed, screened, or deposited directly on a same one of the surfaces of the piezoresistive substrate, each sensor being positioned on the substrate to align with a region of the exterior of a human foot; and sensor circuitry configured to energize the sensors to generate sensor signals, and to receive the sensor signals from the array of sensors, each sensor signal representing a force associated with a corresponding one of the sensors, the sensor circuitry being further configured to determine a force value for each sensor signal using calibrated sensor data representing a response of the corresponding sensor.

2. The sensor system of claim 1, further comprising a flexible dielectric substrate having the shape of the portion of an article of footwear, the flexible dielectric substrate being aligned with the flexible piezoresistive substrate and in contact with the array of sensors, the flexible dielectric substrate being secured to the flexible piezoresistive substrate only at locations on the flexible piezoresistive substrate where there are no sensors.

3. The sensor system of claim 2, wherein the flexible dielectric substrate is secured to the flexible piezoresistive substrate at the locations with patches of adhesive.

4. The sensor system of claim 2, wherein the flexible piezoresistive substrate and the flexible dielectric substrate are included among a plurality of layers, the plurality of layers further including, a stiffener, and top and bottom layers that combine to enclose and provide environmental protection to the flexible piezoresistive substrate, the flexible dielectric substrate, and the stiffener.

5. The sensor system of claim 1, wherein the sensor circuitry is disposed on a printed circuit board positioned in an aperture in the flexible piezoresistive substrate.

6. The sensor system of claim 1, wherein the sensor circuitry is configured to determine the force value for each sensor signal by mapping an analog-to-digital converter (ADC) value for each sensor signal to the force value stored in memory associated with the sensor circuitry.

7. The sensor system of claim 1, wherein the sensor circuitry is configured to determine the force value for each sensor signal corresponding to a sensor of interest by generating a first value with the sensor of interest activated, generating a second value with remaining sensors of the array activated, and processing the first and second values to account for parasitic resistances of the sensor array.

8. The sensor system of claim 1, wherein the sensor circuitry is further configured to process the sensor signals corresponding to multiple sensors to determine a speed and a direction of one or more of the corresponding forces.

9. The sensor system of claim 1, wherein the shape of the portion of an article of footwear is a shape of an insole, and wherein a first set of the sensors is positioned on the flexible piezoresistive substrate to align with undersides of toes of the human foot, a second set of the sensors is positioned on the flexible piezoresistive substrate to align with a ball of the human foot, and a third set of the sensors is positioned on the flexible piezoresistive substrate to align with a heel of the human foot.

10. The sensor system of claim 9, wherein a fourth set of the sensors is positioned on the flexible piezoresistive substrate to align with an outside edge of the human foot.

11. The sensor system of claim 1, wherein the shape of the portion of an article of footwear is a shape of an upper.

12. A sensor system, comprising:

piezoresistive fabric;

a flexible dielectric substrate having a shape of a portion of an article of footwear, the flexible dielectric fabric, the flexible dielectric substrate having top and bottom surfaces being aligned with the piezoresistive fabric, the flexible dielectric substrate having top and bottom surfaces;

an array of sensors, each sensor including two conductive traces, both of the two conductive traces for each sensor being printed, screened, or deposited directly on a same one of the surfaces of the flexible dielectric substrate, the conductive traces being in contact with the piezoresistive fabric, each sensor being positioned on the flexible dielectric substrate to align with a region of the exterior of a human foot; and sensor circuitry configured to energize the sensors to generate sensor signals, and to receive the sensor signals from the array of sensors, each sensor signal representing a force associated with a corresponding one of the sensors, the sensor circuitry being further configured to determine a force value for each sensor signal using calibrated sensor data representing a response of the corresponding sensor.

13. The sensor system of claim 12, wherein the flexible dielectric substrate is secured to the piezoresistive fabric only at locations on the flexible dielectric substrate where there are no sensors.

14. The sensor system of claim 13, wherein the flexible dielectric substrate is secured to the piezoresistive fabric at the locations with patches of adhesive.

15. The sensor system of claim 13, wherein the piezoresistive fabric and the flexible dielectric substrate are included among a plurality of layers, the plurality of layers further including, a stiffener, and top and bottom layers that combine to enclose and provide environmental protection to the piezoresistive fabric, the flexible dielectric substrate, and the stiffener.

16. The sensor system of claim 12, wherein the sensor circuitry is disposed on a printed circuit board positioned in an aperture in the flexible dielectric substrate.

17. The sensor system of claim 12, wherein the sensor circuitry is configured to determine the force value for each sensor signal by mapping an analog-to-digital converter (ADC) value for each sensor signal to the force value stored in memory associated with the sensor circuitry.

18. The sensor system of claim 12, wherein the sensor circuitry is configured to determine the force value for each sensor signal corresponding to a sensor of interest by generating a first value with the sensor of interest activated, generating a second value with remaining sensors of the array activated, and processing the first and second values to account for parasitic resistances of the sensor array.

19. The sensor system of claim 12, wherein the sensor circuitry is further configured to process the sensor signals corresponding to multiple sensors to determine a speed and a direction of one or more of the corresponding forces.

20. The sensor system of claim 12, wherein the shape of the portion of an article of footwear is a shape of an insole, and wherein a first set of the sensors is positioned on the flexible dielectric substrate to align with undersides of toes of the human foot, a second set of the sensors is positioned on the flexible dielectric substrate to align with a ball of the human foot, and a third set of the sensors is positioned on the flexible dielectric substrate to align with a heel of the human foot.

21. The sensor system of claim 20, wherein a fourth set of the sensors is positioned on the flexible dielectric substrate to align with an outside edge of the human foot.

22. The sensor system of claim 12, wherein the shape of the portion of an article of footwear is a shape of an upper.

* * * * *